(12) United States Patent
Sikervar et al.

(10) Patent No.: US 12,538,924 B2
(45) Date of Patent: Feb. 3, 2026

(54) PESTICIDALLY ACTIVE HETEROCYCLIC DERIVATIVES WITH SULFUR CONTAINING SUBSTITUENTS

(71) Applicant: SYNGENTA CROP PROTECTION AG, Basel (CH)

(72) Inventors: Vikas Sikervar, Goa (IN); Indira Sen, Goa (IN); Daniel Emery, Stein (CH); Michel Muehlebach, Stein (CH); Sebastian Rendler, Basel (CH); André Stoller, Stein (CH); Anke Buchholz, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 936 days.

(21) Appl. No.: 17/434,510

(22) PCT Filed: Feb. 28, 2020

(86) PCT No.: PCT/EP2020/055336
§ 371 (c)(1),
(2) Date: Aug. 27, 2021

(87) PCT Pub. No.: WO2020/174094
PCT Pub. Date: Sep. 3, 2020

(65) Prior Publication Data
US 2022/0132850 A1 May 5, 2022

(30) Foreign Application Priority Data

Feb. 28, 2019 (IN) .............................. 201911007906
Jun. 19, 2019 (EP) .................................... 19181176

(51) Int. Cl.
*A01N 43/90* (2006.01)
*A01N 43/40* (2006.01)
*A01P 5/00* (2006.01)
*A01P 7/02* (2006.01)
*A01P 7/04* (2006.01)
*A01P 9/00* (2006.01)
*C07D 401/04* (2006.01)
*C07D 471/04* (2006.01)

(52) U.S. Cl.
CPC ............ *A01N 43/90* (2013.01); *A01N 43/40* (2013.01); *A01P 5/00* (2021.08); *A01P 7/02* (2021.08); *A01P 7/04* (2021.08); *A01P 9/00* (2021.08); *C07D 401/04* (2013.01); *C07D 471/04* (2013.01)

(58) Field of Classification Search
CPC . A01N 43/90; A01N 43/40; A01P 5/00; A01P 7/02; A01P 7/04; A01P 9/00; C07D 401/04; C07D 471/04; C07D 213/73; C07D 213/79
See application file for complete search history.

(56) References Cited

U.S. PATENT DOCUMENTS

| 2018/0132482 A1* | 5/2018 | Furuya | .................. | C07C 321/30 |
| 2019/0021329 A1* | 1/2019 | Wilcke | ................. | C07D 471/04 |
| 2021/0059255 A1* | 3/2021 | Tanaka | .................. | A01N 47/18 |

FOREIGN PATENT DOCUMENTS

| EP | 3006429 A1 | 4/2016 | | |
| EP | 3617207 A1 | 3/2020 | | |
| WO | 2013018928 A1 | 2/2013 | | |
| WO | WO-2019178129 A1 * | 9/2019 | ........... | A61K 31/437 |
| WO | 2020141136 A1 | 7/2020 | | |

OTHER PUBLICATIONS

PubChem entry for PubChem CID 130098417 (accessed Apr. 18, 2024). (Year: 2017).*
Registry (STN) [online] 1805328-72-6, Sep. 11, 2015.
Registry (STN) [online] 1805937-09-0, Sep. 13, 2015.
Written Opinion of the International Searching Authority and International Search Report for International Application No. PCT/EP2020/055336 mailed Apr. 9, 2020.
Database Registry [Online], Chemical Abstracts Service, Columbus, Ohio, US; Jan. 27, 2013; Database Assession No. 1260671-91-7 (XP055681149).
Database Registry [Online], Chemical Abstracts Service, Columbus, Ohio, US; Sep. 11, 2015; Database Assession No. 1805136-41-7 (XP055681154).

(Continued)

*Primary Examiner* — Eric Olson
*Assistant Examiner* — Benjamin M Brandsen
(74) *Attorney, Agent, or Firm* — BakerHostetler; Toni-Junell Herbert

(57) ABSTRACT

Compounds of the Formula(I) wherein the substituents are as defined in claim 1. Furthermore, the present invention relates to agrochemical compositions which comprise compounds of formula (I), to preparation of these compositions, and to the use of the compounds or compositions 10 in agriculture or horticulture for combating, preventing or controlling animal pests, including arthropods and in particular insects, moluscs, nematodes or representatives of the order Acarina.

22 Claims, No Drawings

(56) References Cited

OTHER PUBLICATIONS

Database Registry [Online], Chemical Abstracts Service, Colombus, Ohio, US; Sep. 13, 2015; Database Assession No. 1805936-93-9 (XP055681164).
Database Registry [Online], Chemical Abstracts Service, Colombus, Ohio, US; Sep. 14, 2015; Database Assession No. 1806833-05-5 (XP055681166).
Extended European Search Report for EP Application No. 19181176.9 mailed Aug. 9, 2019.

\* cited by examiner

PESTICIDALLY ACTIVE HETEROCYCLIC DERIVATIVES WITH SULFUR CONTAINING SUBSTITUENTS

CROSS-REFERENCE TO RELATED APPLICATIONS

This application is a 371 National Stage application of International Application No. PCT/EP2020/055336 filed Feb. 28, 2020, which claims priority to IN 201911007906 filed Feb. 28, 2019, and EP 19181176.9 filed Jun. 19, 2019, the entire contents of these applications are hereby incorporated by reference.

The present invention relates to pesticidally active, in particular insecticidally active heterocyclic derivatives containing sulfur substituents, to processes for their preparation, to compositions comprising those compounds, and to their use for controlling animal pests, including arthropods and in particular insects or representatives of the order Acarina.

Heterocyclic benzannulated dihydropyrrolone and phtalimide derivatives with sulfur-containing substituents have been described in the literature, for example in *J. Org. Chem.* 2003, 62, 8240 and *Bull. Chem Soc. Chim. Belg.* 1997, 106, 151. However, none of these references have described to have a pesticidal effect. Structurally different pesticidally active heterocyclic derivatives with sulfur-containing substituents have been described, for example in WO2012/012086848, WO2013/018928 and WO2019/131575.

It has now surprisingly been found that certain novel pesticidally active derivatives with sulfur containing substitutents have favorable properties as pesticides.

The present invention therefore provides compounds of formula I,

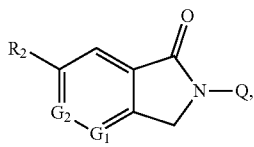

wherein $G_1$ and $G_2$ are, independently from each other, CH or N;

$R_2$ is $C_1$-$C_6$haloalkyl, $C_1$-$C_4$haloalkylsulfanyl, $C_1$-$C_4$haloalkylsulfinyl, $C_1$-$C_4$haloalkylsulfonyl or $C_1$-$C_6$haloalkoxy, $C_1$-$C_4$haloalkylsulfonyloxy;

Q is a radical selected from the group consisting of formula Qa and Qb

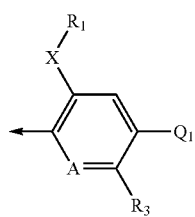

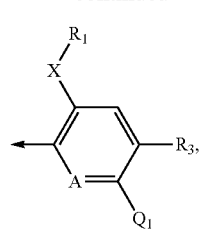

wherein the arrow denotes the point of attachment to the nitrogen atom of the bicyclic ring; and wherein A represents CH or N;

X is S, SO, or $SO_2$;

$R_1$ is $C_1$-$C_6$alkyl, or $C_3$-$C_6$cycloalkyl-$C_1$-$C_6$alkyl;

$Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$cyanoalkoxy, $C_1$-$C_6$haloalkoxy, —$N(R_4)_2$, —$N(R_4)C(=O)R_5$, —$N(R_4)CON(R_4)_2$, (oxazolidin-2-one)-3-yl, or 2-pyridyloxy; or $Q_1$ is a five- to six-membered aromatic ring system, linked via a ring carbon atom to the ring which contains the substituent A, said ring system is unsubstituted or is mono- or polysubstituted by substituents selected from the group consisting of halogen, cyano, $C_1$-$C_6$alkyl, $C_1$-$C_6$haloalkyl, $C_1$-$C_6$alkoxy, $C_1$-$C_6$haloalkoxy, $C_1$-$C_6$alkylsulfanyl, $C_1$-$C_6$alkylsulfinyl and $C_1$-$C_6$alkylsulfonyl; and said ring system can contain 1, 2 or 3 ring heteroatoms selected from the group consisting of nitrogen, oxygen and sulfur, where said ring system may not contain more than one ring oxygen atom and not more than one ring sulfur atom; or $Q_1$ is a five-membered aromatic ring system linked via a ring nitrogen atom to the ring which contains the substituent A, said ring system is unsubstituted or is mono- or polysubstituted by substituents selected from the group consisting of halogen, cyano, $C_1$-$C_6$alkyl, $C_1$-$C_6$haloalkyl, $C_1$-$C_6$alkoxy, $C_1$-$C_6$haloalkoxy, $C_1$-$C_6$alkylsulfanyl, $C_1$-$C_6$alkylsulfinyl and $C_1$-$C_6$alkylsulfonyl; and said ring system contains 1, 2 or 3 ring heteroatoms selected from the group consisting of nitrogen, oxygen and sulfur, where said ring system contains at least one ring nitrogen atom and may not contain more than one ring oxygen atom and not more than one ring sulfur atom;

$R_3$ is hydrogen, halogen or $C_1$-$C_6$alkyl;

each $R_4$ independently is hydrogen, $C_1$-$C_6$alkyl or $C_3$-$C_6$cycloalkyl; and $R_5$ is $C_1$-$C_6$alkyl, $C_1$-$C_6$haloalkyl or $C_3$-$C_6$cycloalkyl.

The present invention also provides agrochemically acceptable salts, stereoisomers, enantiomers, tautomers and N-oxides of the compounds of formula I.

Compounds of formula I which have at least one basic centre can form, for example, acid addition salts, for example with strong inorganic acids such as mineral acids, for example perchloric acid, sulfuric acid, nitric acid, nitrous acid, a phosphorus acid or a hydrohalic acid, with strong organic carboxylic acids, such as $C_1$-$C_6$alkanecarboxylic acids which are unsubstituted or substituted, for example by halogen, for example acetic acid, such as saturated or unsaturated dicarboxylic acids, for example oxalic acid, malonic acid, succinic acid, maleic acid, fumaric acid or phthalic acid, such as hydroxycarboxylic acids, for example ascorbic acid, lactic acid, malic acid, tartaric acid or citric acid, or such as benzoic acid, or with organic sulfonic acids, such as $C_1$-$C_6$alkane- or arylsulfonic acids which are unsubstituted or substituted, for example by halogen, for example methane- or p-toluenesulfonic acid. Compounds of formula I which have at least one acidic group can form, for example, salts with bases, for example mineral salts such as alkali metal or alkaline earth metal salts, for example sodium, potassium or magnesium salts, or salts with ammonia or an organic amine, such as morpholine, piperidine, pyrrolidine, a mono-, di- or tri-lower-alkylamine, for example ethyl-, diethyl-, triethyl- or dimethylpropylamine, or a mono-, di- or trihydroxy-lower-alkylamine, for example mono-, di- or triethanolamine.

In each case, the compounds of formula (I) according to the invention are in free form, in oxidized form as a N-oxide or in salt form, e.g. an agronomically usable salt form.

N-oxides are oxidized forms of tertiary amines or oxidized forms of nitrogen containing heteroaromatic compounds. They are described for instance in the book "Heterocyclic N-oxides" by A. Albini and S. Pietra, CRC Press, Boca Raton 1991.

The compounds of formula I according to the invention also include hydrates which may be formed during the salt formation.

Where substituents are indicated as being itself further substituted, this means that they carry one or more identical or different substituents, e.g. one to four substituents. Normally not more than three such optional substituents are present at the same time. Preferably not more than two such substituents are present at the same time (i.e. the group is substituted by one or two of the substituents indicated). Where the additional substituent group is a larger group, such as cycloalkyl or phenyl, it is most preferred that only one such optional substituent is present. Where a group is indicated as being substituted, e.g. alkyl, this includes those groups that are part of other groups, e.g. the alkyl in alkylthio.

The term "$C_1$-$C_n$alkyl" as used herein refers to a saturated straight-chain or branched hydrocarbon radical attached via any of the carbon atoms having 1 to n carbon atoms, for example, any one of the radicals methyl, ethyl, n-propyl, 1-methylbutyl, 2-methylbutyl, 3-methylbutyl, 2,2-dimethylpropyl, 1-ethylpropyl, n-hexyl, n-pentyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl.

The term "$C_1$-$C_n$haloalkyl" as used herein refers to a straight-chain or branched saturated alkyl radical attached via any of the carbon atoms having 1 to n carbon atoms (as mentioned above), where some or all of the hydrogen atoms in these radicals may be replaced by fluorine, chlorine, bromine and/or iodine, i.e., for example, any one of chloromethyl, dichloromethyl, trichloromethyl, fluoromethyl, difluoromethyl, trifluoromethyl, chlorofluoromethyl, dichlorofluoromethyl, chlorodifluoromethyl, 2-fluoroethyl, 2-chloroethyl, 2-bromoethyl, 2-iodoethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, 2-fluoropropyl, 3-fluoropropyl, 2,2-difluoropropyl, 2,3-difluoropropyl, 2-chloropropyl, 3-chloropropyl, 2,3-dichloropropyl, 2-bromopropyl, 3-bromopropyl, 3,3,3-trifluoropropyl, 3,3,3-trichloropropyl, 2,2,3,3,3-pentafluoropropyl, heptafluoropropyl, 1-(fluoromethyl)-2-fluoroethyl, 1-(chloromethyl)-2-chloroethyl, 1-(bromomethyl)-2-bromoethyl, 4-fluorobutyl, 4-chlorobutyl, 4-bromobutyl or nonafluorobutyl. According a term "$C_1$-$C_2$-fluoroalkyl" would refer to a $C_1$-$C_2$-alkyl radical which carries 1,2,3,4, or 5 fluorine atoms, for example, any one of difluoromethyl, trifluoromethyl, 1-fluoroethyl, 2-fluoroethyl, 2,2-difluoroethyl, 2,2,2-trifluoroethyl, 1,1,2,2-tetrafluoroethyl or pentafluoroethyl.

The term "$C_1$-$C_n$alkoxy" as used herein refers to a straight-chain or branched saturated alkyl radical having 1 to n carbon atoms (as mentioned above) which is attached via an oxygen atom, i.e., for example, any one of methoxy, ethoxy, n-propoxy, 1-methylethoxy, n-butoxy, 1-methylpropoxy, 2-methylpropoxy or 1,1-dimethylethoxy.

The term "$C_1$-$C_n$haloalkoxy" as used herein refers to a $C_1$-$C_n$alkoxy radical as mentioned above which is partially or fully substituted by fluorine, chlorine, bromine and/or iodine, i.e., for example, any one of chloromethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 2-fluoroethoxy, 2-chloroethoxy, 2-bromoethoxy, 2-iodoethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, pentafluoroeth-oxy, 2-fluoropropoxy, 3-fluoropropoxy, 2,2-difluoropropoxy, 2,3-difluoropropoxy, 2-chloropropoxy, 3-chloropropoxy, 2,3-dichloropropoxy, 2-bromopropoxy, 3-bromopropoxy, 3,3,3-trifluoropropoxy, 3,3,3-trichloropropoxy, 2,2,3,3,3-pentafluoropropoxy, heptafluoropropoxy, 1-(fluoromethyl)-2-fluoroethoxy, 1-(chloromethyl)-2-chloroethoxy, 1-(bromomethyl)-2-bromoethoxy, 4-fluorobutoxy, 4-chlorobutoxy, or 4-bromobutoxy.

The term "$C_1$-$C_n$-alkylsulfanyl" as used herein refers to a straight chain or branched saturated alkyl radical having 1 to n carbon atoms (as mentioned above) which is attached via a sulfur atom, i.e., for example, any one of methylthio, ethylthio, n-propylthio, 1-methylethylthio, butylthio, 1-methylpropylthio, 2-methylpropylthio or 1,1-dimethylethylthio.

The term "$C_1$-$C_n$alkylsulfinyl" as used herein refers to a straight chain or branched saturated alkyl radical having 1 to n carbon atoms (as mentioned above) which is attached via the sulfur atom of the sulfinyl group, i.e., for example, any one of methylsulfinyl, ethylsulfinyl, n-propylsulfinyl, 1-methylethyl-sulfinyl, n-butylsulfinyl, 1-methylpropylsulfinyl, 2-methylpropylsulfinyl, 1,1-dimethyl-ethylsulfinyl, n-pentylsulfinyl, 1-methylbutylsulfinyl, 2-methylbutylsulfinyl, 3-methyl-butylsulfinyl, 1,1-dimethylpropylsulfinyl, 1,2-dimethylpropylsulfinyl, 2,2-dimethylpropylsulfinyl or 1-ethylpropylsulfinyl.

The term "$C_1$-$C_n$alkylsulfonyl" as used herein refers to a straight chain or branched saturated alkyl radical having 1 to n carbon atoms (as mentioned above) which is attached via the sulfur atom of the sulfonyl group, i.e., for example, any one of methylsulfonyl, ethylsulfonyl, n-propylsulfonyl, isopropylsulfonyl, n-butylsulfonyl, 1-methylpropylsulfonyl, 2-methylpropylsulfonyl or t-butylsulphonyl.

The term "$C_1$-$C_n$haloalkylsulfanyl" as used herein refers to a $C_1$-$C_n$alkylthio radical as mentioned above which is partially or fully substituted by fluorine, chlorine, bromine and/or iodine, i.e., for example, any one of fluoromethylthio, difluoromethylthio, trifluoromethylthio, chlorodifluoromethylthio, bromodifluoromethylthio, 2-fluoroethylthio, 2-chloroethylthio, 2-bromoethylthio, 2-iodoethylthio, 2,2-difluoroethylthio, 2,2,2-trifluoroethylthio, 2,2,2-trichloroethylthio, 2-chloro-2-fluoroethylthio, 2-chloro-2,2-difluoroethylthio, 2,2-dichloro-2-fluoroethylthio, pentafluoroethylthio, 2-fluoropropylthio, 3-fluoropropylthio, 2-chloropropylthio, 3-chloropropylthio, 2-bromopropylthio, 3-bromopropylthio, 2,2-difluoropropylthio, 2,3-difluoropropylthio, 2,3-dichloropropylthio, 3,3,3-trifluoropropylthio, 3,3,3-trichloropropylthio, 2,2,3,3,3-pentafluoropropylthio, heptafluoropropylthio, 1-(fluoromethyl)-2-fluoroethylthio, 1-(chloromethyl)-2-chloroethylthio, 1-(bromomethyl)-2-bromoethylthio, 4-fluorobutylthio, 4-chlorobutylthio, or 4-bromobutylthio.

The term "$C_1$-$C_n$haloalkylsulfinyl" and "$C_1$-$C_n$haloalkylsulfonyl" refers to the groups above but with the sulfur in oxidations state 1 or 2 respectively.

The term "$C_1$-$C_n$cyanoalkyl" as used herein refers to a straight chain or branched saturated alkyl radicals having 1 to n carbon atoms (as mentioned above) which is substituted by a cyano group, for example cyanomethylene, cyanoethylene, 1,1-dimethylcyanomethyl, cyanomethyl, cyanoethyl, and 1-dimethylcyanomethyl.

The suffix "—$C_1$-$C_n$alkyl" after terms such as "$C_3$-$C_n$cycloalkyl", wherein n is an integer from 1-6, as used herein refers to a straight chain or branched saturated alkyl radicals which is substituted by $C_3$-$C_n$cycloalkyl. An example of $C_3$-$C_n$cycloalkyl-$C_1$-$C_n$alkyl is for example, cyclopropylmethyl.

The term "$C_3$-$C_6$cycloalkyl" as used herein refers to 3-6 membered cycloylkyl groups such as cyclopropane, cyclobutane, cyclopropane, cyclopentane and cyclohexane.

Halogen is generally fluorine, chlorine, bromine or iodine. This also applies, correspondingly, to halogen in combination with other meanings, such as haloalkyl.

In the context of this invention "mono- or polysubstituted" in the definition of the $Q_1$ substituents, means typically, depending on the chemical structure of the substituents, monosubstituted to five-times substituted, more preferably mono-, double- or triple-substituted.

In the context of the this invention, the phrase "$Q_1$ is a five- to six-membered aromatic ring system, linked via a ring carbon atom to the ring which contains the substituent A . . . " and the phrase "$Q_1$ is a five-membered aromatic ring system linked via a ring nitrogen atom to the ring which contains the substituent A . . . ", as the case may be, refer to the manner of attachment of particular embodiments of the substituent $Q_1$ to the radical Q as represented by either formula Qa or formula Qb, as the case may be.

In the context of this invention, examples of "$Q_1$ is a five- to six-membered aromatic ring system, linked via a ring carbon atom to the ring which contains the substituent A, . . . ; and said ring system can contain 1, 2 or 3 ring heteroatoms . . . " are, but not limited to, phenyl, pyrazolyl, triazolyl, pyridinyl and pyrimidinyl; preferably phenyl, 2-pyridyl, 3-pyridyl, 4-pyridyl, pyrimidin-2-yl, pyrimidin-4-yl, and pyrimidin-5-yl.

In the context of this invention, examples of a "$Q_1$ is a five-membered aromatic ring system linked via a ring nitrogen atom to the ring which contains the substituent A, . . . ; and said ring system contains 1, 2 or 3 ring heteroatoms . . . " are, but not limited to, pyrazolyl, pyrrolyl, imidazolyl and triazolyl; preferably pyrrol-1-yl, pyrazol-1-yl, triazol-2-yl, 1,2,4-triazol-1-yl, triazol-1-yl, and imidazol-1-yl.

Certain embodiments according to the invention are provided as set out below.

Embodiment 1 provides compounds of formula I, or an agrochemically acceptable salt, stereoisomer, enantiomer, tautomer or N-oxide thereof, as defined above.

Embodiment 2 provides compounds, or an agrochemically acceptable salt, stereoisomer, enantiomer, tautomer or N-oxide thereof, according to embodiment 1 wherein Q is Qa and preferred values of $G_1$, $G_2$, $R_2$, A, X, $R_1$, $Q_1$, $R_3$, $R_4$ and $R_5$ are, in any combination thereof, as set out below:

Preferably either $G_1$ is N and $G_2$ is CH, or $G_1$ is CH and $G_2$ is N;

Also preferred is when both $G_1$ and $G_2$ are N;

Also preferred is when both $G_1$ and $G_2$ are CH;

Most preferably $G_1$ is CH and $G_2$ is N;

Preferably $R_2$ is $C_1$-$C_6$haloalkyl, $C_1$-$C_6$haloalkoxy, $C_1$-$C_4$haloalkylsulfonyl or $C_1$-$C_4$haloalkylsulfonyloxy;

More preferably $R_2$ is —$OSO_2CF_3$, $SO_2CF_3$, —$OCF_3$, $CF_2CF_3$ or $CF_3$;

Most preferably $R_2$ is $CF_2CF_3$ or $CF_3$;

Preferably A is N or CH;

Most preferably A is N;

Preferably X is S or $SO_2$;

Most preferably X is $SO_2$;

Preferably $R_1$ is $C_1$-$C_4$alkyl or $C_3$-$C_6$cycloalkyl-$C_1$-$C_4$alkyl;

More preferably $R_1$ is ethyl or cyclopropylmethyl;

Most preferably $R_1$ is ethyl;

Preferably $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —$N(R_4)_2$, —$N(R_4)COR_5$, —$N(R_4)CON(R_4)_2$, (oxazolidin-2-one)-3-yl or 2-pyridyloxy;

Also preferred is when $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms;

Also preferred is when $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms.

More preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —$N(R_4)_2$, —$N(R_4)COR_5$, or —$N(R_4)CON(R_4)_2$, in each of which $R_4$ is independently either hydrogen or methyl and $R_5$ is either methyl, ethyl or cyclopropyl;

Most preferably $Q_1$ is hydrogen, bromine, trifluoromethyl, cyclopropyl, 1-cyanocyclopropyl, 1-cyano-1-methyl-ethyl, 2,2,2-trifluoroethoxy, —$NH(CH_3)$, —$N(CH_3)COCH_3$, —$N(CH_3)COCH_2CH_3$, —$N(CH_3)CO(cyclopropyl)$, —$N(H)CONH(CH_3)$, —$N(CH_3)CONH(CH_3)$, (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl;

Preferably each $R_4$ independently is hydrogen or $C_1$-$C_6$alkyl;

Most preferably each $R_4$ independently is hydrogen or methyl;

Preferably $R_5$ is $C_1$-$C_6$alkyl or $C_3$-$C_6$cycloalkyl;

More preferably $R_5$ is methyl, ethyl or cyclopropyl;

Most preferably $R_5$ is methyl;

Preferably $R_3$ is hydrogen or $C_1$-$C_6$alkyl;

More preferably $R_3$ is hydrogen or methyl; and

Most preferably $R_3$ is hydrogen.

Embodiment 3 provides compounds, or an agrochemically acceptable salt, stereoisomer, enantiomer, tautomer or N-oxide thereof, according to embodiment 1 wherein Q is Qb and preferred values of $G_1$, $G_2$, $R_2$, $R_1$, X, $Q_1$, A, $R_4$, $R_5$ and $R_3$ are, in any combination thereof, as set out below:

Preferably either $G_1$ is N and $G_2$ is CH, or $G_1$ is CH and $G_2$ is N;

Also preferred is when both $G_1$ and $G_2$ are N;

Also preferred is when both $G_1$ and $G_2$ are CH;

Most preferably $G_1$ is CH and $G_2$ is N;

Preferably $R_2$ is $C_1$-$C_6$haloalkyl, $C_1$-$C_6$haloalkoxy, $C_1$-$C_6$haloalkylsulfonyl or $C_1$-$C_6$haloalkylsulfonyloxy;

More preferably $R_2$ is —$OSO_2CF_3$, $SO_2CF_3$, —$OCF_3$, $CF_2CF_3$ or $CF_3$;

Most preferably $R_2$ is $CF_2CF_3$ or $CF_3$;

Preferably A is N or CH;

Most preferably A is N;

Preferably X is S or $SO_2$;

Most preferably X is $SO_2$;

Preferably $R_1$ is $C_1$-$C_6$alkyl or $C_3$-$C_6$cycloalkyl-$C_1$-$C_6$alkyl;

More preferably $R_1$ is ethyl or cyclopropylmethyl;

Most preferably $R_1$ is ethyl;

Preferably $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —$N(R_4)_2$, —$N(R_4)COR_5$, —$N(R_4)CON(R_4)_2$, (oxazolidin-2-one)-3-yl or 2-pyridyloxy;

Also preferred is when $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms;

Also preferred is when $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms.

More preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —$N(R_4)_2$, —$N(R_4)COR_5$, or —$N(R_4)CON(R_4)_2$, in each of which $R_a$ is independently either hydrogen or methyl and $R_5$ is either methyl, ethyl or cyclopropyl;

Most preferably $Q_1$ is hydrogen, bromine, trifluoromethyl, cyclopropyl, 1-cyanocyclopropyl, 1-cyano-1-methyl-ethyl, 2,2,2-trifluoroethoxy, —$NH(CH_3)$, —$N(CH_3)COCH_3$, —$N(CH_3)COCH_2CH_3$, —$N(CH_3)CO(cyclopropyl)$, —$N(H)CONH(CH_3)$, —$N(CH_3)CONH(CH_3)$, (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl;

Preferably each $R_4$ independently is hydrogen or $C_1$-$C_6$alkyl;

Most preferably each $R_4$ independently is hydrogen or methyl;

Preferably $R_5$ is $C_1$-$C_6$alkyl or $C_3$-$C_6$cycloalkyl;

More preferably $R_5$ is methyl, ethyl or cyclopropyl;

Most preferably $R_5$ is methyl;

Preferably $R_3$ is hydrogen or $C_1$-$C_6$alkyl;

More preferably $R_3$ is hydrogen or methyl; and

Most preferably $R_3$ is hydrogen.

Further embodiments according to the invention are provided as set forth below.

A preferred group of compounds of formula I is represented by the compounds of formula I-A1

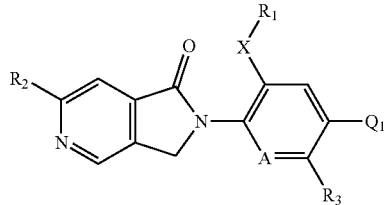

I-A1

Wherein A, $R_1$, $R_2$, $R_3$, X, $Q_1$, $R_4$ and $R_5$ are as defined under formula I above.

In one preferred group of compounds of formula I-A1, A is CH or N; $R_1$ is $C_1$-$C_6$alkyl or $C_3$-$C_6$cycloalkyl-$C_1$-$C_6$alkyl; $R_2$ is $C_1$-$C_2$haloalkyl, $C_1$-$C_2$haloalkoxy, $C_1$-$C_2$haloalkylsulfanyl, $C_1$-$C_2$haloalkylsulfinyl or $C_1$-$C_2$haloalkylsulfonyl; $R_3$ is hydrogen or $C_1$-$C_6$alkyl; X is S or $SO_2$; $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —$N(R_4)_2$, —$N(R_4)COR_5$, —$N(R_4)CON(R_4)_2$, (oxazolidin-2-one)-3-yl or 2-pyridyloxy; in which each $R_4$ independently is hydrogen or $C_1$-$C_6$alkyl; and $R_5$ is $C_1$-$C_6$alkyl or $C_3$-$C_6$cycloalkyl.

In another preferred group of compounds of formula I-A1, A is CH or N; $R_1$ is ethyl or cyclopropylmethyl; $R_2$ is —$OSO_2CF_3$, $SO_2CF_3$, —$OCF_3$, $CF_2CF_3$ or $CF_3$; $R_3$ is hydrogen or methyl; X is S or $SO_2$; and $Q_1$ is hydrogen, bromine, trifluoromethyl, cyclopropyl, 1-cyanocyclopropyl, 1-cyano-1-methyl-ethyl, 2,2,2-trifluoroethoxy, —$NH(CH_3)$, —$N(CH_3)COCH_3$, —$N(CH_3)COCH_2CH_3$, —$N(CH_3)CO(cyclopropyl)$, —$N(H)CONH(CH_3)$, —$N(CH_3)CONH(CH_3)$, (oxazolidin-2-one)-3-yl, or 2-pyridyloxy.

In another further preferred group of compounds of formula I-A1, $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms. In this embodiment, more preferably $Q_1$ is C-linked pyrimidinyl.

Also preferred compounds of formula I-A1 are those wherein $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms. In this embodiment, more preferably $Q_1$ is N-linked pyrazolyl which can be mono-substituted by chloro or trifluoromethyl; or $Q_1$ is N-linked triazolyl.

In compounds of formula I-A1 and all of the preferred embodiments of compounds of formula I-A1 mentioned above, unless otherwise specified, A, $R_1$, $R_2$, $R_3$, X, $Q_1$, $R_4$ and $R_5$ are as defined under formula I above; preferably A is CH or N, more preferably A is N; preferably $R_1$ is ethyl or cyclopropylmethyl; most preferably $R_1$ is ethyl; preferably $R_2$ is —$OSO_2CF_3$, $SO_2CF_3$, —$OCF_3$, $CF_2CF_3$ or $CF_3$; most preferably $R_2$ is $CF_2CF_3$ or $CF_3$; preferably X is S or $SO_2$;

most preferably X is $SO_2$; preferably $R_3$ is hydrogen; preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —$N(R_4)_2$, —$N(R_4)COR_5$, or —$N(R_4)CON(R_4)_2$, in each of which $R_a$ is independently either hydrogen or methyl and $R_5$ is either methyl, ethyl or cyclopropyl; more preferably $Q_1$ is hydrogen, bromine, trifluoromethyl, cyclopropyl, 1-cyanocyclopropyl, 1-cyano-1-methyl-ethyl, 2,2,2-trifluoroethoxy, —$NH(CH_3)$, —$N(CH_3)COCH_3$, —$N(CH_3)COCH_2CH_3$, —$N(CH_3)CO(cyclopropyl)$, —$N(H)CONH(CH_3)$, —$N(CH_3)CONH(CH_3)$, (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-A1-1) which are compounds of formula (I-A1) wherein preferably A is N; preferably $R_1$ is ethyl or cyclopropylmethyl; most preferably $R_1$ is ethyl; preferably $R_2$ is $SO_2CF_3$, —$OCF_3$, $CF_2CF_3$ or $CF_3$; most preferably $R_2$ is $CF_2CF_3$ or $CF_3$; preferably X is S or $SO_2$; most preferably X is $SO_2$; preferably $R_3$ is hydrogen; preferably $Q_1$ is hydrogen, halogen, trifluoromethyl, cyclopropyl, cyanocyclopropyl, cyanoisopropyl, 2-pyridyloxy, N-linked pyrazolyl which can be mono-substituted by chloro or trifluoromethyl, or —$N(R_4)COR_5$ in which $R_a$ is hydrogen and $R_5$ is either methyl or ethyl; more preferably $Q_1$ is hydrogen, bromine, trifluoromethyl, cyclopropyl, 1-cyanocyclopropyl, 1-cyano-1-methyl-ethyl, —$N(CH_3)COCH_3$, 2-pyridyloxy, 3-chloro-pyrazol-1-yl or 3-trifluoromethyl-pyrazol-1-yl.

Another preferred group of compounds of formula I is represented by the compounds of formula I-A2

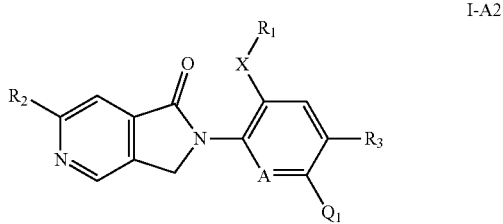

I-A2

Wherein A, $R_1$, $R_2$, $R_3$, X, $Q_1$, $R_4$ and $R_5$ are as defined under formula I above.

In one preferred group of compounds of formula I-A2, A is CH or N; $R_1$ is $C_1$-$C_6$alkyl or $C_3$-$C_6$cycloalkyl-$C_1$-$C_6$alkyl; $R_2$ is $C_1$-$C_2$haloalkyl, $C_1$-$C_2$haloalkoxy, $C_1$-$C_2$haloalkylsulfanyl, $C_1$-$C_2$haloalkylsulfinyl or $C_1$-$C_2$haloalkylsulfonyl; $R_3$ is hydrogen or $C_1$-$C_4$alkyl; X is S or $SO_2$; $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —$N(R_4)_2$, —$N(R_4)COR_5$, —$N(R_4)CON(R_4)_2$, (oxazolidin-2-one)-3-yl or 2-pyridyloxy; in which each $R_4$ independently is hydrogen or $C_1$-$C_6$alkyl; and $R_5$ is $C_1$-$C_6$alkyl or $C_3$-$C_6$cycloalkyl.

In another preferred group of compounds of formula I-A2, A is CH or N; $R_1$ is ethyl or cyclopropylmethyl; $R_2$ is —$OSO_2CF_3$, $SO_2CF_3$, —$OCF_3$, $CF_2CF_3$ or $CF_3$; $R_3$ is hydrogen or methyl; X is S or $SO_2$; and $Q_1$ is hydrogen, bromine, trifluoromethyl, cyclopropyl, 1-cyanocyclopropyl, 1-cyano-1-methyl-ethyl, 2,2,2-trifluoroethoxy, —$NH(CH_3)$, —$N(CH_3)COCH_3$, —$N(CH_3)COCH_2CH_3$, —$N(CH_3)CO$(cyclopropyl), —$N(H)CONH(CH_3)$, —$N(CH_3)CONH(CH_3)$, (oxazolidin-2-one)-3-yl, or 2-pyridyloxy.

In another further preferred group of compounds of formula I-A2, $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms. In this embodiment, more preferably $Q_1$ is C-linked pyrimidinyl.

Also preferred compounds of formula I-A2 are those wherein $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms. In this embodiment, more preferably $Q_1$ is N-linked pyrazolyl which can be mono-substituted by chloro or trifluoromethyl; or $Q_1$ is N-linked triazolyl.

In compounds of formula I-A2 and all of the preferred embodiments of compounds of formula I-A2 mentioned above, unless otherwise specified, A, $R_1$, $R_2$, $R_3$, X, $Q_1$, $R_4$ and $R_5$ are as defined under formula I above; preferably A is CH or N, more preferably A is N; preferably $R_1$ is ethyl or cyclopropylmethyl; most preferably $R_1$ is ethyl; preferably $R_2$ is —$OSO_2CF_3$, $SO_2CF_3$, —$OCF_3$, $CF_2CF_3$ or $CF_3$; most preferably $R_2$ is $CF_2CF_3$ or $CF_3$; preferably X is S or $SO_2$; most preferably X is $SO_2$; preferably $R_3$ is hydrogen; preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —$N(R_4)_2$, —$N(R_4)COR_5$, or —$N(R_4)CON(R_4)_2$, in each of which $R_a$ is independently either hydrogen or methyl and $R_5$ is either methyl, ethyl or cyclopropyl; more preferably $Q_1$ is hydrogen, bromine, trifluoromethyl, cyclopropyl, 1-cyanocyclopropyl, 1-cyano-1-methyl-ethyl, 2,2,2-trifluoroethoxy, —$NH(CH_3)$, —$N(CH_3)COCH_3$, —$N(CH_3)COCH_2CH_3$, —$N(CH_3)CO$(cyclopropyl), —$N(H)CONH(CH_3)$, —$N(CH_3)CONH(CH_3)$, (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-A2-1) which are compounds of formula (I-A2) wherein preferably A is N; preferably $R_1$ is ethyl or cyclopropylmethyl; most preferably $R_1$ is ethyl; preferably $R_2$ is $SO_2CF_3$, —$OCF_3$, $CF_2CF_3$ or $CF_3$; most preferably $R_2$ is $CF_2CF_3$ or $CF_3$; preferably X is S or $SO_2$; most preferably X is $SO_2$; preferably $R_3$ is hydrogen; preferably $Q_1$ is hydrogen, cyclopropyl, N-linked triazolyl, C-linked pyrimidinyl, —$N(R_4)_2$, —$N(R_4)COR_5$, or —$N(R_4)CON(R_4)_2$, in each of which $R_a$ is independently either hydrogen or methyl and $R_5$ is either methyl, ethyl or cyclopropyl; more preferably $Q_1$ is hydrogen, cyclopropyl, —$NH(CH_3)$, —$N(CH_3)COCH_3$, —$N(CH_3)COCH_2CH_3$, —$N(CH_3)CO$(cyclopropyl), —$N(CH_3)CONH(CH_3)$, 1,2,4-triazol-1-yl or pyrimidin-2-yl.

Another preferred group of compounds of formula I is represented by the compounds of formula I-B1

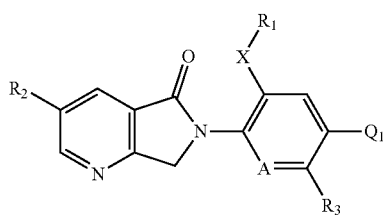

Wherein A, $R_1$, $R_2$, $R_3$, X, $Q_1$, $R_4$ and $R_5$ are as defined under formula I above.

In one preferred group of compounds of formula I-B1, A is CH or N; $R_1$ is $C_1$-$C_6$alkyl or $C_3$-$C_6$cycloalkyl-$C_1$-$C_6$alkyl; $R_2$ is $C_1$-$C_2$haloalkyl, $C_1$-$C_2$haloalkoxy, $C_1$-$C_2$haloalkylsulfanyl, $C_1$-$C_2$haloalkylsulfinyl or $C_1$-$C_2$haloalkylsulfonyl; $R_3$ is hydrogen or $C_1$-$C_6$alkyl; X is S or $SO_2$; $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —N($R_4$)$_2$, —N($R_4$)COR$_5$, —N($R_4$)CON($R_4$)$_2$, (oxazolidin-2-one)-3-yl or 2-pyridyloxy; in which each $R_4$ independently is hydrogen or $C_1$-$C_6$alkyl; and $R_5$ is $C_1$-$C_6$alkyl or $C_3$-$C_6$cycloalkyl.

In another preferred group of compounds of formula I-B1, A is CH or N; $R_1$ is ethyl or cyclopropylmethyl; $R_2$ is —OSO$_2$CF$_3$, SO$_2$CF$_3$, —OCF$_3$, CF$_2$CF$_3$ or CF$_3$; $R_3$ is hydrogen or methyl; X is S or SO$_2$; and $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, or 2-pyridyloxy.

In another further preferred group of compounds of formula I-B1, $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms. In this embodiment, more preferably $Q_1$ is C-linked pyrimidinyl.

Also preferred compounds of formula I-B1 are those wherein $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms. In this embodiment, more preferably $Q_1$ is N-linked pyrazolyl which can be mono-substituted by chloro or trifluoromethyl; or $Q_1$ is N-linked triazolyl.

In compounds of formula I-B1 and all of the preferred embodiments of compounds of formula I-B1 mentioned above, unless otherwise specified, A, $R_1$, $R_2$, $R_3$, X, $Q_1$, $R_4$ and $R_5$ are as defined under formula I above; preferably A is CH or N, more preferably A is N; preferably $R_1$ is ethyl or cyclopropylmethyl; most preferably $R_1$ is ethyl; preferably $R_2$ is —OSO$_2$CF$_3$, SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —N($R_4$)$_2$, —N($R_4$)COR$_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-B1-1) which are compounds of formula (I-B1) wherein preferably A is N; preferably $R_1$ is ethyl or cyclopropylmethyl; most preferably $R_1$ is ethyl; preferably $R_2$ is SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, 2-pyridyloxy, N-linked pyrazolyl which can be mono-substituted by chloro or trifluoromethyl, or —N($R_4$)COR$_5$ in which $R_a$ is hydrogen and $R_5$ is either methyl or ethyl; more preferably $Q_1$ is hydrogen, bromine, trifluoromethyl, cyclopropyl, 1-cyanocyclopropyl, 1-cyano-1-methyl-ethyl, —N(CH$_3$)COCH$_3$, 2-pyridyloxy, 3-chloro-pyrazol-1-yl or 3-trifluoromethyl-pyrazol-1-yl.

Another preferred group of compounds according to this embodiment are compounds of formula (I-B1-2) which are compounds of formula (I-B1) wherein preferably A is N; preferably $R_1$ is ethyl or cyclopropylmethyl; most preferably $R_1$ is ethyl; preferably $R_2$ is SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, 2-pyridyloxy, N-linked pyrazolyl which can be mono-substituted by chloro or trifluoromethyl, or —N($R_4$)COR$_5$ in which $R_a$ is hydrogen and $R_5$ is either methyl or ethyl; more preferably $Q_1$ is hydrogen, 1-cyanocyclopropyl or 1-cyano-1-methyl-ethyl.

Another preferred group of compounds of formula I is represented by the compounds of formula I-B2

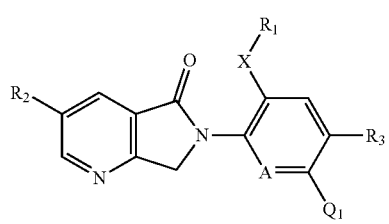

Wherein A, $R_1$, $R_2$, $R_3$, X, $Q_1$, $R_4$ and $R_5$ are as defined under formula I above.

In one preferred group of compounds of formula I-B2, A is CH or N; $R_1$ is $C_1$-$C_6$alkyl or $C_3$-$C_6$cycloalkyl-$C_1$-$C_6$alkyl; $R_2$ is $C_1$-$C_2$haloalkyl, $C_1$-$C_2$haloalkoxy, $C_1$-$C_2$haloalkylsulfanyl, $C_1$-$C_2$haloalkylsulfinyl or $C_1$-$C_2$haloalkylsulfonyl; $R_3$ is hydrogen or $C_1$-$C_6$alkyl; X is S or SO$_2$; $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —N($R_4$)$_2$, —N($R_4$)CO$R_5$, —N($R_4$)CON($R_4$)$_2$, (oxazolidin-2-one)-3-yl or 2-pyridyloxy; in which each $R_4$ independently is hydrogen or $C_1$-$C_6$alkyl; and $R_5$ is $C_1$-$C_6$alkyl or $C_3$-$C_6$cycloalkyl.

In another preferred group of compounds of formula I-B2, A is CH or N; $R_1$ is ethyl or cyclopropylmethyl; $R_2$ is —OSO$_2$CF$_3$, SO$_2$CF$_3$, —OCF$_3$, CF$_2$CF$_3$ or CF$_3$; $R_3$ is hydrogen or methyl; X is S or SO$_2$; and $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO (cyclopropyl), —N(H)CONH(CH$_3$), —N(CH$_3$)CONH (CH$_3$), (oxazolidin-2-one)-3-yl, or 2-pyridyloxy.

In another further preferred group of compounds of formula I-B2, $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_4$haloalkyl; and said ring system can contain 1 or 2 ring nitrogen atoms. In this embodiment, more preferably $Q_1$ is C-linked pyrimidinyl.

Also preferred compounds of formula I-B2 are those wherein $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms. In this embodiment, more preferably $Q_1$ is N-linked pyrazolyl which can be mono-substituted by chloro or trifluoromethyl; or $Q_1$ is N-linked triazolyl.

In compounds of formula I-B2 and all of the preferred embodiments of compounds of formula I-B2 mentioned above, unless otherwise specified, A, $R_1$, $R_2$, $R_3$, X, $Q_1$, $R_4$ and $R_5$ are as defined under formula I above; preferably A is CH or N, more preferably A is N; preferably $R_1$ is ethyl or cyclopropylmethyl; most preferably $R_1$ is ethyl; preferably $R_2$ is —OSO$_2$CF$_3$, SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —N($R_4$)$_2$, —N($R_4$)CO$R_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-B2-1) which are compounds of formula (I-B2) wherein preferably A is N; preferably $R_1$ is ethyl or cyclopropylmethyl; most preferably $R_1$ is ethyl; preferably $R_2$ is SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, cyclopropyl, N-linked triazolyl, C-linked pyrimidinyl, —N($R_4$)$_2$, —N($R_4$)CO$R_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, cyclopropyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), 1,2,4-triazol-1-yl or pyrimidin-2-yl.

Another preferred group of compounds of formula I is represented by the compounds of formula I-C$_1$

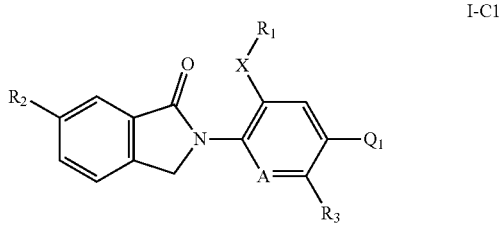

I-C1

Wherein A, $R_1$, $R_2$, $R_3$, X, $Q_1$, $R_4$ and $R_5$ are as defined under formula I above.

In one preferred group of compounds of formula I-C$_1$, A is CH or N; $R_1$ is $C_1$-$C_6$alkyl or $C_3$-$C_6$cycloalkyl-$C_1$-$C_6$alkyl; $R_2$ is $C_1$-$C_2$haloalkyl, $C_1$-$C_2$haloalkoxy, $C_1$-$C_2$haloalkylsulfanyl, $C_1$-$C_2$haloalkylsulfinyl or $C_1$-$C_2$haloalkylsulfonyl; $R_3$ is hydrogen or $C_1$-$C_6$alkyl; X is S or SO$_2$; $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —N($R_4$)$_2$, —N($R_4$)CO$R_5$, —N($R_4$)CON($R_4$)$_2$, (oxazolidin-2-one)-3-yl or 2-pyridyloxy; in which each $R_4$ independently is hydrogen or $C_1$-$C_6$alkyl; and $R_5$ is $C_1$-$C_6$alkyl or $C_3$-$C_6$cycloalkyl.

In another preferred group of compounds of formula I-C$_1$, A is CH or N; $R_1$ is ethyl or cyclopropylmethyl; $R_2$ is —OSO$_2$CF$_3$, SO$_2$CF$_3$, —OCF$_3$, CF$_2$CF$_3$ or CF$_3$; $R_3$ is hydrogen or methyl; X is S or SO$_2$; and $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO (cyclopropyl), —N(H)CONH(CH$_3$), —N(CH$_3$)CONH (CH$_3$), (oxazolidin-2-one)-3-yl, or 2-pyridyloxy.

In another further preferred group of compounds of formula I-C$_1$, $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms. In this embodiment, more preferably $Q_1$ is C-linked pyrimidinyl.

Also preferred compounds of formula I-C$_1$ are those wherein $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms. In this embodiment, more preferably $Q_1$ is N-linked pyrazolyl which can be mono-substituted by chloro or trifluoromethyl; or $Q_1$ is N-linked triazolyl.

In compounds of formula I-C$_1$ and all of the preferred embodiments of compounds of formula I-C$_1$ mentioned above, unless otherwise specified, A, $R_1$, $R_2$, $R_3$, X, $Q_1$, $R_4$ and $R_5$ are as defined under formula I above; preferably A is CH or N, more preferably A is N; preferably $R_1$ is ethyl or cyclopropylmethyl; most preferably $R_1$ is ethyl; preferably $R_2$ is —OSO$_2$CF$_3$, SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —N($R_4$)$_2$, —N($R_4$)COR$_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-$C_1$-1) which are compounds of formula (I-$C_1$) wherein preferably A is N; preferably $R_1$ is ethyl or cyclopropylmethyl; most preferably $R_1$ is ethyl; preferably $R_2$ is SO$_2$CF$_3$, —OCF$_3$, CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, 2-pyridyloxy, N-linked pyrazolyl which can be mono-substituted by chloro or trifluoromethyl, or —N($R_4$)COR$_5$ in which $R_4$ is hydrogen and $R_5$ is either methyl or ethyl; more preferably $Q_1$ is hydrogen, bromine, trifluoromethyl, cyclopropyl, 1-cyanocyclopropyl, 1-cyano-1-methyl-ethyl, —N(CH$_3$)COCH$_3$, 2-pyridyloxy, 3-chloro-pyrazol-1-yl or 3-trifluoromethyl-pyrazol-1-yl.

Another preferred group of compounds according to this embodiment are compounds of formula (I-$C_1$-2) which are compounds of formula (I-$C_1$) wherein preferably A is N; preferably $R_1$ is ethyl or cyclopropylmethyl; most preferably $R_1$ is ethyl; preferably $R_2$ is SO$_2$CF$_3$, —OCF$_3$, CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, 2-pyridyloxy, N-linked pyrazolyl which can be mono-substituted by chloro or trifluoromethyl, or —N($R_4$)COR$_5$ in which $R_4$ is hydrogen and $R_5$ is either methyl or ethyl; more preferably $Q_1$ is hydrogen or 1-cyanocyclopropyl.

Another preferred group of compounds of formula I is represented by the compounds of formula I-$C_2$

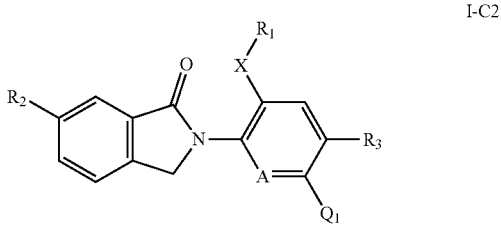

I-C2

Wherein A, $R_1$, $R_2$, $R_3$, X, $Q_1$, $R_4$ and $R_5$ are as defined under formula I above.

In one preferred group of compounds of formula I-$C_2$, A is CH or N; $R_1$ is $C_1$-$C_6$alkyl or $C_3$-$C_6$cycloalkyl-$C_1$-$C_6$alkyl; $R_2$ is $C_1$-$C_2$haloalkyl, $C_1$-$C_2$haloalkoxy, $C_1$-$C_2$haloalkylsulfanyl, $C_1$-$C_2$haloalkylsulfinyl or $C_1$-$C_2$haloalkylsulfonyl; $R_3$ is hydrogen or $C_1$-$C_6$alkyl; X is S or SO$_2$; $Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$haloalkoxy, —N($R_4$)$_2$, —N($R_4$)COR$_5$, —N($R_4$)CON($R_4$)$_2$, (oxazolidin-2-one)-3-yl or 2-pyridyloxy; in which each $R_4$ independently is hydrogen or $C_1$-$C_6$alkyl; and $R_5$ is $C_1$-$C_6$alkyl or $C_3$-$C_6$cycloalkyl.

In another preferred group of compounds of formula I-$C_2$, A is CH or N; $R_1$ is ethyl or cyclopropylmethyl; $R_2$ is —OSO$_2$CF$_3$, SO$_2$CF$_3$, —OCF$_3$, CF$_2$CF$_3$ or CF$_3$; $R_3$ is hydrogen or methyl; X is S or SO$_2$; and $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO (cyclopropyl), —N(H)CONH(CH$_3$), —N(CH$_3$)CONH (CH$_3$), (oxazolidin-2-one)-3-yl, or 2-pyridyloxy.

In another further preferred group of compounds of formula I-$C_2$, $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms. In this embodiment, more preferably $Q_1$ is C-linked pyrimidinyl.

Also preferred compounds of formula I-$C_2$ are those wherein $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms. In this embodiment, more preferably $Q_1$ is N-linked pyrazolyl which can be mono-substituted by chloro or trifluoromethyl; or $Q_1$ is N-linked triazolyl.

In compounds of formula I-$C_2$ and all of the preferred embodiments of compounds of formula I-$C_2$ mentioned above, unless otherwise specified, A, $R_1$, $R_2$, $R_3$, X, $Q_1$, $R_4$ and $R_5$ are as defined under formula I above; preferably A is CH or N, more preferably A is N; preferably $R_1$ is ethyl or cyclopropylmethyl; most preferably $R_1$ is ethyl; preferably $R_2$ is —OSO$_2$CF$_3$, SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —N($R_4$)$_2$, —N($R_4$)COR$_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-$C_2$-1) which are compounds of formula (I-$C_2$) wherein preferably A is N; preferably $R_1$ is ethyl or cyclopropylmethyl; most preferably $R_1$ is ethyl; preferably $R_2$ is SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, cyclopropyl, N-linked triazolyl, C-linked pyrimidinyl, —N($R_4$)$_2$, —N($R_4$)COR$_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, cyclopropyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), 1,2,4-triazol-1-yl or pyrimidin-2-yl.

Another preferred group of compounds of formula I is represented by the compounds of formula I-D1

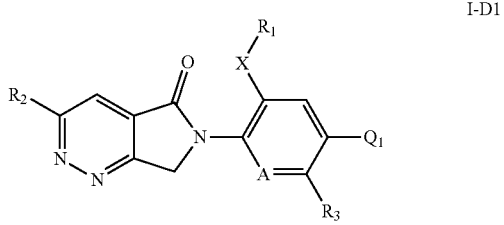

Wherein A, R$_1$, R$_2$, R$_3$, X, Q$_1$, R$_4$ and R$_5$ are as defined under formula I above.

In one preferred group of compounds of formula I-D1, A is CH or N; R$_1$ is C$_1$-C$_6$alkyl or C$_3$-C$_6$cycloalkyl-C$_1$-C$_6$alkyl; R$_2$ is C$_1$-C$_2$haloalkyl, C$_1$-C$_2$haloalkoxy, C$_1$-C$_2$haloalkylsulfanyl, C$_1$-C$_2$haloalkylsulfinyl or C$_1$-C$_2$haloalkylsulfonyl; R$_3$ is hydrogen or C$_1$-C$_4$alkyl; X is S or SO$_2$; Q$_1$ is hydrogen, halogen, C$_1$-C$_6$haloalkyl, C$_3$-C$_6$cycloalkyl, C$_3$-C$_6$cycloalkyl monosubstituted by cyano, C$_1$-C$_6$cyanoalkyl, C$_1$-C$_6$haloalkoxy, —N(R$_4$)$_2$, —N(R$_4$)COR$_5$, —N(R$_4$)CON(R$_4$)$_2$, (oxazolidin-2-one)-3-yl or 2-pyridyloxy; in which each R$_4$ independently is hydrogen or C$_1$-C$_6$alkyl; and R$_5$ is C$_1$-C$_6$alkyl or C$_3$-C$_6$cycloalkyl.

In another preferred group of compounds of formula I-D1, A is CH or N; R$_1$ is ethyl or cyclopropylmethyl; R$_2$ is —OSO$_2$CF$_3$, SO$_2$CF$_3$, —OCF$_3$, CF$_2$CF$_3$ or CF$_3$; R$_3$ is hydrogen or methyl; X is S or SO$_2$; and Q$_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, or 2-pyridyloxy.

In another further preferred group of compounds of formula I-D1, Q$_1$ is a five- to six-membered aromatic ring system linked via a ring carbon atom to the ring which contains the substituent A, said ring system is unsubstituted or is mono-substituted by substituents selected from the group consisting of halogen and C$_1$-C$_6$haloalkyl; and said ring system can contain 1 or 2 ring nitrogen atoms. In this embodiment, more preferably Q$_1$ is C-linked pyrimidinyl.

Also preferred compounds of formula I-D1 are those wherein Q$_1$ is a five-membered aromatic ring system linked via a ring nitrogen atom to the ring which contains the substituent A, said ring system is unsubstituted or is mono-substituted by substituents selected from the group consisting of halogen and C$_1$-C$_6$haloalkyl; and said ring system contains 2 or 3 ring nitrogen atoms. In this embodiment, more preferably Q$_1$ is N-linked pyrazolyl which can be mono-substituted by chloro or trifluoromethyl; or Q$_1$ is N-linked triazolyl.

In compounds of formula I-D1 and all of the preferred embodiments of compounds of formula I-D1 mentioned above, unless otherwise specified, A, R$_1$, R$_2$, R$_3$, X, Q$_1$, R$_4$ and R$_5$ are as defined under formula I above; preferably A is CH or N, more preferably A is N; preferably R$_1$ is ethyl or cyclopropylmethyl; most preferably R$_1$ is ethyl; preferably R$_2$ is —OSO$_2$CF$_3$, SO$_2$CF$_3$, —OCF$_3$, CF$_2$CF$_3$ or CF$_3$; most preferably R$_2$ is CF$_2$CF$_3$ or CF$_3$; preferably X is S or SO$_2$; most preferably X is SO$_2$; preferably R$_3$ is hydrogen; preferably Q$_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —N(R$_4$)$_2$, —N(R$_4$)COR$_5$, or —N(R$_4$)CON(R$_4$)$_2$, in each of which R$_a$ is independently either hydrogen or methyl and R$_5$ is either methyl, ethyl or cyclopropyl; more preferably Q$_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-D1-1) which are compounds of formula (I-D1) wherein preferably A is N; preferably R$_1$ is ethyl or cyclopropylmethyl; most preferably R$_1$ is ethyl; preferably R$_2$ is SO$_2$CF$_3$, —OCF$_3$, CF$_2$CF$_3$ or CF$_3$; most preferably R$_2$ is CF$_2$CF$_3$ or CF$_3$; preferably X is S or SO$_2$; most preferably X is SO$_2$; preferably R$_3$ is hydrogen; preferably Q$_1$ is hydrogen, halogen, trifluoromethyl, cyclopropyl, cyanocyclopropyl, cyanoisopropyl, 2-pyridyloxy, N-linked pyrazolyl which can be mono-substituted by chloro or trifluoromethyl, or —N(R$_4$)COR$_5$ in which R$_a$ is hydrogen and R$_5$ is either methyl or ethyl; more preferably Q$_1$ is hydrogen, bromine, trifluoromethyl, cyclopropyl, 1-cyanocyclopropyl, 1-cyano-1-methyl-ethyl, —N(CH$_3$)COCH$_3$, 2-pyridyloxy, 3-chloro-pyrazol-1-yl or 3-trifluoromethyl-pyrazol-1-yl.

Another preferred group of compounds according to this embodiment are compounds of formula (I-D1-2) which are compounds of formula (I-D1) wherein preferably A is N; preferably R$_1$ is ethyl or cyclopropylmethyl; most preferably R$_1$ is ethyl; preferably R$_2$ is SO$_2$CF$_3$, —OCF$_3$, CF$_2$CF$_3$ or CF$_3$; preferably X is S or SO$_2$; most preferably X is SO$_2$; preferably R$_3$ is hydrogen; preferably Q$_1$ is hydrogen, halogen, trifluoromethyl, cyclopropyl, cyanocyclopropyl, cyanoisopropyl, 2-pyridyloxy, N-linked pyrazolyl which can be mono-substituted by chloro or trifluoromethyl, or —N(R$_4$)COR$_5$ in which R$_4$ is hydrogen and R$_5$ is either methyl or ethyl; more preferably Q$_1$ is hydrogen or 1-cyanocyclopropyl.

Another preferred group of compounds of formula I is represented by the compounds of formula I-D2

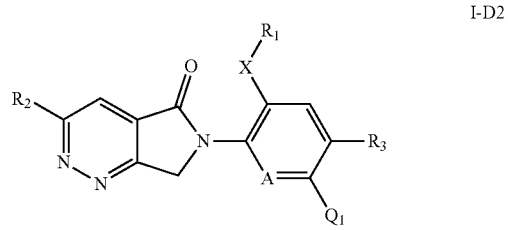

Wherein A, R$_1$, R$_2$, R$_3$, X, Q$_1$, R$_4$ and R$_5$ are as defined under formula I above.

In one preferred group of compounds of formula I-D2, A is CH or N; R$_1$ is C$_1$-C$_6$alkyl or C$_3$-C$_6$cycloalkyl-C$_1$-C$_6$alkyl; R$_2$ is C$_1$-C$_2$haloalkyl, C$_1$-C$_2$haloalkoxy, C$_1$-C$_2$haloalkylsulfanyl, C$_1$-C$_2$haloalkylsulfinyl or C$_1$-C$_2$haloalkylsulfonyl; R$_3$ is hydrogen or C$_1$-C$_6$alkyl; X is S or SO$_2$; Q$_1$ is hydrogen, halogen, C$_1$-C$_6$haloalkyl, C$_3$-C$_6$cycloalkyl, C$_3$-C$_6$cycloalkyl monosubstituted by cyano, $C_1$-$C_6$cyanoalkyl, $C_1$-$C_6$haloalkoxy, —N($R_4$)$_2$, —N($R_4$)CO$R_5$, —N($R_4$)CON($R_4$)$_2$, (oxazolidin-2-one)-3-yl or 2-pyridyloxy; in which each $R_4$ independently is hydrogen or $C_1$-$C_6$alkyl; and $R_5$ is $C_1$-$C_6$alkyl or $C_3$-$C_6$cycloalkyl.

In another preferred group of compounds of formula I-D2, A is CH or N; $R_1$ is ethyl or cyclopropylmethyl; $R_2$ is —OSO$_2$CF$_3$, SO$_2$CF$_3$, —OCF$_3$, CF$_2$CF$_3$ or CF$_3$; $R_3$ is hydrogen or methyl; X is S or SO$_2$; and $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, or 2-pyridyloxy.

In another further preferred group of compounds of formula I-D2, $Q_1$ is a five- to six-membered aromatic ring system linked via a ring carbon atom to the ring which contains the substituent A, said ring system is unsubstituted or is mono-substituted by substituents selected from the group consisting of halogen and $C_1$-$C_6$haloalkyl; and said ring system can contain 1 or 2 ring nitrogen atoms. In this embodiment, more preferably $Q_1$ is C-linked pyrimidinyl.

Also preferred compounds of formula I-D2 are those wherein $Q_1$ is a five-membered aromatic ring system linked via a ring nitrogen atom to the ring which contains the substituent A, said ring system is unsubstituted or is mono-substituted by substituents selected from the group consisting of halogen and $C_1$-$C_6$haloalkyl; and said ring system contains 2 or 3 ring nitrogen atoms. In this embodiment, more preferably $Q_1$ is N-linked pyrazolyl which can be mono-substituted by chloro or trifluoromethyl; or $Q_1$ is N-linked triazolyl.

In compounds of formula I-D2 and all of the preferred embodiments of compounds of formula I-D2 mentioned above, unless otherwise specified, A, $R_1$, $R_2$, $R_3$, X, $Q_1$, $R_4$ and $R_5$ are as defined under formula I above; preferably A is CH or N, more preferably A is N; preferably $R_1$ is ethyl or cyclopropylmethyl; most preferably $R_1$ is ethyl; preferably $R_2$ is —OSO$_2$CF$_3$, SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —N($R_4$)$_2$, —N($R_4$)CO$R_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

One further preferred group of compounds according to this embodiment are compounds of formula (I-D2-1) which are compounds of formula (I-D2) wherein preferably A is N; preferably $R_1$ is ethyl or cyclopropylmethyl; most preferably $R_1$ is ethyl; preferably $R_2$ is SO$_2$CF$_3$, —OCF$_3$, CF$_2$CF$_3$ or CF$_3$; most preferably $R_2$ is CF$_2$CF$_3$ or CF$_3$; preferably X is S or SO$_2$; most preferably X is SO$_2$; preferably $R_3$ is hydrogen; preferably $Q_1$ is hydrogen, cyclopropyl, N-linked triazolyl, C-linked pyrimidinyl, —N($R_4$)$_2$, —N($R_4$)COR$_5$, or —N($R_4$)CON($R_4$)$_2$, in each of which $R_a$ is independently either hydrogen or methyl and $R_5$ is either methyl, ethyl or cyclopropyl; more preferably $Q_1$ is hydrogen, cyclopropyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), 1,2,4-triazol-1-yl or pyrimidin-2-yl.

An outstanding group of compounds according to the invention are those of formula I-E

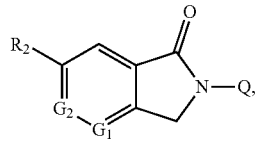

(I-E)

wherein
$G_1$ and $G_2$ are, independently from each other, CH or N;
$R_2$ is $C_1$-$C_6$haloalkyl, $C_1$-$C_6$haloalkylsulfanyl, $C_1$-$C_6$haloalkylsulfinyl, $C_1$-$C_6$haloalkylsulfonyl or $C_1$-$C_6$haloalkoxy, preferably CF$_3$, CF$_2$CF$_3$, SCF$_3$, SOCF$_3$, SO$_2$CF$_3$ or OCF$_3$;
Q is a radical selected from the group consisting of formula Qa1 and Qb1

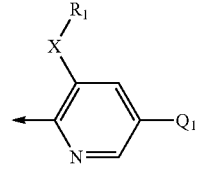

Qa1

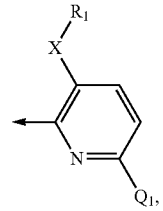

Qb1 wherein the arrow denotes the point of attachment to the nitrogen atom of the bicyclic ring;
and wherein
X is S, SO, or SO$_2$, preferably S or SO$_2$, even more preferably SO$_2$;
$R_1$ is $C_1$-$C_6$alkyl or $C_3$-$C_6$cycloalkyl-$C_1$-$C_6$alkyl, preferably ethyl or cyclopropylmethyl;
$Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, —N($R_4$)$_2$, —N($R_4$)C(=O)$R_5$, —N($R_4$)CON($R_4$)$_2$, or 2-pyridyloxy; preferably $Q_1$ is hydrogen, chlorine, bromine, trifluoromethyl, cyclopropyl, 1-cyanocyclopropyl, 1-cyano-1-methyl-ethyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), or 2-pyridyloxy; or
$Q_1$ is unsubstituted pyrimidinyl, preferably pyrimidin-2-yl; or
$Q_1$ is unsubstituted N-linked triazolyl, preferably 1,2,4-triazol-1-yl; or
$Q_1$ is N-linked pyrazolyl which can be mono-substituted by chloro or trifluoromethyl; preferably $Q_1$ is 3-chloro-pyrazol-1-yl or 3-trifluoromethyl-pyrazol-1-yl;
each $R_4$ independently is hydrogen or $C_1$-$C_6$alkyl, preferably hydrogen or methyl; and R$_5$ is C$_1$-C$_6$alkyl or C$_3$-C$_6$cycloalkyl, preferably methyl or cyclopropyl.

One further outstanding group of compounds according to this embodiment are compounds of formula (I-E1) which are compounds of formula (I-E) wherein G$_1$ and G$_2$ are, independently from each other, CH or N;

R$_2$ is C$_1$-C$_6$haloalkyl, C$_1$-C$_6$haloalkylsulfonyl or C$_1$-C$_6$haloalkoxy, preferably CF$_3$, CF$_2$CF$_3$, SO$_2$CF$_3$ or OCF$_3$;

Q is a radical selected from the group consisting of formula Qa1 and Qb1, wherein X is SO$_2$;

R$_1$ is C$_1$-C$_6$alkyl or C$_3$-C$_6$cycloalkyl-C$_1$-C$_6$alkyl, preferably ethyl or cyclopropylmethyl;

Q$_1$ is hydrogen, halogen, C$_1$-C$_6$haloalkyl, C$_3$-C$_6$cycloalkyl, C$_3$-C$_6$cycloalkyl monosubstituted by cyano, C$_1$-C$_6$cyanoalkyl, —N(R$_4$)$_2$, —N(R$_4$)C(=O)R$_5$, —N(R$_4$)CON(R$_4$)$_2$, or 2-pyridyloxy; preferably Q$_1$ is hydrogen, chlorine, bromine, trifluoromethyl, cyclopropyl, 1-cyanocyclopropyl, 1-cyano-1-methyl-ethyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), or 2-pyridyloxy; or Q$_1$ is unsubstituted pyrimidinyl, preferably pyrimidin-2-yl; or Q$_1$ is unsubstituted N-linked triazolyl, preferably 1,2,4-triazol-1-yl; or Q$_1$ is N-linked pyrazolyl which is mono-substituted by chloro or trifluoromethyl; preferably Q$_1$ is 3-chloro-pyrazol-1-yl or 3-trifluoromethyl-pyrazol-1-yl;

each R$_4$ independently is hydrogen or C$_1$-C$_6$alkyl, preferably hydrogen or methyl; and R$_5$ is C$_1$-C$_6$alkyl or C$_3$-C$_6$cycloalkyl, preferably methyl or cyclopropyl.

One further outstanding group of compounds according to this embodiment are compounds of formula (I-E2) which are compounds of formula (I-E) wherein G$_1$ and G$_2$ are, independently from each other, CH or N;

R$_2$ is CF$_3$, SO$_2$CF$_3$ or OCF$_3$;

Q is a radical selected from the group consisting of formula Qa1 and Qb1, wherein X is SO$_2$;

R$_1$ is ethyl or cyclopropylmethyl; and

Q$_1$ is hydrogen, chlorine, bromine, trifluoromethyl, cyclopropyl, 1-cyanocyclopropyl, 1-cyano-1-methyl-ethyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), 2-pyridyloxy, pyrimidin-2-yl, 1,2,4-triazol-1-yl, 3-chloro-pyrazol-1-yl or 3-trifluoromethyl-pyrazol-1-yl.

Another outstanding group of compounds according to the invention are those of formula I-F

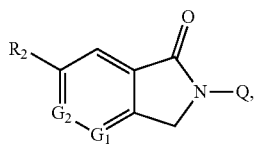

(I-F)

wherein

G$_1$ and G$_2$ are, independently from each other, CH or N;

R$_2$ is C$_1$-C$_6$haloalkyl, C$_1$-C$_4$haloalkylsulfanyl, C$_1$-C$_4$haloalkylsulfinyl, C$_1$-C$_4$haloalkylsulfonyl or C$_1$-C$_6$haloalkoxy, preferably CF$_3$, CF$_2$CF$_3$, SCF$_3$, SOCF$_3$, SO$_2$CF$_3$ or OCF$_3$;

Q is a radical selected from the group consisting of formula Qa2 and Qb2

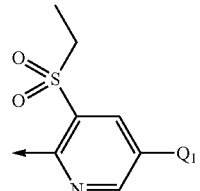

Qa2

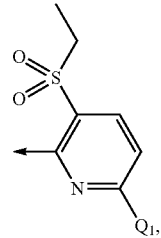

Qb2 wherein the arrow denotes the point of attachment to the nitrogen atom of the bicyclic ring;

and wherein

Q$_1$ is hydrogen, halogen, C$_1$-C$_6$haloalkyl, C$_3$-C$_6$cycloalkyl, C$_3$-C$_6$cycloalkyl monosubstituted by cyano, C$_1$-C$_6$cyanoalkyl, —N(R$_4$)$_2$, —N(R$_4$)C(=O)R$_5$, —N(R$_4$)CON(R$_4$)$_2$, or 2-pyridyloxy; preferably Q$_1$ is hydrogen, chlorine, bromine, trifluoromethyl, cyclopropyl, 1-cyanocyclopropyl, 1-cyano-1-methyl-ethyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), or 2-pyridyloxy; or Q$_1$ is unsubstituted pyrimidinyl, preferably pyrimidin-2-yl; or Q$_1$ is unsubstituted N-linked triazolyl, preferably 1,2,4-triazol-1-yl; or Q$_1$ is N-linked pyrazolyl which can be mono-substituted by chloro or trifluoromethyl; preferably Q$_1$ is 3-chloro-pyrazol-1-yl or 3-trifluoromethyl-pyrazol-1-yl;

each R$_4$ independently is hydrogen or C$_1$-C$_6$alkyl, preferably hydrogen or methyl; and R$_5$ is C$_1$-C$_6$alkyl or C$_3$-C$_6$cycloalkyl, preferably methyl or cyclopropyl.

One further outstanding group of compounds according to this embodiment are compounds of formula (I-F1) which are compounds of formula (I-F) wherein G$_1$ and G$_2$ are, independently from each other, CH or N;

R$_2$ is C$_1$-C$_6$haloalkyl, C$_1$-C$_6$haloalkylsulfonyl or C$_1$-C$_6$haloalkoxy, preferably CF$_3$, CF$_2$CF$_3$, SO$_2$CF$_3$ or OCF$_3$;

Q is a radical selected from the group consisting of formula Qa2 and Qb2, wherein Q$_1$ is hydrogen, halogen, C$_1$-C$_6$haloalkyl, C$_3$-C$_6$cycloalkyl, C$_3$-C$_6$cycloalkyl monosubstituted by cyano, C$_1$-C$_6$cyanoalkyl, —N(R$_4$)$_2$, —N(R$_4$)C(=O)R$_5$, —N(R$_4$)CON(R$_4$)$_2$, or 2-pyridyloxy; preferably Q$_1$ is hydrogen, chlorine, bromine, trifluoromethyl, cyclopropyl, 1-cyanocyclopropyl, 1-cyano-1-methyl-ethyl, —NH(CH$_3$), —N(CH$_3$)COCH$_3$, —N(CH$_3$)COCH$_2$CH$_3$, —N(CH$_3$)CO(cyclopropyl), —N(CH$_3$)CONH(CH$_3$), or 2-pyridyloxy; or Q$_1$ is unsubstituted pyrimidinyl, preferably pyrimidin-2-yl; or Q₁ is unsubstituted N-linked triazolyl, preferably 1,2,4-triazol-1-yl; or Q₁ is N-linked pyrazolyl which is mono-substituted by chloro or trifluoromethyl; preferably Q₁ is 3-chloropyrazol-1-yl or 3-trifluoromethyl-pyrazol-1-yl;

each R₄ independently is hydrogen or $C_1$-$C_6$alkyl, preferably hydrogen or methyl; and R₅ is $C_1$-$C_6$alkyl or $C_3$-$C_6$cycloalkyl, preferably methyl or cyclopropyl.

One further outstanding group of compounds according to this embodiment are compounds of formula (I-F2) which are compounds of formula (I-F) wherein G₁ and G₂ are, independently from each other, CH or N;

R₂ is CF₃, SO₂CF₃ or OCF₃;

Q is a radical selected from the group consisting of formula Qa2 and Qb2, wherein Q₁ is hydrogen, chlorine, bromine, trifluoromethyl, cyclopropyl, 1-cyanocyclopropyl, 1-cyano-1-methyl-ethyl, —NH(CH₃), —N(CH₃)COCH₃, —N(CH₃)COCH₂CH₃, —N(CH₃)CO(cyclopropyl), —N(CH₃)CONH(CH₃), 2-pyridyloxy, pyrimidin-2-yl, 1,2,4-triazol-1-yl, 3-chloro-pyrazol-1-yl or 3-trifluoromethyl-pyrazol-1-yl.

One further outstanding group of compounds according to this embodiment are compounds of formula (I-F3) which are compounds of formula (I-F) wherein G₁ is CH;
G₂ is N;
R₂ is $C_1$-$C_6$haloalkyl, $C_1$-$C_6$haloalkylsulfonyl or $C_1$-$C_6$haloalkoxy, preferably CF₃, CF₂CF₃, SO₂CF₃ or OCF₃;

Q is a radical selected from the group consisting of formula Qa2 and Qb2, wherein Q₁ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, —N(R₄)₂, —N(R₄)C(=O)R₅, —N(R₄)CON(R₄)₂, or 2-pyridyloxy; preferably Q₁ is hydrogen, chlorine, bromine, trifluoromethyl, cyclopropyl, 1-cyanocyclopropyl, 1-cyano-1-methyl-ethyl, —NH(CH₃), —N(CH₃)COCH₃, —N(CH₃)COCH₂CH₃, —N(CH₃)CO(cyclopropyl), —N(CH₃)CONH(CH₃), or 2-pyridyloxy; or Q₁ is unsubstituted pyrimidinyl, preferably pyrimidin-2-yl; or Q₁ is unsubstituted N-linked triazolyl, preferably 1,2,4-triazol-1-yl; or Q₁ is N-linked pyrazolyl which is mono-substituted by chloro or trifluoromethyl; preferably Q₁ is 3-chloropyrazol-1-yl or 3-trifluoromethyl-pyrazol-1-yl;

each R₄ independently is hydrogen or $C_1$-$C_6$alkyl, preferably hydrogen or methyl; and R₅ is $C_1$-$C_6$alkyl or $C_3$-$C_6$cycloalkyl, preferably methyl or cyclopropyl.

One further outstanding group of compounds according to this embodiment are compounds of formula (I-F4) which are compounds of formula (I-F) wherein G₁ is CH;
G₂ is N;
R₂ is $C_1$-$C_6$haloalkyl, $C_1$-$C_6$haloalkylsulfonyl or $C_1$-$C_6$haloalkoxy, preferably CF₃, CF₂CF₃, SO₂CF₃ or OCF₃;

Q is a radical selected from the group consisting of formula Qa2 and Qb2, wherein Q₁ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, —N(R₄)C(=O)R₅, 2-pyridyloxy, or N-linked pyrazolyl which is mono-substituted by chloro or trifluoromethyl, preferably hydrogen, bromine, trifluoromethyl, cyclopropyl, 1-cyanocyclopropyl, 1-cyano-1-methyl-ethyl, —N(CH₃)COCH₃, 2-pyridyloxy, 3-chloro-pyrazol-1-yl or 3-trifluoromethyl-pyrazol-1-yl, when Q is Qa2; or Q₁ is hydrogen, halogen, $C_3$-$C_6$cycloalkyl, —N(R₄)₂, —N(R₄)C(=O)R₅, —N(R₄)CON(R₄)₂, unsubstituted pyrimidinyl, or unsubstituted N-linked triazolyl, preferably hydrogen, chlorine, cyclopropyl, —NH(CH₃), —N(CH₃)COCH₃, —N(CH₃)COCH₂CH₃, —N(CH₃)CO(cyclopropyl), —N(CH₃)CONH(CH₃), pyrimidin-2-yl or 1,2,4-triazol-1-yl, when Q is Qb2;

each R₄ independently is hydrogen or $C_1$-$C_6$alkyl, preferably hydrogen or methyl; and R₅ is $C_1$-$C_6$alkyl or $C_3$-$C_6$cycloalkyl, preferably methyl or cyclopropyl.

One further outstanding group of compounds according to this embodiment are compounds of formula (I-F5) which are compounds of formula (I-F4) wherein R₂ is $C_1$-$C_6$haloalkyl, preferably CF₃ or CF₂CF₃.

One further outstanding group of compounds according to this embodiment are compounds of formula (I-F6) which are compounds of formula (I-F3) wherein G₁ is N; and G₂ is CH.

One further outstanding group of compounds according to this embodiment are compounds of formula (I-F7) which are compounds of formula (I-F4) wherein G₁ is N; and G₂ is CH.

One further outstanding group of compounds according to this embodiment are compounds of formula (I-F8) which are compounds of formula (I-F4) wherein G₁ is N;
G₂ is CH;
R₂ is $C_1$-$C_6$haloalkyl, preferably CF₃ or CF₂CF₃; and
Q is Qa2, wherein Q₁ is hydrogen, $C_3$-$C_6$cycloalkyl monosubstituted by cyano or $C_1$-$C_6$cyanoalkyl, preferably hydrogen, 1-cyanocyclopropyl or 1-cyano-1-methyl-ethyl.

One further outstanding group of compounds according to this embodiment are compounds of formula (I-F9) which are compounds of formula (I-F3) wherein G₁ is CH; and G₂ is CH.

One further outstanding group of compounds according to this embodiment are compounds of formula (I-F10) which are compounds of formula (I-F4) wherein G₁ is CH; and G₂ is CH.

One further outstanding group of compounds according to this embodiment are compounds of formula (I-F11) which are compounds of formula (I-F4) wherein G₁ is CH;
G₂ is CH;
R₂ is $C_1$-$C_6$haloalkyl, $C_1$-$C_4$haloalkylsulfonyl or $C_1$-$C_6$haloalkoxy, preferably CF₃, CF₂CF₃, SO₂CF₃ or OCF₃; and
Q is Qa2, wherein Q₁ is hydrogen or $C_3$-$C_6$cycloalkyl monosubstituted by cyano, preferably hydrogen or 1-cyanocyclopropyl.

Compounds according to the invention may possess any number of benefits including, inter alia, advantageous levels of biological activity for protecting plants against insects or superior properties for use as agrochemical active ingredients (for example, greater biological activity, an advantageous spectrum of activity, an increased safety profile, improved physico-chemical properties, or increased biodegradability or environmental profile). In particular, it has been surprisingly found that certain compounds of formula (I) may show an advantageous safety profile with respect to non-target arthropods, in particular pollinators such as honey bees, solitary bees, and bumble bees. Most particularly, *Apis mellifera*.

In another aspect the present invention provides a composition comprising an insecticidally, acaricidally, nematicidally or molluscicidally effective amount of a compound of formula (I), or an agrochemically acceptable salt, stereoisomer, enantiomer, tautomer or N-oxide thereof, as defined in any of the embodiments under compounds of formula (I-A1), (I-A1-1), (I-A2), (I-A2-1), (I-B1), (I-B1-1), (I-B1-2), (I-B2), (I-B2-1), (I-$C_1$), (I-$C_1$-1), (I-$C_1$-2), (I-$C_2$), (I-$C_2$-1), (I-D1), (I-D1-1), (I-D1-2), (I-D2), (I-D2-1), (I-E), (I-E1), (I-E2), (I-F), and (I-F1) to (I-F11) and, optionally, an auxiliary or diluent.

In a further aspect the present invention provides a method of combating and controlling insects, acarines, nematodes or molluscs which comprises applying to a pest, to a locus of a pest, or to a plant susceptible to attack by a pest an insecticidally, acaricidally, nematicidally or molluscicidally effective amount of a compound of formula (I), or an agrochemically acceptable salt, stereoisomer, enantiomer, tautomer or N-oxide thereof, as defined in any of the embodiments under compounds of formula (I-A1), (I-A1-1), (I-A2), (I-A2-1), (I-B1), (I-B1-1), (I-B1-2), (I-B2), (I-B2-1), (I-$C_1$), (I-$C_1$-1), (I-$C_1$-2), (I-$C_2$), (I-$C_2$-1), (I-D1), (I-D1-1), (I-D1-2), (I-D2), (I-D2-1), (I-E), (I-E1), (I-E2), (I-F), and (I-F1) to (I-F11) (above) or a composition as defined above.

In a yet further aspect, the present invention provides a method for the protection of plant propagation material from the attack by insects, acarines, nematodes or molluscs, which comprises treating the propagation material or the site, where the propagation material is planted, with a composition as defined above.

The process according to the invention for preparing compounds of formula I is carried out by methods known to those skilled in the art. Compounds of formula I-a3, wherein X is $SO_2$ and A, $R_1$, $R_2$, $R_3$, $G_1$, $G_2$, and $Q_1$ are defined as under formula I above, may be prepared by oxidation of compounds of formula I-a2, wherein X is SO and A, $R_1$, $R_2$, $R_3$, $G_1$, $G_2$, and $Q_1$ are defined as under formula I above. The reaction can be performed with reagents such as a peracid, for example peracetic acid or m-chloroperbenzoic acid, or a hydroperoxide, as for example, hydrogen peroxide or tert-butylhydroperoxide, or an inorganic oxidant, such as a monoperoxo-disulfate salt or potassium permanganate. In a similar way, compounds of formula I-a2, wherein X is SO and A, $R_1$, $R_2$, $R_3$, $G_1$, $G_2$, and $Q_1$ are defined as under formula I above, may be prepared by oxidation of compounds of formula I-a1, wherein X is S and A, $R_1$, $R_2$, $R_3$, $G_1$, $G_2$, and $Q_1$ are defined as under formula I above, under analogous conditions described above. These reactions can be performed in various organic or aqueous solvents compatible to these conditions, by temperatures from below 0° C. up to the boiling point of the solvent system. The transformation of compounds of the formula I-a1 into compounds of the formula I-a2 and I-a3 is represented in Scheme 1.

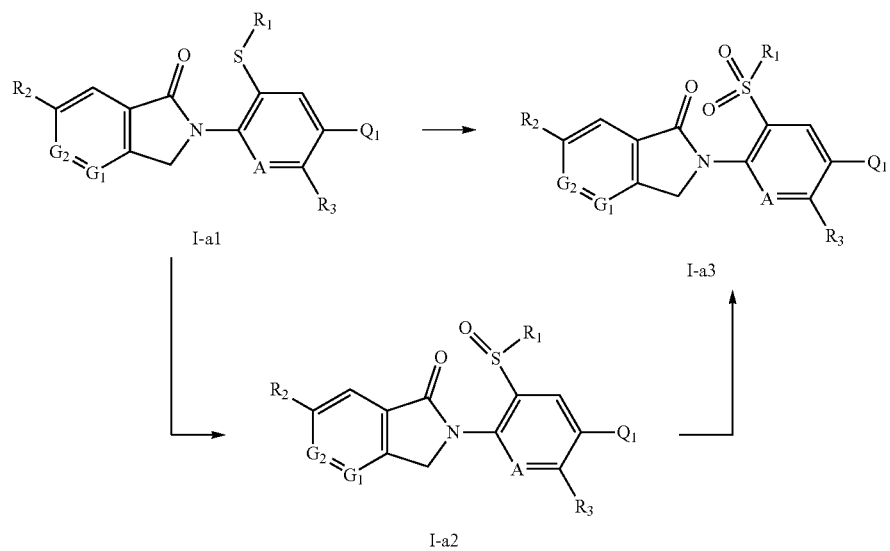

Compounds of formula I-aa3 (scheme 2), wherein X is $SO_2$ and A, $R_1$, $R_2$, $R_3$, $G_1$, $G_2$, and $Q_1$ are defined as under formula I above, may be prepared by analogous procedure as described in scheme 1 for the synthesis of compounds of formula I-a3.

butoxide in the presence of a metal catalyst either copper catalyst for example copper(I) iodide, optionally in the presence of a ligand for example diamine ligands (e.g. N,N'-dimethylethylenediamine or trans-cyclohexyldiamine) or dibenzylideneacetone (dba), or 1,10-phenanthroline, at Scheme 2

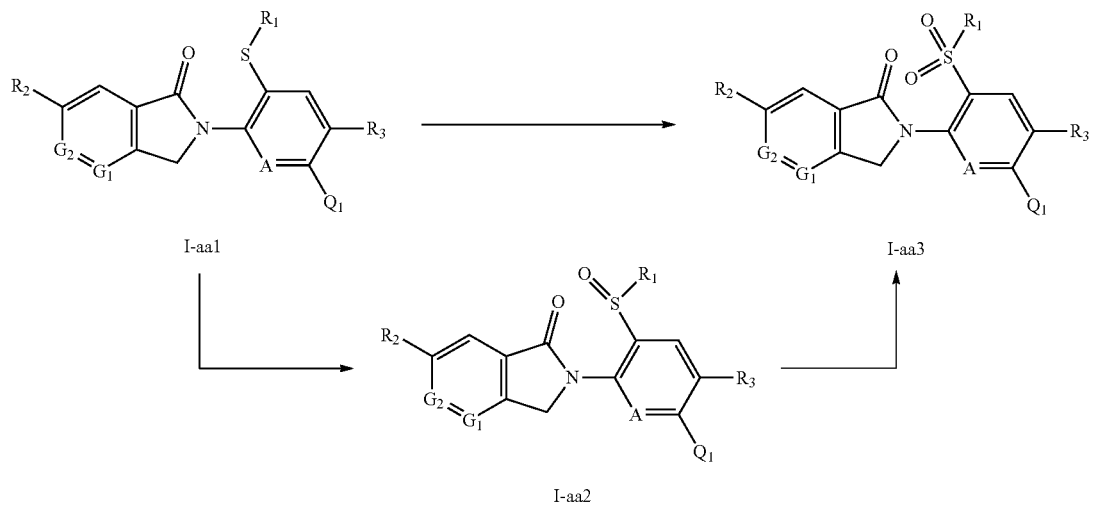

Compounds of formula I wherein $R_1$, $G_1$, $G_2$, and Q are defined as under formula I above may be prepared by reacting compounds of formula VII, wherein $R_2$, $G_1$, and $G_2$ are defined in formula I above and compounds of formula VIII, wherein Q is as defined in formula I above and in which $LG_3$ is a halogen (or a pseudo-halogen leaving group, such as a triflate), in the presence of a base, such as sodium carbonate, potassium carbonate or cesium carbonate, or sodium hydride, in an appropriate solvent such as for example tetrahydrofuran, dioxane, N,N-dimethylformamide, N,N-dimethylacetamide or acetonitrile, at temperatures between 0 and 150° C., optionally under microwave irradiation. Alternatively compounds of formula I wherein $R_2$, $G_1$, $G_2$, and Q are defined as under formula I above may be prepared by reacting compounds of formula VII, wherein $R_2$, $G_1$, and $G_2$ are defined as formula I above and compounds of formula VIII, wherein Q is as defined in formula I above and in which $LG_3$ is a halogen (or a pseudo-halogen leaving group, such as a triflate), preferably bromo or iodo in the presence of a base, such as sodium carbonate, potassium carbonate or cesium carbonate, or potassium tert-butoxide in the presence of a metal catalyst either copper catalyst for example copper(I) iodide, optionally in the presence of a ligand for example diamine ligands (e.g. N,N'-dimethylethylenediamine or trans-cyclohexyldiamine) or dibenzylideneacetone (dba), or 1,10-phenanthroline, at temperatures between 30-180° C., optionally under microwave irradiation or palladium catalyst for example palladium(II)acetate, bis(dibenzylideneacetone)palladium(0) (Pd(dba)$_2$) or tris(dibenzylideneacetone)dipalladium(0) (Pd$_2$(dba)$_3$, optionally in form of a chloroform adduct), or a palladium pre-catalyst such as for example tert-BuBrettPhos Pd G$_3$ [(2-Di-tert-butylphosphino-3,6-dimethoxy-2',4',6'-triisopropyl-1,1'-biphenyl)-2-(2'-amino-1,1'-biphenyl)]palladium(II) methanesulfonate or BrettPhos Pd G3 [(2-di-cyclohexylphosphino-3,6-dimethoxy-2',4',6'-triisopropyl-1,1'-biphenyl)-2-(2'-amino-1,1'-biphenyl)]palladium(II) methanesulfonate, and optionally in the presence of a ligand, for example SPhos, t-BuBrettPhos or Xantphos, at temperatures between 60-120° C., optionally under microwave irradiation. The above reaction may be carried out in the presence of solvent such as toluene, dimethylformamide DMF, N-methyl pyrrolidine NMP, dimethyl sulfoxide DMSO, dioxane, tetrahydrofuran THF and are described in literature Scheme 3

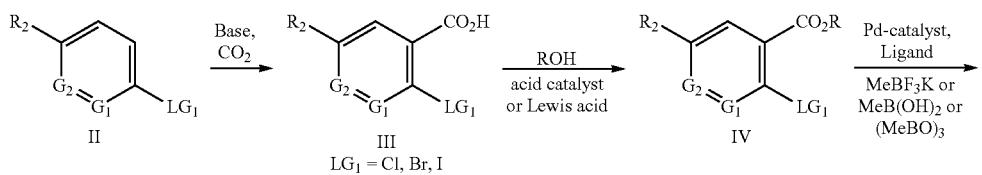

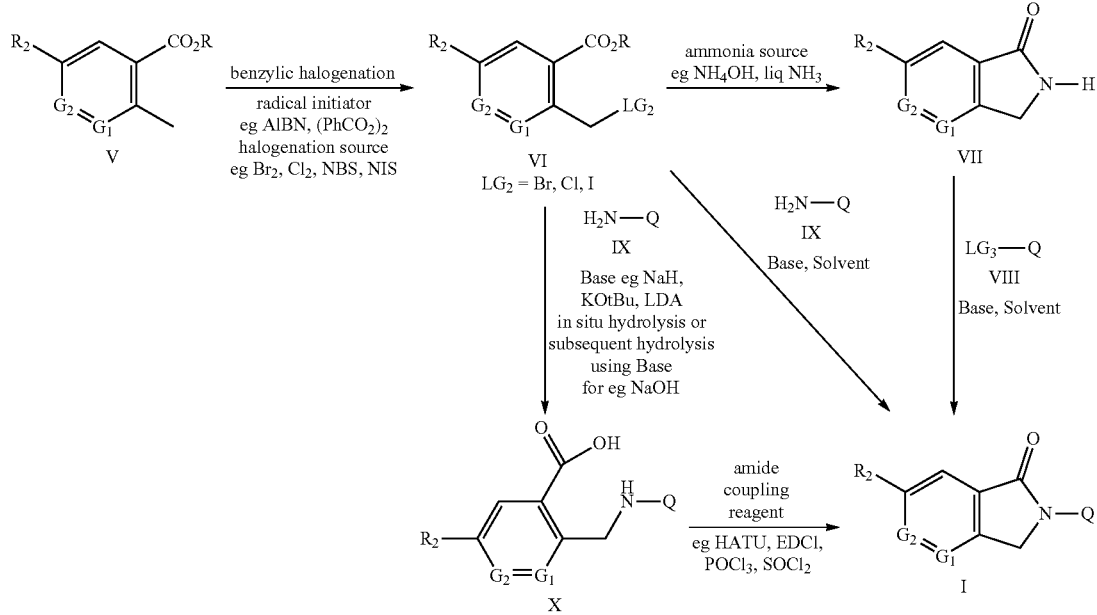

for example in WO2012031004, WO2009042907 and Synthetic Communications, 41: 67-72, 2011. Alternatively compounds of formula I wherein $R_2$, $G_1$, $G_2$, and Q are defined as under formula I above may be prepared by reacting compounds of formula VI, wherein $R_2$, $G_1$ and $G_2$ are as defined in formula I above and $LG_2$ is a leaving group for example Br, Cl or I, preferably bromo and R is $C_1$-$C_6$alkyl, benzyl or phenyl group and compounds of formula IX, wherein Q is as defined in formula I above in the presence of base such as such as sodium carbonate, potassium carbonate or cesium carbonate, or sodium hydride, N,N-Diisopropylethylamine or KOtBu and in the presence of solvent such as ethanol, methanol, dioxane, toluene, DMF, DMA, DMSO, THF at temperatures between 0 and 150° C., optionally under microwave irradiation. Such reactions proceeds via nucleophilic substitution and subsequent cyclization and are also reported in literature for example in WO2009042907.

Alternatively compounds of formula I wherein $R_2$, $G_1$, $G_2$, and Q are defined as under formula I above can be prepared by cyclizing compounds of formula X, wherein $R_2$, $G_1$, $G_2$ and Q are as defined in formula I, for example in the presence of phosphorus oxychloride, optionally in the presence of a solvent or diluent, such as toluene or xylene, at temperatures between 0 and 180° C., preferably between 20 and 120° C.

Scheme 4

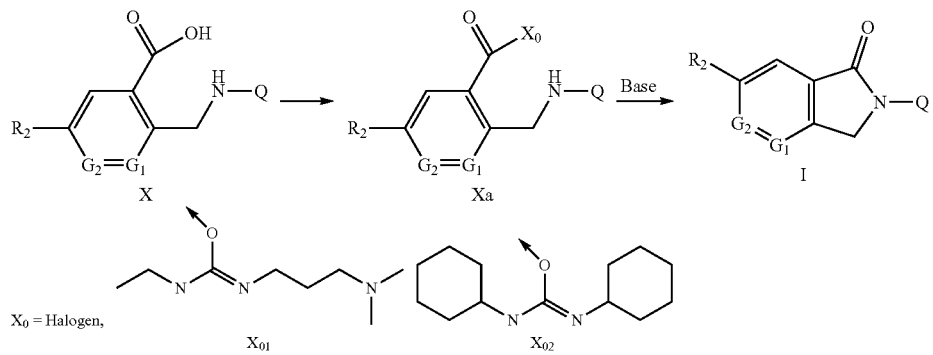

Compounds of formula I, wherein $R_2$, $G_1$, $G_2$, and Q are defined as under formula I above, can also be prepared by cyclization of the formula Xa wherein $R_2$, $G_1$, $G_2$, and Q are defined as under formula I above and in which $X_0$ is halogen, preferably chlorine, or $X_0$ is either $X_{01}$ or $X_{02}$, in the presence of a base, such as triethylamine, N,N-diisopropylethylamine or pyridine, optionally in the presence of a catalyst (such as 4-dimethylaminopyridine DMAP), in an inert solvents such as dichloromethane, tetrahydrofuran, dioxane, N,N-dimethyl-formamide, N,N-dimethylacetamide, acetonitrile, ethyl acetate or toluene, at temperatures between 0 and 50° C. Certain bases, such as pyridine and triethylamine, may be employed successfully as both base and solvent.

Compounds of formula Xa, wherein $R_2$, $G_1$, $G_2$, and Q are defined as under formula I above and in which $X_0$ is halogen, preferably chlorine, or $X_0$ is either $X_{01}$ or $X_{02}$, can be prepared by activation of compound of formula X, wherein $R_2$, $G_1$, $G_2$, and Q are defined as under formula I above, by methods known to those skilled in the art and described in, for example, Tetrahedron, 2005, 61 (46), 10827-10852. Preferred is the formation of an activated species Xa, wherein $R_2$, $G_1$, $G_2$, and Q are defined as under formula I above and in which $X_0$ is halogen, preferably chlorine. For example, compounds Xa where $X_0$ is halogen, preferably chlorine, are formed by treatment of X with, for example, oxalyl chloride $(COCl)_2$ or thionyl chloride $SOCl_2$ in the presence of catalytic quantities of N,N-dimethylformamide DMF in inert solvents such as methylene chloride $CH_2Cl_2$ or tetrahydrofuran THF at temperatures between 20 to 100° C., preferably 25° C. Alternatively, treatment of compounds of formula X with, for example, 1-ethyl-3-(3-dimethylaminopropyl)carbo-diimide EDC or dicyclohexyl carbodiimide DCC will generate an activated species Xa, wherein $X_0$ is $X_{01}$ or $X_{02}$ respectively, in an inert solvent, such as pyridine or tetrahydrofuran THF, optionally in the presence of a base, such as triethylamine, at temperatures between 50-180° C.

Compounds of formula VII, wherein $R_2$, $G_1$ and $G_2$ are as defined in formula I above can be prepared by reacting compounds of formula VI, wherein $R_2$, $G_1$ and $G_2$ are as defined in formula I above and $LG_2$ is a leaving group for example Br, Cl or I, preferably bromo and R is $C_1$-$C_6$alkyl, benzyl or phenyl group with ammonia or surrogates of ammonia for example $NH_4OH$ in the presence of solvent such as ethanol, methanol, dioxane, toluene, DMF, DMA, DMSO, THF at temperatures between 0 and 150° C., optionally under microwave irradiation.

Compounds of formula X, wherein $R_2$, $G_1$, $G_2$, and Q are defined as under formula I above, can be prepared by nucleophilic substitution reaction of compound of formula VI, wherein $R_2$, $G_1$ and $G_2$ are as defined in formula I above and $LG_2$ is a leaving group for example Br, Cl or I, preferably bromo and R is $C_1$-$C_6$alkyl, benzyl or phenyl group, with amino compound of formula IX, wherein Q is as defined in formula I above, followed by in situ hydrolysis of the intermediate ester of formula XVII, wherein $R_2$, $G_1$, $G_2$, and Q are defined as under formula I above, and in which R is $C_1$-$C_6$alkyl, benzyl or phenyl group.

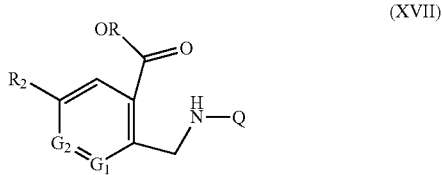

(XVII)

The in situ generated unhydrolyzed ester compound of formula XVII may be isolated and can also be converted via saponification reaction in the presence of suitable base for example NaOH, LiOH, $Ba(OH)_2$ to form the carboxylic acid of formula X. The conversion of compound of formula VI to compound of formula X can be carried out in the presence of base such as sodium hydride, KOtBu, butyllithium, lithium diisopropylamide amongst others and in the presence of solvent such as dioxane, DMF, DMA, DMSO, THF at temperatures between −30 and 150° C. Compounds of formula VI, wherein $R_2$, $G_1$ and $G_2$ are as defined in formula I above and $LG_2$ is a leaving group for example Br, Cl or I, preferably bromo and R is $C_1$-$C_6$alkyl, benzyl or phenyl group can be prepared by radical induced benzylic halogenation of compounds of formula V, wherein $R_2$, $G_1$ and $G_2$ are as defined in formula I above, and R is $C_1$-$C_6$alkyl, benzyl or phenyl group. Such reaction are well known to those skilled in the art and may be carried out in the presence of electrophilic halogenating reagents such as $Br_2$, NBS, $Cl_2$, NIS amongst others and in the presence of radical initiator for example AIBN (Azobisisobutyronitrile), benzoyl peroxide or under photochemical conditions and at temperatures ranging from 20° C. to the boiling point of solvent and in the presence of solvent such as toluene, xylene, acetonitrile, hexane, dichloroethane, or carbon tetrachloride. Such reactions are known by the name of Wohl-Ziegler bromination and are reported in literature for example in *Synthesis*, 2015, 47, 1280-1290 and *J. Am. Chem. Soc.*, 1963, 85 (3), pp 354-355.

Compounds of formula V, wherein $R_2$, $G_1$ and $G_2$ are as defined in formula I above and R is $C_1$-$C_6$alkyl, benzyl or phenyl group, may be prepared by a Suzuki reaction, which involves for example, reacting compounds of formula IV, wherein $R_2$, $G_1$ and $G_2$ are as defined in formula I above, $LG_1$ is halogen Br, Cl, I preferably Cl and R is $C_1$-$C_6$alkyl, benzyl or phenyl group with trimethylboroxine or potassium methyltrifluoroborate amongst other methyl boronic acid equivalent. The reaction may be catalyzed by a palladium based catalyst, for example tetrakis(triphenyl-phosphine) palladium(0), (1,1'bis(diphenylphosphino)ferrocene)dichloro-palladium-dichloromethane (1:1 complex) or chloro(2-dicyclohexylphosphino-2',4',6'-triisopropyl-1,1'-biphenyl)[2-(2'-amino-1,1'-biphenyl)]palladium(II) (XPhos palladacycle), in presence of a base, like sodium carbonate, tripotassium phosphate or cesium fluoride, in a solvent or a solvent mixture, like, for example dioxane, acetonitrile, N,N-dimethyl-formamide, a mixture of 1,2-dimethoxyethane and water or of dioxane/water, or of toluene/water, preferably under inert atmosphere. The reaction temperature can preferentially range from room temperature to the boiling point of the reaction mixture, or the reaction may be performed under microwave irradiation. Such Suzuki reactions are well known to those skilled in the art and have been reviewed, for example, in J. Organomet. Chem. 576, 1999, 147-168.

Compounds of formula IV, wherein $R_2$, $G_1$ and $G_2$ are as defined in formula I above, $LG_1$ is halogen Br, Cl, I preferably Cl and R is $C_1$-$C_6$alkyl, benzyl or phenyl group can be prepared by reacting compounds of formula III, wherein $R_2$, $G_1$ and $G_2$ are as defined in formula I above, $LG_1$ is halogen Br, Cl, I preferably Cl and ROH, wherein R is $C_1$-$C_6$alkyl, benzyl or phenyl group in the presence of acid catalyst for example sulfuric acid or Lewis acid for example $Sc(OTf)_3$ or $FeCl_3$. Such reactions are well known to those skilled in the state of art and known by the name of Fischer Esterification reaction and are reported in literature for example in *J. Org. Chem.*, 2006, 71, 3332-3334, *Chem. Commun.*, 1997, 351-352 and *Synthesis*, 2008, 3407-3410. Such esterification reaction can also be carried out by reacting compounds of formula III with $TMSCHN_2$ to form compounds of formula IV, wherein $R_2$, $G_1$ and $G_2$ are as defined in formula I above, $LG_1$ is halogen Br, Cl, I preferably Cl and R is methyl and are reported in *Angew. Chem. Int. Ed.* 2007, 46, 7075.

Compounds of formula III, wherein $R_2$, $G_1$ and $G_2$ are as defined in formula I above, $LG_1$ is halogen Br, Cl, I preferably Cl can be prepared by metalation reaction of compounds of formula II, wherein $R_2$, $G_1$ and $G_2$ are as defined in formula I above, $LG_1$ is halogen Br, Cl, I preferably Cl with suitable base and subsequent reaction with carbon dioxide. Metalation reaction can be performed using base for example organolithium compound such as lithium tetramethylpiperidide, lithium diisopropylamide, sec-BuLi amongst others at temperatures ranging from −78 to 40° C. in the presence of solvent such as THF, DMPU, dioxane, 2-Me-THF. Such reactions are reported in literature for example in Tetrahedron, 2004, 60(51), 11869-11874.

Alternatively, compounds of formula IV, wherein $R_2$, $G_1$ and $G_2$ are as defined in formula I above, $LG_1$ is halogen, for example Br, Cl or I (preferably Cl), and R is $C_1$-$C_6$alkyl, benzyl or phenyl Scheme 3a

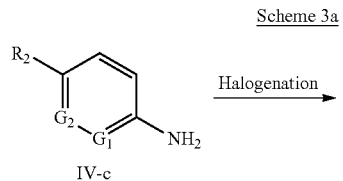

a carbonylation reaction, in which compounds of formula (IV-b) are reacted with carbon monoxide CO (usually under pressure), in presence of metal catalyst such as a palladium catalyst (for example: palladium(II) acetate), in an alcohol ROH solvent (optionally in presence of a co-solvent), wherein R is $C_1$-$C_6$alkyl, benzyl or phenyl, and optionally in presence of a phosphine ligand, and optionally in presence of a base, at temperatures between 0-180° C.

Compounds of formula IV-b, wherein $R_2$, $G_1$ and $G_2$ are as defined in formula I above, and $LG_4$ is halogen, preferably Br, Cl or I, can be prepared by a halogenation reaction, which involves for example, reacting compounds of formula IV-c, wherein $R_2$, $G_1$ and $G_2$ are as defined in formula I above, with halogenating reagents such as N-chlorosuccinimide (NCS), N-bromo-succinimide (NBS) or N-iodosuccinimide (NIS), or alternatively chlorine, bromine or iodine. Such halogenation reactions are carried out in an inert solvent, such as chloroform, carbon tetrachloride, 1,2-dichloroethane, acetic acid, ethers, acetonitrile or N,N-dimethylformamide, at temperatures between 20-200° C., preferably room temperature to 100° C.

The compounds of formula VI-a

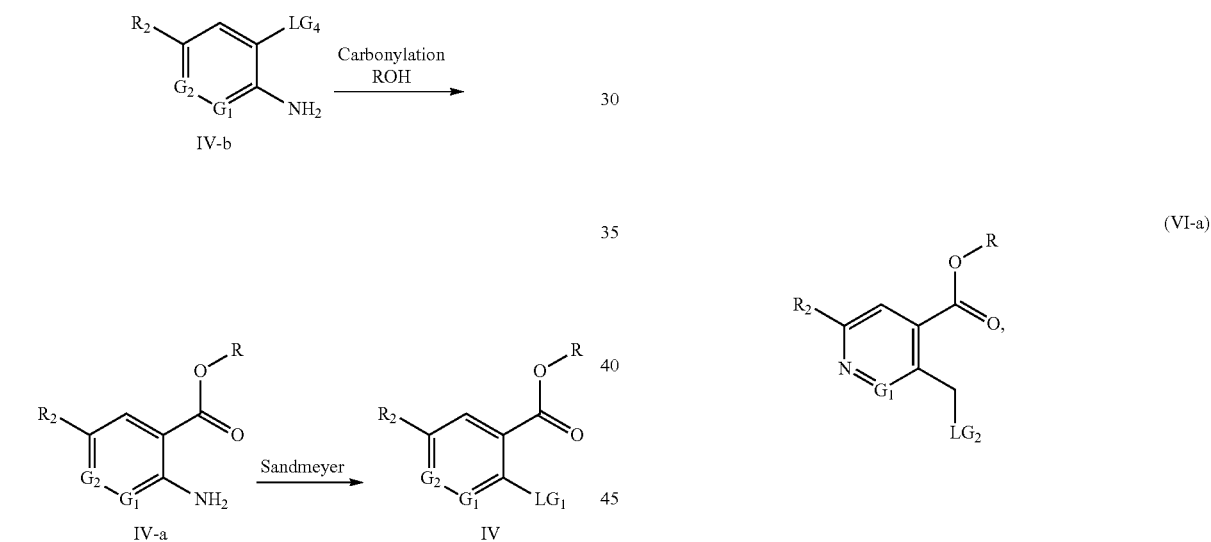

can be prepared (scheme 3a) by reacting compounds of formula IV-a, wherein $R_2$, $G_1$ and $G_2$ are as defined in formula I above, and R is $C_1$-$C_6$alkyl, benzyl or phenyl, with a nitrite, such as tert-butyl nitrite t-BuONO, isoamyl nitrite, or sodium nitrite in the presence of a hydrohalic acid H-$LG_1$ and a copper salt Cu-$LG_1$, wherein $LG_1$ is halogen, for example Br, Cl or I (preferably Cl) under Sandmeyer-type reaction conditions. This transformation is preferably performed in an inert solvent, such as acetonitrile or a halogenated solvent like 1,2-dichloroethane, or water at temperatures between 0-150° C., preferably at temperatures ranging from room temperature to the boiling point of the reaction mixture.

Compounds of formula IV-a, wherein $R_2$, $G_1$ and $G_2$ are as defined in formula I above, and R is $C_1$-$C_6$alkyl, benzyl or phenyl, can be prepared from compounds of formula IV-b, wherein $R_2$, $G_1$ and $G_2$ are as defined in formula I above, and $LG_4$ is halogen, preferably Br, Cl or I, by methods found in, for example, WO 2016/020286 involving wherein $R_2$ and $G_1$ are as defined under formula I above, and in which $LG_2$ is a leaving group for example Br, Cl or I, and R is $C_1$-$C_6$alkyl, benzyl or phenyl are novel, especially developed for the preparation of the compounds of formula I according to the invention and therefore represent a further object of the invention. The preferences and preferred embodiments of the substituents of the compounds of formula I are also valid for the compounds of formula VI-a. Preferably, $LG_2$ is bromo or chloro; even more preferably $LG_2$ is bromo. Preferably R is $C_1$-$C_6$alkyl; even more preferably R is methyl or ethyl.

Alternatively compounds of formula I, wherein $G_1$, $G_2$, $R_2$ and Q are defined as under formula I above can be prepared following scheme 5.

Scheme 5

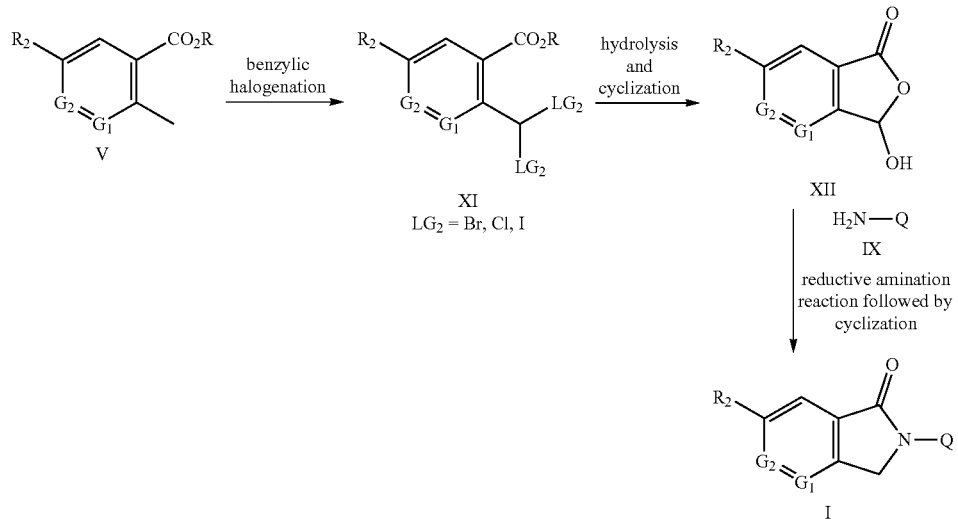

In scheme 5, compounds of formula I, wherein $G_1$, $G_2$, $R_2$ and Q are defined as under formula I above can be prepared from compounds of formula X, wherein $G_1$, $G_2$, $R_2$ and Q are defined as under formula I above, by method as described in scheme 4 above (scheme 6). Compounds of formula X can be prepared by reacting compounds of formula XII, wherein $G_1$, $G_2$, $R_2$ are as defined in formula I above with compounds of formula IX, wherein Q is as defined in formula I above under reductive amination conditions (scheme 6). The reaction can be carried out in the presence of reducing agent for example sodium cyanoborohydride, sodium triacetoxyborohydride, amongst others and optionally in the presence of acid such as trifluoroacetic acid, formic acid, acetic acid and like others and at temperatures ranging from 0° C. to the boiling point of solvent. The reaction can be carried out in the presence of inert solvents such as ethanol, methanol, dioxane or tetrahydrofuran. Such reactions involving two step conversion form compounds of formula XII to compounds of formula I have been described in literature for example in Bioorganic & Medicinal Chemistry Letters 26 (2016) 5947-5950. Compounds of formula XII, wherein $G_1$, $G_2$, and $R_2$ are as defined in formula I above, can be prepared from compound of formula XI, wherein $G_1$, $G_2$, and $R_2$ are as defined in formula I above, $LG_2$ is chloro, bromo or iodo preferably bromo and R is $C_1$-$C_6$alkyl, benzyl or phenyl group by the hydrolysis reaction. The reaction can be carried out either using metal hydroxide under basic conditions for example using aqueous sodium hydroxide in the presence of solvent such as dioxane, tetrahydrofuran or water and at temperature ranging from 20 to 150° C. as reported in Synlett 1992, (6), 531-533, or under aqueous acidic conditions for example using acetic acid, hydrochloric acid or sulfuric acid in the presence of solvent such as water, dioxane, halogenate solvents such as dichloroethane as reported in Tetrahedron 62 (2006) 9589-9602. Compounds of formula XI, wherein $G_1$, $G_2$, and $R_2$ are as defined in formula I above, $LG_2$ is chloro, bromo or iodo preferably bromo and R is $C_1$-$C_6$alkyl, benzyl or phenyl group can be prepared from compounds of formula V, wherein $G_1$, $G_2$, and $R_2$ are as defined in formula I above, and R is $C_1$-$C_6$alkyl, benzyl or phenyl group by method similar to as described in scheme 3 for the conversion of compound of formula V to compound of formula VI.

Scheme 6

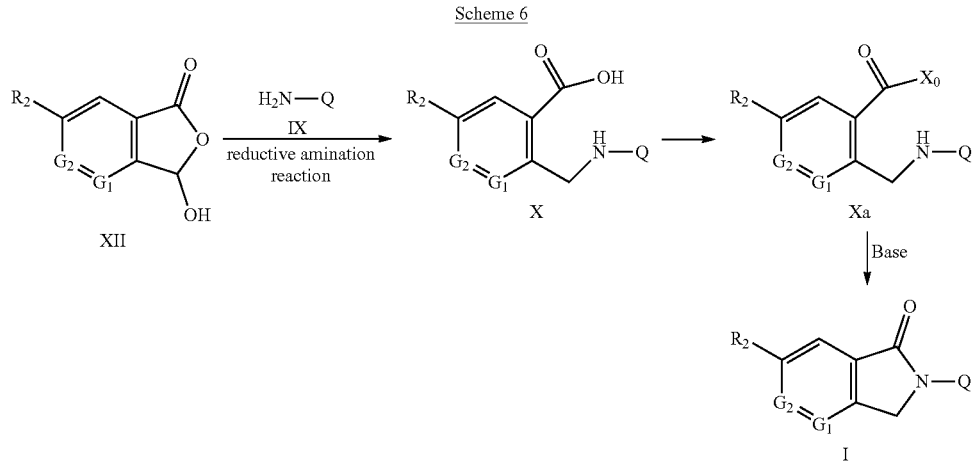

-continued

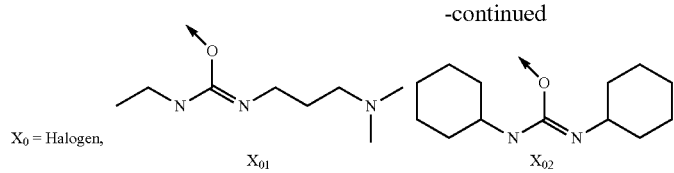

$X_0$ = Halogen, $X_{01}$, $X_{02}$

Alternatively compounds of formula I, wherein $G_1$, $G_2$, $R_2$ and Q are defined as under formula I, above can be prepared from compounds of formula XV, wherein $G_1$, $G_2$, $R_2$ and Q are defined as under formula I, above via selective reduction of the carbonyl functional group (Scheme 7).

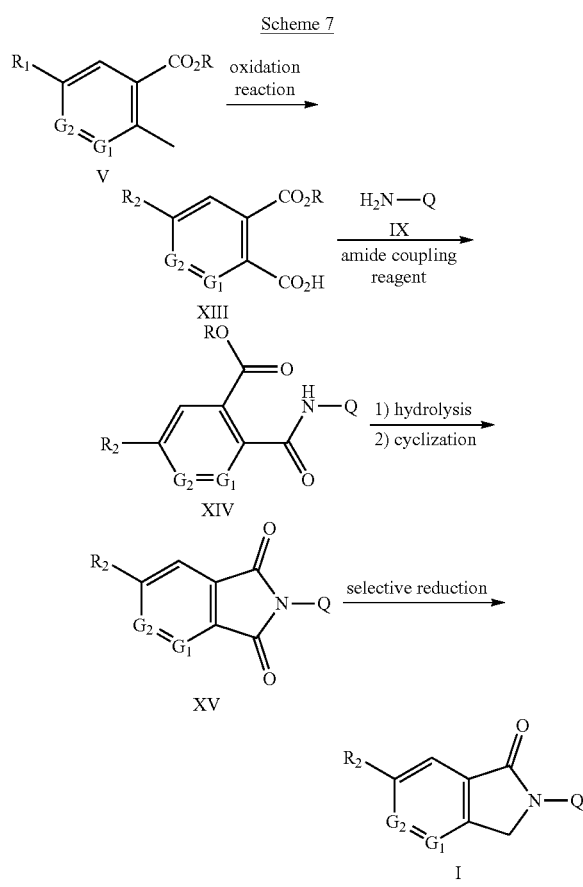

The reaction can be carried out in the presence of reducing agent for example $NaBH_4$, $LiAlH_4$, palladium on carbon in the presence of hydrogen or a combination of two reducing agent for example $NaBH_4$ followed by triethylsilane. Such reactions have been described for example in US20100160303A1. Compounds of formula XV, wherein $G_1$, $G_2$, $R_2$ and Q are defined as under formula I, above can be prepared from compounds of formula XIV, wherein $G_1$, $G_2$, $R_2$ and Q are defined as under formula I, above by hydrolysis reaction and subsequent cyclization reaction as described in scheme 4 for the conversion of compounds of formula X to compounds of formula I. Compounds of formula XIV, wherein $G_1$, $G_2$, $R_2$ and Q are defined as under formula I, above and R is $C_1$-$C_6$alkyl, benzyl or phenyl can be prepared by reacting compounds of formula XIII, wherein $R_2$, $G_1$, $G_2$ are as described in formula I, above and R is $C_1$-$C_6$alkyl, benzyl or phenyl with compounds of formula IX, wherein Q is as defined in formula I above by amidation reaction as also described in scheme 4. Compounds of formula XIII, wherein $R_2$, $G_1$, $G_2$ are as described in formula I, above and R is $C_1$-$C_6$alkyl, benzyl or phenyl can be prepared by benzylic oxidation of compounds of formula V, wherein $R_2$, $G_1$, $G_2$ are as described in formula I, above and R is $C_1$-$C_6$alkyl, benzyl or phenyl. The reaction can be carried out in the presence of oxidative reagents such as $KMNO_4$, $nBu_4MnO_4$, $K_2S_2O_8$ in the presence of oxygen, or under photochemical conditions in the presence of oxygen and at temperature ranging from 20° C. to the boiling point of solvent. The reaction is carried out in the presence of inert solvent such as acetonitrile, ethyl acetate, DMSO, dichloroethane. Such reactions are known in the literature for example in Synthesis, 2017, 49, 4007-4016, Synthesis, 2006, 1757-1759 and IOSR Journal of Applied Chemistry, 2014, 7, 16-27.

Alternatively, compounds of formula I, wherein $R_2$, $G_1$, $G_2$ and Q are as defined in formula I, above can be prepared by cyclization reaction of compounds of formula XVII, wherein $R_2$, $G_1$, $G_2$ and Q are as defined in formula I, above and R is $C_1$-$C_6$alkyl, benzyl or phenyl (Scheme 8):

Scheme 8

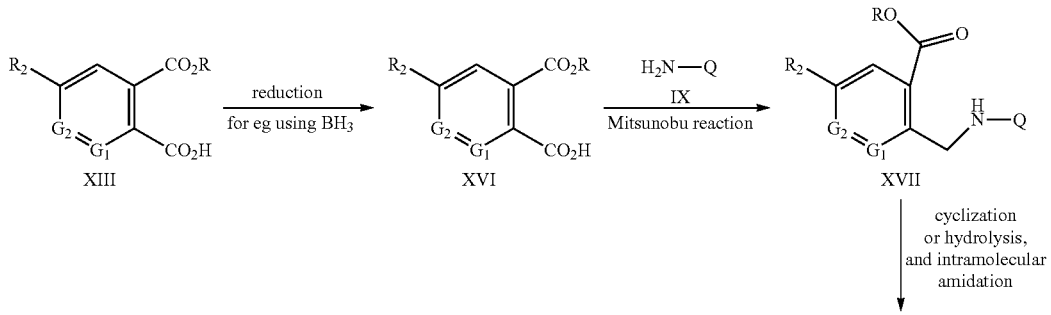

cyclization or hydrolysis, and intramolecular amidation

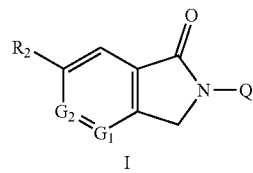

Reaction can be carried out in the presence of base such as potassium tert-butoxide, lithium diisopropylamide, sodium hydride, and similar others and at temperature ranging from −20° C. to the boiling point of solvent and in the presence of inert solvent such as tetrahydrofuran, dioxane, DMF. Such reactions are reported in Synlett 2006 (4): 591-594. Compounds of formula XVII, wherein $R_2$, $G_1$, $G_2$ and Q are as defined in formula I, above and R is $C_1$-$C_6$alkyl, benzyl or phenyl can be prepared by reacting compounds of formula XVI, wherein $R_2$, $G_1$ and $G_2$ are as defined in formula I, above and R is $C_1$-$C_6$alkyl, benzyl or phenyl with compounds of formula IX, wherein Q is as defined in formula I above under Mitsunobu conditions. Such reactions are well known to those skilled in the state of art and can be carried out in the presence of phosphine reagent such as triphenylphosphine, tributylphosphine, or polymer supported triphenyl phosphine amongst others and in the presence of an azodicarboxylate reagent such as diethyl azodicarboxylate, diisopropyl azodicarboxylate and at temperature ranging from 0° C. and 100° C. and in the presence of inert solvent such as acetonitrile, dichloromethane, tetrahydrofuran, toluene. Such reactions are reported for example in Synthesis, 1981(1), 1-28. Compounds of formula XVI, wherein $R_2$, $G_1$ and $G_2$ are as defined in formula I, above and R is $C_1$-$C_6$alkyl, benzyl or phenyl can be prepared by reacting compounds of formula XIII, wherein $R_2$, $G_1$ and $G_2$ are as defined in formula I, above and R is $C_1$-$C_6$alkyl, benzyl or phenyl with reducing agents. Reaction can be performed using reducing reagents for example using metal hydrides such as lithium aluminum-hydride, DIBAL-H, or boranes such as diborane, borane tetrahydrofuran amongst others at temperatures ranging from 0° C. and 150° C. and in the presence of inert solvent such as tetrahydrofuran, dioxane. Such reactions have been reported in Tetrahedron Letters, 1982, 23, 2475-2478.

The compounds of formula XVII-a

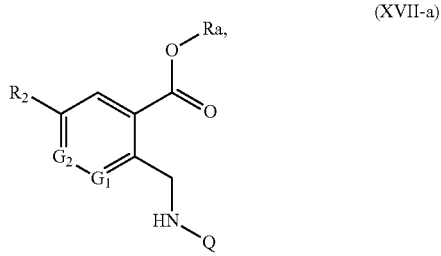

(XVII-a)

wherein $R_2$, $G_1$, $G_2$ and Q are as defined under formula I above, and $R_a$ is hydrogen, $C_1$-$C_6$alkyl, benzyl or phenyl are novel, especially developed for the preparation of the compounds of formula I according to the invention and therefore represent a further object of the invention. The preferences and preferred embodiments of the substituents of the compounds of formula I are also valid for the compounds of formula XVII-a. Preferably, $R_a$ is hydrogen or $C_1$-$C_6$alkyl; even more preferably, $R_a$ is hydrogen, methyl or ethyl.

Compounds of formula IX, wherein Q is as defined in formula I above, may be prepared by the deprotection reaction of tert-butyl group of compounds of formula XIX, wherein Q is as defined in formula I above (Scheme 9).

Scheme 9

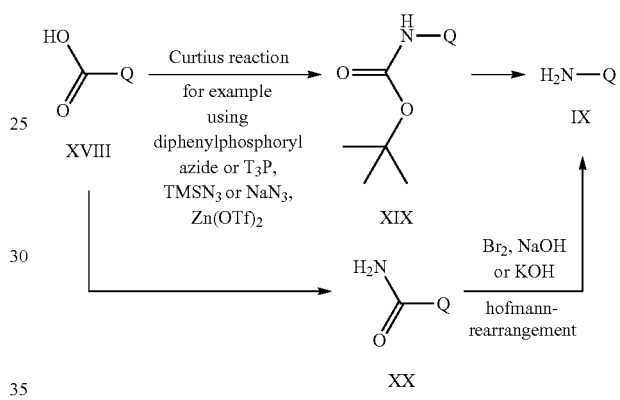

The reaction can be carried out in the presence of acid catalyst such as trifluoroacetic acid, hydrochloric acid or sulfuric acid and like others. Compounds of formula IX, wherein Q is as defined in formula I above, may be prepared by the reaction of compounds of formula XVIII, wherein Q is as defined in formula I above, with an organo-azide in the presence of a suitable base, t-BuOH and in the presence of a coupling agent optionally in the presence of Lewis acid and in the presence of an inert solvent at temperatures between 50° C. and boiling point of solvent. The reaction can be carried out in the presence of coupling agent such as $T_3P$ or via activation of carboxylic acid with $SOCl_2$ or oxalyl chloride or other coupling agent as described in scheme 6 for the conversion of compounds of formula X to the compounds of formula Xa. Examples of organo-azide include $TMSN_3$, sodium azide, or tosyl azide and suitable solvent may be toluene, xylene, THF or acetonitrile. Example of suitable Lewis acid may include $Zn(OTf)_2$, $Sc(OTf)_2$, or $Cu(OTf)_2$ amongst others. Compounds of formula XIX can also be prepared by reacting compounds of formula XVIII with diphenylphosphorylazide in the presence of an organic base such as triethyl amine, diisopropylethylamine and similar others, and in the presence of tert-butanol and an inert solvent for example halogenated solvent such as dichloromethane, dichloroethane or cyclic ethers such as tetrahydrofuran amongst others and at temperatures ranging from 50° C. to the boiling point of solvent. Such reactions of converting carboxylic acids to amines are well known to those skilled in the state of art by the name of Curtius reaction and are reported in Org. Lett., 2005, 7, 4107-4110; Journal of Medicinal Chemistry, 49(12), 3614-3627; 2006,

*J. Am. Chem. Soc.*, 1972, 94 (17), pp 6203-6205. Compounds of formula IX, wherein Q is as defined in formula I above, may also be prepared from compounds of formula XX, wherein Q is as defined in formula I above by Hofmann-rearrangement reaction. The reaction can be carried out in the presence of base for example metal hydroxides such as aqueous sodium hydroxide or potassium hydroxide or organic bases such as DBU (1,8-Diazabicyclo(5.4.0) undec-7-ene) and in the presence of electrophilic halogenating reagents such as chlorine, bromine or N-bromo-succinimide and at temperatures ranging from 20° C. to the boiling point of solvent. Such reactions are known by the name of Hofmann-rearrangement and are reported in literature for example in Chem. Ber. 1881, 14, 2725. Compounds of formula XX, wherein Q is as defined in formula I above can be prepared by the reaction of compounds of formula XVIII with ammonia for example $NH_4OH$, $NH_3$, or other ammonia surrogates in the presence of carboxylic acid activating agent as described in scheme 4.

The subgroup of compounds of formula IX, wherein Q is defined as Qa, in which X is $SO_2$, A is N, and $R_1$, $R_3$ and $Q_1$ are as defined in formula I, can be defined as compounds of formula IX-1 (scheme 9a).

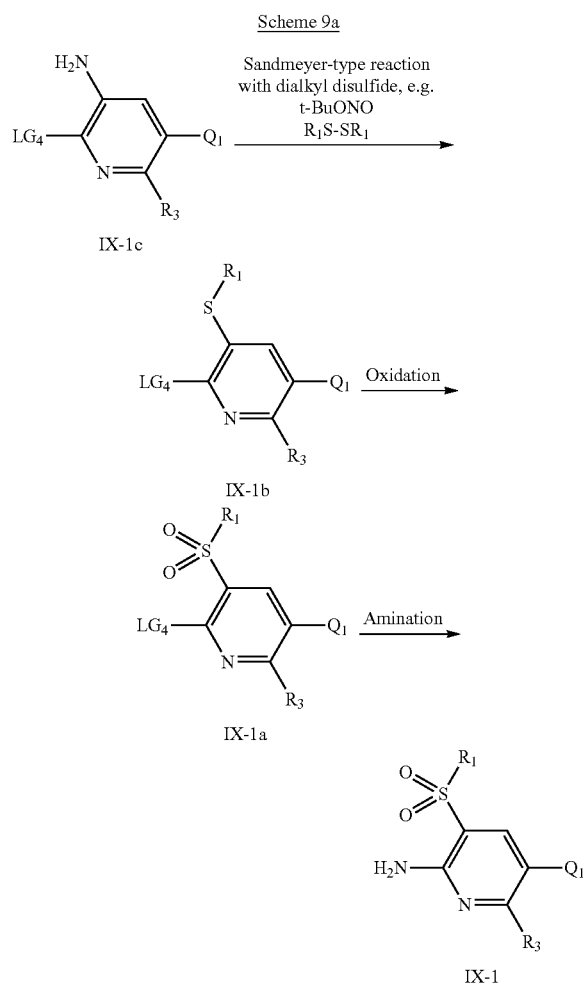

Compounds of formula IX-1 can be prepared by an amination reaction, which involves for example, reacting compounds of formula IX-la, wherein $R_1$, $R_3$ and $Q_1$ are as defined in formula I, and $LG_4$ is halogen, preferably F, Br or Cl, with ammonia, or a salt thereof (such as a hydrohalide salt, preferably a hydrochloride or a hydrobromide salt, or any other equivalent salt). The source of nitrogen may be ammonia $NH_3$ itself or an ammonia equivalent such as for example ammonium hydroxide $NH_4OH$, ammonium chloride $NH_4Cl$, ammonium acetate $NH_4OAc$, ammonium carbonate $(NH_4)_2CO_3$, and other $NH_3$ surrogates. This transformation is preferably performed in suitable solvents (or diluents) such as alcohols, amides, esters, ethers, nitriles and water, particularly preferred are methanol, ethanol, 2,2,2-trifluoroethanol, propanol, iso-propanol, N,N-dimethylformamide, N,N-dimethylacetamide, dioxane, tetrahydrofuran, dimethoxyethane, acetonitrile, ethyl acetate, water or mixtures thereof, optionally in presence of a base, at temperatures between 0-150° C., preferably at temperatures ranging from room temperature to the boiling point of the reaction mixture, optionally under microwave irradiation.

Compounds of formula IX-la, wherein $R_1$, $R_3$ and $Q_1$ are as defined in formula I, and $LG_4$ is halogen, preferably F, Br or Cl, can be prepared by oxidizing compounds of formula IX-1 b, wherein $R_1$, $R_3$ and $Q_1$ are as defined in formula I, and $LG_4$ is halogen, preferably F, Br or Cl, under conditions already described above.

Compounds of formula IX-1b, wherein $R_1$, $R_3$ and $Q_1$ are as defined in formula I, and $LG_4$ is halogen, preferably F, Br or Cl, can be prepared by reacting compounds of formula IX-1c, wherein $R_3$ and $Q_1$ are as defined in formula I, and $LG_4$ is halogen, preferably F, Br or Cl, with a nitrite, such as tert-butyl nitrite t-BuONO, isoamyl nitrite, or sodium nitrite in presence of a hydrohalic acid, and a disulfide $R_1S-SR_1$ or alternatively a thiol lRISH, wherein $R_1$ is as defined in formula I above, under Sandmeyer-type reaction conditions. This transformation is preferably performed in an inert solvent, such as acetonitrile or a halogenated solvent like 1,2-dichloroethane, at temperatures between 0-150° C., preferably at temperatures ranging from room temperature to the boiling point of the reaction mixture, optionally in the presence of copper salts.

The compounds of formula IX-a

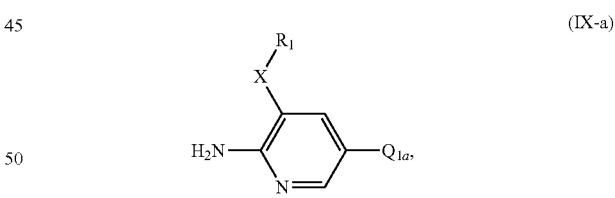

wherein
$R_1$ and X are as defined under formula I above, and $Q_{1a}$ is 1-cyanocyclopropyl, 1-cyano-1-methyl-ethyl or 2-pyridyloxy, are novel, especially developed for the preparation of the compounds of formula I according to the invention and therefore represent a further object of the invention. The preferences and preferred embodiments of the substituents of the compounds of formula I are also valid for the compounds of formula IX-a.

The subgroup of compounds of formula I, wherein $G_1$, $G_2$, and $R_2$ are as defined in formula I above and wherein Q is defined as Qb, in which A, $Q_1$, $R_3$, X and $R_1$ are as defined in formula I, may be defined as compounds of formula I-Qb (scheme 10).

Scheme 10

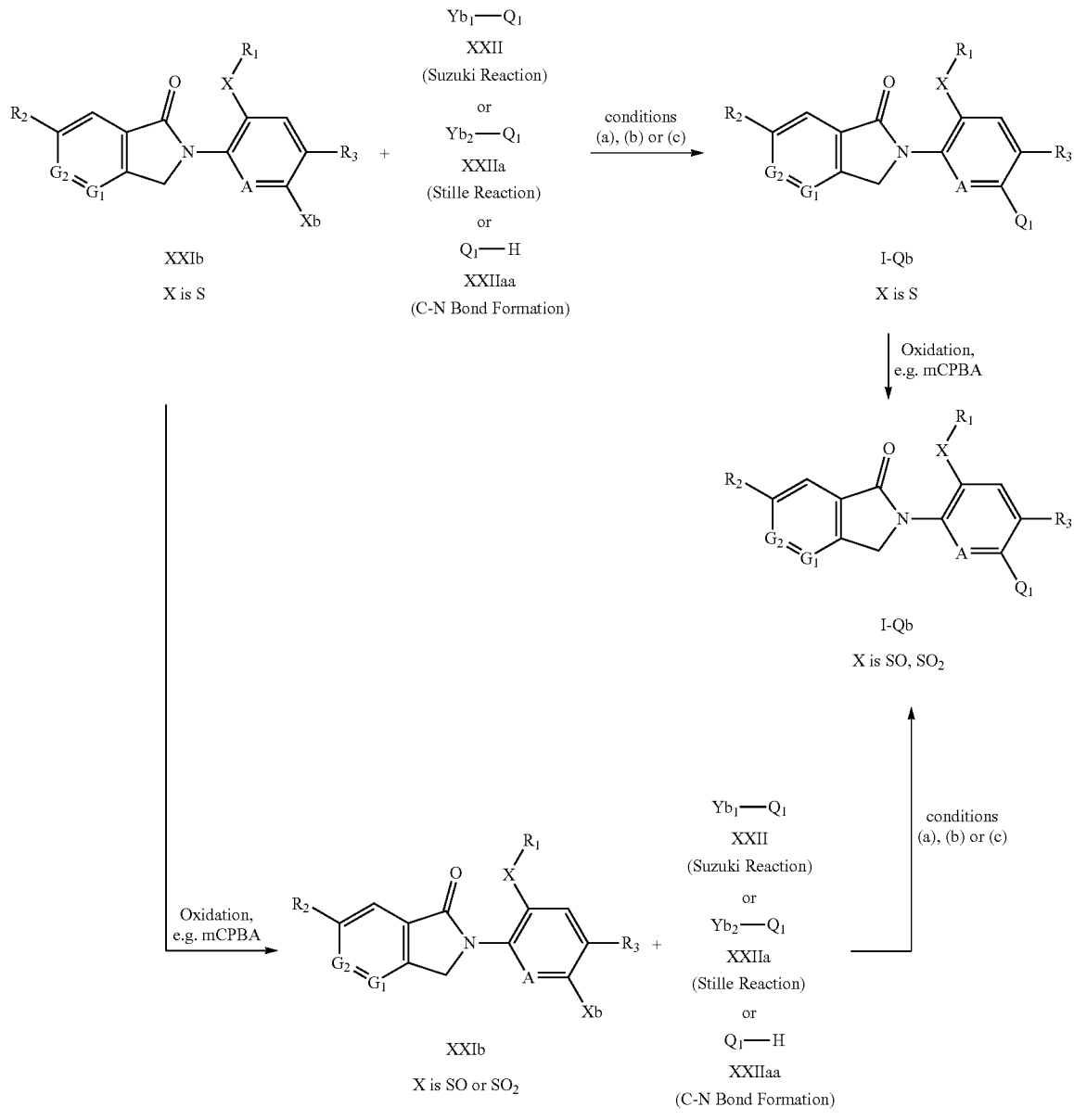

(a) Suzuki reaction: Pd cat. (e.g. Pd(PPh$_3$)$_4$ or Pd(dppf)Cl$_2$), base (e.g. Na$_2$CO$_3$), solvent (e.g. 1,2-dimethoxyethane / water), 25-180° C.
(b) Stille reaction: Pd cat. (e.g. Pd(PPh$_3$)$_4$ or Pd(PPh$_3$)Cl$_2$), solvent (e.g. toluene), 25-180° C.
(c) C-N bond formation: Optional base (e.g. K$_2$CO$_3$ or Cs$_2$CO$_3$), optional presence of copper or palladium catalyst, optional additive (such as N,N'-dimethylethylenediamine), optional ligand (such as Xantphos), solvent (e.g. dioxane, pyridine or N,N-dimethylformamide DMF), 25-180° C.

In the particular situation within scheme 10 when $Q_1$ is an optionally substituted triazole linked via a ring nitrogen atom to the ring which contains the group A, then compounds of formula I-Qb, wherein X is SO or SO$_2$, may be prepared from compounds of formula XXIb, wherein $G_1$, $G_2$, A, $R_3$, $R_1$ and $R_2$ are as defined in formula I above and in which X is SO or SO$_2$, and wherein Xb is a leaving group like, for example, chlorine, bromine or iodine (preferably chlorine or bromine), or an aryl- or alkylsulfonate such as trifluoromethanesulfonate, by reaction (C—N bond formation) with an optionally substituted triazole $Q_1$-H (which contains an appropriate NH functionality) (XXIIaa), wherein $Q_1$ is N-linked triazolyl, in solvents such as alcohols (eg. methanol, ethanol, isopropanol, or higher boiling linear or branched alcohols), pyridine or acetic acid, optionally in the presence of an additional base, such as potassium carbonate K$_2$CO$_3$ or cesium carbonate Cs$_2$CO$_3$, optionally in the presence of a copper catalyst, for example copper(I) iodide, at temperatures between 30-180° C., optionally under microwave irradiation.

In the particular situation within scheme 10 when $Q_1$ is —N(R$_4$)COR$_5$, or —N(R$_4$)CON(R$_4$)$_2$, wherein R$_4$ and R$_5$ are as defined in formula I, then compounds of formula I-Qb, wherein X is SO or SO$_2$, may be prepared from compounds of formula XXIb, wherein A, R$_1$, R$_2$, G$_1$, G$_2$ and R$_3$ are as defined in formula I, and in which X is SO or SO$_2$, and wherein Xb is a leaving group like, for example, chlorine, bromine or iodine (preferably chlorine or bromine), or an aryl- or alkylsulfonate such as trifluoromethanesulfonate, by reaction (C—N bond formation) with a reagent $Q_1$-H (XXI-Iaa) equivalent to $HN(R_4)COR_5$, or $HN(R_4)CON(R_4)_2$, wherein $R_4$ and $R_5$ are as defined in formula I. Such a reaction is performed in the presence of a base, such as potassium carbonate, cesium carbonate, sodium hydroxide, in an inert solvent, such as toluene, dimethylformamide DMF, N-methyl pyrrolidine NMP, dimethyl sulfoxide DMSO, dioxane, tetrahydrofuran THF, and the like, optionally in the presence of a catalyst, for example palladium(II) acetate, bis(dibenzylideneacetone)palladium(0) $(Pd(dba)_2)$ or tris(dibenzylideneacetone)dipalladium(0) $(Pd_2(dba)_3$, optionally in form of a chloroform adduct), or a palladium pre-catalyst such as for example tert-BuBrettPhos Pd $G_3$ [(2-Di-tert-butylphosphino-3,6-dimethoxy-2',4',6'-triisopropyl-1,1'-biphenyl)-2-(2'-amino-1,1'-biphenyl)]palladium(II) methanesulfonate or BrettPhos Pd $G_3$ [(2-di-cyclohexylphosphino-3,6-dimethoxy-2',4',6'-triisopropyl-1,1'-biphenyl)-2-(2'-amino-1,1'-biphenyl)]palladium(II) methanesulfonate, and optionally in the presence of a ligand, for example SPhos, t-BuBrettPhos or Xantphos, at temperatures between 60-120° C., optionally under microwave irradiation.

In the particular situation within scheme 10 when $Q_1$ —$N(R_4)_2$, wherein $R_a$ is as defined in formula I, then compounds of formula I-Qb, wherein X is SO or $SO_2$, may be prepared from compounds of formula XXIb, wherein A, $R_1$, $R_2$, $G_1$, $G_2$ and $R_3$ are as defined in formula I, and in which X is SO or $SO_2$, and wherein Xb is a leaving group like, for example, chlorine, bromine or iodine (preferably chlorine or bromine), or an aryl- or alkylsulfonate such as trifluoromethanesulfonate, by reaction (C—N bond formation) with a reagent $Q_1$-H (XXIIaa) equivalent to $HN(R_4)_2$, or a salt thereof (such as a hydrohalide salt, preferably a hydrochloride or a hydrobromide salt, or a trifluoroacetic acid salt, or any other equivalent salt), wherein $R_a$ is as defined in formula I. Such a reaction is commonly performed in an inert solvent such as alcohols, amides, esters, ethers, nitriles and water, particularly preferred are methanol, ethanol, 2,2,2-trifluoroethanol, propanol, isopropanol, N,N-dimethylformamide, N,N-dimethylacetamide, dioxane, tetrahydrofuran, dimethoxyethane, acetonitrile, ethyl acetate, toluene, water or mixtures thereof, at temperatures between 0-150° C., optionally under microwave irradiation or pressurized conditions using an autoclave, optionally in the presence of a copper catalyst, such as copper powder, copper(I) iodide or copper sulfate (optionally in form of a hydrate), or mixtures thereof, optionally in presence a ligand, for example diamine ligands (e.g. N,N'-dimethylethylenediamine or trans-cyclohexyldiamine) or dibenzylideneacetone (dba), or 1,10-phenanthroline, and optionally in presence of a base such as potassium phosphate.

Reagents $HN(R_4)_2$, $HN(R_4)COR_5$, or $HN(R_4)CON(R_4)_2$, wherein $R_4$ and $R_5$ are as defined in formula I, are either known, commercially available or may be prepared by methods known to a person skilled in the art.

Alternatively, compounds of formula I-Qb, wherein X is SO or $SO_2$, may be prepared by a Suzuki reaction, which involves for example, reacting compounds of formula XXIb, wherein A, $R_1$, $R_2$, $G_1$, $G_2$ and $R_3$ are as defined in formula I, and in which X is SO or $SO_2$, and wherein Xb is a leaving group like, for example, chlorine, bromine or iodine (preferably chlorine or bromine), or an aryl- or alkylsulfonate such as trifluoromethanesulfonate, with compounds of formula (XXII), wherein $Q_1$ is as defined in formula I, and wherein $Y_{b1}$ can be a boron-derived functional group, such as for example $B(OH)_2$ or $B(OR_{b1})_2$ wherein $R_{b1}$ can be a $C_1$-$C_4$alkyl group or the two groups $OR_{b1}$ can form together with the boron atom a five membered ring, as for example a pinacol boronic ester. The reaction may be catalyzed by a palladium based catalyst, for example tetrakis(triphenylphosphine)palladium(0), (1,1'bis(diphenylphosphino)ferrocene)dichloro-palladium-dichloromethane (1:1 complex) or chloro(2-dicyclohexylphosphino-2',4',6'-triisopropyl-1,1'-biphenyl)[2-(2'-amino-1,1'-biphenyl)]palladium(II) (XPhos palladacycle), in presence of a base, like sodium carbonate, tripotassium phosphate or cesium fluoride, in a solvent or a solvent mixture, like, for example dioxane, acetonitrile, N,N-dimethyl-formamide, a mixture of 1,2-dimethoxy-ethane and water or of dioxane/water, or of toluene/water, preferably under inert atmosphere. The reaction temperature can preferentially range from room temperature to the boiling point of the reaction mixture, or the reaction may be performed under microwave irradiation. Such Suzuki reactions are well known to those skilled in the art and have been reviewed, for example, in J. Organomet. Chem. 576, 1999, 147-168.

Alternatively compounds of formula I-Qb, wherein X is SO or $SO_2$, may be prepared by a Stille reaction between compounds of formula (XXIIa), wherein $Q_1$ is as defined above, and wherein $Y_{b2}$ is a trialkyltin derivative, preferably tri-n-butyl tin or tri-methyl-tin, and compounds of formula XXIb, wherein A, $R_1$, $R_2$, $G_1$, $G_2$ and $R_3$ are as defined in formula I, and in which X is SO or $SO_2$, and wherein Xb is a leaving group like, for example, chlorine, bromine or iodine (preferably chlorine or bromine), or an aryl- or alkylsulfonate such as trifluoromethanesulfonate. Such Stille reactions are usually carried out in the presence of a palladium catalyst, for example tetrakis(triphenylphosphine)palladium(0), or bis(triphenylphosphine)palladium(II) dichloride, in an inert solvent such as N,N-dimethylformamide, acetonitrile, toluene or dioxane, optionally in the presence of an additive, such as cesium fluoride, or lithium chloride, and optionally in the presence of a further catalyst, for example copper(I)iodide. Such Stille couplings are also well known to those skilled in the art, and have been described in for example J. Org. Chem., 2005, 70, 8601-8604, J. Org. Chem., 2009, 74, 5599-5602, and Angew. Chem. Int. Ed., 2004, 43, 1132-1136.

When $Q_1$ is a five-membered aromatic ring system linked via a ring nitrogen atom to the ring which contains the substituent A, then compounds of formula I-Qb, wherein X is SO or $SO_2$, may be prepared from compounds of formula XXIb, wherein A, $R_1$, $R_2$, $G_1$, $G_2$ and $R_3$ are as defined in formula I, and in which X is SO or $SO_2$, and wherein Xb is a leaving group like, for example, chlorine, bromine or iodine (preferably chlorine or bromine), or an aryl- or alkylsulfonate such as trifluoromethanesulfonate, by reaction with a heterocycle $Q_1$-H (which contains an appropriate NH functionality) (XXIIaa), wherein $Q_1$ is as defined above, in the presence of a base, such as potassium carbonate $K_2CO_3$ or cesium carbonate $Cs_2CO_3$, optionally in the presence of a copper catalyst, for example copper(I) iodide, with or without an additive such as L-proline, N,N'-dimethylcyclohexane-1,2-diamine or N,N'-dimethyl-ethylene-diamine, in an inert solvent such as N-methylpyrrolidone NMP or N,N-dimethylformamide DMF at temperatures between 30-150° C., optionally under microwave irradiation.

Oxidation of compounds of formula XXIb, wherein A, $R_1$, $R_2$, $G_1$, $G_2$ and $R_3$ are as defined in formula I, and in which X is S, and wherein Xb is a leaving group like, for example, chlorine, bromine or iodine (preferably chlorine or bromine), or an aryl- or alkylsulfonate such as trifluoromethanesulfonate, with a suitable oxidizing agent, into compounds of formula XXIb, wherein X is SO or $SO_2$ may be achieved under conditions already described above.

A large number of compounds of the formula (XXII), (XXIIa) and (XXIIaa) are commercially available or can be prepared by those skilled in the art.

Alternatively, compounds of formula I-Qb, wherein X is SO or $SO_2$, may be prepared from compounds of formula XXIIb, wherein X is S (sulfide) by involving the same chemistry as described above, but by changing the order of the steps (i.e. by running the sequence XXIb (X is S) to I-Qb (X is S) via Suzuki, Stille or C—N bond formation, followed by an oxidation step to form I-Qb (X is SO or $SO_2$).

The subgroup of compounds of formula I, wherein $G_1$, $G_2$ and $R_2$ are as defined above and wherein Q is defined as Qa, in which A, $Q_1$, $R_3$, X and $R_1$ are as defined in formula I, may be defined as compounds of formula I-Qa (scheme 11). The chemistry described previously in scheme 10 to access compounds of formula I-Qb from compounds of formula XXIIb, can be applied analogously (scheme 11) for the preparation of compounds of formula I-Qa from compounds of formula XXIa, wherein all substituent definitions mentioned previously remain valid.

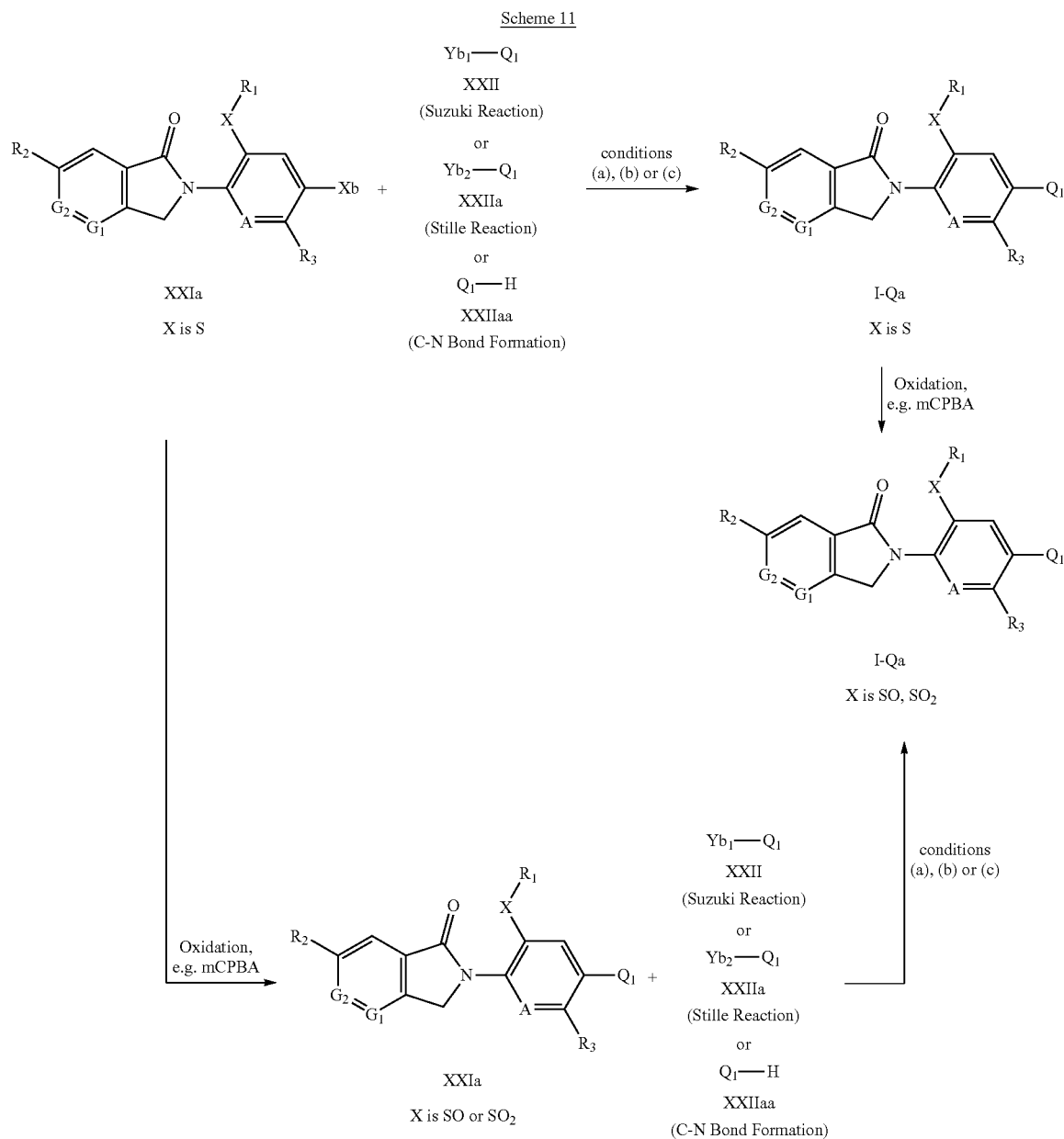

(a) Suzuki reaction: Pd cat. (e.g. Pd(PPh$_3$)$_4$ or Pd(dppf)Cl$_2$), base (e.g. Na$_2$CO$_3$), solvent (e.g. 1,2-dimethoxyethane / water), 25-180° C.
(b) Stille reaction: Pd cat. (e.g. Pd(PPh$_3$)$_4$ or Pd(PPh$_3$)Cl$_2$), solvent (e.g. toluene), 25-180° C.
(c) C-N bond formation: Optional base (e.g. K$_2$CO$_3$ or Cs$_2$CO$_3$), optional presence of copper or palladium catalyst, optional additive (such as N,N'-dimethylethylenediamine), optional ligand (such as Xantphos), solvent (e.g. dioxane, pyridine or N,N-dimethylformamide DMF), 25-180° C.

The reactants can be reacted in the presence of a base. Examples of suitable bases are alkali metal or alkaline earth metal hydroxides, alkali metal or alkaline earth metal hydrides, alkali metal or alkaline earth metal amides, alkali metal or alkaline earth metal alkoxides, alkali metal or alkaline earth metal acetates, alkali metal or alkaline earth metal carbonates, alkali metal or alkaline earth metal dialkylamides or alkali metal or alkaline earth metal alkylsilylamides, alkylamines, alkylenediamines, free or N-alkylated saturated or unsaturated cycloalkylamines, basic heterocycles, ammonium hydroxides and carbocyclic amines. Examples which may be mentioned are sodium hydroxide, sodium hydride, sodium amide, sodium methoxide, sodium acetate, sodium carbonate, potassium tert-butoxide, potassium hydroxide, potassium carbonate, potassium hydride, lithium diisopropylamide, potassium bis(trimethylsilyl)amide, calcium hydride, triethylamine, diisopropylethylamine, triethylenediamine, cyclohexylamine, N-cyclohexyl-N,N-dimethylamine, N,N-diethylaniline, pyridine, 4-(N,N-dimethylamino)pyridine, quinuclidine, N-methylmorpholine, benzyltrimethylammonium hydroxide and 1,8-diazabicyclo[5.4.0]undec-7-ene (DBU).

The reactants can be reacted with each other as such, i.e. without adding a solvent or diluent. In most cases, however, it is advantageous to add an inert solvent or diluent or a mixture of these. If the reaction is carried out in the presence of a base, bases which are employed in excess, such as triethylamine, pyridine, N-methylmorpholine or N,N-diethylaniline, may also act as solvents or diluents.

The reactions are advantageously carried out in a temperature range from approximately −80° C. to approximately +140° C., preferably from approximately −30° C. to approximately +100° C., in many cases in the range between ambient temperature and approximately +80° C.

A compound of formula I can be converted in a manner known per se into another compound of formula I by replacing one or more substituents of the starting compound of formula I in the customary manner by (an)other substituent(s) according to the invention, and by post modification of compounds of with reactions such as oxidation, alkylation, reduction, acylation and other methods known by those skilled in the art.

Depending on the choice of the reaction conditions and starting materials which are suitable in each case, it is possible, for example, in one reaction step only to replace one substituent by another substituent according to the invention, or a plurality of substituents can be replaced by other substituents according to the invention in the same reaction step.

Salts of compounds of formula I can be prepared in a manner known per se. Thus, for example, acid addition salts of compounds of formula I are obtained by treatment with a suitable acid or a suitable ion exchanger reagent and salts with bases are obtained by treatment with a suitable base or with a suitable ion exchanger reagent.

Salts of compounds of formula I can be converted in the customary manner into the free compounds I, acid addition salts, for example, by treatment with a suitable basic compound or with a suitable ion exchanger reagent and salts with bases, for example, by treatment with a suitable acid or with a suitable ion exchanger reagent.

Salts of compounds of formula I can be converted in a manner known per se into other salts of compounds of formula I, acid addition salts, for example, into other acid addition salts, for example by treatment of a salt of inorganic acid such as hydrochloride with a suitable metal salt such as a sodium, barium or silver salt, of an acid, for example with silver acetate, in a suitable solvent in which an inorganic salt which forms, for example silver chloride, is insoluble and thus precipitates from the reaction mixture.

Depending on the procedure or the reaction conditions, the compounds of formula I, which have salt-forming properties can be obtained in free form or in the form of salts.

The compounds of formula I and, where appropriate, the tautomers thereof, in each case in free form or in salt form, can be present in the form of one of the isomers which are possible or as a mixture of these, for example in the form of pure isomers, such as antipodes and/or diastereomers, or as isomer mixtures, such as enantiomer mixtures, for example racemates, diastereomer mixtures or racemate mixtures, depending on the number, absolute and relative configuration of asymmetric carbon atoms which occur in the molecule and/or depending on the configuration of non-aromatic double bonds which occur in the molecule; the invention relates to the pure isomers and also to all isomer mixtures which are possible and is to be understood in each case in this sense hereinabove and hereinbelow, even when stereochemical details are not mentioned specifically in each case.

Diastereomer mixtures or racemate mixtures of compounds of formula I, in free form or in salt form, which can be obtained depending on which starting materials and procedures have been chosen can be separated in a known manner into the pure diasteromers or racemates on the basis of the physicochemical differences of the components, for example by fractional crystallization, distillation and/or chromatography.

Enantiomer mixtures, such as racemates, which can be obtained in a similar manner can be resolved into the optical antipodes by known methods, for example by recrystallization from an optically active solvent, by chromatography on chiral adsorbents, for example high-performance liquid chromatography (HPLC) on acetyl cellulose, with the aid of suitable microorganisms, by cleavage with specific, immobilized enzymes, via the formation of inclusion compounds, for example using chiral crown ethers, where only one enantiomer is complexed, or by conversion into diastereomeric salts, for example by reacting a basic end-product racemate with an optically active acid, such as a carboxylic acid, for example camphor, tartaric or malic acid, or sulfonic acid, for example camphorsulfonic acid, and separating the diastereomer mixture which can be obtained in this manner, for example by fractional crystallization based on their differing solubilities, to give the diastereomers, from which the desired enantiomer can be set free by the action of suitable agents, for example basic agents.

Pure diastereomers or enantiomers can be obtained according to the invention not only by separating suitable isomer mixtures, but also by generally known methods of diastereoselective or enantioselective synthesis, for example by carrying out the process according to the invention with starting materials of a suitable stereochemistry.

N-oxides can be prepared by reacting a compound of the formula I with a suitable oxidizing agent, for example the $H_2O_2$/urea adduct in the presence of an acid anhydride, e.g. trifluoroacetic anhydride. Such oxidations are known from the literature, for example from *J. Med. Chem.*, 32 (12), 2561-73, 1989 or WO 2000/15615.

It is advantageous to isolate or synthesize in each case the biologically more effective isomer, for example enantiomer or diastereomer, or isomer mixture, for example enantiomer mixture or diastereomer mixture, if the individual components have a different biological activity.

The compounds of formula I and, where appropriate, the tautomers thereof, in each case in free form or in salt form, can, if appropriate, also be obtained in the form of hydrates and/or include other solvents, for example those which may have been used for the crystallization of compounds which are present in solid form.

The compounds of formula I according to the following Tables A-1 to L-12 can be prepared according to the methods described above. The examples which follow are intended to illustrate the invention and show preferred compounds of formula I, in the form of a compound of formula I-1 to 1-9.

The tables below illustrate specific compounds of the invention. In the tables, $CH_2cPr$ means $CH_2$-cyclopropyl.

Table A-1 provides 16 compounds A-1.001 to A-1.016 of formula I-1 wherein $G_1$ is N, $G_2$ is N, X is S, $R_1$ is $CH_2CH_3$, A is N and $Q_1$ are as defined in table B.

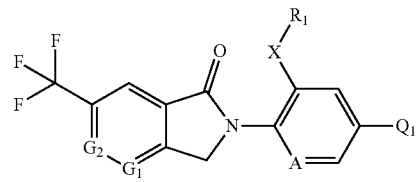
(I-1)

For example, A-1.009 is

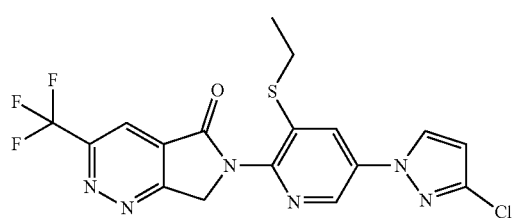 [SMILES: CCSc1cc(-n2ccc(Cl)n2)cnc1N1Cc2nnc(C(F)(F)F)cc2C1=O]

TABLE B

| Substituent definitions of $Q_1$: | |
|---|---|
| Index | $Q_1$ |
| 1 | (N-acetyl-N-methylamino) |
| 2 | (N-propionyl-N-methylamino) |
| 3 | (N-cyclopropanoyl-N-methylamino) |
| 4 | (oxazolidin-2-on-3-yl) |

TABLE B-continued

| Substituent definitions of $Q_1$: | |
|---|---|
| Index | $Q_1$ |
| 5 | (pyrimidin-2-yl) |
| 6 | (cyclopropyl) |
| 7 | (1-cyanocyclopropyl) |
| 8 | (3-trifluoromethyl-pyrazol-1-yl) |
| 9 | (3-chloro-pyrazol-1-yl) |
| 10 | (pyridin-2-yloxy) |
| 11 | (trifluoromethyl) |
| 12 | (1,2,4-triazol-1-yl) |
| 13 | (2,2,2-trifluoroethoxymethoxy) |
| 14 | (N,N'-dimethylureido) |

TABLE B-continued

Substituent definitions of $Q_1$:

| Index | $Q_1$ |
|---|---|
| 15 | (structure: C bonded to CN, CH3, with two wavy bonds) |
| 16 | —H |

Table A-2 provides 16 compounds A-2.001 to A-2.016 of formula I-1 wherein G1 is N, G2 is N, X is S, R1 is CH2CH3, A is CH and Q1 are as defined in table B.

Table A-3 provides 16 compounds A-3.001 to A-3.016 of formula I-1 wherein G1 is N, G2 is N, X is S, R1 is CH2cPr, A is N and Q1 are as defined in table B.

Table A-4 provides 16 compounds A-4.001 to A-4.016 of formula I-1 wherein G1 is N, G2 is N, X is S, R1 is CH2cPr, A is CH and Q1 are as defined in table B.

Table A-5 provides 16 compounds A-5.001 to A-5.016 of formula I-1 wherein G1 is N, G2 is N, X is SO, R1 is CH2CH3, A is N and Q1 are as defined in table B.

Table A-6 provides 16 compounds A-6.001 to A-6.016 of formula I-1 wherein G1 is N, G2 is N, X is SO, R1 is CH2CH3, A is CH and Q1 are as defined in table B.

Table A-7 provides 16 compounds A-7.001 to A-7.016 of formula I-1 wherein G1 is N, G2 is N, X is SO, R1 is CH2cPr, A is N and Q1 are as defined in table B.

Table A-8 provides 16 compounds A-8.001 to A-8.016 of formula I-1 wherein G1 is N, G2 is N, X is SO, R1 is CH2cPr, A is CH and Q1 are as defined in table B.

Table A-9 provides 16 compounds A-9.001 to A-9.016 of formula I-1 wherein G1 is N, G2 is N, X is SO2, R1 is CH2CH3, A is N and Q1 are as defined in table B.

Table A-10 provides 16 compounds A-10.001 to A-10.016 of formula I-1 wherein G1 is N, G2 is N, X is SO2, R1 is CH2CH3, A is CH and Q1 are as defined in table B.

Table A-11 provides 16 compounds A-11.001 to A-11.016 of formula I-1 wherein G1 is N, G2 is N, X is SO2, R1 is CH2cPr, A is N and Q1 are as defined in table B.

Table A-12 provides 16 compounds A-12.001 to A-12.016 of formula I-1 wherein G1 is N, G2 is N, X is SO2, R1 is CH2cPr, A is CH and Q1 are as defined in table B.

Table A-13 provides 16 compounds A-13.001 to A-13.016 of formula I-1 wherein G1 is N, G2 is CH, X is S, R1 is CH2CH3, A is N and Q1 are as defined in table B.

Table A-14 provides 16 compounds A-14.001 to A-14.016 of formula I-1 wherein G1 is N, G2 is CH, X is S, R1 is CH2CH3, A is CH and Q1 are as defined in table B.

Table A-15 provides 16 compounds A-15.001 to A-15.016 of formula I-1 wherein G1 is N, G2 is CH, X is S, R1 is CH2cPr, A is N and Q1 are as defined in table B.

Table A-16 provides 16 compounds A-16.001 to A-16.016 of formula I-1 wherein G1 is N, G2 is CH, X is S, R1 is CH2cPr, A is CH and Q1 are as defined in table B.

Table A-17 provides 16 compounds A-17.001 to A-17.016 of formula I-1 wherein G1 is N, G2 is CH, X is SO, R1 is CH2CH3, A is N and Q1 are as defined in table B.

Table A-18 provides 16 compounds A-18.001 to A-18.016 of formula I-1 wherein G1 is N, G2 is CH, X is SO, R1 is CH2CH3, A is CH and Q1 are as defined in table B.

Table A-19 provides 16 compounds A-19.001 to A-19.016 of formula I-1 wherein G1 is N, G2 is CH, X is SO, R1 is CH2cPr, A is N and Q1 are as defined in table B.

Table A-20 provides 16 compounds A-20.001 to A-20.016 of formula I-1 wherein G1 is N, G2 is CH, X is SO, R1 is CH2cPr, A is CH and Q1 are as defined in table B.

Table A-21 provides 16 compounds A-21.001 to A-21.016 of formula I-1 wherein G1 is N, G2 is CH, X is SO2, R1 is CH2CH3, A is N and Q1 are as defined in table B.

Table A-22 provides 16 compounds A-22.001 to A-22.016 of formula I-1 wherein G1 is N, G2 is CH, X is SO2, R1 is CH2CH3, A is CH and Q1 are as defined in table B.

Table A-23 provides 16 compounds A-23.001 to A-23.016 of formula I-1 wherein G1 is N, G2 is CH, X is SO2, R1 is CH2cPr, A is N and Q1 are as defined in table B.

Table A-24 provides 16 compounds A-24.001 to A-24.016 of formula I-1 wherein G1 is N, G2 is CH, X is SO2, R1 is CH2cPr, A is CH and Q1 are as defined in table B.

Table A-25 provides 16 compounds A-25.001 to A-25.016 of formula I-1 wherein G1 is CH, G2 is N, X is S, R1 is CH2CH3, A is N and Q1 are as defined in table B.

Table A-26 provides 16 compounds A-26.001 to A-26.016 of formula I-1 wherein G1 is CH, G2 is N, X is S, R1 is CH2CH3, A is CH and Q1 are as defined in table B.

Table A-27 provides 16 compounds A-27.001 to A-27.016 of formula I-1 wherein G1 is CH, G2 is N, X is S, R1 is CH2cPr, A is N and Q1 are as defined in table B.

Table A-28 provides 16 compounds A-28.001 to A-28.016 of formula I-1 wherein G1 is CH, G2 is N, X is S, R1 is CH2cPr, A is CH and Q1 are as defined in table B.

Table A-29 provides 16 compounds A-29.001 to A-29.016 of formula I-1 wherein G1 is CH, G2 is N, X is SO, R1 is CH2CH3, A is N and Q1 are as defined in table B.

Table A-30 provides 16 compounds A-30.001 to A-30.016 of formula I-1 wherein G1 is CH, G2 is N, X is SO, R1 is CH2CH3, A is CH and Q1 are as defined in table B.

Table A-31 provides 16 compounds A-31.001 to A-31.016 of formula I-1 wherein G1 is CH, G2 is N, X is SO, R1 is CH2cPr, A is N and Q1 are as defined in table B.

Table A-32 provides 16 compounds A-32.001 to A-32.016 of formula I-1 wherein G1 is CH, G2 is N, X is SO, R1 is CH2cPr, A is CH and Q1 are as defined in table B.

Table A-33 provides 16 compounds A-33.001 to A-33.016 of formula I-1 wherein G1 is CH, G2 is N, X is SO2, R1 is CH2CH3, A is N and Q1 are as defined in table B.

Table A-34 provides 16 compounds A-34.001 to A-34.016 of formula I-1 wherein G1 is CH, G2 is N, X is SO2, R1 is CH2CH3, A is CH and Q1 are as defined in table B.

Table A-35 provides 16 compounds A-35.001 to A-35.016 of formula I-1 wherein G1 is CH, G2 is N, X is SO2, R1 is CH2cPr, A is N and Q1 are as defined in table B.

Table A-36 provides 16 compounds A-36.001 to A-36.016 of formula I-1 wherein G1 is CH, G2 is N, X is SO2, R1 is CH2cPr, A is CH and Q1 are as defined in table B.

Table A-37 provides 16 compounds A-37.001 to A-37.016 of formula I-1 wherein G1 is CH, G2 is CH, X is S, R1 is CH2CH3, A is N and Q1 are as defined in table B.

Table A-38 provides 16 compounds A-38.001 to A-38.016 of formula I-1 wherein G1 is CH, G2 is CH, X is S, R1 is CH2CH3, A is CH and Q1 are as defined in table B.

Table A-39 provides 16 compounds A-39.001 to A-39.016 of formula I-1 wherein G1 is CH, G2 is CH, X is S, R1 is CH2cPr, A is N and Q1 are as defined in table B.

Table A-40 provides 16 compounds A-40.001 to A-40.016 of formula I-1 wherein G1 is CH, G2 is CH, X is S, R1 is CH2cPr, A is CH and Q1 are as defined in table B.

Table A-41 provides 16 compounds A-41.001 to A-41.016 of formula I-1 wherein G1 is CH, G2 is CH, X is SO, R1 is CH2CH3, A is N and Q1 are as defined in table B.

Table A-42 provides 16 compounds A-42.001 to A-42.016 of formula I-1 wherein G1 is CH, G2 is CH, X is SO, R1 is CH2CH3, A is CH and Q1 are as defined in table B.

Table A-43 provides 16 compounds A-43.001 to A-43.016 of formula I-1 wherein G1 is CH, G2 is CH, X is SO, R1 is CH2cPr, A is N and Q1 are as defined in table B.

Table A-44 provides 16 compounds A-44.001 to A-44.016 of formula I-1 wherein G1 is CH, G2 is CH, X is SO, R1 is CH2cPr, A is CH and Q1 are as defined in table B.

Table A-45 provides 16 compounds A-45.001 to A-45.016 of formula I-1 wherein G1 is CH, G2 is CH, X is SO2, R1 is CH2CH3, A is N and Q1 are as defined in table B.

Table A-46 provides 16 compounds A-46.001 to A-46.016 of formula I-1 wherein G1 is CH, G2 is CH, X is SO2, R1 is CH2CH3, A is CH and Q1 are as defined in table B.

Table A-47 provides 16 compounds A-47.001 to A-47.016 of formula I-1 wherein G1 is CH, G2 is CH, X is SO2, R1 is CH2cPr, A is N and Q1 are as defined in table B.

Table A-48 provides 16 compounds A-48.001 to A-48.016 of formula I-1 wherein G1 is CH, G2 is CH, X is SO2, R1 is CH2cPr, A is CH and Q1 are as defined in table B.

The tables below illustrate specific compounds of the invention.

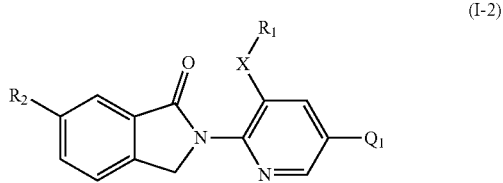

(I-2)

Table C-1 provides 16 compounds C-1.001 to C-1.016 of formula I-2 wherein R2 is OSO2CF3, X is S, R1 is CH2CH3 and Q1 are as defined in table B.

Table C-2 provides 16 compounds C-2.001 to C-2.016 of formula I-2 wherein R2 is OSO2CF3, X is S, R1 is CH2cPr and Q1 are as defined in table B.

Table C-3 provides 16 compounds C-3.001 to C-3.016 of formula I-2 wherein R2 is OSO2CF3, X is SO, R1 is CH2CH3 and Q1 are as defined in table B.

Table C-4 provides 16 compounds C-4.001 to C-4.016 of formula I-2 wherein R2 is OSO2CF3, X is SO, R1 is CH2cPr and Q1 are as defined in table B.

Table C-5 provides 16 compounds C-5.001 to C-5.016 of formula I-2 wherein R2 is OSO2CF3, X is SO2, R1 is CH2CH3 and Q1 are as defined in table B.

Table C-6 provides 16 compounds C-6.001 to C-6.016 of formula I-2 wherein R2 is OSO2CF3, X is SO2, R1 is CH2cPr and Q1 are as defined in table B.

Table C-7 provides 16 compounds C-7.001 to C-7.016 of formula I-2 wherein R2 is SO2CF3, X is S, R1 is CH2CH3 and Q1 are as defined in table B.

Table C-8 provides 16 compounds C-8.001 to C-8.016 of formula I-2 wherein R2 is SO2CF3, X is S, R1 is CH2cPr and Q1 are as defined in table B.

Table C-9 provides 16 compounds C-9.001 to C-9.016 of formula I-2 wherein R2 is SO2CF3, X is SO, R1 is CH2CH3 and Q1 are as defined in table B.

Table C-10 provides 16 compounds C-10.001 to C-10.016 of formula I-2 wherein R2 is SO2CF3, X is SO, R1 is CH2cPr and Q1 are as defined in table B.

Table C-11 provides 16 compounds C-11.001 to C-11.016 of formula I-2 wherein R2 is SO2CF3, X is SO2, R1 is CH2CH3 and Q1 are as defined in table B.

Table C-12 provides 16 compounds C-12.001 to C-12.016 of formula I-2 wherein R2 is SO2CF3, X is SO2, R1 is CH2cPr and Q1 are as defined in table B.

Table C-13 provides 16 compounds C-13.001 to C-13.016 of formula I-2 wherein R2 is OCF3, X is S, R1 is CH2CH3 and Q1 are as defined in table B.

Table C-14 provides 16 compounds C-14.001 to C-14.016 of formula I-2 wherein R2 is OCF3, X is S, R1 is CH2cPr and Q1 are as defined in table B.

Table C-15 provides 16 compounds C-15.001 to C-15.016 of formula I-2 wherein R2 is OCF3, X is SO, R1 is CH2CH3 and Q1 are as defined in table B.

Table C-16 provides 16 compounds C-16.001 to C-16.016 of formula I-2 wherein R2 is OCF3, X is SO, R1 is CH2cPr and Q1 are as defined in table B.

Table C-17 provides 16 compounds C-17.001 to C-17.016 of formula I-2 wherein R2 is OCF3, X is SO2, R1 is CH2CH3 and Q1 are as defined in table B.

Table C-18 provides 16 compounds C-18.001 to C-18.016 of formula I-2 wherein R2 is OCF3, X is SO2, R1 is CH2cPr and Q1 are as defined in table B.

The tables below illustrate specific compounds of the invention.

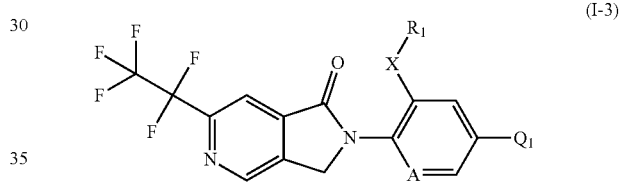

(I-3)

Table D-1 provides 16 compounds D-1.001 to D-1.016 of formula I-3 wherein X is S, R1 is CH2CH3, A is N and Q1 are as defined in table B.

Table D-2 provides 16 compounds D-2.001 to D-2.016 of formula I-3 wherein X is S, R1 is CH2CH3, A is CH and Q1 are as defined in table B.

Table D-3 provides 16 compounds D-3.001 to D-3.016 of formula I-3 wherein X is S, R1 is CH2cPr, A is N and Q1 are as defined in table B.

Table D-4 provides 16 compounds D-4.001 to D-4.016 of formula I-3 wherein X is S, R1 is CH2cPr, A is CH and Q1 are as defined in table B.

Table D-5 provides 16 compounds D-5.001 to D-5.016 of formula I-3 wherein X is SO, R1 is CH2CH3, A is N and Q1 are as defined in table B.

Table D-6 provides 16 compounds D-6.001 to D-6.016 of formula I-3 wherein X is SO, R1 is CH2CH3, A is CH and Q1 are as defined in table B.

Table D-7 provides 16 compounds D-7.001 to D-7.016 of formula I-3 wherein X is SO, R1 is CH2cPr, A is N and Q1 are as defined in table B.

Table D-8 provides 16 compounds D-8.001 to D-8.016 of formula I-3 wherein X is SO, R1 is CH2cPr, A is CH and $Q_1$ are as defined in table B.

Table D-9 provides 16 compounds D-9.001 to D-9.016 of formula I-3 wherein X is $SO_2$, $R_1$ is $CH_2CH_3$, A is N and $Q_1$ are as defined in table B.

Table D-10 provides 16 compounds D-10.001 to D-10.016 of formula I-3 wherein X is $SO_2$, $R_1$ is $CH_2CH_3$, A is CH and $Q_1$ are as defined in table B.

Table D-11 provides 16 compounds D-11.001 to D-11.016 of formula I-3 wherein X is SO$_2$, R$_1$ is CH$_2$cPr, A is N and Q$_1$ are as defined in table B.

Table D-12 provides 16 compounds D-12.001 to D-12.016 of formula I-3 wherein X is SO$_2$, R$_1$ is CH$_2$cPr, A is CH and Q$_1$ are as defined in table B.

(I-4)

Table E-1 provides 16 compounds E-1.001 to E-1.016 of formula I-4 wherein X is S, R1 is CH2CH3, A is N and Q1 are as defined in table B.

Table E-2 provides 16 compounds E-2.001 to E-2.016 of formula I-4 wherein X is S, R1 is CH2CH3, A is CH and Q1 are as defined in table B.

Table E-3 provides 16 compounds E-3.001 to E-3.016 of formula I-4 wherein X is S, R1 is CH2cPr, A is N and Q1 are as defined in table B.

Table E-4 provides 16 compounds E-4.001 to E-4.016 of formula I-4 wherein X is S, R1 is CH2cPr, A is CH and Q1 are as defined in table B.

Table E-5 provides 16 compounds E-5.001 to E-5.016 of formula I-4 wherein X is SO, R1 is CH2CH3, A is N and Q1 are as defined in table B.

Table E-6 provides 16 compounds E-6.001 to E-6.016 of formula I-4 wherein X is SO, R1 is CH2CH3, A is CH and Q1 are as defined in table B.

Table E-7 provides 16 compounds E-7.001 to E-7.016 of formula I-4 wherein X is SO, R1 is CH2cPr, A is N and Q1 are as defined in table B.

Table E-8 provides 16 compounds E-8.001 to E-8.016 of formula I-4 wherein X is SO, R1 is CH2cPr, A is CH and Q1 are as defined in table B.

Table E-9 provides 16 compounds E-9.001 to E-9.016 of formula I-4 wherein X is SO2, R1 is CH2CH3, A is N and Q1 are as defined in table B.

Table E-10 provides 16 compounds E-10.001 to E-10.016 of formula I-4 wherein X is SO2, R1 is CH2CH3, A is CH and Q1 are as defined in table B.

Table E-11 provides 16 compounds E-11.001 to E-11.016 of formula I-4 wherein X is SO2, R1 is CH2cPr, A is N and Q1 are as defined in table B.

Table E-12 provides 16 compounds E-12.001 to E-12.016 of formula I-4 wherein X is SO2, R1 is CH2cPr, A is CH and Q1 are as defined in table B.

The tables below illustrate specific compounds of the invention.

(I-5)

Table G-1 provides 16 compounds G-1.001 to G-1.016 of formula I-5 wherein G1 is N, G2 is N, X is S, R1 is CH2CH3 and Q1 are as defined in table B.

Table-G2 provides 16 compounds G-2.001 to G-2.016 of formula I-5 wherein G1 is N, G2 is N, X is S, R1 is CH2cPr and Q1 are as defined in table B.

Table-G3 provides 16 compounds G-3.001 to G-3.016 of formula I-5 wherein G1 is N, G2 is N, X is SO, R1 is CH2CH3 and Q1 are as defined in table B.

Table-G4 provides 16 compounds G-4.001 to G-4.016 of formula I-5 wherein G1 is N, G2 is N, X is SO, R1 is CH2cPr and Q1 are as defined in table B.

Table-G5 provides 16 compounds G-5.001 to G-5.016 of formula I-5 wherein G1 is N, G2 is N, X is SO2, R1 is CH2CH3 and Q1 are as defined in table B.

Table-G6 provides 16 compounds G-6.001 to G-6.016 of formula I-5 wherein G1 is N, G2 is N, X is SO2, R1 is CH2cPr and Q1 are as defined in table B.

Table-G7 provides 16 compounds G-7.001 to G-7.016 of formula I-5 wherein G1 is N, G2 is CH, X is S, R1 is CH2CH3 and Q1 are as defined in table B.

Table-G8 provides 16 compounds G-8.001 to G-8.016 of formula I-5 wherein G1 is N, G2 is CH, X is S, R1 is CH2cPr and Q1 are as defined in table B.

Table-G9 provides 16 compounds G-9.001 to G-9.016 of formula I-5 wherein G1 is N, G2 is CH, X is SO, R1 is CH2CH3 and Q1 are as defined in table B.

Table-G10 provides 16 compounds G-10.001 to G-10.016 of formula I-5 wherein G1 is N, G2 is CH, X is SO, R1 is CH2cPr and Q1 are as defined in table B.

Table-G11 provides 16 compounds G-11.001 to G-11.016 of formula I-5 wherein G1 is N, G2 is CH, X is SO2, R1 is CH2CH3 and Q1 are as defined in table B.

Table-G12 provides 16 compounds G-12.001 to G-12.016 of formula I-5 wherein G1 is N, G2 is CH, X is SO2, R1 is CH2cPr and Q1 are as defined in table B.

Table-G13 provides 16 compounds G-13.001 to G-13.016 of formula I-5 wherein G1 is CH, G2 is N, X is S, R1 is CH2CH3 and Q1 are as defined in table B.

Table-G14 provides 16 compounds G-14.001 to G-14.016 of formula I-5 wherein G1 is CH, G2 is N, X is S, R1 is CH2cPr and Q1 are as defined in table B.

Table-G15 provides 16 compounds G-15.001 to G-15.016 of formula I-5 wherein G1 is CH, G2 is N, X is SO, R1 is CH2CH3 and Q1 are as defined in table B.

Table-G16 provides 16 compounds G-16.001 to G-16.016 of formula I-5 wherein G1 is CH, G2 is N, X is SO, R1 is CH2cPr and Q1 are as defined in table B.

Table-G17 provides 16 compounds G-17.001 to G-17.016 of formula I-5 wherein G1 is CH, G2 is N, X is SO2, R1 is CH2CH3 and Q1 are as defined in table B.

Table-G18 provides 16 compounds G-18.001 to G-18.016 of formula I-5 wherein G1 is CH, G2 is N, X is SO2, R1 is CH2cPr and Q1 are as defined in table B.

Table-G19 provides 16 compounds G-19.001 to G-19.016 of formula I-5 wherein G1 is CH, G2 is CH, X is S, R1 is CH2CH3 and Q1 are as defined in table B.

Table-G20 provides 16 compounds G-20.001 to G-20.016 of formula I-5 wherein G1 is CH, G2 is CH, X is S, R1 is CH2cPr and Q1 are as defined in table B.

Table-G21 provides 16 compounds G-21.001 to G-21.016 of formula I-5 wherein G1 is CH, G2 is CH, X is SO, R1 is CH2CH3 and Q1 are as defined in table B.

Table-G22 provides 16 compounds G-22.001 to G-22.016 of formula I-5 wherein G1 is CH, G2 is CH, X is SO, R1 is CH2cPr and Q1 are as defined in table B.

Table-G23 provides 16 compounds G-23.001 to G-23.016 of formula I-5 wherein G1 is CH, G2 is CH, X is SO2, R1 is CH2CH3 and Q1 are as defined in table B.

Table-G24 provides 16 compounds G-24.001 to G-24.016 of formula I-5 wherein G1 is CH, G2 is CH, X is SO2, R1 is CH2cPr and Q1 are as defined in table B.

The tables below illustrate specific compounds of the invention.

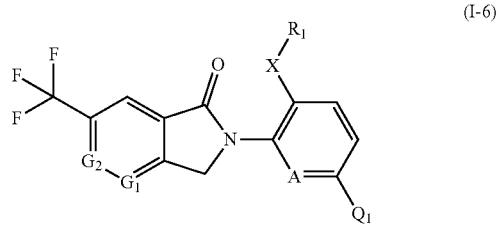

(I-6)

Table I-1 provides 10 compounds 1-1.001 to 1-1.010 of formula I wherein $G_1$ is N, $G_2$ is N, X is S, $R_1$ is $CH_2CH_3$, A is N and $Q_1$ are as defined in table H.

TABLE H

| Substituent definitions of Q1: | |
| --- | --- |
| Index | Q₁ |
| 1 | ![structure] |
| 2 | ![structure] |
| 3 | ![structure] |
| 4 | ![structure] |
| 5 | ![structure] |
| 6 | ![structure] |

TABLE H-continued

| Substituent definitions of Q1: | |
| --- | --- |
| Index | Q₁ |
| 7 | ![structure] |
| 8 | ![structure] |
| 9 | ![structure] |
| 10 | ![structure] |

Table I-2 provides 10 compounds 1-2.001 to 1-2.010 of formula I-6 wherein G1 is N, G2 is N, X is S, R1 is CH2CH3, A is CH and Q1 are as defined in table H.

Table I-3 provides 10 compounds 1-3.001 to 1-3.010 of formula I-6 wherein G1 is N, G2 is N, X is S, R1 is CH2cPr, A is N and Q1 are as defined in table H.

Table I-4 provides 10 compounds 1-4.001 to 1-4.010 of formula I-6 wherein G1 is N, G2 is N, X is S, R1 is CH2cPr, A is CH and Q1 are as defined in table H.

Table I-5 provides 10 compounds 1-5.001 to 1-5.010 of formula I-6 wherein G1 is N, G2 is N, X is SO, R1 is CH2CH3, A is N and Q1 are as defined in table H.

Table I-6 provides 10 compounds 1-6.001 to 1-6.010 of formula I-6 wherein G1 is N, G2 is N, X is SO, R1 is CH2CH3, A is CH and Q1 are as defined in table H.

Table I-7 provides 10 compounds 1-7.001 to 1-7.010 of formula I-6 wherein G1 is N, G2 is N, X is SO, R1 is CH2cPr, A is N and Q1 are as defined in table H.

Table I-8 provides 10 compounds 1-8.001 to 1-8.010 of formula I-6 wherein G1 is N, G2 is N, X is SO, R1 is CH2cPr, A is CH and Q1 are as defined in table H.

Table I-9 provides 10 compounds 1-9.001 to 1-9.010 of formula I-6 wherein G1 is N, G2 is N, X is SO2, R1 is CH2CH3, A is N and Q1 are as defined in table H.

Table I-10 provides 10 compounds 1-10.001 to 1-10.010 of formula I-6 wherein G1 is N, G2 is N, X is SO2, R1 is CH2CH3, A is CH and Q1 are as defined in table H.

Table I-11 provides 10 compounds 1-11.001 to 1-11.010 of formula I-6 wherein G1 is N, G2 is N, X is SO2, R1 is CH2cPr, A is N and Q1 are as defined in table H.

Table I-12 provides 10 compounds 1-12.001 to 1-12.010 of formula I-6 wherein G1 is N, G2 is N, X is SO2, R1 is CH2cPr, A is CH and Q1 are as defined in table H.

Table I-13 provides 10 compounds 1-13.001 to 1-13.010 of formula I-6 wherein G1 is N, G2 is CH, X is S, R1 is CH2CH3, A is N and Q1 are as defined in table H.

Table I-14 provides 10 compounds 1-14.001 to 1-14.010 of formula I-6 wherein G1 is N, G2 is CH, X is S, R1 is CH2CH3, A is CH and Q1 are as defined in table H.

Table I-15 provides 10 compounds 1-15.001 to 1-15.010 of formula I-6 wherein G1 is N, G2 is CH, X is S, R1 is CH2cPr, A is N and Q1 are as defined in table H.

Table I-16 provides 10 compounds 1-16.001 to 1-16.010 of formula I-6 wherein G1 is N, G2 is CH, X is S, R1 is CH2cPr, A is CH and Q1 are as defined in table H.

Table I-17 provides 10 compounds 1-17.001 to 1-17.010 of formula I-6 wherein G1 is N, G2 is CH, X is SO, R1 is CH2CH3, A is N and Q1 are as defined in table H.

Table I-18 provides 10 compounds 1-18.001 to 1-18.010 of formula I-6 wherein G1 is N, G2 is CH, X is SO, R1 is CH2CH3, A is CH and Q1 are as defined in table H.

Table I-19 provides 10 compounds 1-19.001 to 1-19.010 of formula I-6 wherein G1 is N, G2 is CH, X is SO, R1 is CH2cPr, A is N and Q1 are as defined in table H.

Table I-20 provides 10 compounds 1-20.001 to 1-20.010 of formula I-6 wherein G1 is N, G2 is CH, X is SO, R1 is CH2cPr, A is CH and Q1 are as defined in table H.

Table I-21 provides 10 compounds 1-21.001 to 1-21.010 of formula I-6 wherein G1 is N, G2 is CH, X is SO2, R1 is CH2CH3, A is N and Q1 are as defined in table H.

Table I-22 provides 10 compounds 1-22.001 to 1-22.010 of formula I-6 wherein G1 is N, G2 is CH, X is SO2, R1 is CH2CH3, A is CH and Q1 are as defined in table H.

Table I-23 provides 10 compounds 1-23.001 to 1-23.010 of formula I-6 wherein G1 is N, G2 is CH, X is SO2, R1 is CH2cPr, A is N and Q1 are as defined in table H.

Table I-24 provides 10 compounds 1-24.001 to 1-24.010 of formula I-6 wherein G1 is N, G2 is CH, X is SO2, R1 is CH2cPr, A is CH and Q1 are as defined in table H.

Table I-25 provides 10 compounds 1-25.001 to 1-25.010 of formula I-6 wherein G1 is CH, G2 is N, X is S, R1 is CH2CH3, A is N and Q1 are as defined in table H.

Table I-26 provides 10 compounds 1-26.001 to 1-26.010 of formula I-6 wherein G1 is CH, G2 is N, X is S, R1 is CH2CH3, A is CH and Q1 are as defined in table H.

Table I-27 provides 10 compounds 1-27.001 to 1-27.010 of formula I-6 wherein G1 is CH, G2 is N, X is S, R1 is CH2cPr, A is N and Q1 are as defined in table H.

Table I-28 provides 10 compounds 1-28.001 to 1-28.010 of formula I-6 wherein G1 is CH, G2 is N, X is S, R1 is CH2cPr, A is CH and Q1 are as defined in table H.

Table I-29 provides 10 compounds 1-29.001 to 1-29.010 of formula I-6 wherein G1 is CH, G2 is N, X is SO, R1 is CH2CH3, A is N and Q1 are as defined in table H.

Table I-30 provides 10 compounds 1-30.001 to 1-30.010 of formula I-6 wherein G1 is CH, G2 is N, X is SO, R1 is CH2CH3, A is CH and Q1 are as defined in table H.

Table I-31 provides 10 compounds 1-31.001 to 1-31.010 of formula I-6 wherein G1 is CH, G2 is N, X is SO, R1 is CH2cPr, A is N and Q1 are as defined in table H.

Table I-32 provides 10 compounds 1-32.001 to 1-32.010 of formula I-6 wherein G1 is CH, G2 is N, X is SO, R1 is CH2cPr, A is CH and Q1 are as defined in table H.

Table I-33 provides 10 compounds 1-33.001 to 1-33.010 of formula I-6 wherein G1 is CH, G2 is N, X is SO2, R1 is CH2CH3, A is N and Q1 are as defined in table H.

Table I-34 provides 10 compounds 1-34.001 to 1-34.010 of formula I-6 wherein G1 is CH, G2 is N, X is SO2, R1 is CH2CH3, A is CH and Q1 are as defined in table H.

Table I-35 provides 10 compounds 1-35.001 to 1-35.010 of formula I-6 wherein G1 is CH, G2 is N, X is SO2, R1 is CH2cPr, A is N and Q1 are as defined in table H.

Table I-36 provides 10 compounds 1-36.001 to 1-36.010 of formula I-6 wherein G1 is CH, G2 is N, X is SO2, R1 is CH2cPr, A is CH and Q1 are as defined in table H.

Table I-37 provides 10 compounds 1-37.001 to 1-37.010 of formula I-6 wherein G1 is CH, G2 is CH, X is S, R1 is CH2CH3, A is N and Q1 are as defined in table H.

Table I-38 provides 10 compounds 1-38.001 to 1-38.010 of formula I-6 wherein G1 is CH, G2 is CH, X is S, R1 is CH2CH3, A is CH and Q1 are as defined in table H.

Table I-39 provides 10 compounds 1-39.001 to 1-39.010 of formula I-6 wherein G1 is CH, G2 is CH, X is S, R1 is CH2cPr, A is N and Q1 are as defined in table H.

Table I-40 provides 10 compounds 1-40.001 to 1-40.010 of formula I-6 wherein G1 is CH, G2 is CH, X is S, R1 is CH2cPr, A is CH and Q1 are as defined in table H.

Table I-41 provides 10 compounds 1-41.001 to 1-41.010 of formula I-6 wherein G1 is CH, G2 is CH, X is SO, R1 is CH2CH3, A is N and Q1 are as defined in table H.

Table I-42 provides 10 compounds 1-42.001 to 1-42.010 of formula I-6 wherein G1 is CH, G2 is CH, X is SO, R1 is CH2CH3, A is CH and Q1 are as defined in table H.

Table I-43 provides 10 compounds 1-43.001 to 1-43.010 of formula I-6 wherein G1 is CH, G2 is CH, X is SO, R1 is CH2cPr, A is N and Q1 are as defined in table H.

Table I-44 provides 10 compounds 1-44.001 to 1-44.010 of formula I-6 wherein G1 is CH, G2 is CH, X is SO, R1 is CH2cPr, A is CH and Q1 are as defined in table H.

Table I-45 provides 10 compounds 1-45.001 to 1-45.010 of formula I-6 wherein G1 is CH, G2 is CH, X is SO2, R1 is CH2CH3, A is N and Q1 are as defined in table H.

Table I-46 provides 10 compounds 1-46.001 to 1-46.010 of formula I-6 wherein G1 is CH, G2 is CH, X is SO2, R1 is CH2CH3, A is CH and Q1 are as defined in table H.

Table I-47 provides 10 compounds 1-47.001 to 1-47.010 of formula I-6 wherein G1 is CH, G2 is CH, X is SO2, R1 is CH2cPr, A is N and Q1 are as defined in table H.

Table I-48 provides 10 compounds 1-48.001 to 1-48.010 of formula I-6 wherein G1 is CH, G2 is CH, X is SO2, R1 is CH2cPr, A is CH and Q1 are as defined in table H.

The tables below illustrate specific compounds of the invention.

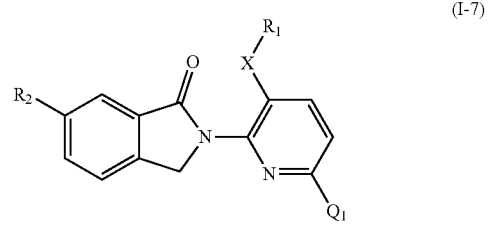

(I-7)

Table J-1 provides 10 compounds J-1.001 to J-1.010 of formula I-7 wherein R2 is SO2CF3, X is S, R1 is CH2CH3 and Q1 are as defined in table H.

Table J-2 provides 10 compounds J-2.001 to J-2.010 of formula I-7 wherein R2 is SO2CF3, X is S, R1 is CH2cPr and Q1 are as defined in table H.

Table J-3 provides 10 compounds J-3.001 to J-3.010 of formula I-7 wherein R2 is SO2CF3, X is SO, R1 is CH2CH3 and Q1 are as defined in table H.

Table J-4 provides 10 compounds J-4.001 to J-4.010 of formula I-7 wherein R2 is SO2CF3, X is SO, R1 is CH2cPr and Q1 are as defined in table H.

Table J-5 provides 10 compounds J-5.001 to J-5.010 of formula I-7 wherein R2 is SO2CF3, X is SO2, R1 is CH2CH3 and Q1 are as defined in table H.

Table J-6 provides 10 compounds J-6.001 to J-6.010 of formula I-7 wherein R2 is SO2CF3, X is SO2, R1 is CH2cPr and Q1 are as defined in table H.

Table J-7 provides 10 compounds J-7.001 to J-7.010 of formula I-7 wherein R2 is OSO2CF3, X is S, R1 is CH2CH3 and Q1 are as defined in table H.

Table J-8 provides 10 compounds J-8.001 to J-8.010 of formula I-7 wherein R2 is OSO2CF3, X is S, R1 is CH2cPr and Q1 are as defined in table H.

Table J-9 provides 10 compounds J-9.001 to J-9.010 of formula I-7 wherein R2 is OSO2CF3, X is SO, R1 is CH2CH3 and Q1 are as defined in table H.

Table J-10 provides 10 compounds J-10.001 to J-10.010 of formula I-7 wherein R2 is OSO2CF3, X is SO, R1 is CH2cPr and Q1 are as defined in table H.

Table J-11 provides 10 compounds J-11.001 to J-11.010 of formula I-7 wherein R2 is OSO2CF3, X is SO2, R1 is CH2CH3 and Q1 are as defined in table H.

Table J-12 provides 10 compounds J-12.001 to J-12.010 of formula I-7 wherein R2 is OSO2CF3, X is SO2, R1 is CH2cPr and Q1 are as defined in table H.

Table J-13 provides 10 compounds J-13.001 to J-13.010 of formula I-7 wherein R2 is OCF3, X is S, R1 is CH2CH3 and Q1 are as defined in table H.

Table J-14 provides 10 compounds J-14.001 to J-14.010 of formula I-7 wherein R2 is OCF3, X is S, R1 is CH2cPr and Q1 are as defined in table H.

Table J-15 provides 10 compounds J-15.001 to J-15.010 of formula I-7 wherein R2 is OCF3, X is SO, R1 is CH2CH3 and Q1 are as defined in table H.

Table J-16 provides 10 compounds J-16.001 to J-16.010 of formula I-7 wherein R2 is OCF3, X is SO, R1 is CH2cPr and Q1 are as defined in table H.

Table J-17 provides 10 compounds J-17.001 to J-17.010 of formula I-7 wherein R2 is OCF3, X is SO2, R1 is CH2CH3 and Q1 are as defined in table H.

Table J-18 provides 10 compounds J-18.001 to J-18.010 of formula I-7 wherein R2 is OCF3, X is SO2, R1 is CH2cPr and Q1 are as defined in table H.

The tables below illustrate specific compounds of the invention.

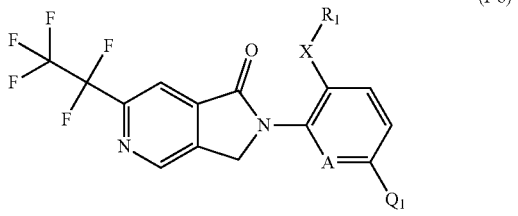

(I-8)

Table K-1 provides 10 compounds K-1.001 to K-1.010 of formula I-8 wherein X is S, R1 is CH2CH3, A is N and Q1 are as defined in table H.

Table K-2 provides 10 compounds K-2.001 to K-2.010 of formula I-8 wherein X is S, R1 is CH2CH3, A is CH and Q1 are as defined in table H.

Table K-3 provides 10 compounds K-3.001 to K-3.010 of formula I-8 wherein X is S, R1 is CH2cPr, A is N and Q1 are as defined in table H.

Table K-4 provides 10 compounds K-4.001 to K-4.010 of formula I-8 wherein X is S, R1 is CH2cPr, A is CH and Q1 are as defined in table H.

Table K-5 provides 10 compounds K-5.001 to K-5.010 of formula I-8 wherein X is SO, R1 is CH2CH3, A is N and Q1 are as defined in table H.

Table K-6 provides 10 compounds K-6.001 to K-6.010 of formula I-8 wherein X is SO, R1 is CH2CH3, A is CH and Q1 are as defined in table H.

Table K-7 provides 10 compounds K-7.001 to K-7.010 of formula I-8 wherein X is SO, R1 is CH2cPr, A is N and Q1 are as defined in table H.

Table K-8 provides 10 compounds K-8.001 to K-8.010 of formula I-8 wherein X is SO, R1 is CH2cPr, A is CH and Q1 are as defined in table H.

Table K-9 provides 10 compounds K-9.001 to K-9.010 of formula I-8 wherein X is SO2, R1 is CH2CH3, A is N and Q1 are as defined in table H.

Table K-10 provides 10 compounds K-10.001 to K-10.010 of formula I-8 wherein X is SO2, R1 is CH2CH3, A is CH and Q1 are as defined in table H.

Table K-11 provides 10 compounds K-11.001 to K-11.010 of formula I-8 wherein X is SO2, R1 is CH2cPr, A is N and Q1 are as defined in table H.

Table K-12 provides 10 compounds K-12.001 to K-12.010 of formula I-8 wherein X is SO2, R1 is CH2cPr, A is CH and Q1 are as defined in table H.

The tables below illustrate specific compounds of the invention.

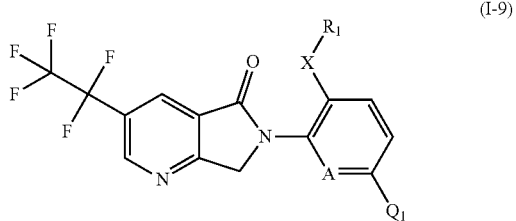

(I-9)

Table L-1 provides 10 compounds L-1.001 to L-1.010 of formula I-9 wherein X is S, R1 is CH2CH3, A is N and Q1 are as defined in table H.

Table L-2 provides 10 compounds L-2.001 to L-2.010 of formula I-9 wherein X is S, R1 is CH2CH3, A is CH and Q1 are as defined in table H.

Table L-3 provides 10 compounds L-3.001 to L-3.010 of formula I-9 wherein X is S, R1 is CH2cPr, A is N and Q1 are as defined in table H.

Table L-4 provides 10 compounds L-4.001 to L-4.010 of formula I-9 wherein X is S, R1 is CH2cPr, A is CH and Q1 are as defined in table H.

Table L-5 provides 10 compounds L-5.001 to L-5.010 of formula I-9 wherein X is SO, R1 is CH2CH3, A is N and Q1 are as defined in table H.

Table L-6 provides 10 compounds L-6.001 to L-6.010 of formula I-9 wherein X is SO, R1 is CH2CH3, A is CH and Q1 are as defined in table H.

Table L-7 provides 10 compounds L-7.001 to L-7.010 of formula I-9 wherein X is SO, R1 is CH2cPr, A is N and Q1 are as defined in table H.

Table L-8 provides 10 compounds L-8.001 to L-8.010 of formula I-9 wherein X is SO, R1 is CH2cPr, A is CH and Q1 are as defined in table H.

Table L-9 provides 10 compounds L-9.001 to L-9.010 of formula I-9 wherein X is SO2, R1 is CH2CH3, A is N and Q1 are as defined in table H.

Table L-10 provides 10 compounds L-10.001 to L-10.010 of formula I-9 wherein X is SO2, R1 is CH2CH3, A is CH and Q1 are as defined in table H.

Table L-11 provides 10 compounds L-11.001 to L-11.010 of formula I-9 wherein X is SO2, R1 is CH2cPr, A is N and Q1 are as defined in table H.

Table L-12 provides 10 compounds L-12.001 to L-12.010 of formula I-9 wherein X is SO2, R1 is CH2cPr, A is CH and Q1 are as defined in table H.

The compounds of formula I according to the invention are preventively and/or curatively valuable active ingredients in the field of pest control, even at low rates of application, which have a very favorable biocidal spectrum and are well tolerated by warm-blooded species, fish and plants. The active ingredients according to the invention act against all or individual developmental stages of normally sensitive, but also resistant, animal pests, such as insects or representatives of the order Acarina. The insecticidal or acaricidal activity of the active ingredients according to the invention can manifest itself directly, i. e. in destruction of the pests, which takes place either immediately or only after some time has elapsed, for example during ecdysis, or indirectly, for example in a reduced oviposition and/or hatching rate, a good activity corresponding to a destruction rate (mortality) of at least 50 to 60%.

Examples of the above-mentioned animal pests are:

from the order Acarina, for example,

Acalitus spp, Aculus spp, Acaricalus spp, Aceria spp, Acarus siro, Amblyomma spp., Argas spp., Boophilus spp., Brevipalpus spp., Bryobia spp, Calipitrimerus spp., Chorioptes spp., Dermanyssus gallinae, Dermatophagoides spp, Eotetranychus spp, Eriophyes spp., Hemitarsonemus spp, Hyalomma spp., Ixodes spp., Olygonychus spp, Ornithodoros spp., Polyphagotarsone latus, Panonychus spp., Phyllocoptruta oleivora, Phytonemus spp, Polyphagotarsonemus spp, Psoroptes spp., Rhipicephalus spp., Rhizoglyphus spp., Sarcoptes spp., Steneotarsonemus spp, Tarsonemus spp. and Tetranychus spp.;

from the order Anoplura, for example,

Haematopinus spp., Linognathus spp., Pediculus spp., Pemphigus spp. and Phylloxera spp.; from the order Coleoptera, for example, Agriotes spp., Amphimallon majale, Anomala orientalis, Anthonomus spp., Aphodius spp, Astylus atromaculatus, Ataenius spp, Atomaria linearis, Chaetocnema tibialis, Cerotoma spp, Conoderus spp, Cosmopolites spp., Cotinis nitida, Curculio spp., Cyclocephala spp, Dermestes spp., Diabrotica spp., Diloboderus abderus, Epilachna spp., Eremnus spp., Heteronychus arator, Hypothenemus hampei, Lagria vilosa, Leptinotarsa decemLineata, Lissorhoptrus spp., Liogenys spp, Maecolaspis spp, Maladera castanea, Megascelis spp, Melighetes aeneus, Melolontha spp., Myochrous armatus, Orycaephilus spp., Otiorhynchus spp., Phyllophaga spp, Phlyctinus spp., Popillia spp., Psylliodes spp., Rhyssomatus aubtilis, Rhizopertha spp., Scarabeidae, Sitophilus spp., Sitotroga spp., Somaticus spp, Sphenophorus spp, Sternechus subsignatus, Tenebrio spp., Tribolium spp. and Trogoderma spp.; from the order Diptera, for example, Aedes spp., Anopheles spp, Antherigona soccata, Bactrocea oleae, Bibio hortulanus, Bradysia spp, Calliphora erythrocephala, Ceratitis spp., Chrysomyia spp., Culex spp., Cuterebra spp., Dacus spp., Delia spp, Drosophila melanogaster, Fannia spp., Gastrophilus spp., Geomyza tripunctata, Glossina spp., Hypoderma spp., Hyppobosca spp., Liriomyza spp., Lucilia spp., Melanagromyza spp., Musca spp., Oestrus spp., Orseolia spp., Oscinella frit, Pegomyia hyoscyami, Phorbia spp., Rhagoletis spp, Rivelia quadrifasciata, Scatella spp, Sciara spp., Stomoxys spp., Tabanus spp., Tannia spp. and Tipula spp.;

from the order Hemiptera, for example,

Acanthocoris scabrator, Acrosternum spp, Adelphocoris lineolatus, Amblypelta nitida, Bathycoelia thalassina, Blissus spp, Cimex spp., Clavigralla tomentosicollis, Creontiades spp, Distantiella theobroma, Dichelops furcatus, Dysdercus spp., Edessa spp, Euschistus spp., Eurydema pulchrum, Eurygaster spp., Halyomorpha halys, Horcias nobilellus, Leptocorisa spp., Lygus spp, Margarodes spp, Murgantia histrionic, Neomegalotomus spp, Nesidiocoris tenuis, Nezara spp., Nysius simulans, Oebalus insularis, Piesma spp., Piezodorus spp, Rhodnius spp., Sahlbergella singularis, Scaptocoris castanea, Scotinophara spp., Thyanta spp, Triatoma spp., Vatiga illudens;

Acyrthosium pisum, Adalges spp, Agalliana ensigera, Agonoscena targionii, Aleurodicus spp, Aleurocanthus spp, Aleurolobus barodensis, Aleurothrixus floccosus, Aleyrodes brassicae, Amarasca biguttula, Amritodus atkinsoni, Aonidiella spp., Aphididae, Aphis spp., Aspidiotus spp., Aulacorthum solani, Bactericera cockerelli, Bemisia spp, Brachycaudus spp, Brevicoryne brassicae, Cacopsylla spp, Cavariella aegopodii Scop., Ceroplaster spp., Chrysomphalus aonidium, Chrysomphalus dictyospermi, Cicadella spp, Cofana spectra, Cryptomyzus spp, Cicadulina spp, Coccus hesperidum, Dalbulus maidis, Dialeurodes spp, Diaphorina citri, Diuraphis noxia, Dysaphis spp, Empoasca spp., Eriosoma larigerum, Erythroneura spp., Gascardia spp., Glycaspis brimblecombei, Hyadaphis pseudobrassicae, Hyalopterus spp, Hyperomyzus pallidus, Idioscopus clypealis, Jacobiasca lybica, Laodelphax spp., Lecanium corni, Lepidosaphes spp., Lopaphis erysimi, Lyogenys maidis, Macrosiphum spp., Mahanarva spp, Metcalfa pruinosa, Metopolophium dirhodum, Myndus crudus, Myzus spp., Neotoxoptera sp, Nephotettix spp., Nilaparvata spp., Nippolachnus piri Mats, Odonaspis ruthae, Oregma lanigera Zehnter, Parabemisia myricae, Paratrioza cockerelli, Parlatoria spp., Pemphigus spp., Peregrinus maidis, Perkinsiella spp, Phorodon humuli, Phylloxera spp, Planococcus spp., Pseudaulacaspis spp., Pseudococcus spp., Pseudatomoscelis seriatus, Psylla spp., Pulvinaria aethiopica, Quadraspidiotus spp., Quesada gigas, Recilia dorsalis, Rhopalosiphum spp., Saissetia spp., Scaphoideus spp., Schizaphis spp., Sitobion spp., Sogatella furcifera, Spissistilus festinus, Tarophagus Proserpina, Toxoptera spp, Trialeurodes spp, Tridiscus sporoboli, Trionymus spp, Trioza erytreae, Unaspis citri, Zygina flammigera, Zyginidia scutellaris;

from the order Hymenoptera, for example,

Acromyrmex, Arge spp, Atta spp., Cephus spp., Diprion spp., Diprionidae, Gilpinia polytoma, Hoplo-campa spp., Lasius spp., Monomorium pharaonis, Neodiprion spp., Pogonomyrmex spp, Slenopsis invicta, Solenopsis spp. and Vespa spp.;

from the order Isoptera, for example,

Coptotermes spp, Corniternes cumulans, Incisitermes spp, Macrotermes spp, Mastotermes spp, Microtermes spp, Reticulitermes spp.; Solenopsis geminate from the order Lepidoptera, for example,

*Acleris* spp., *Adoxophyes* spp., *Aegeria* spp., *Agrotis* spp., *Alabama argillaceae*, *Amylois* spp., *Anticarsia gemmatalis*, *Archips* spp., *Argyresthia* spp, *Argyrotaenia* spp., *Autographa* spp., *Bucculatrix thurberiella*, *Busseola fusca*, *Cadra cautella*, *Carposina nipponensis*, *Chilo* spp., *Choristoneura* spp., *Chrysoteuchia topiaria*, *Clysia ambiguella*, *Cnaphalocrocis* spp., *Cnephasia* spp., *Cochylis* spp., *Coleophora* spp., *Colias lesbia*, *Cosmophila flava*, *Crambus* spp, *Crocidolomia binotalis*, *Cryptophlebia leucotreta*, *Cydalima perspectalis*, *Cydia* spp., *Diaphania perspectalis*, *Diatraea* spp., *Diparopsis castanea*, *Earias* spp., *Eldana saccharina*, *Ephestia* spp., *Epinotia* spp, *Estigmene acrea*, *Etiella zinckinella*, *Eucosma* spp., *Eupoecilia ambiguella*, *Euproctis* spp., *Euxoa* spp., *Feltia jaculiferia*, *Grapholita* spp., *Hedya nubiferana*, *Heliothis* spp., *Hellula undalis*, *Herpetogramma* spp, *Hyphantria cunea*, *Keiferia lycopersicella*, *Lasmopalpus lignosellus*, *Leucoptera scitella*, *Lithocollethis* spp., *Lobesia botrana*, *Loxostege bifidalis*, *Lymantria* spp., *Lyonetia* spp., *Malacosoma* spp., *Mamestra brassicae*, *Manduca sexta*, *Mythimna* spp, *Noctua* spp, *Operophtera* spp., *Orniodes indica*, *Ostrinia nubilalis*, *Pammene* spp., *Pandemis* spp., *Panolis flammea*, *Papaipema nebris*, *Pectinophora gossypi-ela*, *Perileucoptera coffeella*, *Pseudaletia unipuncta*, *Phthorimaea operculella*, *Pieris rapae*, *Pieris* spp., *Plutella xylostella*, *Prays* spp., *Pseudoplusia* spp, *Rachiplusia nu*, *Richia albicosta*, *Scirpophaga* spp., *Sesamia* spp., *Sparganothis* spp., *Spodoptera* spp., *Sylepta derogate*, *Synanthedon* spp., *Thaumetopoea* spp., *Tortrix* spp., *Trichoplusia ni*, *Tuta absoluta*, and *Yponomeuta* spp.;

from the order Mallophaga, for example,

*Damalinea* spp. and *Trichodectes* spp.;

from the order Orthoptera, for example,

*Blatta* spp., *Blattella* spp., *Gryllotalpa* spp., *Leucophaea maderae*, *Locusta* spp., *Neocurtilla hexadactyla*, *Periplaneta* spp., *Scapteriscus* spp, and *Schistocerca* spp.;

from the order Psocoptera, for example,

*Liposcelis* spp.;

from the order Siphonaptera, for example,

*Ceratophyllus* spp., *Ctenocephalides* spp. and *Xenopsylla cheopis;* from the order Thysanoptera, for example,

*Calliothrips phaseoli*, *Frankliniella* spp., *Heliothrips* spp, *Hercinothrips* spp., *Parthenothrips* spp, *Scirtothrips aurantii*, *Sericothrips variabilis*, *Taeniothrips* spp., *Thrips* spp;

from the order Thysanura, for example, *Lepisma saccharina.*

The active ingredients according to the invention can be used for controlling, i. e. containing or destroying, pests of the abovementioned type which occur in particular on plants, especially on useful plants and ornamentals in agriculture, in horticulture and in forests, or on organs, such as fruits, flowers, foliage, stalks, tubers or roots, of such plants, and in some cases even plant organs which are formed at a later point in time remain protected against these pests.

Suitable target crops are, in particular, cereals, such as wheat, barley, rye, oats, rice, maize or sorghum; beet, such as sugar or fodder beet; fruit, for example pomaceous fruit, stone fruit or soft fruit, such as apples, pears, plums, peaches, almonds, cherries or berries, for example strawberries, raspberries or blackberries; leguminous crops, such as beans, lentils, peas or soya; oil crops, such as oilseed rape, mustard, poppies, olives, sunflowers, coconut, castor, cocoa or ground nuts; cucurbits, such as pumpkins, cucumbers or melons; fibre plants, such as cotton, flax, hemp or jute; citrus fruit, such as oranges, lemons, grapefruit or tangerines; vegetables, such as spinach, lettuce, asparagus, cabbages, carrots, onions, tomatoes, potatoes or bell peppers; Lauraceae, such as avocado, Cinnamonium or camphor; and also tobacco, nuts, coffee, eggplants, sugarcane, tea, pepper, grapevines, hops, the plantain family and latex plants.

The compositions and/or methods of the present invention may be also used on any ornamental and/or vegetable crops, including flowers, shrubs, broad-leaved trees and evergreens.

For example the invention may be used on any of the following ornamental species: *Ageratum* spp., *Alonsoa* spp., *Anemone* spp., *Anisodontea capsenisis*, *Anthemis* spp., *Antirrhinum* spp., *Aster* spp., *Begonia* spp. (e.g. *B. elatior*, *B. sempertiorens*, *B. tubéreux*), *Bougainvillea* spp., *Brachycome* spp., *Brassica* spp. (ornamental), *Calceolaria* spp., *Capsicum annuum*, *Catharanthus roseus*, *Canna* spp., *Centaurea* spp., *Chrysanthemum* spp., *Cineraria* spp. (*C. maritime*), *Coreopsis* spp., *Crassula coccinea*, *Cuphea ignea*, *Dahlia* spp., *Delphinium* spp., *Dicentra spectabilis*, *Dorotheantus* spp., *Eustoma grandiflorum*, *Forsythia* spp., *Fuchsia* spp., *Geranium gnaphalium*, *Gerbera* spp., *Gomphrena globosa*, *Heliotropium* spp., *Helianthus* spp., *Hibiscus* spp., *Hortensia* spp., *Hydrangea* spp., *Hypoestes phyllostachya*, *Impatiens* spp. (*I. Walleriana*), *Ire sines* spp., *Kalanchoe* spp., *Lantana camara*, *Lavatera trimestris*, *Leonotis leonurus*, *Lilium* spp., *Mesembryanthemum* spp., *Mimulus* spp., *Monarda* spp., *Nemesia* spp., *Tagetes* spp., *Dianthus* spp. (carnation), *Canna* spp., *Oxalis* spp., *Berns* spp., *Pelargonium* spp. (*P. peltatum*, *P. Zonale*), *Viola* spp. (pansy), *Petunia* spp., *Phlox* spp., *Plecthranthus* spp., *Poinsettia* spp., *Parthenocissus* spp. (*P. quinquefolia*, *P. tricuspidata*), *Primula* spp., *Ranunculus* spp., *Rhododendron* spp., *Rosa* spp. (rose), *Rudbeckia* spp., *Saintpaulia* spp., *Salvia* spp., *Scaevola aemola*, *Schizanthus wisetonensis*, *Sedum* spp., *Solanum* spp., *Surfinia* spp., *Tagetes* spp., *Nicotinia* spp., *Verbena* spp., *Zinnia* spp. and other bedding plants.

For example the invention may be used on any of the following vegetable species: *Allium* spp. (*A. sativum*, *A. cepa*, *A. oschaninii*, *A. Porrum*, *A. ascalonicum*, *A. fistulosum*), *Anthriscus cerefolium*, *Apium graveolus*, *Asparagus officinalis*, *Beta vulgarus*, *Brassica* spp. (*B. Oleracea*, *B. Pekinensis*, *B. rapa*), *Capsicum annuum*, *Cicer arietinum*, *Cichorium endivia*, *Cichorum* spp. (*C. intybus*, *C. endivia*), *Citrillus lanatus*, *Cucumis* spp. (*C. sativus*, *C. melo*), *Cucurbita* spp. (*C. pepo*, *C. maxima*), *Cyanara* spp. (*C. scolymus*, *C. cardunculus*), *Daucus carota*, *Foeniculum vulgare*, *Hypericum* spp., *Lactuca sativa*, *Lycopersicon* spp. (*L. esculentum*, *L. lycopersicum*), *Mentha* spp., *Ocimum basilicum*, *Petroselinum crispum*, *Phaseolus* spp. (*P. vulgaris*, *P. coccineus*), *Pisum sativum*, *Raphanus sativus*, *Rheum rhaponticum*, *Rosemarinus* spp., *Salvia* spp., *Scorzonera hispanica*, *Solanum melongena*, *Spinacea oleracea*, *Valerianella* spp. (*V. locusta*, *V. eriocarpa*) and *Vicia fabs.*

Preferred ornamental species include African violet, Begonia, Dahlia, Gerbera, Hydrangea, Verbena, Rosa, Kalanchoe, Poinsettia, Aster, Centaurea, Coreopsis, Delphinium, Monarda, Phlox, Rudbeckia, Sedum, Petunia, Viola, Impatiens, Geranium, Chrysanthemum, Ranunculus, Fuchsia, Salvia, Hortensia, rosemary, sage, St. Johnswort, mint, sweet pepper, tomato and cucumber.

The active ingredients according to the invention are especially suitable for controlling *Aphis craccivora*, *Diabrotica balteata*, *Heliothis virescens*, *Myzus persicae*, *Plutella xylostella* and *Spodoptera littoralis* in cotton, vegetable, maize, rice and soya crops. The active ingredients according to the invention are further especially suitable for controlling *Mamestra* (preferably in vegetables), *Cydia pomonella* (preferably in apples), *Empoasca* (preferably in vegetables, vineyards), *Leptinotarsa* (preferably in potatos) and *Chilo supressalis* (preferably in rice).

The active ingredients according to the invention are especially suitable for controlling *Aphis craccivora, Diabrotica balteata, Heliothis virescens, Myzus persicae, Plutella xylostella* and *Spodoptera littoralis* in cotton, vegetable, maize, rice and soya crops. The active ingredients according to the invention are further especially suitable for controlling *Mamestra* (preferably in vegetables), *Cydia pomonella* (preferably in apples), *Empoasca* (preferably in vegetables, vineyards), *Leptinotarsa* (preferably in potatos) and *Chilo supressalis* (preferably in rice).

In a further aspect, the invention may also relate to a method of controlling damage to plant and parts thereof by plant parasitic nematodes (Endoparasitic-, Semiendoparasitic- and Ectoparasitic nematodes), especially plant parasitic nematodes such as root knot nematodes, *Meloidogyne hapla, Meloidogyne incognita, Meloidogyne javanica, Meloidogyne arenaria* and other *Meloidogyne* species; cyst-forming nematodes, *Globodera rostochiensis* and other *Globodera* species; *Heterodera avenae, Heterodera glycines, Heterodera schachtii, Heterodera trifolii*, and other *Heterodera* species; Seed gall nematodes, *Anguina* species; Stem and foliar nematodes, *Aphelenchoides* species; Sting nematodes, *Belonolaimus longicaudatus* and other *Belonolaimus* species; Pine nematodes, *Bursaphelenchus xylophilus* and other *Bursaphelenchus* species; Ring nematodes, *Criconema* species, *Criconemella* species, *Criconemoides* species, *Mesocriconema* species; Stem and bulb nematodes, *Ditylenchus destructor, Ditylenchus dipsaci* and other *Ditylenchus* species; Awl nematodes, *Dolichodorus* species; Spiral nematodes, *Heliocotylenchus multicinctus* and other *Helicotylenchus* species; Sheath and sheathoid nematodes, *Hemicycliophora* species and *Hemicriconemoides* species; *Hirshmanniella* species; Lance nematodes, *Hoploaimus* species; false rootknot nematodes, *Nacobbus* species; Needle nematodes, *Longidorus elongatus* and other *Longidorus* species; Pin nematodes, *Pratylenchus* species; Lesion nematodes, *Pratylenchus neglectus, Pratylenchus penetrans, Pratylenchus curvitatus, Pratylenchus goodeyi* and other *Pratylenchus* species; Burrowing nematodes, *Radopholus similis* and other *Radopholus* species; Reniform nematodes, *Rotylenchus robustus, Rotylenchus reniformis* and other *Rotylenchus* species; *Scutellonema* species; Stubby root nematodes, *Trichodorus primitivus* and other *Trichodorus* species, *Paratrichodorus* species; Stunt nematodes, *Tylenchorhynchus claytoni, Tylenchorhynchus dubius* and other *Tylenchorhynchus* species; Citrus nematodes, *Tylenchulus* species; Dagger nematodes, *Xiphinema* species; and other plant parasitic nematode species, such as *Subanguina* spp., *Hypsoperine* spp., *Macroposthonia* spp., *Melinius* spp., *Punctodera* spp., and *Quinisulcius* spp.

The compounds of the invention may also have activity against the molluscs. Examples of which include, for example, Ampullariidae; *Anion* (*A. ater, A. circumscriptus, A. hortensis, A. rufus*); Bradybaenidae (*Bradybaena fruticum*); *Cepaea* (*C. hortensis, C. Nemoralis*); ochlodina; *Deroceras* (*D. agrestis, D. empiricorum, D. laeve, D. reticulatum*); *Discus* (*D. rotundatus*); Euomphalia; *Galba* (*G. trunculata*); *Helicelia* (*H. itala, H. obvia*); Helicidae *Helicigona arbustorum*); *Helicodiscus*; *Helix* (*H. aperta*); *Limax* (*L. cinereoniger, L. flavus, L. marginatus, L. maximus, L. tenellus*); *Lymnaea; Milax* (*M. gagates, M. marginatus, M. sowerbyi*); *Opeas*; *Pomacea* (*P. canaticulata*); *Vallonia* and Zanitoides.

The term "crops" is to be understood as including also crop plants which have been so transformed by the use of recombinant DNA techniques that they are capable of synthesising one or more selectively acting toxins, such as are known, for example, from toxin-producing bacteria, especially those of the genus *Bacillus*.

Toxins that can be expressed by such transgenic plants include, for example, insecticidal proteins, for example insecticidal proteins from *Bacillus cereus* or *Bacillus popilliae*; or insecticidal proteins from *Bacillus thuringiensis*, such as δ-endotoxins, e.g. Cry1Ab, Cry1Ac, Cry1F, Cry1Fa2, Cry2Ab, Cry3A, Cry3Bb1 or Cry9C, or vegetative insecticidal proteins (Vip), e.g. Vip1, Vip2, Vip3 or Vip3A; or insecticidal proteins of bacteria colonising nematodes, for example *Photorhabdus* spp. or *Xenorhabdus* spp., such as *Photorhabdus luminescens, Xenorhabdus nematophilus*; toxins produced by animals, such as scorpion toxins, arachnid toxins, wasp toxins and other insect-specific neurotoxins; toxins produced by fungi, such as Streptomycetes toxins, plant lectins, such as pea lectins, barley lectins or snowdrop lectins; agglutinins; proteinase inhibitors, such as trypsin inhibitors, serine protease inhibitors, patatin, cystatin, papain inhibitors; ribosome-inactivating proteins (RIP), such as ricin, maize-RIP, abrin, luffin, saporin or bryodin; steroid metabolism enzymes, such as 3-hydroxysteroidoxidase, ecdysteroid-UDP-glycosyl-transferase, cholesterol oxidases, ecdysone inhibitors, HMG-COA-reductase, ion channel blockers, such as blockers of sodium or calcium channels, juvenile hormone esterase, diuretic hormone receptors, stilbene synthase, bibenzyl synthase, chitinases and glucanases.

In the context of the present invention there are to be understood by δ-endotoxins, for example Cry1Ab, Cry1Ac, Cry1F, Cry1Fa2, Cry2Ab, Cry3A, Cry3Bb1 or Cry9C, or vegetative insecticidal proteins (Vip), for example Vip1, Vip2, Vip3 or Vip3A, expressly also hybrid toxins, truncated toxins and modified toxins. Hybrid toxins are produced recombinantly by a new combination of different domains of those proteins (see, for example, WO 02/15701). Truncated toxins, for example a truncated Cry1Ab, are known. In the case of modified toxins, one or more amino acids of the naturally occurring toxin are replaced. In such amino acid replacements, preferably non-naturally present protease recognition sequences are inserted into the toxin, such as, for example, in the case of Cry3A055, a cathepsin-G-recognition sequence is inserted into a Cry3A toxin (see WO 03/018810). Examples of such toxins or transgenic plants capable of synthesising such toxins are disclosed, for example, in EP-A-0 374 753, WO 93/07278, WO 95/34656, EP-A-0 427 529, EP-A-451 878 and WO 03/052073.

The processes for the preparation of such transgenic plants are generally known to the person skilled in the art and are described, for example, in the publications mentioned above. Cry1-type deoxyribonucleic acids and their preparation are known, for example, from WO 95/34656, EP-A-0 367 474, EP-A-0 401 979 and WO 90/13651.

The toxin contained in the transgenic plants imparts to the plants tolerance to harmful insects. Such insects can occur in any taxonomic group of insects, but are especially commonly found in the beetles (*Coleoptera*), two-winged insects (*Diptera*) and moths (*Lepidoptera*).

Transgenic plants containing one or more genes that code for an insecticidal resistance and express one or more toxins are known and some of them are commercially available.

Examples of such plants are: YieldGard® (maize variety that expresses a Cry1Ab toxin); YieldGard Rootworm® (maize variety that expresses a Cry3Bb1 toxin); YieldGard Plus® (maize variety that expresses a Cry1Ab and a Cry3Bb1 toxin); Starlink® (maize variety that expresses a Cry9C toxin); Herculex I® (maize variety that expresses a Cry1Fa2 toxin and the enzyme phosphinothricine N-acetyltransferase (PAT) to achieve tolerance to the herbicide glufosinate ammonium); NuCOTN 33B® (cotton variety that expresses a Cry1Ac toxin); Bollgard I® (cotton variety that expresses a Cry1Ac toxin); Bollgard II® (cotton variety that expresses a Cry1Ac and a Cry2Ab toxin); VipCot® (cotton variety that expresses a Vip3A and a Cry1Ab toxin); NewLeaf® (potato variety that expresses a Cry3A toxin); NatureGard®, Agrisure® GT Advantage (GA21 glyphosate-tolerant trait), Agrisure® CB Advantage (Bt11 corn borer (CB) trait) and Protecta®.

Further examples of such transgenic crops are:

1. Bt11 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia nonagrioides*) by transgenic expression of a truncated Cry1Ab toxin. Bt11 maize also transgenically expresses the enzyme PAT to achieve tolerance to the herbicide glufosinate ammonium.
2. Bt176 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and *Sesamia nonagrioides*) by transgenic expression of a Cry1Ab toxin. Bt176 maize also transgenically expresses the enzyme PAT to achieve tolerance to the herbicide glufosinate ammonium.
3. MIR604 Maize from Syngenta Seeds SAS, Chemin de l'Hobit 27, F-31 790 St. Sauveur, France, registration number C/FR/96/05/10. Maize which has been rendered insect-resistant by transgenic expression of a modified Cry3A toxin. This toxin is Cry3A055 modified by insertion of a cathepsin-G-protease recognition sequence. The preparation of such transgenic maize plants is described in WO 03/018810.
4. MON 863 Maize from Monsanto Europe S.A. 270-272 Avenue de Tervuren, B-1150 Brussels, Belgium, registration number C/DE/02/9. MON 863 expresses a Cry3Bb1 toxin and has resistance to certain *Coleoptera* insects.
5. IPC 531 Cotton from Monsanto Europe S.A. 270-272 Avenue de Tervuren, B-1150 Brussels, Belgium, registration number C/ES/96/02.
6. 1507 Maize from Pioneer Overseas Corporation, Avenue Tedesco, 7 B-1160 Brussels, Belgium, registration number C/NL/00/10. Genetically modified maize for the expression of the protein Cry1F for achieving resistance to certain *Lepidoptera* insects and of the PAT protein for achieving tolerance to the herbicide glufosinate ammonium.
7. NK603×MON 810 Maize from Monsanto Europe S.A. 270-272 Avenue de Tervuren, B-1150 Brussels, Belgium, registration number C/GB/02/M3/03. Consists of conventionally bred hybrid maize varieties by crossing the genetically modified varieties NK603 and MON 810. NK603×MON 810 Maize transgenically expresses the protein CP4 EPSPS, obtained from *Agrobacterium* sp. strain CP4, which imparts tolerance to the herbicide Roundup® (contains glyphosate), and also a Cry1Ab toxin obtained from *Bacillus thuringiensis* subsp. *kurstaki* which brings about tolerance to certain *Lepidoptera*, include the European corn borer.

Transgenic crops of insect-resistant plants are also described in BATS (Zentrum für Biosicherheit and Nachhaltigkeit, Zentrum BATS, Clarastrasse 13, 4058 Basel, Switzerland) Report 2003, (http://bats.ch).

The term "crops" is to be understood as including also crop plants which have been so transformed by the use of recombinant DNA techniques that they are capable of synthesising antipathogenic substances having a selective action, such as, for example, the so-called "pathogenesis-related proteins" (PRPs, see e.g. EP-A-0 392 225). Examples of such antipathogenic substances and transgenic plants capable of synthesising such antipathogenic substances are known, for example, from EP-A-0 392 225, WO 95/33818 and EP-A-0 353 191. The methods of producing such transgenic plants are generally known to the person skilled in the art and are described, for example, in the publications mentioned above.

Crops may also be modified for enhanced resistance to fungal (for example *Fusarium*, Anthracnose, or *Phytophthora*), bacterial (for example *Pseudomonas*) or viral (for example potato leafroll virus, tomato spotted wilt virus, cucumber mosaic virus) pathogens.

Crops also include those that have enhanced resistance to nematodes, such as the soybean cyst nematode.

Crops that are tolerance to abiotic stress include those that have enhanced tolerance to drought, high salt, high temperature, chill, frost, or light radiation, for example through expression of NF—YB or other proteins known in the art.

Antipathogenic substances which can be expressed by such transgenic plants include, for example, ion channel blockers, such as blockers for sodium and calcium channels, for example the viral KP1, KP4 or KP6 toxins; stilbene synthases; bibenzyl synthases; chitinases; glucanases; the so-called "pathogenesis-related proteins" (PRPs; see e.g. EP-A-0 392 225); antipathogenic substances produced by microorganisms, for example peptide antibiotics or heterocyclic antibiotics (see e.g. WO 95/33818) or protein or polypeptide factors involved in plant pathogen defence (so-called "plant disease resistance genes", as described in WO 03/000906).

Further areas of use of the compositions according to the invention are the protection of stored goods and store rooms and the protection of raw materials, such as wood, textiles, floor coverings or buildings, and also in the hygiene sector, especially the protection of humans, domestic animals and productive livestock against pests of the mentioned type.

The present invention also provides a method for controlling pests (such as mosquitoes and other disease vectors; see also http://www.who.int/malaria/vector_control/irs/en/). In one embodiment, the method for controlling pests comprises applying the compositions of the invention to the target pests, to their locus or to a surface or substrate by brushing, rolling, spraying, spreading or dipping. By way of example, an IRS (indoor residual spraying) application of a surface such as a wall, ceiling or floor surface is contemplated by the method of the invention. In another embodiment, it is contemplated to apply such compositions to a substrate such as non-woven or a fabric material in the form of (or which can be used in the manufacture of) netting, clothing, bedding, curtains and tents.

In one embodiment, the method for controlling such pests comprises applying a pesticidally effective amount of the compositions of the invention to the target pests, to their locus, or to a surface or substrate so as to provide effective residual pesticidal activity on the surface or substrate. Such application may be made by brushing, rolling, spraying, spreading or dipping the pesticidal composition of the invention. By way of example, an IRS application of a surface such as a wall, ceiling or floor surface is contemplated by the method of the invention so as to provide effective residual pesticidal activity on the surface. In another embodiment, it is contemplated to apply such compositions for residual control of pests on a substrate such as a fabric material in the form of (or which can be used in the manufacture of) netting, clothing, bedding, curtains and tents.

Substrates including non-woven, fabrics or netting to be treated may be made of natural fibres such as cotton, raffia, jute, flax, sisal, hessian, or wool, or synthetic fibres such as polyamide, polyester, polypropylene, polyacrylonitrile or the like. The polyesters are particularly suitable. The methods of textile treatment are known, e.g. WO 2008/151984, WO 2003/034823, U.S. Pat. No. 5,631,072, WO 2005/64072, WO2006/128870, EP 1724392, WO 2005113886 or WO 2007/090739.

Further areas of use of the compositions according to the invention are the field of tree injection/trunk treatment for all ornamental trees as well all sort of fruit and nut trees.

In the field of tree injection/trunk treatment, the compounds according to the present invention are especially suitable against wood-boring insects from the order *Lepidoptera* as mentioned above and from the order *Coleoptera*, especially against woodborers listed in the following tables A and B:

TABLE A

Examples of exotic woodborers of economic importance.

| Family | Species | Host or Crop Infested |
|---|---|---|
| Buprestidae | *Agrilus planipennis* | Ash |
| Cerambycidae | *Anoplura glabripennis* | Hardwoods |
| Scolytidae | *Xylosandrus crassiusculus* | Hardwoods |
| | *X. mutilatus* | Hardwoods |
| | *Tomicus piniperda* | Conifers |

TABLE B

Examples of native woodborers of economic importance.

| Family | Species | Host or Crop Infested |
|---|---|---|
| Buprestidae | *Agrilus anxius* | Birch |
| | *Agrilus politus* | Willow, Maple |
| | *Agrilus sayi* | Bayberry, Sweetfern |
| | *Agrilus vittaticolllis* | Apple, Pear, Cranberry, Serviceberry, Hawthorn |
| | *Chrysobothris femorata* | Apple, Apricot, Beech, Boxelder, Cherry, Chestnut, Currant, Elm, Hawthorn, Hackberry, Hickory, Horsechestnut, Linden, Maple, Mountain-ash, Oak, Pecan, Pear, Peach, Persimmon, Plum, Poplar, Quince, Redbud, Serviceberry, Sycamore, Walnut, Willow |
| | *Texania campestris* | Basswood, Beech, Maple, Oak, Sycamore, Willow, Yellow-poplar |
| Cerambycidae | *Goes pulverulentus* | Beech, Elm, Nuttall, Willow, Black oak, Cherrybark oak, Water oak, Sycamore |

TABLE B-continued

Examples of native woodborers of economic importance.

| Family | Species | Host or Crop Infested |
|---|---|---|
| | *Goes tigrinus* | Oak |
| | *Neoclytus acuminatus* | Ash, Hickory, Oak, Walnut, Birch, Beech, Maple, Eastern hophornbeam, Dogwood, Persimmon, Redbud, Holly, Hackberry, Black locust, Honeylocust, Yellow-poplar, Chestnut, Osage-orange, Sassafras, Lilac, Mountain-mahogany, Pear, Cherry, Plum, Peach, Apple, Elm, Basswood, Sweetgum |
| | *Neoptychodes trilineatus* | Fig, Alder, Mulberry, Willow, Netleaf hackberry |
| | *Oberea ocellata* | Sumac, Apple, Peach, Plum, Pear, Currant, Blackberry |
| | *Oberea tripunctata* | Dogwood, Viburnum, Elm, Sourwood, Blueberry, Rhododendron, Azalea, Laurel, Poplar, Willow, Mulberry |
| | *Oncideres cingulata* | Hickory, Pecan, Persimmon, Elm, Sourwood, Basswood, Honeylocust, Dogwood, Eucalyptus, Oak, Hackberry, Maple, Fruit trees |
| | *Saperda calcarata* | Poplar |
| | *Strophiona nitens* | Chestnut, Oak, Hickory, Walnut, Beech, Maple |
| Scolytidae | *Corthylus columbianus* | Maple, Oak, Yellow-poplar, Beech, Boxelder, Sycamore, Birch, Basswood, Chestnut, Elm |
| | *Dendroctonus frontalis* | Pine |
| | *Dryocoetes betulae* | Birch, Sweetgum, Wild cherry, Beech, Pear |
| | *Monarthrum fasciatum* | Oak, Maple, Birch, Chestnut, Sweetgum, Blackgum, Poplar, Hickory, Mimosa, Apple, Peach, Pine |
| | *Phloeotribus liminaris* | Peach, Cherry, Plum, Black cherry, Elm, Mulberry, Mountain-ash |
| | *Pseudopityophthorus pruinosus* | Oak, American beech, Black cherry, Chickasaw plum, Chestnut, Maple, Hickory, Hornbeam, Hophornbeam |
| Sesiidae | *Paranthrene simulans* | Oak, American chestnut |
| | *Sannina uroceriformis* | Persimmon |
| | *Synanthedon exitiosa* | Peach, Plum, Nectarine, Cherry, Apricot, Almond, Black cherry |
| | *Synanthedon pictipes* | Peach, Plum, Cherry, Beach, Black Cherry |
| | *Synanthedon rubrofascia* | Tupelo |
| | *Synanthedon scitula* | Dogwood, Pecan, Hickory, Oak, Chestnut, Beech, Birch, Black cherry, Elm, Mountain-ash, Viburnum, Willow, Apple, Loquat, Ninebark, Bayberry |
| | *Vitacea polistiformis* | Grape |

The present invention may be also used to control any insect pests that may be present in turfgrass, including for example beetles, caterpillars, fire ants, ground pearls, millipedes, sow bugs, mites, mole crickets, scales, mealybugs ticks, spittlebugs, southern chinch bugs and white grubs. The present invention may be used to control insect pests at various stages of their life cycle, including eggs, larvae, nymphs and adults.

In particular, the present invention may be used to control insect pests that feed on the roots of turfgrass including white grubs (such as *Cyclocephala* spp. (e.g. masked chafer, *C. lurida*), *Rhizotrogus* spp. (e.g. European chafer, *R. majalis*), *Cotinus* spp. (e.g. Green June beetle, *C. nitida*), *Popillia* spp. (e.g. Japanese beetle, *P. japonica*), *Phyllophaga* spp. (e.g. May/June beetle), *Ataenius* spp. (e.g. Black turfgrass *ataenius*, *A. spretulus*), *Maladera* spp. (e.g. Asiatic garden beetle, *M. castanea*) and *Tomarus* spp.), ground pearls (*Margarodes* spp.), mole crickets (tawny, southern, and short-winged; *Scapteriscus* spp., *Giyllotalpa africana*) and leatherjackets (European crane fly, *Tipula* spp.).

The present invention may also be used to control insect pests of turfgrass that are thatch dwelling, including armyworms (such as fall armyworm *Spodoptera frugiperda*, and common armyworm *Pseudaletia unipuncta*), cutworms, billbugs (*Sphenophorus* spp., such as *S. venatus verstitus* and *S. parvulus*), and sod webworms (such as *Crambus* spp. and the tropical sod webworm, *Herpetogramma phaeopteralis*).

The present invention may also be used to control insect pests of turfgrass that live above the ground and feed on the turfgrass leaves, including chinch bugs (such as southern chinch bugs, *Blissus insularis*), Bermudagrass mite (*Eriophyes cynodoniensis*), rhodesgrass mealybug (*Antonina graminis*), two-lined spittlebug (*Propsapia bicincta*), leafhoppers, cutworms (Noctuidae family), and greenbugs. The present invention may also be used to control other pests of turfgrass such as red imported fire ants (*Solenopsis invicta*) that create ant mounds in turf.

In the hygiene sector, the compositions according to the invention are active against ectoparasites such as hard ticks, soft ticks, mange mites, harvest mites, flies (biting and licking), parasitic fly larvae, lice, hair lice, bird lice and fleas.

Examples of such parasites are:

Of the order Anoplurida: *Haematopinus* spp., *Linognathus* spp., *Pediculus* spp. and *Phtirus* spp., *Solenopotes* spp.

Of the order Mallophagida: *Trimenopon* spp., *Menopon* spp., *Trinoton* spp., *Bovicola* spp., *Werneckiella* spp., *Lepikentron* spp., *Damalina* spp., *Trichodectes* spp. and *Felicola* spp.

Of the order *Diptera* and the suborders Nematocerina and Brachycerina, for example *Aedes* spp., *Anopheles* spp., *Culex* spp., *Simulium* spp., *Eusimulium* spp., *Phlebotomus* spp., *Lutzomyia* spp., *Culicoides* spp., *Chrysops* spp., *Hybomitra* spp., *Atylotus* spp., *Tabanus* spp., *Haematopota* spp., *Philipomyia* spp., *Braula* spp., *Musca* spp., *Hydrotaea* spp., *Stomoxys* spp., *Haematobia* spp., *Morellia* spp., *Fannia* spp., *Glossina* spp., *Calliphora* spp., *Lucilia* spp., *Chrysomyia* spp., *Wohlfahrtia* spp., *Sarcophaga* spp., *Oestrus* spp., *Hypoderma* spp., *Gasterophilus* spp., *Hippobosca* spp., *Lipoptena* spp. and *Melophagus* spp.

Of the order Siphonapterida, for example *Pulex* spp., *Ctenocephalides* spp., *Xenopsylla* spp., *Ceratophyllus* spp.

Of the order Heteropterida, for example *Cimex* spp., *Triatoma* spp., *Rhodnius* spp., *Panstrongylus* spp.

Of the order Blattarida, for example *Blatta orientalis*, *Periplaneta americana*, *Blattelagermanica* and *Supella* spp.

Of the subclass Acaria (Acarida) and the orders Meta- and Meso-stigmata, for example *Argas* spp., *Ornithodorus* spp., *Otobius* spp., *Ixodes* spp., *Amblyomma* spp., *Boophilus* spp., *Dermacentor* spp., *Haemophysalis* spp., *Hyalomma* spp., *Rhipicephalus* spp., *Dermanyssus* spp., *Raillietia* spp., *Pneumonyssus* spp., *Sternostoma* spp. *and Varroa* spp.

Of the orders Actinedida (Prostigmata) and Acaridida (Astigmata), for example *Acarapis* spp., *Cheyletiella* spp., *Ornithocheyletia* spp., *Myobia* spp., *Psorergates* spp., *Demodex* spp., *Trombicula* spp., *Listrophorus* spp., *Acarus* spp., *Tyrophagus* spp., *Caloglyphus* spp., *Hypodectes* spp., *Pterolichus* spp., *Psoroptes* spp., *Chorioptes* spp., *Otodectes* spp., *Sarcoptes* spp., *Notoedres* spp., *Knemidocoptes* spp., *Cytodites* spp. and *Laminosioptes* spp.

The compositions according to the invention are also suitable for protecting against insect infestation in the case of materials such as wood, textiles, plastics, adhesives, glues, paints, paper and card, leather, floor coverings and buildings.

The compositions according to the invention can be used, for example, against the following pests: beetles such as *Hylotrupes bajulus*, *Chlorophorus pilosis*, *Anobium punctatum*, *Xestobium rufovillosum*, *Ptilinuspecticornis*, *Dendrobium pertinex*, *Ernobius mollis*, *Priobium carpini*, *Lyctus brunneus*, *Lyctus africanus*, *Lyctus planicollis*, *Lyctus linearis*, *Lyctus pubescens*, *Trogoxylon aequale*, *Minthesrugicollis*, *Xyleborus* spec., *Tryptodendron* spec., *Apate monachus*, *Bostrychus capucins*, *Heterobostrychus brunneus*, *Sinoxylon* spec. and *Dinoderus minutus*, and also hymenopterans such as *Sirex juvencus*, *Urocerus gigas*, *Urocerus gigas* taignus and *Urocerus augur*, and termites such as *Kalotermes flavicollis*, *Cryptotermes brevis*, *Heterotermes indicola*, *Reticulitermes flavipes*, *Reticulitermes santonensis*, *Reticulitermes lucifugus*, *Mastotermes darwiniensis*, *Zootermopsis nevadensis* and *Coptotermes formosanus*, and bristletails such as *Lepisma saccharina*.

The compounds according to the invention can be used as pesticidal agents in unmodified form, but they are generally formulated into compositions in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspoemulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood N.J. (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The inventive compositions generally comprise from 0.1 to 99% by weight, especially from 0.1 to 95% by weight, of compounds of the present invention and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Preferred formulations can have the following compositions (weight %):
Emulsifiable Concentrates:
 active ingredient: 1 to 95%, preferably 60 to 90%
 surface-active agent: 1 to 30%, preferably 5 to 20%
 liquid carrier: 1 to 80%, preferably 1 to 35%
Dusts:
 active ingredient: 0.1 to 10%, preferably 0.1 to 5%
 solid carrier: 99.9 to 90%, preferably 99.9 to 99%
Suspension Concentrates:
 active ingredient: 5 to 75%, preferably 10 to 50%
 water: 94 to 24%, preferably 88 to 30%
 surface-active agent: 1 to 40%, preferably 2 to 30%
Wettable Powders:
 active ingredient: 0.5 to 90%, preferably 1 to 80%
 surface-active agent: 0.5 to 20%, preferably 1 to 15%
 solid carrier: 5 to 95%, preferably 15 to 90%

Granules:

active ingredient: 0.1 to 30%, preferably 0.1 to 15% solid carrier: 99.5 to 70%, preferably 97 to 85%

The following Examples further illustrate, but do not limit, the invention.

| Wettable powders | a) | b) | c) |
|---|---|---|---|
| active ingredients | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
|---|---|---|---|
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | — | 20% |

The combination is thoroughly mixed with the adjuvants and the mixture is thoroughly ground in a suitable mill, affording powders that can be used directly for seed treatment.

| Emulsifiable concentrate | |
|---|---|
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
|---|---|---|---|
| Active ingredients | 5% | 6% | 4% |
| Talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruder dranules | |
|---|---|
| Active ingredients | 15% |
| sodium lignosulfonate | 2% |
| carboxymethylcellulose | 1% |
| Kaolin | 82% |

The combination is mixed and ground with the adjuvants, and the mixture is moistened with water.
The mixture is extruded and then dried in a stream of air.

| Coated granules | |
|---|---|
| Active ingredients | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

Suspension Concentrate

| | |
|---|---|
| active ingredients | 40% |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Flowable Concentrate for Seed Treatment

| | |
|---|---|
| active ingredients | 40% |
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

Formulation types include an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP), a soluble granule (SG) or any technically feasible formulation in combination with agriculturally acceptable adjuvants.

PREPARATORY EXAMPLES

"Mp" means melting point in ° C. Free radicals represent methyl groups. $^1$H NMR measurements were recorded on a Brucker 400 MHz spectrometer, chemical shifts are given in ppm relevant to a TMS standard. Spectra measured in deuterated solvents as indicated. Either one of the LCMS methods below was used to characterize the compounds. The characteristic LCMS values obtained for each compound were the retention time ("Rt", recorded in minutes) and the measured molecular ion $(M+H)^+$.

LCMS Methods:
Method 1:
Spectra were recorded on a Mass Spectrometer from Agilent Technologies (6410 Triple Quadrupole mass spectrometer) equipped with an equipped with an electrospray source (Polarity: positive or negative ions, MS2 Scan, Capillary: 4.00 kV, Fragmentor: 100 V, Desolvatation Temperature: 350° C., Gas Flow: 11 L/min, Nebulizer Gas: 45 psi, Mass range: 110 to 1000 Da) and a 1200 Series HPLC from Agilent: quaternary pump, heated column compartment and diode-array detector. Column: KINETEX EVO C18, 2.6 µm, 50×4.6 mm, Temp: 40° C., DAD Wavelength range (nm): 210 to 400, Solvent Gradient: A=water+5% Acetonitrile+0.1% HCOOH, B=Acetonitrile+0.1% HCOOH: gradient: 0 min 0% B, 100% A; 0.9-1.8 min 100% B; Flow (mL/min) 1.8.

Method 2:
Spectra were recorded on a Mass Spectrometer from Waters (SQD Single quadrupole mass spectrometer) equipped with an electrospray source (Polarity: positive or negative ions, Full Scan, Capillary: 3.00 kV, Cone range: 41 V, Source Temperature: 150° C., Desolvation Temperature: 500° C., Cone Gas Flow: 50 L/Hr, Desolvation Gas Flow: 1000 L/Hr, Mass range: 110 to 800 Da) and a H-Class UPLC from Waters: Binary pump, heated column compartment and diode-array detector. Column: Waters UPLC HSS T3 C18, 1.8 µm, 30×2.1 mm, Temp: 40° C., DAD Wavelength range (nm): 210 to 400, Solvent Gradient: A=water+5% Acetonitrile+0.1% HCOOH, B=Acetonitrile+0.1% HCOOH: gradient: 0 min 10% B; 0.-0.2 min 10-50% B; 0.2-0.7 min 50-100% B; Flow (mL/min) 0.8.

Method 3:
Spectra were recorded on a Mass Spectrometer from Waters (SQD Single quadrupole mass spectrometer) equipped with an electrospray source (Polarity: positive or negative ions, Full Scan, Capillary: 3.00 kV, Cone range: 41 V, Source Temperature: 150° C., Desolvation Temperature: 500° C., Cone Gas Flow: 50 L/Hr, Desolvation Gas Flow: 1000 L/Hr, Mass range: 110 to 800 Da) and a H-Class UPLC from Waters: Binary pump, heated column compartment and diode-array detector. Column: Waters UPLC HSS T3 C18, 1.8 µm, 30×2.1 mm, Temp: 40° C., DAD Wavelength range (nm): 210 to 400, Solvent Gradient: A=water+5% Acetonitrile+0.1% HCOOH, B=Acetonitrile+0.05% HCOOH: gradient: 0 min 10% B; 0.-0.2 min 10-50% B; 0.2-0.7 min 50-100% B; 0.7-1.3 min 100% B; 1.3-1.4 min 100-10% B; 1.4-1.6 min 10% B; Flow (mL/min) 0.6.

Method 4:
Spectra were recorded on a Mass Spectrometer from Waters (ZQ Single quadrupole mass spectrometer) equipped with an electrospray source (Polarity: positive or negative ions, Capillary: 3.00 kV, Cone range: 30-60 V, Extractor: 2.00 V, Source Temperature: 150° C., Desolvation Temperature: 350° C., Cone Gas Flow: 0 L/Hr, Desolvation Gas Flow: 650 L/Hr, Mass range: 100 to 900 Da) and an Acquity UPLC from Waters: Binary pump, heated column compartment and diode-array detector. Solvent degasser, binary pump, heated column compartment and diode-array detector. Column: Waters UPLC HSS T3, 1.8 µm, 30×2.1 mm, Temp: 60° C., DAD Wavelength range (nm): 210 to 500, Solvent Gradient: A=water+5% MeOH+0.05% HCOOH, B=Acetonitrile+0.05% HCOOH: gradient: 0 min 0% B, 100% A; 1.2-1.5 min 100% B; Flow (ml/min) 0.85.

Example P1: Preparation of 2-(3-ethylsulfonyl-2-pyridyl)-6-(trifluoromethyl)-3H-pyrrolo[3,4-c]pyridin-1-one (Compound P1)

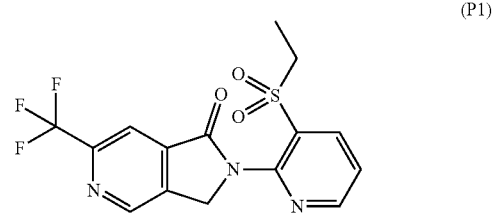 [SMILES: CCS(=O)(=O)c1cccnc1N1Cc2cnc(C(F)(F)F)cc2C1=O]

Step A1: Preparation of 5-chloro-2-(trifluoromethyl) pyridine-4-carboxylic Acid (Intermediate I1) and 2,2,6,6-tetramethylpiperidin-1-ium 5-chloro-2-(trifluoromethyl)pyridine-4-carboxylate (Intermediate I2)

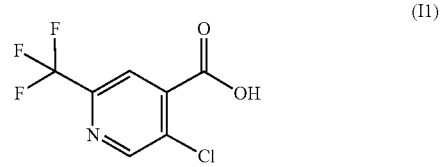

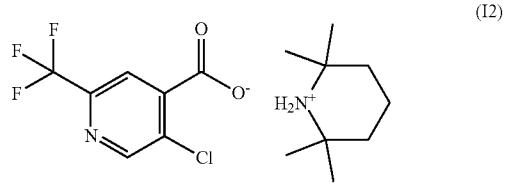

A 2.0 M butyllithium solution in tetrahydrofuran (165 mL, 330 mmol, 4.00 equiv.) was added dropwise to a −78° C. cooled solution of 2,2,6,6-tetramethylpiperidine (35.0 g, 248 mmol, 3.00 equiv.) in tetrahydrofuran (500 mL). After complete addition, the reaction mixture was stirred for 30 min at −50° C. and cooled again to −78° C. before adding a solution of 5-chloro-2-(trifluoromethyl)pyridine (15.0 g, 82.6 mmol) in tetrahydrofuran (100 mL). The reaction mixture was stirred for 30 min at −78° C. before being added via canula to a CO2 saturated solution of tetrahydrofuran cooled at −78° C. Once the addition was complete, the reaction mixture was warmed up to room temperature, and quenched by addition of a saturated ammonium chloride aqueous solution (200 mL). The aqueous phase was extracted twice with ethyl acetate (200 mL), the combined organic phases were dried over sodium sulfate, filtered and concentrated under reduced pressure to give 2,2,6,6-tetramethylpiperidin-1-ium 5-chloro-2-(trifluoromethyl)pyridine-4-carboxylate (Intermediate I2). The aqueous phase was acidified to pH 3 by addition of a 2 M hydrochloric acid aqueous solution and extracted twice with a 90/10 mixture of dichloromethane/methanol (200 mL). The combined organic phases were dried over sodium sulfate, filtered and concentrated under reduced pressure to give 5-chloro-2-(trifluoromethyl)pyridine-4-carboxylic acid (Intermediate I1). Both crude materials were used in the next step without further purification. LCMS (method 2): retention time 0.67 min, m/z 226/228 [M+H]$^+$. $^1$H NMR (400 MHz, DMSO-d$_6$) δ/ppm: 8.18 (s, 1H), 8.98 (s, 1H) (5-chloro-2-(trifluoromethyl)pyridine-4-carboxylic acid 11).

Step A2: Preparation of Ethyl 5-chloro-2-(trifluoromethyl)pyridine-4-carboxylate (Intermediate I3)

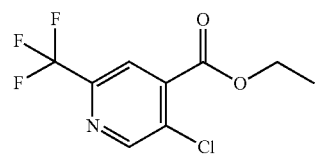

(I3)

A mixture of 5-chloro-2-(trifluoromethyl)pyridine-4-carboxylic acid (Intermediate I1) prepared as described above) (1.00 g, 4.43 mmol) and concentrated sulfuric acid (1.00 mL) in ethanol (30 mL) was heated at reflux overnight. After cooling down to room temperature, the reaction mixture was concentrated and the residue was diluted with iced water (50 mL). The aqueous phase was extracted twice with ethyl acetate (2*30 mL), the combined organic phases were washed with brine (30 mL), dried over sodium sulfate, filtered and concentrated. The crude material was purified by flash chromatography over silica gel (ethyl acetate in cyclohexane) to give the desired compound as a yellow liquid. LCMS (method 2): retention time 1.10 min, m/z 254/256 [M+H]$^+$. $^1$H NMR (400 MHz, CDCl$_3$) δ/ppm: 1.45 (t, J=7.12 Hz, 3H), 4.49 (q, J=7.12 Hz, 2H), 8.04 (s, 1H), 8.82 (s, 1H).

Step A3: Preparation of Ethyl 5-methyl-2-(trifluoromethyl)pyridine-4-carboxylate (Intermediate I4)

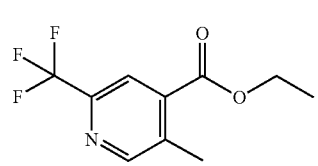

(I4)

Tripotassium phosphate (4.5 g, 21.3 mmol, 3.0 equiv.) and tricyclohexylphosphine (0.2 g, 0.71 mmol, 0.10 equiv.) were added to a mixture of ethyl 5-chloro-2-(trifluoromethyl)pyridine-4-carboxylate (Intermediate I3 prepared as described above) (1.8 g, 7.1 mmol) and methyl-boronic acid (1.3 g, 21.3 mmol, 3.0 equiv.) in toluene (50 mL) and water (5.0 mL). The mixture was purged with nitrogen for 10 min before adding palladium acetate (0.08 g, 0.035 mmol, 0.05 equiv.). Purging was continued for 10 min and the reaction mixture was heated at 100° C. for 2 hours. After cooling down to room temperature, the mixture was diluted with water (50 mL) and ethyl acetate (50 mL), and filtered over Celite (washed with ethyl acetate). The phases were separated, the aqueous phase was extracted with ethyl acetate, the combined organic phases were dried over sodium sulfate, filtered and concentrated. Purification of the crude material by flash chromatography over silica gel (ethyl acetate in cyclohexane) afforded the desired compound as a pale yellow liquid. LCMS (method 2): retention time 1.08 min, m/z 234 [M+H]$^+$. $^1$H NMR (400 MHz, CDCl$_3$) δ/ppm: 1.44 (t, J=7.16 Hz, 3H), 2.66 (s, 3H), 4.44 (q, J=7.16 Hz, 2H), 8.08 (s, 1H), 8.68 (s, 1H).

Step A4: Preparation of Ethyl 5-(bromomethyl)-2-(trifluoromethyl)pyridine-4-carboxylate (Intermediate

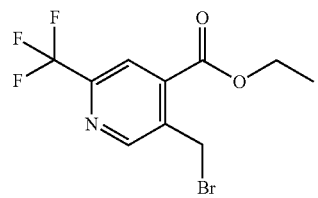

(I5)

N-bromosuccinimide (1.40 g, 7.80 mmol, 1.40 equiv.) and benzoyl peroxide (0.42 g, 1.70 mmol, 0.30 equiv.) were added to a solution of ethyl 5-methyl-2-(trifluoromethyl)pyridine-4-carboxylate (Intermediate I4 prepared as described above) (1.30 g, 5.60 mmol) in tetrachloromethane (45 mL). The reaction mixture was heated at 70° C. overnight. After cooling down to room temperature, the reaction mixture was diluted with iced water (20 mL), and the aqueous phase was extracted twice with ethyl acetate (10 mL). The combined organic phases were dried over sodium sulfate, filtered and concentrated. The crude material was purified by flash chromatography over silica gel (ethyl acetate in cyclohexane) to give the desired product. LCMS (method 2): retention time 1.12 min, m/z 312/314 [M+H]$^+$.

¹H NMR (400 MHz, CDCl₃) δ/ppm: 1.44 (t, J=7.15 Hz, 3H), 4.50 (q, J=7.15 Hz, 2H), 4.94 (s, 2H), 7.27 (s, 1H), 8.14 (s, 1H), 8.85 (s, 1H).

Step B1: Preparation of 3-ethylsulfonylpyridin-2-amine (Intermediate I6)

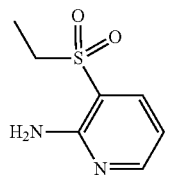
(I6)

A mixture of 3-ethylsulfonyl-2-fluoro-pyridine (CAS 2092522-98-8, prepared according to patent JP 2018076354) (0.6 g, 3.0 mmol) in a 7.0 M ammonia solution in methanol) (6.0 mL) in an autoclave vessel was heated at 70° C. for 4 hours. After cooling down to room temperature, the autoclave was set under normal pressure again, and the reaction mixture was concentrated under vacuum. The crude material was purified directly by flash chromatography over silica gel (methanol in dichloromethane) to afford the desired compound. LCMS (method 1): retention time 0.33 min, m/z 187 [M+H]⁺. ¹H NMR (400 MHz, CDCl₃) δ/ppm: 1.11 (t, J=7.34 Hz, 3H), 3.30 (q, J=7.34 Hz, 2H), 6.66-6.81 (m, 3H), 7.86 (dd, J₁=7.76, J₂=1.90 Hz, 1H), 8.27 (dd, J₁=4.71, J₂=1.90 Hz, 1H).

Step C₁: Preparation of Ethyl 5-[[(3-ethylsulfonyl-2-pyridyl)amino]methyl]-2-(trifluoromethyl)pyridine-4-carbamate (Intermediate I7) and 5-[[(3-ethylsulfonyl-2-pyridyl)amino]methyl]-2-(trifluoromethyl)pyridine-4-carboxylic Acid (Intermediate I8)

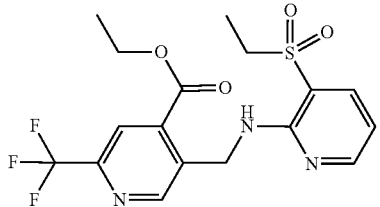
(I7)

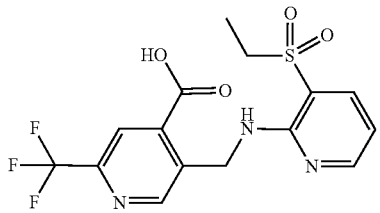
(I8)

Sodium hydride (60% mass, 64 mg, 1.61 mmol, 1.50 equiv.) was added to a 0° C. cooled solution of 3-ethylsulfonylpyridin-2-amine (Intermediate I6 prepared as described above) (200 mg, 1.07 mmol) in N,N-dimethylformamide (10 mL). After stirring for 15 min, a solution of ethyl 5-(bromomethyl)-2-(trifluoromethyl)pyridine-4-carboxylate (Intermediate I5 prepared as described above) (352 mg, 1.13 mmol, 1.05 equiv.) in N,N-dimethylformamide (0.5 mL) was added and the ice bath was removed. After 1 hour stirring at room temperature, the reaction mixture was quenched by addition of iced water (10 mL). The aqueous phase was extracted first twice with ethyl acetate (2×5 mL) and then once with a 90/10 dichloromethane/methanol mixture. The combined ethyl acetate extracts were dried over sodium sulfate, filtered and concentrated under reduced pressure. The crude material was purified by flash chromatography over silica gel (ethyl acetate in cyclohexane) to give the desired compound 17. The dichloromethane/methanol extract was dried over sodium sulfate, filtered and concentrated to give crude 5-[[(3-ethylsulfonyl-2-pyridyl)amino]methyl]-2-(trifluoromethyl)pyridine-4-carboxylic acid (Intermediate I8) which was used in step C₃ without further purification.

Step C₂: Preparation of 5-[[(3-ethylsulfonyl-2-pyridyl)amino]methyl]-2-(trifluoromethyl)pyridine-4-carboxylic Acid (Intermediate I8)

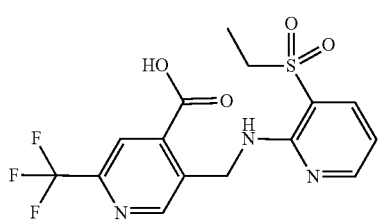
(I8)

Barium hydroxide (octahydrate) (91 mg, 0.29 mmol, 2.0 equiv.) was added at 0° C. to a suspension of ethyl 5-[[(3-ethylsulfonyl-2-pyridyl)amino]methyl]-2-(trifluoromethyl)pyridine-4-carboxylate (intermediate 17 prepared as described above) (60 mg, 0.143 mmol) in methanol (2.4 mL). After stirring at room temperature for 2 h, the reaction mixture was diluted with methanol (5.0 mL), filtered and concentrated under reduced pressure. The crude material was used in the next step without further purification. LCMS (method 1): retention time 1.31 min, m/z 390 [M+H]⁺.

Step C₃: Preparation of 2-(3-ethylsulfonyl-2-pyridyl)-6-(trifluoromethyl)-3H-pyrrolo[3,4-c]pyridin-1-one (Compound P1)

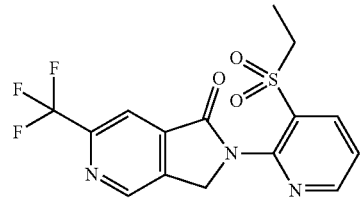
(P1)

Phosphorus oxychloride (0.16 mL, 2.0 equiv.) was added at 0° C. to a solution of 5-[[(3-ethylsulfonyl-2-pyridyl)amino]methyl]-2-(trifluoromethyl)pyridine-4-carboxylic acid (Intermediate I8 prepared as described above) (330 mg, 0.85 mmol) in pyridine (2 mL). After stirring for 1 h at 0° C., the reaction mixture was concentrated, the crude material was diluted with water (20 mL), and the aqueous phase was extracted twice with ethyl acetate (10 mL). The combined organic phases were dried over sodium sulfate, filtered and concentrated. Purification of the crude material by flash chromatography over silica gel (methanol in dichloromethane) afforded the desired compound. LCMS (method 2): retention time 0.91 min, m/z 372 [M+H]$^+$. $^1$H NMR (400 MHz, CDCl$_3$) δ/ppm: 1.39 (t, J=7.34 Hz, 3H), 3.52 (q, J=7.34 Hz, 2H), 5.20 (br s, 2H), 7.65 (dd, J$_1$=7.95 Hz, J$_2$=4.77 Hz, 1H), 8.21 (s, 1H), 8.47 (dd, J$_1$=7.95 Hz, J$_2$=1.83 Hz, 1H) 8.85 (dd, J, =4.77 Hz, J$_2$=1.83 Hz, 1H), 9.05 (s, 1H).

Example P2: Preparation of 2-[5-ethylsulfonyl-6-[1-oxo-6-(trifluoromethyl)-3H-pyrrolo[3,4-c]pyridin-2-yl]-3-pyridyl]-2-methyl-propanenitrile (Compound P2)

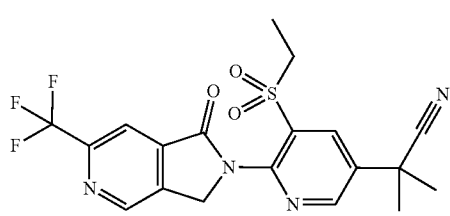

(P2)

Step A1: Preparation of Methyl 5-chloro-2-(trifluoromethyl)pyridine-4-carboxylate (Intermediate I9)

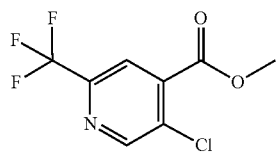

(I9)

A trimethylsilyl diazomethane solution (2.0 M in hexanes) (80 mL, 160 mmol, 2.0 equiv.) was added dropwise to a solution of 5-chloro-2-(trifluoromethyl)pyridine-4-carboxylic acid (Intermediate I1 prepared as described in step A1 of example P1) (18 g, 80 mmol) in methanol (200 mL) and toluene (200 mL) cooled at 0° C. After stirring for 1 hour at 0° C., the reaction mixture was evaporated to dryness and the crude material was purified by flash chromatography over silica gel (ethyl acetate in cyclohexane) to afford the desired product as a yellow liquid. LCMS (method 2): retention time 1.04 min, m/z 240/242 [M+H]$^+$. $^1$H NMR (400 MHz, CDCl$_3$) δ/ppm: 4.03 (s, 3H) 8.07 (s, 1H) 8.83 (s, 1H).

Step A2: Preparation of Methyl 5-methyl-2-(trifluoromethyl)pyridine-4-carboxylate (Intermediate I10)

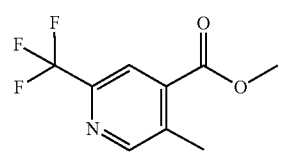

(I10)

According to procedure described in step A3 of example P1 by reaction of intermediate I9 (prepared as described above). LCMS (method 2): retention time 1.01 min, m/z 220 [M+H]$^+$.

Step A3: Preparation of Methyl 5-(bromomethyl)-2-(trifluoromethyl)pyridine-4-carboxylate (Intermediate I11)

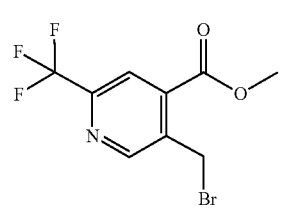

(I11)

According to procedure described in step A4 of example P1 by reaction of intermediate I10 (prepared as described above). LCMS (method 2): retention time 1.06 min, m/z 298/300 [M+H]$^+$. $^1$H NMR (400 MHz, CDCl$_3$) δ/ppm: 4.04 (s, 3H), 4.95 (s, 2H), 8.15 (s, 1H), 8.87 (s, 1H).

Step B1: Preparation of Both Tert-butyl N-[5-(1-cyano-1-methyl-ethyl)-3-ethylsulfanyl-2-pyridyl]carbamate (Intermediate I12) and 2-(6-amino-5-ethylsulfanyl-3-pyridyl)-2-methyl-propanenitrile (Intermediate I13)

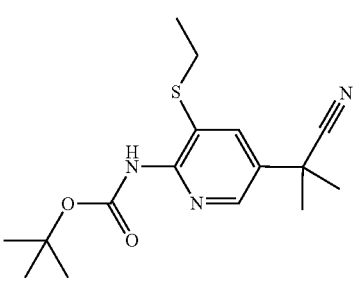

(I12)

and

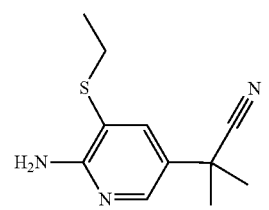

(I13)

Diphenylphosphoryl azide (0.88 mL, 4.0 mmol, 1.0 equiv.) was added to a mixture of 5-(1-cyano-1-methylethyl)-3-ethylsulfanyl-pyridine-2-carboxylic acid (CAS 2225113-81-3, prepared according to WO2018077565) (1.0 g, 4.0 mmol) in toluene (5.0 mL) with trimethylamine (0.56 mL, 4.0 mmol, 1.0 equiv.). After stirring for 30 min at room temperature, tert-butanol (0.76 mL, 8.0 mmol, 2.0 equiv.) was added, and the reaction mixture was heated at 90° C. After stirring for 4 hours, the reaction mixture was cooled down to room temperature, diluted with water (50 mL) and a saturated sodium hydrogenocarbonate aqueous solution (10 mL). The aqueous phase was extracted twice with ethyl acetate (20 mL), the combined organic layers were washed with brine (50 mL), dried over sodium sulfate, filtered and concentrated. Purification of the crude material afforded the desired compound 112, along with some intermediate I13 as well. $^1$H NMR (400 MHz, CDCl$_3$) δ/ppm: 1.26 (t, J=7.34 Hz, 3H), 1.71 (s, 6H), 2.82 (q, J=7.34 Hz, 2H) 5.18 (br s, 2H) 7.68 (d, J=2.51 Hz, 1H) 8.11 (d, J=2.51 Hz, 1H) for compound 113.

Step B2: Preparation of 2-(6-amino-5-ethylsulfanyl-3-pyridyl)-2-methyl-propanenitrile (Intermediate I13)

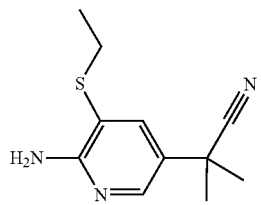

(I13)

2,2,2-trifluoroacetic acid (2.34 mL, 31.1 mmol, 10 equiv.) was added dropwise to a solution of tert-butyl N-[5-(1-cyano-1-methyl-ethyl)-3-ethylsulfanyl-2-pyridyl]carbamate (intermediate I12, prepared as described above) (1.00 g, 3.11 mmol) in dichloromethane (2.00 mL) at 0° C. After stirring for 5 hours at room temperature, the reaction mixture was poured over water (50 mL) and the pH was brought to 9 by addition of a saturated sodium hydrogenocarbonate solution. The aqueous phase was extracted twice with dichloromethane (25 mL), the combined organic phases were dried over sodium sulfate, filtered and concentrated. Purification of the crude material by flash chromatography over silica gel (ethyl acetate in cyclohexane) afforded the desired compound. LCMS (method 2): retention time 0.64 min, m/z 222 [M+H]$^+$.

Similarly, 1-(6-amino-5-ethylsulfanyl-3-pyridyl)cyclopropanecarbonitrile can be obtained from 5-(1-cyanocyclopropyl)-3-ethylsulfanyl-pyridine-2-carboxylic acid (CAS 2225113-77-7; WO18077565) by treatment with diphenylphosphoryl azide and 2,2,2-trifluoroacetic acid. LCMS (method 2): retention time 0.27 min, m/z 220 [M+H]$^+$. $^1$H NMR (400 MHz, CDCl$_3$) δ/ppm: 1.26 (t, J=7.4 Hz, 3H), 1.31 (m, 2H), 1.66 (m, 2H), 2.81 (q, J=7.4 Hz, 2H), 5.18 (br s, 2H), 7.56 (d, J=2.3 Hz, 1H), 7.97 (d, J=2.3 Hz, 1H).

Similarly, 3-ethylsulfanyl-5-(2-pyridyloxy)pyridin-2-amine can be obtained from 3-ethylsulfanyl-5-(2-pyridyloxy)pyridine-2-carboxylic acid (compound IP-6; preparation given below) by treatment with diphenylphosphoryl azide and 2,2,2-trifluoroacetic acid. LCMS (method 3): retention time 0.83 min, m/z 248 [M+H]$^+$. $^1$H NMR (400 MHz, CDCl$_3$) δ/ppm: 1.34 (t, J=7.3 Hz, 3H), 2.89 (q, J=7.3 Hz, 2H), 6.99 (d, J=8.2 Hz, 1H), 7.08 (m, 1H), 7.30 (br s, 2H), 7.71-7.78 (m, 2H), 7.81 (d, 1H), 8.13 (dd, J=4.9, 1.7 Hz, 1H).

Step B3: Preparation of 2-(6-amino-5-ethylsulfonyl-3-pyridyl)-2-methyl-propanenitrile (Intermediate I14)

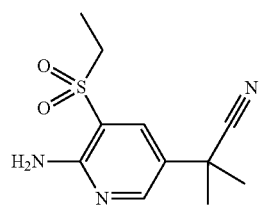

(I14)

3-Chloroperbenzoic acid (8.06 g, 32.7 mmol) was added to a solution of 2-(6-amino-5-ethylsulfanyl-3-pyridyl)-2-methyl-propanenitrile (intermediate I13, prepared as described above) (3.45 g, 15.6 mmol) in dichloromethane (100 mL) at 0° C. After stirring for 30 min at 0° C., the reaction mixture was quenched by addition of a 2 M sodium hydroxide solution, the aqueous phase was extracted twice with dichloromethane. The combined organic layers were washed with a saturated sodium thiosulfate solution, brine, dried over sodium sulfate and filtered, and concentrated under reduced pressure after controlling for any presence of remaining peroxides with a starch test. The crude material was purified by flash chromatography over silica gel (ethyl acetate in cyclohexane) to give the desired product. LCMS (method 2): retention time 0.85 min, m/z 254 [M+H]$^+$. $^1$H NMR (400 MHz, CDCl$_3$) δ/ppm: 1.31 (t, J=7.52 Hz, 3H), 1.74 (s, 6H). 3.19 (q, J=7.52 Hz, 2H), 5.92 (br s, 2H), 7.98 (d, J=2.51 Hz, 1H), 8.46 (d, J=2.51 Hz, 1H).

Similarly, 1-(6-amino-5-ethylsulfonyl-3-pyridyl)cyclopropanecarbonitrile can be obtained from 1-(6-amino-5-ethylsulfanyl-3-pyridyl)cyclopropanecarbonitrile. LCMS (method 3): retention time 0.73 min, m/z 252 [M+H]$^+$. $^1$H NMR (400 MHz, CDCl$_3$) δ/ppm: 1.32 (t, J=7.4 Hz, 3H), 1.35 (m, 2H), 1.75 (m, 2H), 3.18 (q, J=7.4 Hz, 2H), 5.89 (br s, 2H), 7.83 (d, J=2.5 Hz, 1H), 8.36 (d, J=2.5 Hz, 1H).

Data for 3-ethylsulfonyl-5-(2-pyridyloxy)pyridin-2-amine:

LCMS (method 3): retention time 0.92 min, m/z 280 [M+H]$^+$. $^1$H NMR (400 MHz, CDCl$_3$) δ/ppm: 1.34 (t, J=7.4 Hz, 3H), 3.24 (q, J=7.4 Hz, 2H), 5.77 (br s, 2H), 6.99 (d, J=8.3 Hz, 1H), 7.04 (m, 1H), 7.74 (m, 1H), 7.87 (d, J=2.7 Hz, 1H), 8.12 (dd, J=5.0, 1.2 Hz, 1H), 8.24 (d, J=2.7 Hz, 1H).

Step C₁: Preparation of Methyl 5-[[[5-(1-cyano-1-methyl-ethyl)-3-ethylsulfonyl-2-pyridyl]amino]methyl]-2-(trifluoromethyl)pyridine-4-carboxylate (Intermediate I15)

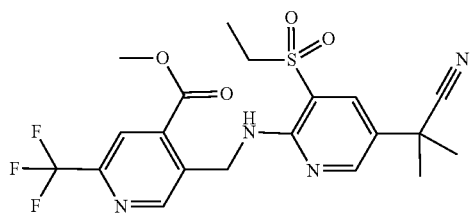

(I15)

According to procedure described in step C₁ of example P1 by reaction of intermediate I11 (prepared as described in step A3 above) and intermediate I14 (prepared as described in step B3 above). LCMS (method 2): retention time 1.13 min, m/z 471 [M+H]⁺.

Step C₂: Preparation of 5-[[[5-(1-cyano-1-methyl-ethyl)-3-ethylsulfonyl-2-pyridyl]amino]methyl]-2-(trifluoromethyl)pyridine-4-carboxylic Acid (Intermediate I16)

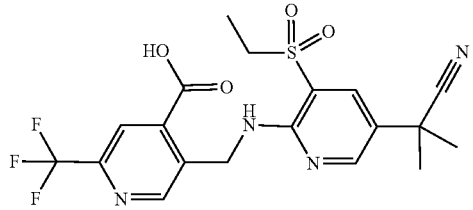

(I16)

According to procedure described in step C₂ of example P1 by reaction of intermediate I15 (prepared as described above). LCMS (method 2): retention time 1.02 min, m/z 457 [M+H]⁺.

Step C₃: Preparation of 2-[5-ethylsulfonyl-6-[1-oxo-6-(trifluoromethyl)-3H-pyrrolo[3,4-c]pyridin-2-yl]-3-pyridyl]-2-methyl-propanenitrile (Compound P2)

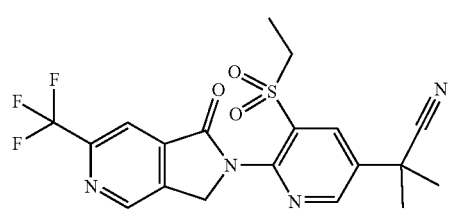

(P2)

According to procedure described in step C₃ of example P1 by reaction of intermediate I16 (prepared as described above). LCMS (method 2): retention time 1.00 min, m/z 439 [M+H]⁺. ¹H NMR (400 MHz, CDCl₃) δ/ppm: 1.41 (t, J=7.48 Hz, 3H), 1.88 (s, 6H), 3.56 (q, J=7.48 Hz, 2H), 5.20 (br s, 2H), 8.21 (s, 1H), 8.46 (d, J=2.57 Hz, 1H), 9.00 (d, J=2.57 Hz, 1H), 9.07 (s, 1H).

Example P3: Preparation of N-[5-ethylsulfonyl-6-[1-oxo-6-(trifluoromethyl)-3H-pyrrolo[3,4-c]pyridin-2-yl]-3-pyridyl]-N-methyl-acetamide (Compound P3))

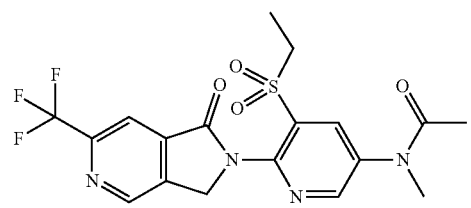

(P3)

Step A1: Preparation of 2,5-dibromo-3-ethylsulfanyl-pyridine (Intermediate I17)

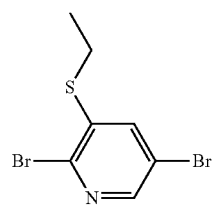

(I17)

A solution of 2,5-dibromopyridin-3-amine (CAS 90902-84-4) (8 g, 31.8 mmol) in 1,2-dichlorethane (200 mL) was added slowly over 90 min via a dropping funnel to a solution of diethyl sulfide (7.82 mL, 63.6 mmol, 2.00 equiv.) and tert-butyl nitrite (5.67 mL, 47.7 mmol, 1.50 equiv.) in 1,2-dichlorethane (60 mL) and dichloromethane (40 mL) already heated at 40° C. The reaction mixture was stirred at 40° C. for 1 hour after complete addition. After cooling down to room temperature, the reaction mixture was diluted with water (100 mL), and the aqueous phase was extracted twice with dichloromethane (100 mL). The combined organic phases were dried over sodium sulfate, filtered and concentrated. Purification of the crude material by flash chromatography over silica gel (ethyl acetate in cyclohexane) afforded the desired product. LCMS (method 2): retention time 1.16 min, m/z 296/298/300 [M+H]⁺. ¹H NMR (400 MHz, CDCl₃) δ/ppm: 1.44 (t, J=7.48 Hz, 3H), 2.98 (q, J=7.48 Hz, 2H), 7.52 (s, 1H), 8.19 (s, 1H).

Step A2: Preparation of 2,5-dibromo-3-ethylsulfonyl-pyridine (Intermediate I18)

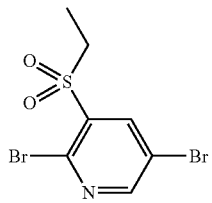
(I18)

According to procedure described in step B3 of example P2 by reaction of intermediate I17 (prepared as described above). LCMS (method 2): retention time 0.92 min, m/z 328/330/332 [M+H]$^+$.

Step A3: Preparation of 5-bromo-3-ethylsulfonyl-pyridin-2-amine (Intermediate I19)

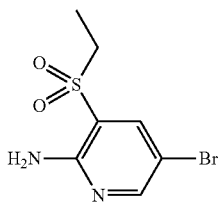
(I19)

According to procedure described in step B1 of example P1 by reaction of intermediate I17 (prepared as described above). LCMS (method 2): retention time 0.82 min, m/z 265/267 [M+H]$^+$. $^1$H NMR (400 MHz, DMSO-d$_6$) δ/ppm: 1.15 (t, J=7.34 Hz, 3H), 3.33 (q, 2H, hidden under H$_2$O peak exchange in DMSO), 5.75 (s, 1H) 6.95 (br s, 2H) 7.93 (d, J=2.32 Hz, 1H) 8.37 (d, J=2.45 Hz, 1H).

Step B1: Preparation of methyl 5-[[(5-bromo-3-ethylsulfonyl-2-pyridyl)amino]methyl]-2-(trifluoromethyl)pyridine-4-carboxylate (Intermediate I20)

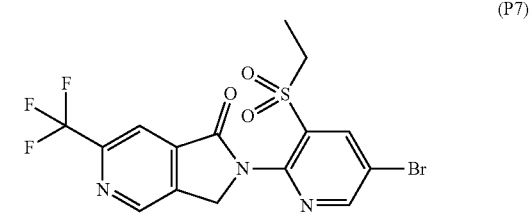
(I20)

According to procedure described in step C$_1$ of example P1 by reaction of intermediate I11 (prepared as described in step A3 of example P2) and intermediate I19 (prepared in step A3 above). LCMS (method 2): retention time 1.20 min, m/z 482/484 [M+H]$^+$.

Step B2: Preparation of 5-[[(5-bromo-3-ethylsulfonyl-2-pyridyl)amino]methyl]-2-(trifluoromethyl)pyridine-4-carboxylic Acid (Intermediate I21)

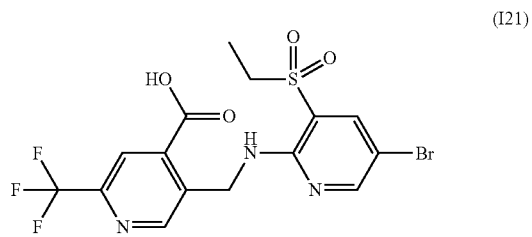 [SMILES: CCS(=O)(=O)c1cc(Br)cnc1NCc1cnc(C(F)(F)F)cc1C(=O)O]
(I21)

According to procedure described in step C$_2$ of example P1 by reaction of intermediate I20 (Prepared as described above). LCMS (method 2): retention time 1.07 min, m/z 468/470 [M+H]$^+$.

Step B3: Preparation of 2-(5-bromo-3-ethylsulfonyl-2-pyridyl)-6-(trifluoromethyl)-3H-pyrrolo[3,4-c]pyridin-1-one (Compound P7)

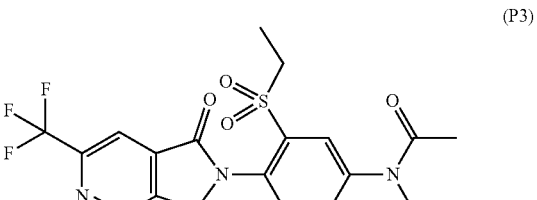
(P7)

According to procedure described in step C$_3$ of example P1 by reaction of intermediate I21 (prepared as described above). LCMS (method 2): retention time 1.07 min, m/z 450/452 [M+H]$^+$. $^1$H NMR (400 MHz, CDCl$_3$) δ/ppm: 1.41 (t, J=7.42 Hz, 3H), 3.55 (q, J=7.42 Hz, 2H), 5.17 (br s, 2H), 8.20 (s, 1H), 8.56 (d, J=2.32 Hz, 1H), 8.87 (d, J=2.32 Hz, 1H), 9.06 (s, 1H).

Step B4: Preparation of N-[5-ethylsulfonyl-6-[1-oxo-6-(trifluoromethyl)-3H-pyrrolo[3,4-c]pyridin-2-yl]-3-pyridyl]-N-methyl-acetamide (Compound P3)

(P3)

Cesium carbonate (213 mg, 0.65 mmol, 1.40 equiv.) and Xantphos (38 mg, 0.065 mmol, 0.14 equiv.) were added to a solution of 2-(5-bromo-3-ethylsulfonyl-2-pyridyl)-6-(trifluoromethyl)-3H-pyrrolo[3,4-c]pyridin-1-one (210 mg, 0.47 mmol) (intermediate I22 prepared as described above) in dioxane (10 mL) in a microwave vial. After degassing with nitrogen for 5 min, tris(dibenzylideneacetone)dipalladium (8.5 mg, 0.01 mmol, 0.02 equiv.) was added and the mixture degassed further for 5 min before adding N-methyl acetamide (0.108 mL, 1.40 mmol, 0.3.00 equiv.). The vial was sealed and transferred to microwave, to be heated at 160° C. for 1 hour under microwave irradiation. After cooling down, the mixture was diluted with water (10 mL), and ethyl acetate (10 mL) and filtered over Celite. The organic phase was dried over sodium sulfate, filtered and concentrated. Purification of the crude material by flash chromatography over silica gel (methanol in dichloromethane) afforded the desired compound. LCMS (method 2): retention time 0.92 min, m/z 443 [M+H]$^+$.

Example P6: Preparation of 1-[5-ethylsulfonyl-6-[1-oxo-6-(trifluoromethyl)-3H-pyrrolo[3,4-c]pyridin-2-yl]-2-pyridyl]-1,3-dimethyl-urea (P6)

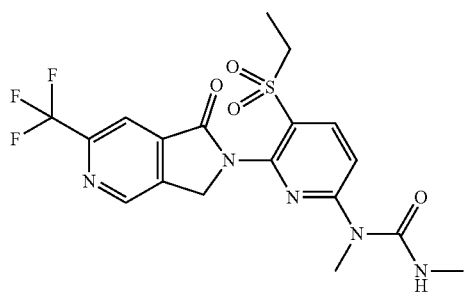
(P6)

Step A1: Preparation of 6-chloro-3-ethylsulfonyl-pyridin-2-amine (Intermediate I22)

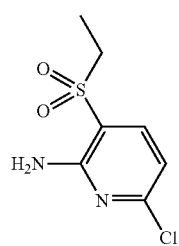
(I22)

2-Bromo-6-chloro-3-ethylsulfonyl-pyridine (CAS 2118896-18-5, WO 2017134066 A1) (4.0 g, 14 mmol) and ammonia in dioxane (50 mL, 30 mmol, 0.5 mol/L) were added to a miniclave vessel and heated at 100° C. for 5 h. Reaction mixture was poured into water (50 mL) and extracted with ethylacetate (3×50 mL). Combined organic layers were dried over sodium sulfate, filtered and concentrated under reduced pressure. Crude product was purified by combiflash (50% ethyl acetate/cyclohexane) to afford 6-chloro-3-ethylsulfonyl-pyridin-2-amine. LCMS (method 2): retention time 0.85 min, m/z 221/223 [M+H]$^+$. $^1$H NMR (400 MHz, CDCl$_3$) δ/ppm: 1.31 (t, 3H) 3.16 (q, 2H) 5.99 (br s, 2H) 6.79 (d, 1H) 7.89 (d, 1H).

Step B1: Preparation of Methyl 5-[[(6-chloro-3-ethylsulfonyl-2-pyridyl)amino]methyl]-2-(trifluoromethyl)pyridine-4-carboxylate (Intermediate I23)

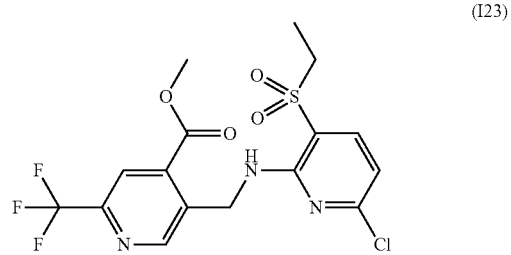 [SMILES: CCS(=O)(=O)c1ccc(Cl)nc1NCc1cnc(C(F)(F)F)cc1C(=O)OC]
(I23)

According to procedure described in step C$_1$ of example P1 by reaction of intermediate I11 (prepared as described in step A3 of example P2) and intermediate I22 (prepared in step A1 above). LCMS (method 2): retention time 1.14 min, m/z 438/440 [M+H]$^+$.

Step B2: Preparation of 5-[[(6-chloro-3-ethylsulfonyl-2-pyridyl)amino]methyl]-2-(trifluoromethyl)pyridine-4-carboxylic Acid (Intermediate I24)

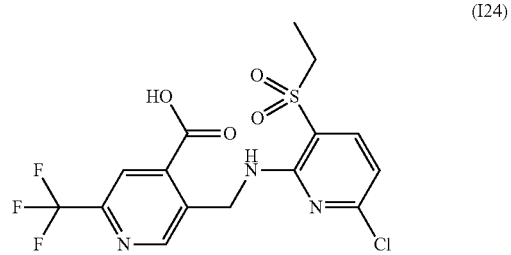 [SMILES: CCS(=O)(=O)c1ccc(Cl)nc1NCc1cnc(C(F)(F)F)cc1C(=O)O]
(I24)

According to procedure described in step C$_2$ of example P1 by reaction of intermediate I23 (prepared as described above). LCMS (method 2): retention time 1.06 min, m/z 424/426 [M+H]$^+$.

Step B3: Preparation of 2-(6-chloro-3-ethylsulfonyl-2-pyridyl)-6-(trifluoromethyl)-3H-pyrrolo[3,4-c]pyridin-1-one (Intermediate I25)

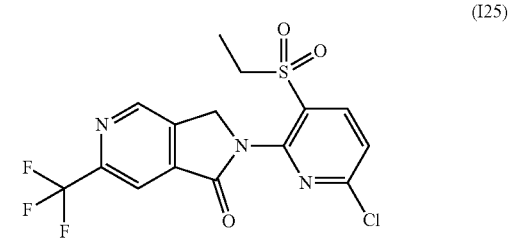 [SMILES: CCS(=O)(=O)c1ccc(Cl)nc1N1Cc2cnc(C(F)(F)F)cc2C1=O]
(I25)

According to procedure described in step C$_3$ of example P1 by reaction of intermediate I24 (prepared as described above). LCMS (method 2): retention time 1.03 min, m/z 406/408 [M+H]$^+$.

Step B4: Preparation of 2-[3-ethylsulfonyl-6-(methylamino)-2-pyridyl]-6-(trifluoromethyl)-3H-pyrrolo[3,4-c]pyridin-1-one (Compound P4)

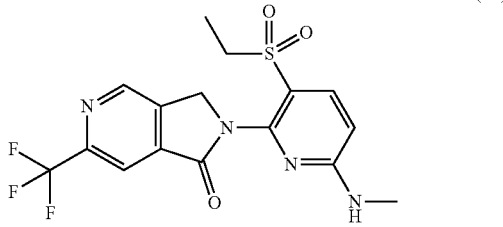

(P4)

2-(6-Chloro-3-ethylsulfonyl-2-pyridyl)-6-(trifluoromethyl)-3H-pyrrolo[3,4-c]pyridin-1-one (80 mg, 0.1971 mmol) and methylamine (2.0 mL, 2 mol/mL) were added to a 25 mL round bottom flask and reaction mixture was left stirring at room temperature for 2 h. Additional methylamine (1 mL, 2 mol/mL) was added to the above reaction mixture and reaction mixture was stirred for additional 2 h. The reaction mixture was then concentrated under vacuum and the residue was purified by column chromatography (1-3% MeOH/dichloromethane) to give 2-[3-ethylsulfonyl-6-(methylamino)-2-pyridyl]-6-(trifluoromethyl)-3H-pyrrolo[3,4-c]pyridin-1-one. LCMS (method 1): retention time 1.24 min, m/z 401 [M+H]$^+$. $^1$H NMR (400 MHz, CDCl$_3$) δ/ppm 1.24-1.38 (m, 3H) 3.01 (d, J=5.01 Hz, 3H) 3.39 (m, J=6.85 Hz, 2H) 5.10 (br s, 2H) 5.23 (m, 1H) 6.53 (d, J=8.80 Hz, 1H) 8.04 (br d, J=8.93 Hz, 1H) 8.19 (s, 1H) 9.01 (s, 1H).

Step B5: Preparation of phenyl N-[5-ethylsulfonyl-6-[1-oxo-6-(trifluoromethyl)-3H-pyrrolo[3,4-c]pyridin-2-yl]-2-pyridyl]-N-methyl-carbamate (I26)

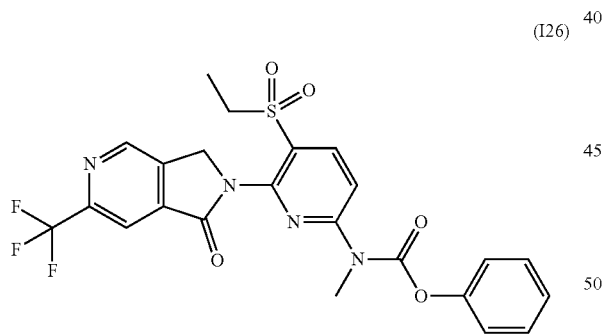

(I26)

To solution of 5-ethylsulfonyl-N-methyl-6-[3-methyl-6-(trifluoromethyl)imidazo[4,5-c]pyridin-2-yl]pyridin-2-amine (75 mg, 0.18 mmol) in acetonitrile (1.0 mL) at 0° C. were added anhydrous pyridine (0.14 mL, 0.18 mmol) and phenyl chloroformate (31 mg, 0.18 mmol). Reaction mixture was stirred at room temperature overnight and then additional pyridine (0.14 mL, 0.18 mmol) and phenyl chloroformate (31 mg, 0.18 mmol) were added and reaction mixture was heated at 50° C. overnight. Additional equivalents of pyridine (0.14 mL, 0.18 mmol) and phenyl chloroformate (31 mg, 0.18 mmol) were added and reaction mixture was heated at 80° C. for 3 h. Reaction mixture was concentrated under vacuum and adsorbed directly on silica-gel and purified using combi-flash silica-gel (30-40% ethyl acetate in cyclohexane) to give phenyl N-[5-ethylsulfonyl-6-[1-oxo-6-(trifluoromethyl)-3H-pyrrolo[3,4-c]pyridin-2-yl]-2-pyridyl]-N-methyl-carbamate (I26). LCMS (method 2): retention time 1.14 min, 521 [M+H]$^+$.

Step B6: Preparation of 1-[5-ethylsulfonyl-6-[1-oxo-6-(trifluoromethyl)-3H-pyrrolo[3,4-c]pyridin-2-yl]-2-pyridyl]-1,3-dimethyl-urea (P6)

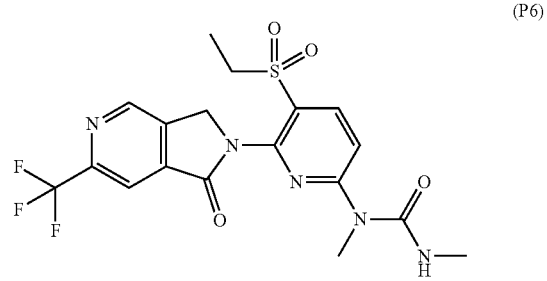 [SMILES: CCS(=O)(=O)c1ccc(N(C)C(=O)NC)nc1N1Cc2cnc(C(F)(F)F)cc2C1=O]

(P6)

A solution of phenyl N-[5-ethylsulfonyl-6-[1-oxo-6-(trifluoromethyl)-3H-pyrrolo[3,4-c]pyridin-2-yl]-2-pyridyl]-N-methyl-carbamate (80 mg, 0.15 mmol) in anhydrous methylamine (3 mL, 0.006 mmol, 2 mmol/L) was heated at 100° C. for 1 h under microwave irradiation. Reaction mixture was then concentrated under vacuum, adsorbed directly on silica-gel and purified using combi-flash silica-gel (gradient 2-5% MeOH/dichloromethane) to afford 1-[5-ethylsulfonyl-6-[1-oxo-6-(trifluoromethyl)-3H-pyrrolo[3,4-c]pyridin-2-yl]-2-pyridyl]-1,3-dimethyl-urea (P6). LCMS (method 2): retention time 0.93 min, 458 [M+H]$^+$. $^1$H NMR (400 MHz, CDCl$_3$) δ/ppm: 1.31-1.40 (m, 3H), 2.90 (d, J=4.65 Hz, 3H), 3.40 (q, J=7.34 Hz, 2H), 3.52 (s, 3H), 5.12 (s, 2H), 7.30-7.35 (m, 1H), 8.23 (s, 1H), 8.35 (d, J=8.93 Hz, 1H), 8.66 (br s, 1H), 9.07 (s, 1H).

Example P23: Preparation of 2-(3-ethylsulfonyl-2-pyridyl)-6-(trifluoromethylsulfonyl)isoindolin-1-one (Compound P23)

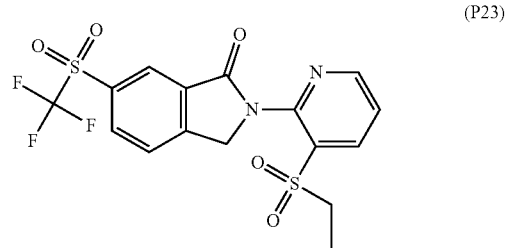 [SMILES: CCS(=O)(=O)c1cccnc1N1Cc2ccc(S(=O)(=O)C(F)(F)F)cc2C1=O]

(P23)

Step 1: Preparation of 2-bromo-4-(trifluoromethylsulfanyl)aniline (Intermediate I-1)

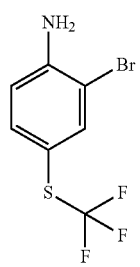

(I-1)

To a solution of 4-(trifluoromethylsulfanyl)aniline (0.50 g, 2.6 mmol) in N,N-dimethylformamide (2 mL) was added at 10° C. a solution of N-bromosuccinimide (0.42 g, 2.3 mmol) in N,N-dimethylformamide (2 mL). The reaction mixture was stirred at room temperature for 2 hours. It was then diluted with water and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (0.55 g). LCMS (method 1): retention time 1.56 min, m/z 271.8 [M+H]$^+$. $^1$H NMR (400 MHz, CDCl$_3$) δ ppm: 6.76 (d, 1H), 7.36-7.41 (m, 1H), 7.71 (d, 1H).

Step 2: Preparation of methyl 2-amino-5-(trifluoromethylsulfanyl)benzoate (Intermediate I-2)

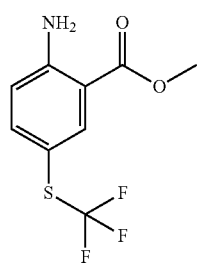

(I-2)

In an autoclave were charged 2-bromo-4-(trifluoromethylsulfanyl)aniline (intermediate I-1 prepared as described above, 4.0 g, 15 mmol), trimethylamine (4.1 mL, 29 mmol), 1,1'-bis(diphenylphosphino) ferrocene-palladium(ii)dichloride dichloromethane complex (2.5 g, 2.9 mmol), followed by methanol (40 mL) and N,N-dimethylformamide (20 mL). The reactor was closed and flushed three times with carbon monoxide. The reaction mixture was then heated up to 80° C. and stirred 6 hours under at 10 bar carbon monoxide atmosphere. After cooling down at room temperature, the reaction mixture was diluted with brine and extracted with ethyl acetate. The combined organic layers were dried over sodium sulfate, filtered and concentrated under reduced pressure. Purification of the crude material by flash chromatography over silica gel (ethyl acetate in cyclohexane) afforded the desired product (2.0 g). LCMS (method 2): retention time 1.13 min, m/z 252 [M+H]$^+$. $^1$H NMR (400 MHz, CDCl$_3$) δ ppm: 3.91 (s, 3H), 6.65-6.71 (m, 1H), 7.49 (dd, J=8.56, 2.20 Hz, 1H), 8.17 (m, 1H).

Step 3: Preparation of Methyl 2-bromo-5-(trifluoromethylsulfanyl)benzoate (Intermediate I-3)

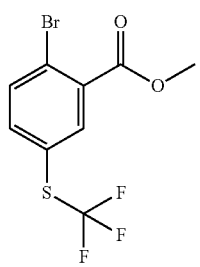

(I-3)

To a solution of methyl 2-amino-5-(trifluoromethylsulfanyl)benzoate (intermediate I-2 prepared as described above, 6.5 g, 26 mmol) in hydrobromic acid (48% in water, 65 mL) was added dropwise at 0° C. a solution of sodium nitrite (3.6 g, 52 mmol) in water (20 mL). The reaction mixture was stirred at 0° C. for 30 minutes, before copper(I) bromide (6.6 g, 46 mmol) was added. The reaction mixture was stirred for additional 30 minutes at 0° C., and then at room temperature overnight. The reaction mixture was diluted with water and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (5.9 g). $^1$H NMR (400 MHz, CDCl$_3$) δ ppm: 3.97 (s, 3H), 7.61 (dd, J=8.38, 2.26 Hz, 1H), 7.75 (d, J=8.31 Hz, 1H), 8.08 (d, J=2.20 Hz, 1H).

Step 4: Preparation of methyl 2-methyl-5-(trifluoromethylsulfanyl)benzoate (Intermediate I-4)

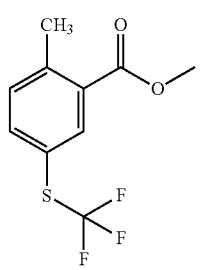

(I-4)

In a flask were charged methyl 2-bromo-5-(trifluoromethylsulfanyl)benzoate (intermediate I-3 prepared as described above, 6.3 g, 20 mmol), methylboronic acid (3.7 g, 60 mmol), tripotassium phosphate (13 g, 60 mmol), tricyclohexylphosphane (0.56 g, 2.0 mmol), followed by toluene (76 mL) and water (13 mL). The flask was purged with nitrogen for 10 minutes, before adding palladium(II) acetate (0.22 g, 1.0 mmol) and continuing purging for additional 10 minutes. The reaction mixture was heated up to 95° C. and stirred for 16 hours. The reaction mixture was quenched with water and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (3.9 g, 16 mmol). $^1$H NMR (400 MHz, CDCl$_3$) δ ppm: 2.65 (s, 3H), 3.93 (s, 3H), 7.27 (s, 1H), 7.32 (s, 1H), 7.68 (d, J=7.90 Hz, 1H), 8.18-8.24 (m, 1H).

Step 5: Preparation of Methyl 2-methyl-5-(trifluoromethylsulfonyl)benzoate (Intermediate I-5)

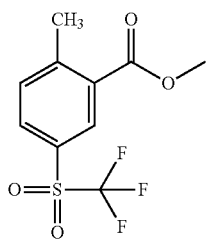

(I-5)

To a solution of methyl 2-methyl-5-(trifluoromethylsulfanyl)benzoate (intermediate I-4 prepared as described above, 3.9 g, 16 mmol) in dichloromethane (78 mL) was added at 0° C. 3-chloroperbenzoic acid (19 g, 78 mmol). The reaction mixture was stirred at room temperature for 2 hours. The reaction mixture was quenched at 0° C. with 2M sodium hydroxide solution and extracted twice with dichloromethane. The combined organic layers were washed with water and brine, dried over sodium sulfate, filtered and concentrated under reduced pressure. Purification of the crude material by flash chromatography over silica gel (100% cyclohexane) afforded the desired product (2.7 g). $^1$H NMR (400 MHz, CDCl$_3$) δ ppm: 2.78 (s, 3H), 3.97 (s, 3H), 7.58 (d, J=8.07 Hz, 1H), 8.04 (dd, J=8.13, 2.02 Hz, 1H), 8.57 (d, J=1.96 Hz, 1H).

Step 6: Preparation of Methyl 2-(bromomethyl)-5-(trifluoromethylsulfonyl)benzoate (Intermediate I-6)

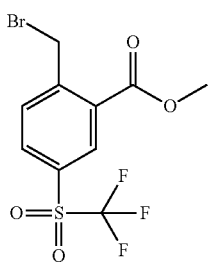

(I-6)

To a solution of methyl 2-methyl-5-(trifluoromethylsulfonyl)benzoate (intermediate I-5 prepared as described above, 2.7 g, 9.6 mmol) in tetrachloromethane (77 mL) were added at room temperature N-bromosuccinimide (2.4 g, 13 mmol) and benzoyl peroxide (0.83 g, 2.4 mmol). The reaction mixture was heated up to 60° C. and stirred for 16 hours. After cooling down to room temperature, the reaction mixture was diluted with ice cold water and extracted three times with dichloromethane. The combined organic layers were washed with brine, dried over sodium sulfate, filtered and concentrated under reduced pressure. Purification of the crude material by flash chromatography over silica gel (ethyl acetate in cyclohexane) afforded the desired product (1.0 g). $^1$H NMR (400 MHz, CDCl$_3$) δ ppm: 4.02 (s, 3H), 5.03 (s, 3H), 7.83 (d, J=8.19 Hz, 1H), 8.15 (dd, J=8.19, 1.96 Hz, 1H), 8.62 (d, J=1.96 Hz, 1H).

Step 7: Preparation of Tert-butyl N-(3-ethylsulfonyl-2-pyridyl)carbamate (Intermediate I-7)

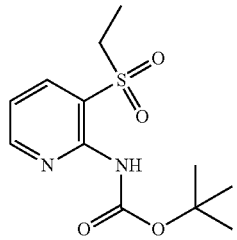

(I-7)

To a solution of 3-ethylsulfonylpyridin-2-amine (0.60 g, 3.2 mmol) in N,N-dimethylformamide (6 mL) was added at 0° C. sodium hydride (60%, 0.23 g, 5.8 mmol). The reaction mixture was stirred at this temperature for 30 minutes. To this mixture was added at 0° C. a solution of tert-butoxycarbonyl tert-butyl carbonate (0.84 g, 3.9 mmol) in N,N-dimethylformamide (3 mL). The reaction mixture was stirred at room temperature for 2 hours. The reaction mixture was diluted with ammonium chloride sat. aq. and extracted three times with ethyl acetate. The combined organic layers were dried over sodium sulfate, filtered and concentrated under reduced pressure. Purification of the crude material by flash chromatography over silica gel (dichloromethane in ethyl acetate) afforded the desired product (0.50 g). LCMS (method 2): retention time 0.91 min, m/z 231 [M-56]+. $^1$H NMR (400 MHz, CDCl$_3$) δ ppm: 1.31 (t, 3H), 1.57 (s, 9H), 3.20 (q, 2H), 7.17 (dd, 1H), 8.16 (dd, 1H), 8.72 (dd, 1H), 8.96 (br s, 1H).

Step 8: Preparation of Methyl 2-[[tert-butoxycarbonyl-(3-ethylsulfonyl-2-pyridyl)amino]methyl]-5-(trifluoromethylsulfonyl)benzoate (Intermediate I-8)

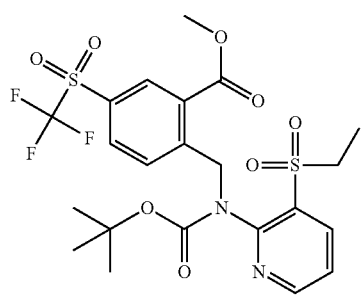

(I-8)

To a solution of tert-butyl N-(3-ethylsulfonyl-2-pyridyl)carbamate (intermediate I-7 prepared as described above, 0.40 g, 1.4 mmol) in N,N-dimethylformamide (8 mL) was added at 0° C. sodium hydride (60%, 73 mg, 1.8 mmol). The reaction mixture was stirred at this temperature for 30 minutes. To this mixture was added at 0° C. a solution of methyl 2-(bromomethyl)-5-(trifluoromethyl-sulfonyl)benzoate (intermediate I-6 prepared as described above, 0.66 g, 1.8 mmol) in N,N-dimethylformamide (2 mL). The reaction mixture was stirred at 10° C. for 1 hour. The reaction mixture was diluted with water and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (0.35 g). LCMS (method 1): retention time 1.59 min, m/z 510 [M−56]$^+$. $^1$H NMR (400 MHz, CDCl$_3$) δ ppm: 1.28 (s, 9H), 1.38 (t, 3H), 3.50 (q, 2H), 3.94 (s, 3H), 5.02 (br d, 1H), 5.76 (m, 1H), 7.47 (br d, 1H), 8.18 (dd, 1H), 8.38 (m, 1H), 8.49 (br d, 1H), 8.58 (m, 1H), 8.67 (dd, 1H).

Step 9: Preparation of methyl 2-[[(3-ethylsulfonyl-2-pyridyl)amino]methyl]-5-(trifluoromethylsulfonyl)benzoate (Intermediate I-9)

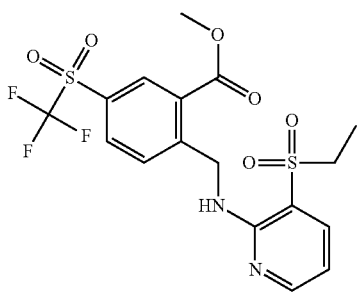

(I-9)

To a solution of methyl 2-[[tert-butoxycarbonyl-(3-ethylsulfonyl-2-pyridyl)amino]methyl]-5-(trifluoromethylsulfonyl)benzoate (intermediate I-8 prepared as described above, 0.32 g, 0.56 mmol) in dichloromethane (4 mL) was added trifluoroacetic acid (0.17 mL, 5.6 mmol). The reaction mixture was stirred at room temperature for 5 hours. It was then concentrated under reduced pressure and coevaporated with toluene to afford the crude desired product as which was used without further purification. LCMS (method 1): retention time 1.57 min, m/z 467 [M+H]$^+$.

Step 10: Preparation of 2-[[(3-ethylsulfonyl-2-pyridyl)amino]methyl]-5-(trifluoromethylsulfonyl)benzoic Acid (Intermediate I-10)

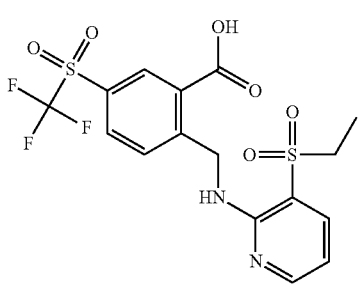

(I-10)

To a solution of crude methyl 2-[[(3-ethylsulfonyl-2-pyridyl)amino]methyl]-5-(trifluoromethyl-sulfonyl)benzoate (intermediate I-9 prepared as described above, 0.25 g, 0.54 mmol) in methanol (5 mL) and water (2.5 mL) was added dihydroxybarium octahydrate (0.34 g, 1.1 mmol). The reaction mixture was stirred at room temperature for 3 hours. It was then acidified with 2N hydrochloric acid and extracted three times with ethyl acetate. The combined organic layers were dried over sodium sulfate, filtered and concentrated under reduced pressure to afford the crude desired product which was used without further purification. LCMS (method 1): retention time 1.39 min, m/z 453 [M+H]$^+$.

Step 11: Preparation of 2-(3-ethylsulfonyl-2-pyridyl)-6-(trifluoromethylsulfonyl)isoindolin-1-one (Compound P23)

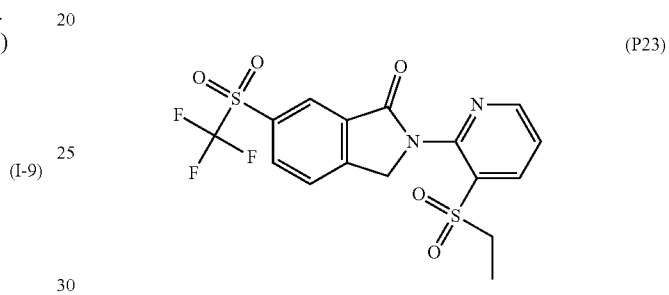

(P23)

To a solution of crude 2-[[(3-ethylsulfonyl-2-pyridyl)amino]methyl]-5-(trifluoromethylsulfonyl)benzoic acid (intermediate I-10 prepared as described above, 0.25 g, 0.54 mmol) in pyridine (3 mL) was added at 0° C. phosphorus oxychloride (0.11 mL, 1.1 mmol, 2.0 equiv.). The reaction mixture was stirred at this temperature for 1 hour. It was then acidified with 2N hydrochloric acid and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (0.10 g) as a solid, mp 202-204° C. LCMS (method 2): retention time 0.99 min, m/z 435 [M+H]$^+$. $^1$H NMR (400 MHz, CDCl$_3$) δ ppm: 1.39 (t, 3H), 3.55 (q, 2H), 5.19 (br s, 2H), 7.64 (dd, 1H), 7.88 (d, 1H), 8.31 (dd, 1H), 8.47 (dd, 1H), 8.61 (s, 1H), 8.84 (dd, 1H).

Example P25: Preparation of 1-[5-ethylsulfonyl-6-[1-oxo-6-(trifluoromethoxy)isoindolin-2-yl]-3-pyridyl]cyclopropanecarbonitrile (Compound P25)

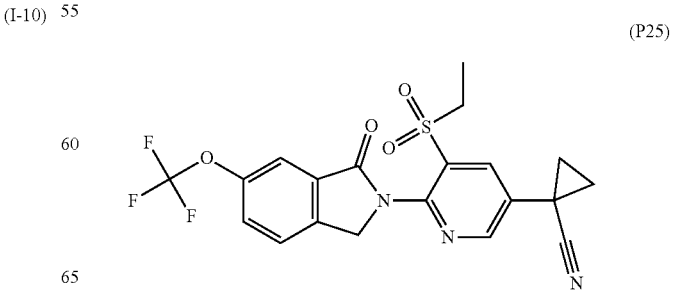

(P25)

Step 1: Preparation of Methyl 2-amino-5-(trifluoromethoxy)benzoate (Intermediate II-1)

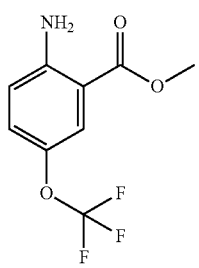

(II-1)

To a solution of 2-amino-5-(trifluoromethoxy)benzoic acid (5.0 g, 23 mmol) in N,N-dimethylformamide (50 mL) were added at room temperature potassium carbonate (6.3 g, 45 mmol) and iodomethane (1.4 mL, 23 mmol). The reaction mixture was stirred overnight at room temperature. It was then quenched with water and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (4.0 g). LCMS (method 2): retention time 1.08 min, m/z 236 [M+H]$^+$. $^1$H NMR (400 MHz, CDCl$_3$) δ ppm: 3.89 (s, 3H), 5.80 (br s, 2H), 6.66 (d, 1H), 7.15 (ddt, 1H), 7.73 (d, 1H).

Step 2: Preparation of Methyl 2-bromo-5-(trifluoromethoxy)benzoate (Intermediate II-2)

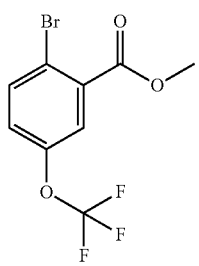

(II-2)

To a solution of methyl 2-amino-5-(trifluoromethoxy)benzoate (intermediate II-1 prepared as described above, 7.3 g, 31 mmol) in hydrobromic acid (48% in water, 73 mL) was added dropwise at 0° C. a solution of sodium nitrite (4.3 g, 62 mmol) in water (22 mL). The reaction mixture was stirred at 0° C. for 30 minutes, before copper(I) bromide (8.0 g, 56 mmol) was added. The reaction mixture was stirred for additional 30 minutes at 0° C., and then at room temperature for 5 hours. The reaction mixture was diluted with water and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (5.3 g). $^1$H NMR (400 MHz, CDCl$_3$) δ ppm: 3.96 (s, 3H), 7.22 (m, 1H), 7.66-7.73 (m, 2H).

Step 3: Preparation of Methyl 2-methyl-5-(trifluoromethoxy)benzoate (Intermediate II-3)

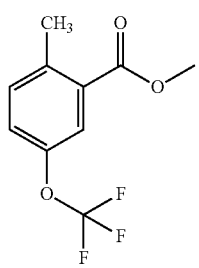

(II-3)

In a flask were charged methyl 2-bromo-5-(trifluoromethoxy)benzoate (intermediate II-2 prepared as described above, 5.3 g, 18 mmol), methylboronic acid (3.3 g, 53 mmol), tripotassium phosphate (11 g, 53 mmol), tricyclohexylphosphane (0.50 g, 1.8 mmol), followed by toluene (64 mL) and water (11 mL). The flask was purged with nitrogen for 10 minutes, before adding palladium(II) acetate (0.20 g, 0.89 mmol) and continuing purging for additional 10 minutes. The reaction mixture was heated up to 100° C. and stirred for 3 hours. The reaction mixture was quenched with water and extracted three times with ethyl acetate. The combined organic layers were dried over sodium sulfate, filtered and concentrated under reduced pressure. Purification of the crude material by flash chromatography over silica gel (100% cyclohexane) afforded the desired product (2.0 g). $^1$H NMR (400 MHz, CDCl$_3$) δ ppm: 2.61 (s, 3H), 3.92 (s, 3H), 7.29 (m, 2H), 7.78 (s, 1H).

Step 4: Preparation of Methyl 2-(bromomethyl)-5-(trifluoromethoxy)benzoate (Intermediate II-4)

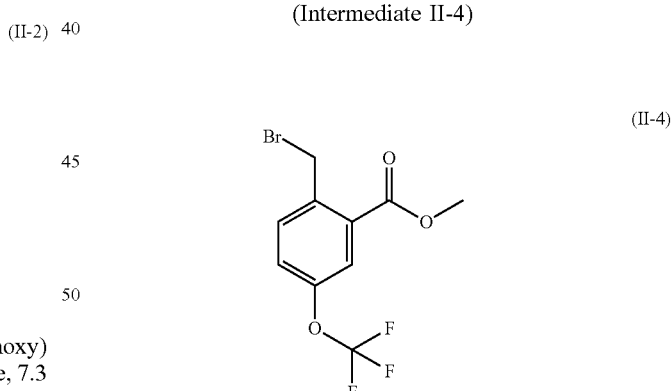

(II-4)

To a solution of methyl 2-methyl-5-(trifluoromethoxy)benzoate (intermediate II-3 prepared as described above, 1.9 g, 8.1 mmol) in tetrachloromethane (65 mL) were added at room temperature N-bromosuccinimide (2.0 g, 11 mmol) and benzoyl peroxide (0.70 g, 2.0 mmol). The reaction mixture was heated up to 70° and stirred for 3 hours. After cooling down to room temperature, the reaction mixture was diluted with ice cold water and extracted three times with dichloromethane. The combined organic layers were washed with brine, dried over sodium sulfate, filtered and concentrated under reduced pressure. Purification of the crude material by flash chromatography over silica gel (ethyl acetate in cyclohexane) afforded the desired product (1.6 g). ¹H NMR (400 MHz, CDCl₃) δ ppm: 3.97 (s, 3H), 4.95 (s, 2H), 7.53 (m, 1H), 7.83 (d, 1H), 8.10 (m, 1H).

Step 5: Preparation of Methyl 2-[[[5-(1-cyanocyclopropyl)-3-ethylsulfonyl-2-pyridyl]amino]methyl]-5-(trifluoromethoxy)benzoate (Intermediate II-5)

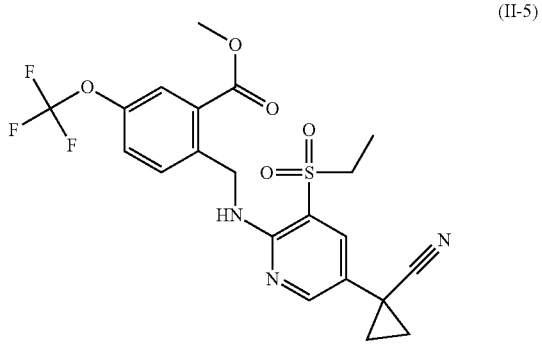 [SMILES: CCS(=O)(=O)c1cc(C2(C#N)CC2)cnc1NCc1ccc(OC(F)(F)F)cc1C(=O)OC]

(II-5)

To a solution of 1-(6-amino-5-ethylsulfonyl-3-pyridyl)cyclopropanecarbonitrile (0.35 g, 1.4 mmol) in N,N-dimethylformamide (5 mL) was added at 0° C. sodium hydride (60%, 84 mg, 2.1 mmol). The reaction mixture was stirred at this temperature for 30 minutes. To this mixture was added at 0° C. a solution of methyl 2-(bromomethyl)-5-(trifluoromethoxy)benzoate (intermediate II-4 prepared as described above, 0.61 g, 2.0 mmol) in N,N-dimethylformamide (3.5 mL). The reaction mixture was stirred at 10° C. for 1 hour. The reaction mixture was diluted with water and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (0.25 g). LCMS (method 1): retention time 1.59 min, m/z 484 [M+H]⁺.

Step 6: Preparation of 2-[[[5-(1-cyanocyclopropyl)-3-ethylsulfonyl-2-pyridyl]amino]methyl]-5-(trifluoromethoxy)benzoic Acid (Intermediate II-6)

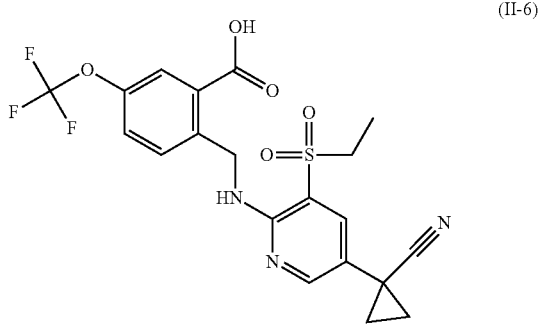 [SMILES: CCS(=O)(=O)c1cc(C2(C#N)CC2)cnc1NCc1ccc(OC(F)(F)F)cc1C(=O)O]

(II-6)

To a solution of methyl 2-[[[5-(1-cyanocyclopropyl)-3-ethylsulfonyl-2-pyridyl]amino]methyl]-5-(trifluoromethoxy)benzoate (intermediate II-5 prepared as described above, 0.25 g, 0.52 mmol) in methanol (5 mL) and water (2.5 mL) was added dihydroxybarium octahydrate (0.33 g, 1.0 mmol). The reaction mixture was stirred at room temperature for 3 hours. It was then acidified with 2N hydrochloric acid and extracted three times with ethyl acetate. The combined organic layers were dried over sodium sulfate, filtered and concentrated under reduced pressure to afford the crude desired product which was used without further purification. LCMS (method 1): retention time 1.48 min, m/z 470 [M+H]⁺.

Step 7: Preparation of 1-[5-ethylsulfonyl-6-[1-oxo-6-(trifluoromethoxy)isoindolin-2-yl]-3-pyridyl]cyclopropanecarbonitrile (Compound P25)

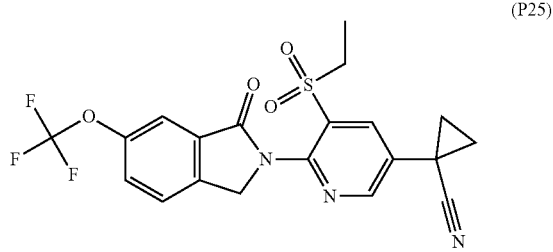 [SMILES: CCS(=O)(=O)c1cc(C2(C#N)CC2)cnc1N1Cc2ccc(OC(F)(F)F)cc2C1=O]

(P25)

To a solution of crude 2-[[[5-(1-cyanocyclopropyl)-3-ethylsulfonyl-2-pyridyl]amino]methyl]-5-(trifluoromethoxy)benzoic acid (intermediate II-6 prepared as described above, 0.22 g, 0.47 mmol) in pyridine (3 mL) was added at 0° C. phosphorus oxychloride (0.088 mL, 0.94 mmol). The reaction mixture was stirred at this temperature for 1 hour. It was then acidified with 2N hydrochloric acid and extracted three times with ethyl acetate. The combined organic layers were dried over sodium sulfate, filtered and concentrated under reduced pressure. Purification of the crude material by flash chromatography over silica gel (ethyl acetate in cyclohexane) afforded the desired product (70 mg) as a solid, mp 149-151° C. LCMS (method 1): retention time 1.53 min, m/z 452 [M+H]⁺. ¹H NMR (400 MHz, CDCl₃) δ ppm: 1.39 (t, 3H), 1.59-1.64 (m, 2H), 1.92-2.03 (m, 2H), 3.56 (q, 2H), 5.02 (s, 2H), 7.51 (m, 1H), 7.59 (m, 1H), 7.77 (s, 1H), 8.20 (d, 1H), 8.84 (d, 1H).

TABLE P

Examples of compounds of formula I

| Entry | IUPAC name | STRUCTURE | RT (min) | [M + H] (measured) | Method | MP ° C. |
|---|---|---|---|---|---|---|
| P1 | 2-(3-ethylsulfonyl-2-pyridyl)-6-(trifluoromethyl)-3H-pyrrolo[3,4-c]pyridin-1-one | | 0.91 | 372 | 2 | 161-163 |
| P2 | 2-[5-ethylsulfonyl-6-[1-oxo-6-(trifluoromethyl)-3H-pyrrolo[3,4-c]pyridin-2-yl]-3-pyridyl]-2-methyl-propanenitrile | | 1.00 | 439 | 2 | 205-207 |
| P3 | N-[5-ethylsulfonyl-6-[1-oxo-6-(trifluoromethyl)-3H-pyrrolo[3,4-c]pyridin-2-yl]-3-pyridyl]-N-methyl-acetamide | | 0.92 | 443 | 2 | 181-184 |
| P4 | 2-[3-ethylsulfonyl-6-(methylamino)-2-pyridyl]-6-(trifluoromethyl)-3H-pyrrolo[3,4-c]pyridin-1-one | | 1.24 | 401 | 1 | 202-204 |
| P5 | 2-[3-ethylsulfonyl-6-(1,2,4-triazol-1-yl)-2-pyridyl]-6-(trifluoromethyl)-3H-pyrrolo[3,4-c]pyridin-1-one | | 0.94 | 439 | 2 | 270-272 |
| P6 | 1-[5-ethylsulfonyl-6-[1-oxo-6-(trifluoromethyl)-3H-pyrrolo[3,4-c]pyridin-2-yl]-2-pyridyl]-1,3-dimethyl-urea | | 0.93 | 458 | 2 | 165-167 |

TABLE P-continued

Examples of compounds of formula I

| Entry | IUPAC name | STRUCTURE | RT (min) | [M + H] (measured) | Method | MP ° C. |
|---|---|---|---|---|---|---|
| P7 | 2-(5-bromo-3-ethylsulfonyl-2-pyridyl)-6-(trifluoromethyl)-3H-pyrrolo[3,4-c]pyridin-1-one | | 1.07 | 450 | 2 | 192-194 |
| P8 | 1-[5-ethylsulfonyl-6-[1-oxo-6-(trifluoromethyl)-3H-pyrrolo[3,4-c]pyridin-2-yl]-3-pyridyl]cyclopropanecarbonitrile | | 1.00 | 437 | 2 | 222-223 |
| P9 | 2-[3-ethylsulfonyl-5-[3-(trifluoromethyl)pyrazol-1-yl]-2-pyridyl]-6-(trifluoromethyl)-3H-pyrrolo[3,4-c]pyridin-1-one | | 1.12 | 506 | 2 | 177-179 |
| P10 | 2-[3-ethylsulfonyl-5-(trifluoromethyl)-2-pyridyl]-6-(trifluoromethyl)-3H-pyrrolo[3,4-c]pyridin-1-one | | 1.12 | 440 | 3 | 142-144 |
| P11 | 1-[5-ethylsulfonyl-6-[5-oxo-3-(trifluoromethyl)-7H-pyrrolo[3,4-b]pyridin-6-yl]-3-pyridyl]cyclopropanecarbonitrile | | 1.05 | 437 | 2 | 185-186 |
| P12 | 2-[3-ethylsulfonyl-5-(2-pyridyloxy)-2-pyridyl]-6-(trifluoromethyl)-3H-pyrrolo[3,4-c]pyridin-1-one | | 1.08 | 465 | 2 | 170-172 |

TABLE P-continued

Examples of compounds of formula I

| Entry | IUPAC name | STRUCTURE | RT (min) | [M + H] (measured) | Method | MP ° C. |
|---|---|---|---|---|---|---|
| P13 | 2-[5-(3-chloropyrazol-1-yl)-3-ethylsulfonyl-2-pyridyl]-6-(trifluoromethyl)-3H-pyrrolo[3,4-c]pyridin-1-one | | 1.17 | 472 | 2 | 216-218 |
| P14 | 2-(5-cyclopropyl-3-ethylsulfonyl-2-pyridyl)-6-(trifluoromethyl)-3H-pyrrolo[3,4-c]pyriclin-1-one | | 1.07 | 412 | 2 | 158-160 |
| P15 | 2-(6-cyclopropyl-3-ethylsulfonyl-2-pyridyl)-6-(trifluoromethyl)-3H-pyrrolo[3,4-c]pyriclin-1-one | | 1.04 | 412 | 2 | 166-168 |
| P16 | 2-(3-ethylsulfonyl-6-pyrimidin-2-yl-2-pyridyl)-6-(trifluoromethyl)-3H-pyrrolo[3,4-c]pyriclin-1-one | | 0.96 | 450 | 3 | — |
| P17 | 3-[5-ethylsulfonyl-6-[1-oxo-6-(trifluoromethyl)-3H-pyrrolo[3,4-c]pyridin-2-yl]-2-pyridyl]oxazolidin-2-one | | 1.10 | 457 | 3 | 116-118 |

TABLE P-continued

Examples of compounds of formula I

| Entry | IUPAC name | STRUCTURE | RT (min) | [M + H] (measured) | Method | MP ° C. |
|---|---|---|---|---|---|---|
| P18 | N-[5-ethylsulfonyl-6-[1-oxo-6-(trifluoromethyl)-3H-pyrrolo[3,4-c]pyridin-2-yl]-2-pyridyl]-N-methyl-cyclopropanecarboxamide | | 1.20 | 469 | 3 | 186-188 |
| P19 | N-[5-ethylsulfonyl-6-[1-oxo-6-(trifluoromethyl)-3H-pyrrolo[3,4-c]pyridin-2-yl]-2-pyridyl]-N-methyl-propanamide | | 1.13 | 457 | 3 | 156-158 |
| P20 | N-[5-ethylsulfonyl-6-[1-oxo-6-(trifluoromethyl)-3H-pyrrolo[3,4-c]pyridin-2-yl]-2-pyridyl]-N-methyl-acetamide | | 1.11 | 443 | 3 | 194-196 |
| P21 | 2-(3-ethylsulfonyl-2-pyridyl)-6-(trifluoromethyl)isoindolin-1-one | | 1.35 | 371 | 1 | 131-133 |
| P22 | 6-(3-ethylsulfonyl-2-pyridyl)-3-(trifluoromethyl)-7H-pyrrolo[3,4-b]pyridin-5-one | | 0.99 | 372 | 3 | — |
| P23 | 2-(3-ethylsulfonyl-2-pyridyl)-6-(trifluoromethylsulfonyl)isoindolin-1-one | | 0.99 | 435 | 2 | 202-204 |

TABLE P-continued

Examples of compounds of formula I

| Entry | IUPAC name | STRUCTURE | RT (min) | [M + H] (measured) | Method | MP ° C. |
|---|---|---|---|---|---|---|
| P24 | 2-(3-ethylsulfonyl-2-pyridyl)-6-(trifluoromethoxy)isoindolin-1-one | | 1.36 | 387 | 1 | 110-112 |
| P25 | 1-[5-ethylsulfonyl-6-[1-oxo-6-(trifluoromethoxy)isoindolin-2-yl]-3-pyridyl]cyclopropanecarbonitrile | | 1.53 | 452 | 1 | 149-151 |
| P26 | 1-[5-ethylsulfonyl-6-[1-oxo-6-(trifluoromethyl)isoindolin-2-yl]-3-pyridyl]cyclopropanecarbonitrile | | 1.41 | 436 | 3 | 162-164 |
| P27 | 2-[5-ethylsulfonyl-6-[5-oxo-3-(trifluoromethyl)-7H-pyrrolo[3,4-b]pyridin-6-yl]-3-pyridyl]-2-methyl-propanenitrile | | 1.00 | 439 | 2 | 229-230 |
| P28 | 1-[5-(cyclopropylmethylsulfonyl)-6-[1-oxo-6-(trifluoromethyl)-3H-pyrrolo[3,4-c]pyridin-2-yl]-3-pyridyl]cyclopropanecarbonitrile | | 1.05 | 463 | 2 | — |

Intermediate Preparation

Example IP1: Preparation of Methyl 2-(bromomethyl)-5-(trifluoromethyl)pyridine-3-carboxylate (Intermediate IP-3)

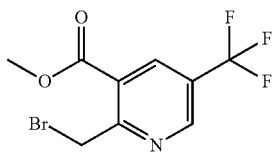
(IP-3)

Step 1: Preparation of methyl 2-chloro-5-(trifluoromethyl)pyridine-3-carboxylate (Intermediate IP-1)

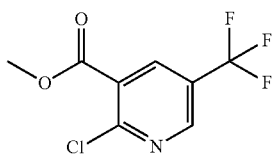
(IP-1)

To a solution of 2-chloro-5-(trifluoromethyl)pyridine-3-carboxylic acid (CAS 505084-59-3; 7.00 g, 31.0 mmol) in N,N-dimethylformamide (70 mL) was added cesium carbonate (12.1 g, 37.2 mmol). The reaction mixture was stirred at room temperature for 5 minutes, before addition of iodomethane (2.90 mL, 46.6 mmol). Stirring was continued at room temperature for 1 hour. The reaction mixture was diluted with ice water and extracted three times with ethyl acetate. The combined organic layers were washed with ice water and brine, dried over sodium sulfate, filtered and concentrated under reduced pressure to afford the desired product (7.00 g), which was used without further purification. LCMS (method 3): m/z 240/242 [M+H]$^+$, retention time Rt=1.00 min. $^1$H NMR (400 MHz, CDCl$_3$) δ ppm 4.01 (s, 3H), 8.41 (d, 1H), 8.78 (d, 1H).

Step 2: Preparation of methyl 2-methyl-5-(trifluoromethyl)pyridine-3-carboxylate (Intermediate IP-2)

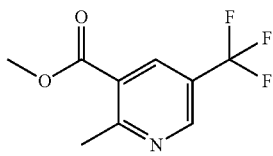
(IP-2)

A reaction vessel was charged with methylboronic acid (7.73 g, 125 mmol), potassium phosphate tribasic (26.6 g, 125 mmol), tricyclohexylphosphane (1.17 g, 4.17 mmol), followed by toluene (100 mL) and water (13 mL). The flask was purged with nitrogen for 15 minutes. To the reaction mixture were added methyl 2-chloro-5-(trifluoromethyl) pyridine-3-carboxylate (intermediate IP-1 prepared as described above, 10.0 g, 41.7 mmol) and palladium(II) acetate (0.469 g, 2.09 mmol). The reaction mixture was first heated to 100° C. and stirred for 2 hours, then at 90° C. overnight. After cooling to room temperature, the mixture was diluted with water and ethyl acetate, and filtered over a Celite pad. The layers were separated, and the organic layer was dried over sodium sulfate, filtered and concentrated under reduced pressure to afford the desired product (5.00 g), which was used without further purification. LCMS (method 3): m/z 220 [M+H]$^+$, retention time Rt=0.93 min. $^1$H NMR (400 MHz, CDCl$_3$) δ ppm 2.92 (s, 3H), 3.97 (s, 3H), 8.44 (d, 1H), 8.87 (m, 1H).

Step 3: Preparation of Methyl 2-(bromomethyl)-5-(trifluoromethyl)pyridine-3-carboxylate (Intermediate IP-3)

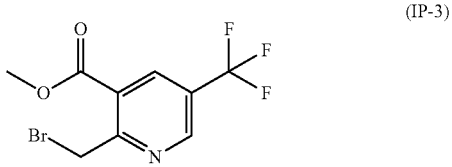 [SMILES: COC(=O)c1cc(C(F)(F)F)cnc1CBr]
(IP-3)

To a solution of methyl 2-methyl-5-(trifluoromethyl)pyridine-3-carboxylate (intermediate IP-2 prepared as described above, 3.50 g, 16.0 mmol) in tetrachloromethane (80 mL) were added N-bromo-succinimide (4.00 g, 22.0 mmol) and benzoyl peroxide (70%, 1.40 g, 4.00 mmol). The reaction mixture was heated to 70° C. and stirred for 3 hours. After cooling to room temperature, it was diluted with ice water and extracted three times with dichloromethane. The combined organic layers were washed with brine, dried over sodium sulfate, filtered and concentrated under reduced pressure. Purification of the crude material by flash chromatography over silica gel (gradient ethyl acetate in cyclohexane) afforded the desired product (1.40 g). LCMS (method 3): m/z 298/300 [M+H]$^+$, retention time Rt=1.01 min. $^1$H NMR (400 MHz, CDCl$_3$) δ ppm: 4.03 (s, 3H), 5.08 (s, 2H), 8.53 (d, J=2.01 Hz, 1H), 8.96 (m, 1H).

Example IP2: Preparation of 3-ethylsulfanyl-5-(2-pyridyloxy)pyridine-2-carboxylic Acid (Intermediate IP-6)

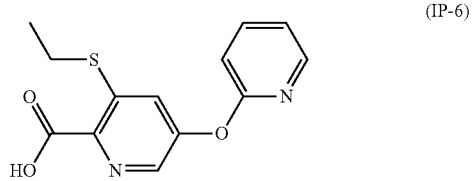 [SMILES: CCSc1cc(Oc2ccccn2)cnc1C(=O)O]
(IP-6)

Step 1: Preparation of Methyl 3-ethylsulfanyl-5-hydroxy-pyridine-2-carboxylate (IP-4)

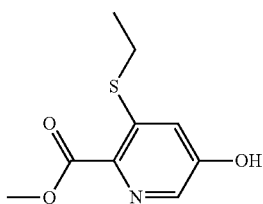

(IP-4)

To a solution of methyl 5-bromo-3-ethylsulfanyl-pyridine-2-carboxylate (prepared as described in WO 2016/026848) (10.0 g, 36.21 mmol) in acetonitrile (72 ml) were added cesium carbonate (25.96 g, 79.67 mmol) and (E)-benzaldehyde oxime (5.7 g, 47.08 mmol), and the suspension was heated to 80° C. overnight. The solvent was evaporated in vacuo and the residue dissolved with ethyl acetate and water. The separated aqueous layer was acidified with 1M aqueous hydrochloric acid and extracted with ethyl acetate (3×) and once with dichloromethane. The combined organic phases were dried over sodium sulfate, filtered and concentrated. The residue was purified by flash chromatography on silica gel (gradient 0-10% methanol in dichloromethane) to afford methyl 3-ethylsulfanyl-5-hydroxy-pyridine-2-carboxylate. LCMS (method 4): m/z 214 [M+I-1]+; retention time: 0.68 min.

Step 2: Preparation of Methyl 3-ethylsulfanyl-5-(2-pyridyloxy)pyridine-2-carboxylate (IP-5)

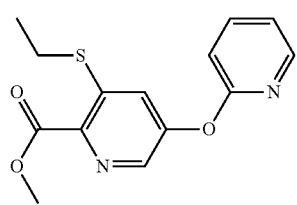

(IP-5)

A mixture of methyl 3-ethylsulfanyl-5-hydroxy-pyridine-2-carboxylate (compound IP-4 prepared as described above; 2.00 g, 9.4 mmol), potassium carbonate (2.6 g, 19 mmol), 2-iodopyridine (1.5 mL, 14.0 mmol), and copper iodide (0.187 g, 0.94 mmol) in N,N-dimethylformamide (20 mL) was stirred at 110° C. for 6 hours. The reaction mixture was neutralized with aqueous 2M hydrochloric acid (50 mL), diluted with water (50 mL) and extracted with ethyl acetate (3×50 mL). The combined organic layers were dried over sodium sulfate, filtered and concentrated in vacuo to afford methyl 3-ethylsulfanyl-5-(2-pyridyloxy)pyridine-2-carboxylate. This material was used without further purification into the next step. LCMS (method 1): m/z 291 [M+I-1]+; retention time: 1.37 min. $^1$H NMR (400 MHz, CDCl$_3$) δ/ppm: 1.38 (t, 3H), 2.87 (q, 2H), 3.98 (s, 3H), 7.03 (d, 1H), 7.10 (m, 1H), 7.52 (d, J=2.3 Hz, 1H), 7.77 (m, 1H), 8.16 (m, 1H), 8.29 (d, J=2.3 Hz, 1H).

Step 3: Preparation of 3-ethylsulfanyl-5-(2-pyridyloxy)pyridine-2-carboxylic Acid (IP-6)

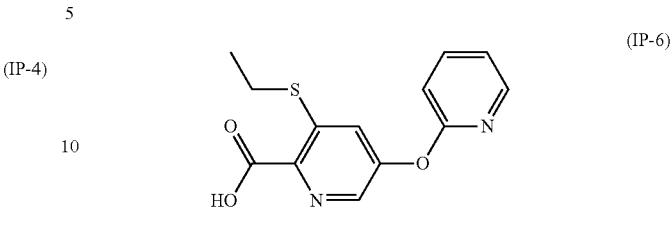

(IP-6)

To a solution of methyl 3-ethylsulfanyl-5-(2-pyridyloxy) pyridine-2-carboxylate (compound IP-5 prepared as described above; 0.900 g, 3.10 mmol) in tetrahydrofuran (10 mL) were added lithium hydroxide monohydrate (0.0951 g, 4.65 mmol) and water (2 mL). The reaction mixture was stirred at room temperature for 2 hours, then acidified with aqueous 2M hydrochloric acid (25 mL) and extracted with ethyl acetate (3×25 mL). The combined organic layers were dried over sodium sulfate, filtered and concentrated in vacuo to afford 3-ethylsulfanyl-5-(2-pyridyloxy)pyridine-2-carboxylic acid as a solid. LCMS (method 1): m/z 277 [M+H]+; retention time: 1.26 min.

The activity of the compositions according to the invention can be broadened considerably, and adapted to prevailing circumstances, by adding other insecticidally, acaricidally and/or fungicidally active ingredients. The mixtures of the compounds of formula I with other insecticidally, acaricidally and/or fungicidally active ingredients may also have further surprising advantages which can also be described, in a wider sense, as synergistic activity. For example, better tolerance by plants, reduced phytotoxicity, insects can be controlled in their different development stages or better behaviour during their production, for example during grinding or mixing, during their storage or during their use. Suitable additions to active ingredients here are, for example, representatives of the following classes of active ingredients: organophosphorus compounds, nitrophenol derivatives, thioureas, juvenile hormones, formamidines, benzophenone derivatives, ureas, pyrrole derivatives, carbamates, pyrethroids, chlorinated hydrocarbons, acylureas, pyridylmethyleneamino derivatives, macrolides, neonicotinoids and *Bacillus thuringiensis* preparations.

The following mixtures of the compounds of formula I with active ingredients are preferred (the abbreviation "TX" means "one compound selected from the group consisting of the compounds described in Tables A-1 to A-48, Tables C1-C18, Tables D1-D12, Tables E1-E12, Tables $G_1$-$G_{24}$, Tables 11-148, Tables J1 to J18, Tables K1-K12 and Tables L-1 to L-12 and Table P of the present invention"):

an adjuvant selected from the group of substances consisting of petroleum oils (alternative name) (628)+TX,
an adjuvant selected from the group of substances consisting of petroleum oils (alternative name) (628)+TX,
an acaricide selected from the group of substances consisting of 1,1-bis(4-chlorophenyl)-2-ethoxyethanol (IUPAC name) (910)+TX, 2,4-dichlorophenyl benzenesulfonate (IUPAC/Chemical Abstracts name) (1059)+TX, 2-fluoro-N-methyl-N-1-naphthylacetamide (IUPAC name) (1295)+TX, 4-chlorophenyl phenyl sulfone (IUPAC name) (981)+TX, abamectin (1)+TX, acequinocyl (3)+TX, acetoprole [CCN]+TX, acrinathrin (9)+TX, aldicarb (16)+TX, aldoxycarb (863)+TX, alpha-cypermethrin (202)+TX, amidithion (870)+TX, amidoflumet [CCN]+TX, amidothioate (872)+TX, amiton (875)+TX, amiton hydrogen oxalate (875)+TX, amitraz (24)+TX, aramite (881)+TX, arsenous oxide (882)+TX, AVI 382 (compound code)+TX, AZ 60541 (compound code)+TX, azinphos-ethyl (44)+TX, azinphos-methyl (45)+TX, azobenzene (IUPAC name) (888)+TX, azocyclotin (46)+TX, azothoate (889)+TX, benomyl (62)+TX, benoxafos (alternative name) [CCN]+TX, benzoximate (71)+TX, benzyl benzoate (IUPAC name) [CCN]+TX, bifenazate (74)+TX, bifenthrin (76)+TX, binapacryl (907)+TX, brofenvalerate (alternative name)+TX, bromocyclen (918)+TX, bromophos (920)+TX, bromophos-ethyl (921)+TX, bromopropylate (94)+TX, buprofezin (99)+TX, butocarboxim (103)+TX, butoxycarboxim (104)+TX, butylpyridaben (alternative name)+TX, calcium polysulfide (IUPAC name) (111)+TX, camphechlor (941)+TX, carbanolate (943)+TX, carbaryl (115)+TX, carbofuran (118)+TX, carbophenothion (947)+TX, CGA 50'439 (development code) (125)+TX, chinomethionat (126)+TX, chlorbenside (959)+TX, chlordimeform (964)+TX, chlordimeform hydrochloride (964)+TX, chlorfenapyr (130)+TX, chlorfenethol (968)+TX, chlorfenson (970)+TX, chlorfensulfide (971)+TX, chlorfenvinphos (131)+TX, chlorobenzilate (975)+TX, chloromebuform (977)+TX, chloromethiuron (978)+TX, chloropropylate (983)+TX, chlorpyrifos (145)+TX, chlorpyrifos-methyl (146)+TX, chlorthiophos (994)+TX, cinerin I (696)+TX, cinerin II (696)+TX, cinerins (696)+TX, clofentezine (158)+TX, closantel (alternative name) [CCN]+TX, coumaphos (174)+TX, crotamiton (alternative name) [CCN]+TX, crotoxyphos (1010)+TX, cufraneb (1013)+TX, cyanthoate (1020)+TX, cyflumetofen (CAS Reg. No.: 400882-07-7)+TX, cyhalothrin (196)+TX, cyhexatin (199)+TX, cypermetrin (201)+TX, DCPM (1032)+TX, DDT (219)+TX, demephion (1037)+TX, demephion-O (1037)+TX, demephion-S(1037)+TX, demeton (1038)+TX, demeton-methyl (224)+TX, demeton-O (1038)+TX, demeton-O-methyl (224)+TX, demeton-S(1038)+TX, demeton-S-methyl (224)+TX, demeton-S-methylsulfon (1039)+TX, diafenthiuron (226)+TX, dialifos (1042)+TX, diazinon (227)+TX, dichlofluanid (230)+TX, dichlorvos (236)+TX, dicliphos (alternative name)+TX, dicofol (242)+TX, dicrotophos (243)+TX, dienochlor (1071)+TX, dimefox (1081)+TX, dimethoate (262)+TX, dinactin (alternative name) (653)+TX, dinex (1089)+TX, dinex-diclexine (1089)+TX, dinobuton (269)+TX, dinocap (270)+TX, dinocap-4 [CCN]+TX, dinocap-6 [CCN]+TX, dinocton (1090)+TX, dinopenton (1092)+TX, dinosulfon (1097)+TX, dinoterbon (1098)+TX, dioxathion (1102)+TX, diphenyl sulfone (IUPAC name) (1103)+TX, disulfiram (alternative name) [CCN]+TX, disulfoton (278)+TX, DNOC (282)+TX, dofenapyn (1113)+TX, doramectin (alternative name) [CCN]+TX, endosulfan (294)+TX, endothion (1121)+TX, EPN (297)+TX, eprinomectin (alternative name) [CCN]+TX, ethion (309)+TX, ethoate-methyl (1134)+TX, etoxazole (320)+TX, etrimfos (1142)+TX, fenazaflor (1147)+TX, fenazaquin (328)+TX, fenbutatin oxide (330)+TX, fenothiocarb (337)+TX, fenpropathrin (342)+TX, fenpyrad (alternative name)+TX, fenpyroximate (345)+TX, fenson (1157)+TX, fentrifanil (1161)+TX, fenvalerate (349)+TX, fipronil (354)+TX, fluacrypyrim (360)+TX, fluazuron (1166)+TX, flubenzimine (1167)+TX, flucycloxuron (366)+TX, flucythrinate (367)+TX, fluenetil (1169)+TX, flufenoxuron (370)+TX, flumethrin (372)+TX, fluorbenside (1174)+TX, fluvalinate (1184)+TX, FMC 1137 (development code) (1185)+TX, formetanate (405)+TX, formetanate hydrochloride (405)+TX, formothion (1192)+TX, formparanate (1193)+TX, gamma-HCH (430)+TX, glyodin (1205)+TX, halfenprox (424)+TX, heptenophos (432)+TX, hexadecyl cyclopropanecarboxylate (IUPAC/Chemical Abstracts name) (1216)+TX, hexythiazox (441)+TX, iodomethane (IUPAC name) (542)+TX, isocarbophos (alternative name) (473)+TX, isopropyl O-(methoxyaminothiophosphoryl)salicylate (IUPAC name) (473)+TX, ivermectin (alternative name) [CCN]+TX, jasmolin I (696)+TX, jasmolin II (696)+TX, jodfenphos (1248)+TX, lindane (430)+TX, lufenuron (490)+TX, malathion (492)+TX, malonoben (1254)+TX, mecarbam (502)+TX, mephosfolan (1261)+TX, mesulfen (alternative name) [CCN]+TX, methacrifos (1266)+TX, methamidophos (527)+TX, methidathion (529)+TX, methiocarb (530)+TX, methomyl (531)+TX, methyl bromide (537)+TX, metolcarb (550)+TX, mevinphos (556)+TX, mexacarbate (1290)+TX, milbemectin (557)+TX, milbemycin oxime (alternative name) [CCN]+TX, mipafox (1293)+TX, monocrotophos (561)+TX, morphothion (1300)+TX, moxidectin (alternative name) [CCN]+TX, naled (567)+TX, NC-184 (compound code)+TX, NC-512 (compound code)+TX, nifluridide (1309)+TX, nikkomycins (alternative name) [CCN]+TX, nitrilacarb (1313)+TX, nitrilacarb 1:1 zinc chloride complex (1313)+TX, NNI-0101 (compound code)+TX, NNI-0250 (compound code)+TX, omethoate (594)+TX, oxamyl (602)+TX, oxydeprofos (1324)+TX, oxydisulfoton (1325)+TX, pp'-DDT (219)+TX, parathion (615)+TX, permethrin (626)+TX, petroleum oils (alternative name) (628)+TX, phenkapton (1330)+TX, phenthoate (631)+TX, phorate (636)+TX, phosalone (637)+TX, phosfolan (1338)+TX, phosmet (638)+TX, phosphamidon (639)+TX, phoxim (642)+TX, pirimiphos-methyl (652)+TX, polychloroterpenes (traditional name) (1347)+TX, polynactins (alternative name) (653)+TX, proclonol (1350)+TX, profenofos (662)+TX, promacyl (1354)+TX, propargite (671)+TX, propetamphos (673)+TX, propoxur (678)+TX, prothidathion (1360)+TX, prothoate (1362)+TX, pyrethrin I (696)+TX, pyrethrin II (696)+TX, pyrethrins (696)+TX, pyridaben (699)+TX, pyridaphenthion (701)+TX, pyrimidifen (706)+TX, pyrimitate (1370)+TX, quinalphos (711)+TX, quintiofos (1381)+TX, R-1492 (development code) (1382)+TX, RA-17 (development code) (1383)+TX, rotenone (722)+TX, schradan (1389)+TX, sebufos (alternative name)+TX, selamectin (alternative name) [CCN]+TX, SI-0009 (compound code)+TX, sophamide (1402)+TX, spirodiclofen (738)+TX, spiromesifen (739)+TX, SSI-121 (development code) (1404)+TX, sulfiram (alternative name) [CCN]+TX, sulfluramid (750)+TX, sulfotep (753)+TX, sulfur (754)+TX, SZI-121 (development code) (757)+TX, tau-fluvalinate (398)+TX, tebufenpyrad (763)+TX, TEPP (1417)+TX, terbam (alternative name)+TX, tetrachlorvinphos (777)+TX, tetradifon (786)+TX, tetranactin (alternative name) (653)+TX, tetrasul (1425)+TX, thiafenox (alternative name)+TX, thiocarboxime (1431)+TX, thiofanox (800)+TX, thiometon (801)+TX, thioquinox (1436)+TX, thuringiensin (alternative name) [CCN]+TX, triamiphos (1441)+TX, triarathene (1443)+TX, triazophos (820)+TX, triazuron (alternative name)+TX, trichlorfon (824)+TX, trifenofos (1455)+TX, trinactin (alternative name) (653)+TX, vamidothion (847)+TX, vaniliprole [CCN] and YI-5302 (compound code)+TX, an algicide selected from the group of substances consisting of bethoxazin [CCN]+TX, copper dioctanoate (IUPAC name) (170)+TX, copper sulfate (172)+TX, cybutryne [CCN]+TX, dichlone (1052)+TX, dichlorophen (232)+TX, endothal (295)+TX, fentin (347)+TX, hydrated lime [CCN]+TX, nabam (566)+TX, quinoclamine (714)+TX, quinonamid (1379)+TX, simazine (730)+TX, triphenyltin acetate (IUPAC name) (347) and triphenyltin hydroxide (IUPAC name) (347)+TX, an anthelmintic selected from the group of substances consisting of abamectin (1)+TX, crufomate (1011)+TX, doramectin (alternative name) [CCN]+TX, emamectin (291)+TX, emamectin benzoate (291)+TX, eprinomectin (alternative name) [CCN]+TX, ivermectin (alternative name) [CCN]+TX, milbemycin oxime (alternative name) [CCN]+TX, moxidectin (alternative name) [CCN]+TX, piperazine [CCN]+TX, selamectin (alternative name) [CCN]+TX, spinosad (737) and thiophanate (1435)+TX, an avicide selected from the group of substances consisting of chloralose (127)+TX, endrin (1122)+TX, fenthion (346)+TX, pyridin-4-amine (IUPAC name) (23) and strychnine (745)+TX, a bactericide selected from the group of substances consisting of 1-hydroxy-1H-pyridine-2-thione (IUPAC name) (1222)+TX, 4-(quinoxalin-2-ylamino)benzenesulfonamide (IUPAC name) (748)+TX, 8-hydroxyquinoline sulfate (446)+TX, bronopol (97)+TX, copper dioctanoate (IUPAC name) (170)+TX, copper hydroxide (IUPAC name) (169)+TX, cresol [CCN]+TX, dichlorophen (232)+TX, dipyrithione (1105)+TX, dodicin (1112)+TX, fenaminosulf (1144)+TX, formaldehyde (404)+TX, hydrargaphen (alternative name) [CCN]+TX, kasugamycin (483)+TX, kasugamycin hydrochloride hydrate (483)+TX, nickel bis(dimethyldithiocarbamate) (IUPAC name) (1308)+TX, nitrapyrin (580)+TX, octhilinone (590)+TX, oxolinic acid (606)+TX, oxytetracycline (611)+TX, potassium hydroxyquinoline sulfate (446)+TX, probenazole (658)+TX, streptomycin (744)+TX, streptomycin sesquisulfate (744)+TX, tecloftalam (766)+TX, and thiomersal (alternative name) [CCN]+TX, a biological agent selected from the group of substances consisting of *Adoxophyes orana* GV (alternative name) (12)+TX, *Agrobacterium radiobacter* (alternative name) (13)+TX, *Amblyseius* spp. (alternative name) (19)+TX, *Anagrapha falcifera* NPV (alternative name) (28)+TX, *Anagrus atomus* (alternative name) (29)+TX, *Aphelinus abdominalis* (alternative name) (33)+TX, *Aphidius colemani* (alternative name) (34)+TX, *Aphidoletes aphidimyza* (alternative name) (35)+TX, *Autographa californica* NPV (alternative name) (38)+TX, *Bacillus firmus* (alternative name) (48)+TX, *Bacillus sphaericus* Neide (scientific name) (49)+TX, *Bacillus thuringiensis* Berliner (scientific name) (51)+TX, *Bacillus thuringiensis* subsp. *aizawai* (scientific name) (51)+TX, *Bacillus thuringiensis* subsp. *israelensis* (scientific name) (51)+TX, *Bacillus thuringiensis* subsp. *japonensis* (scientific name) (51)+TX, *Bacillus thuringiensis* subsp. *kurstaki* (scientific name) (51)+TX, *Bacillus thuringiensis* subsp. *tenebrionis* (scientific name) (51)+TX, *Beauveria bassiana* (alternative name) (53)+TX, *Beauveria brongniartii* (alternative name) (54)+TX, *Chrysoperla carnea* (alternative name) (151)+TX, *Cryptolaemus montrouzieri* (alternative name) (178)+TX, *Cydia pomonella* GV (alternative name) (191)+TX, *Dacnusa sibirica* (alternative name) (212)+TX, *Diglyphus isaea* (alternative name) (254)+TX, *Encarsia formosa* (scientific name) (293)+TX, *Eretmocerus eremicus* (alternative name) (300)+TX, *Helicoverpa zea* NPV (alternative name) (431)+TX, *Heterorhabditis bacteriophora* and *H. megidis* (alternative name) (433)+TX, *Hippodamia convergens* (alternative name) (442)+TX, *Leptomastix dactylopfi* (alternative name) (488)+TX, *Macrolophus caliginosus* (alternative name) (491)+TX, *Mamestra brassicae* NPV (alternative name) (494)+TX, *Metaphycus helvolus* (alternative name) (522)+TX, *Metarhizium anisopliae* var. *acridum* (scientific name) (523)+TX, *Metarhizium anisopliae* var. *anisopliae* (scientific name) (523)+TX, *Neodiprion sertifer* NPV and *N. lecontei* NPV (alternative name) (575)+TX, *Orius* spp. (alternative name) (596)+TX, *Paecilomyces fumosoroseus* (alternative name) (613)+TX, *Phytoseiulus persimilis* (alternative name) (644)+TX, *Spodoptera exigua* multicapsid nuclear polyhedrosis virus (scientific name) (741)+TX, *Steinernema bibionis* (alternative name) (742)+TX, *Steinernema carpocapsae* (alternative name) (742)+TX, *Steinernema feltiae* (alternative name) (742)+TX, *Steinernema glaseri* (alternative name) (742)+TX, *Steinernema riobrave* (alternative name) (742)+TX, *Steinernema riobravis* (alternative name) (742)+TX, *Steinernema scapterisci* (alternative name) (742)+TX, *Steinernema* spp. (alternative name) (742)+TX, *Trichogramma* spp. (alternative name) (826)+TX, *Typhlodromus occidentalis* (alternative name) (844) and *Verticillium lecanii* (alternative name) (848)+TX, a soil sterilant selected from the group of substances consisting of iodomethane (IUPAC name) (542) and methyl bromide (537)+TX, a chemosterilant selected from the group of substances consisting of apholate [CCN]+TX, bisazir (alternative name) [CCN]+TX, busulfan (alternative name) [CCN]+TX, diflubenzuron (250)+TX, dimatif (alternative name) [CCN]+TX, hemel [CCN]+TX, hempa [CCN]+TX, metepa [CCN]+TX, methiotepa [CCN]+TX, methyl apholate [CCN]+TX, morzid [CCN]+TX, penfluron (alternative name) [CCN]+TX, tepa [CCN]+TX, thiohempa (alternative name) [CCN]+TX, thiotepa (alternative name) [CCN]+TX, tretamine (alternative name) [CCN] and uredepa (alternative name) [CCN]+TX, an insect pheromone selected from the group of substances consisting of (E)-dec-5-en-1-yl acetate with (E)-dec-5-en-1-ol (IUPAC name) (222)+TX, (E)-tridec-4-en-1-yl acetate (IUPAC name) (829)+TX, (E)-6-methylhept-2-en-4-ol (IUPAC name) (541)+TX, (E,Z)-tetradeca-4,10-dien-1-yl acetate (IUPAC name) (779)+TX, (Z)-dodec-7-en-1-yl acetate (IUPAC name) (285)+TX, (Z)-hexadec-11-enal (IUPAC name) (436)+TX, (Z)-hexadec-11-en-1-yl acetate (IUPAC name) (437)+TX, (Z)-hexadec-13-en-11-yn-1-yl acetate (IUPAC name) (438)+TX, (Z)-icos-13-en-10-one (IUPAC name) (448)+TX, (Z)-tetradec-7-en-1-ol (IUPAC name) (782)+TX, (Z)-tetradec-9-en-1-ol (IUPAC name) (783)+TX, (Z)-tetradec-9-en-1-yl acetate (IUPAC name) (784)+TX, (7E,9Z)-dodeca-7,9-dien-1-yl acetate (IUPAC name) (283)+TX, (9Z,11E)-tetradeca-9,11-dien-1-yl acetate (IUPAC name) (780)+TX, (9Z,12E)-tetradeca-9,12-dien-1-yl acetate (IUPAC name)

(781)+TX, 14-methyloctadec-1-ene (IUPAC name) (545)+TX, 4-methylnonan-5-ol with 4-methylnonan-5-one (IUPAC name) (544)+TX, alpha-multistriatin (alternative name) [CCN]+TX, brevicomin (alternative name) [CCN]+TX, codlelure (alternative name) [CCN]+TX, codlemone (alternative name) (167)+TX, cuelure (alternative name) (179)+TX, disparlure (277)+TX, dodec-8-en-1-yl acetate (IUPAC name) (286)+TX, dodec-9-en-1-yl acetate (IUPAC name) (287)+TX, dodeca-8+TX, 10-dien-1-yl acetate (IUPAC name) (284)+TX, dominicalure (alternative name) [CCN]+TX, ethyl 4-methyloctanoate (IUPAC name) (317)+TX, eugenol (alternative name) [CCN]+TX, frontalin (alternative name) [CCN]+TX, gossyplure (alternative name) (420)+TX, grandlure (421)+TX, grandlure I (alternative name) (421)+TX, grandlure II (alternative name) (421)+TX, grandlure III (alternative name) (421)+TX, grandlure IV (alternative name) (421)+TX, hexalure [CCN]+TX, ipsdienol (alternative name) [CCN]+TX, ipsenol (alternative name) [CCN]+TX, japonilure (alternative name) (481)+TX, lineatin (alternative name) [CCN]+TX, litlure (alternative name) [CCN]+TX, looplure (alternative name) [CCN]+TX, medlure [CCN]+TX, megatomoic acid (alternative name) [CCN]+TX, methyl eugenol (alternative name) (540)+TX, muscalure (563)+TX, octadeca-2,13-dien-1-yl acetate (IUPAC name) (588)+TX, octadeca-3,13-dien-1-yl acetate (IUPAC name) (589)+TX, orfralure (alternative name) [CCN]+TX, oryctalure (alternative name) (317)+TX, ostramone (alternative name) [CCN]+TX, siglure [CCN]+TX, sordidin (alternative name) (736)+TX, sulcatol (alternative name) [CCN]+TX, tetradec-11-en-1-yl acetate (IUPAC name) (785)+TX, trimedlure (839)+TX, trimedlure A (alternative name) (839)+TX, trimedlure $B_1$ (alternative name) (839)+TX, trimedlure $B_2$ (alternative name) (839)+TX, trimedlure C (alternative name) (839) and trunc-call (alternative name) [CCN]+TX, an insect repellent selected from the group of substances consisting of 2-(octylthio)ethanol (IUPAC name) (591)+TX, butopyronoxyl (933)+TX, butoxy(polypropylene glycol) (936)+TX, dibutyl adipate (IUPAC name) (1046)+TX, dibutyl phthalate (1047)+TX, dibutyl succinate (IUPAC name) (1048)+TX, diethyltoluamide [CCN]+TX, dimethyl carbate [CCN]+TX, dimethyl phthalate [CCN]+TX, ethyl hexanediol (1137)+TX, hexamide [CCN]+TX, methoquin-butyl (1276)+TX, methylneodecanamide [CCN]+TX, oxamate [CCN] and picaridin [CCN]+TX, an insecticide selected from the group of substances consisting of 1-dichloro-1-nitroethane (IUPAC/Chemical Abstracts name) (1058)+TX, 1,1-dichloro-2,2-bis(4-ethylphenyl)ethane (IUPAC name) (1056), +TX, 1,2-dichloropropane (IUPAC/Chemical Abstracts name) (1062)+TX, 1,2-dichloropropane with 1,3-dichloropropene (IUPAC name) (1063)+TX, 1-bromo-2-chloroethane (IUPAC/Chemical Abstracts name) (916)+TX, 2,2,2-trichloro-1-(3,4-dichlorophenyl)ethyl acetate (IUPAC name) (1451)+TX, 2,2-dichlorovinyl 2-ethylsulfinylethyl methyl phosphate (IUPAC name) (1066)+TX, 2-(1,3-dithiolan-2-yl)phenyl dimethylcarbamate (IUPAC/Chemical Abstracts name) (1109)+TX, 2-(2-butoxyethoxy)ethyl thiocyanate (IUPAC/Chemical Abstracts name) (935)+TX, 2-(4,5-dimethyl-1,3-dioxolan-2-yl)phenyl methylcarbamate (IUPAC/Chemical Abstracts name) (1084)+TX, 2-(4-chloro-3,5-xylyloxy)ethanol (IUPAC name) (986)+TX, 2-chlorovinyl diethyl phosphate (IUPAC name) (984)+TX, 2-imidazolidone (IUPAC name) (1225)+TX, 2-isovalerylindan-1,3-dione (IUPAC name) (1246)+TX, 2-methyl(prop-2-ynyl)aminophenyl methylcarbamate (IUPAC name) (1284)+TX, 2-thiocyanatoethyl laurate (IUPAC name) (1433)+TX, 3-bromo-1-chloroprop-1-ene (IUPAC name) (917)+TX, 3-methyl-1-phenylpyrazol-5-yl dimethylcarbamate (IUPAC name) (1283)+TX, 4-methyl(prop-2-ynyl)amino-3,5-xylyl methylcarbamate (IUPAC name) (1285)+TX, 5,5-dimethyl-3-oxocyclohex-1-enyl dimethylcarbamate (IUPAC name) (1085)+TX, abamectin (1)+TX, acephate (2)+TX, acetamiprid (4)+TX, acethion (alternative name) [CCN]+TX, acetoprole [CCN]+TX, acrinathrin (9)+TX, acrylonitrile (IUPAC name) (861)+TX, alanycarb (15)+TX, aldicarb (16)+TX, aldoxycarb (863)+TX, aldrin (864)+TX, allethrin (17)+TX, allosamidin (alternative name) [CCN]+TX, allyxycarb (866)+TX, alpha-cypermethrin (202)+TX, alpha-ecdysone (alternative name) [CCN]+TX, aluminium phosphide (640)+TX, amidithion (870)+TX, amidothioate (872)+TX, aminocarb (873)+TX, amiton (875)+TX, amiton hydrogen oxalate (875)+TX, amitraz (24)+TX, anabasine (877)+TX, athidathion (883)+TX, AVI 382 (compound code)+TX, AZ 60541 (compound code)+TX, azadirachtin (alternative name) (41)+TX, azamethiphos (42)+TX, azinphos-ethyl (44)+TX, azinphos-methyl (45)+TX, azothoate (889)+TX, *Bacillus thuringiensis* delta endotoxins (alternative name) (52)+TX, barium hexafluorosilicate (alternative name) [CCN]+TX, barium polysulfide (IUPAC/Chemical Abstracts name) (892)+TX, barthrin [CCN]+TX, Bayer 22/190 (development code) (893)+TX, Bayer 22408 (development code) (894)+TX, bendiocarb (58)+TX, benfuracarb (60)+TX, bensultap (66)+TX, beta-cyfluthrin (194)+TX, beta-cypermethrin (203)+TX, bifenthrin (76)+TX, bioallethrin (78)+TX, bioallethrin S-cyclopentenyl isomer (alternative name) (79)+TX, bioethanomethrin [CCN]+TX, biopermethrin (908)+TX, bioresmethrin (80)+TX, bis(2-chloroethyl) ether (IUPAC name) (909)+TX, bistrifluron (83)+TX, borax (86)+TX, brofenvalerate (alternative name)+TX, bromfenvinfos (914)+TX, bromocyclen (918)+TX, bromo-DDT (alternative name) [CCN]+TX, bromophos (920)+TX, bromophos-ethyl (921)+TX, bufencarb (924)+TX, buprofezin (99)+TX, butacarb (926)+TX, butathiofos (927)+TX, butocarboxim (103)+TX, butonate (932)+TX, butoxycarboxim (104)+TX, butylpyridaben (alternative name)+TX, cadusafos (109)+TX, calcium arsenate [CCN]+TX, calcium cyanide (444)+TX, calcium polysulfide (IUPAC name) (111)+TX, camphechlor (941)+TX, carbanolate (943)+TX, carbaryl (115)+TX, carbofuran (118)+TX, carbon disulfide (IUPAC/Chemical Abstracts name) (945)+TX, carbon tetrachloride (IUPAC name) (946)+TX, carbophenothion (947)+TX, carbosulfan (119)+TX, cartap (123)+TX, cartap hydrochloride (123)+TX, cevadine (alternative name) (725)+TX, chlorbicyclen (960)+TX, chlordane (128)+TX, chlordecone (963)+TX, chlordimeform (964)+TX, chlordimeform hydrochloride (964)+TX, chlorethoxyfos (129)+TX, chlorfenapyr (130)+TX, chlorfenvinphos (131)+TX, chlorfluazuron (132)+TX, chlormephos (136)+TX, chloroform [CCN]+TX, chloropicrin (141)+TX, chlorphoxim (989)+TX, chlorprazophos (990)+TX, chlorpyrifos (145)+TX, chlorpyrifos-methyl (146)+TX, chlorthiophos (994)+TX, chromafenozide (150)+TX, cinerin I (696)+TX, cinerin II (696)+TX, cinerins (696)+TX, cis-resmethrin (alternative name)+TX, cismethrin (80)+TX, clocythrin (alternative name)+TX, cloethocarb (999)+TX, closantel (alternative name) [CCN]+TX, clothianidin (165)+TX, copper acetoarsenite [CCN]+TX, copper arsenate [CCN]+TX, copper oleate [CCN]+TX, coumaphos (174)+TX, coumithoate (1006)+TX, crotamiton (alternative name) [CCN]+TX, crotoxyphos (1010)+TX, crufomate (1011)+TX, cryolite (alternative name) (177)+TX, CS 708 (development code) (1012)+TX, cyanofenphos (1019)+TX, cyanophos (184)+TX, cyanthoate (1020)+TX, cyclethrin [CCN]+TX, cycloprothrin (188)+TX, cyfluthrin (193)+TX, cyhalothrin (196)+TX, cypermethrin (201)+TX, cyphenothrin (206)+TX, cyromazine (209)+TX, cythioate (alternative name) [CCN]+TX, d-limonene (alternative name) [CCN]+TX, d-tetramethrin (alternative name) (788)+TX, DAEP (1031)+TX, dazomet (216)+TX, DDT (219)+TX, decarbofuran (1034)+TX, deltamethrin (223)+TX, demephion (1037)+TX, demephion-O (1037)+TX, demephion-S (1037)+TX, demeton (1038)+TX, demeton-methyl (224)+TX, demeton-O (1038)+TX, demeton-O-methyl (224)+TX, demeton-S(1038)+TX, demeton-S-methyl (224)+TX, demeton-S-methylsulphon (1039)+TX, diafenthiuron (226)+TX, dimpropyridaz+TX, dialifos (1042)+TX, diamidafos (1044)+TX, diazinon (227)+TX, dicapthon (1050)+TX, dichlofenthion (1051)+TX, dichlorvos (236)+TX, dicliphos (alternative name)+TX, dicresyl (alternative name) [CCN]+TX, dicrotophos (243)+TX, dicyclanil (244)+TX, dieldrin (1070)+TX, diethyl 5-methylpyrazol-3-yl phosphate (IUPAC name) (1076)+TX, diflubenzuron (250)+TX, dilor (alternative name) [CCN]+TX, dimefluthrin [CCN]+TX, dimefox (1081)+TX, dimetan (1085)+TX, dimethoate (262)+TX, dimethrin (1083)+TX, dimethylvinphos (265)+TX, dimetilan (1086)+TX, dinex (1089)+TX, dinex-diclexine (1089)+TX, dinoprop (1093)+TX, dinosam (1094)+TX, dinoseb (1095)+TX, dinotefuran (271)+TX, diofenolan (1099)+TX, dioxabenzofos (1100)+TX, dioxacarb (1101)+TX, dioxathion (1102)+TX, disulfoton (278)+TX, dithicrofos (1108)+TX, DNOC (282)+TX, doramectin (alternative name) [CCN]+TX, DSP (1115)+TX, ecdysterone (alternative name) [CCN]+TX, EI 1642 (development code) (1118)+TX, emamectin (291)+TX, emamectin benzoate (291)+TX, EMPC (1120)+TX, empenthrin (292)+TX, endosulfan (294)+TX, endothion (1121)+TX, endrin (1122)+TX, EPBP (1123)+TX, EPN (297)+TX, epofenonane (1124)+TX, eprinomectin (alternative name) [CCN]+TX, esfenvalerate (302)+TX, etaphos (alternative name) [CCN]+TX, ethiofencarb (308)+TX, ethion (309)+TX, ethiprole (310)+TX, ethoate-methyl (1134)+TX, ethoprophos (312)+TX, ethyl formate (IUPAC name) [CCN]+TX, ethyl-DDD (alternative name) (1056)+TX, ethylene dibromide (316)+TX, ethylene dichloride (chemical name) (1136)+TX, ethylene oxide [CCN]+TX, etofenprox (319)+TX, etrimfos (1142)+TX, EXD (1143)+TX, famphur (323)+TX, fenamiphos (326)+TX, fenazaflor (1147)+TX, fenchlorphos (1148)+TX, fenethacarb (1149)+TX, fenfluthrin (1150)+TX, fenitrothion (335)+TX, fenobucarb (336)+TX, fenoxacrim (1153)+TX, fenoxycarb (340)+TX, fenpirithrin (1155)+TX, fenpropathrin (342)+TX, fenpyrad (alternative name)+TX, fensulfothion (1158)+TX, fenthion (346)+TX, fenthion-ethyl [CCN]+TX, fenvalerate (349)+TX, fipronil (354)+TX, flonicamid (358)+TX, flubendiamide (CAS. Reg. No.: 272451-65-7)+TX, flucofuron (1168)+TX, flucycloxuron (366)+TX, flucythrinate (367)+TX, fluenetil (1169)+TX, flufenerim [CCN]+TX, flufenoxuron (370)+TX, flufenprox (1171)+TX, flumethrin (372)+TX, fluvalinate (1184)+TX, FMC 1137 (development code) (1185)+TX, fonofos (1191)+TX, formetanate (405)+TX, formetanate hydrochloride (405)+TX, formothion (1192)+TX, formparanate (1193)+TX, fosmethilan (1194)+TX, fospirate (1195)+TX, fosthiazate (408)+TX, fosthietan (1196)+TX, furathiocarb (412)+TX, furethrin (1200)+TX, gamma-cyhalothrin (197)+TX, gamma-HCH (430)+TX, guazatine (422)+TX, guazatine acetates (422)+TX, GY-81 (development code) (423)+TX, halfenprox (424)+TX, halofenozide (425)+TX, HCH (430)+TX, HEOD (1070)+TX, heptachlor (1211)+TX, heptenophos (432)+TX, heterophos [CCN]+TX, hexaflumuron (439)+TX, HHDN (864)+TX, hydramethylnon (443)+TX, hydrogen cyanide (444)+TX, hydroprene (445)+TX, hyquincarb (1223)+TX, imidacloprid (458)+TX, imiprothrin (460)+TX, indoxacarb (465)+TX, iodomethane (IUPAC name) (542)+TX, IPSP (1229)+TX, isazofos (1231)+TX, isobenzan (1232)+TX, isocarbophos (alternative name) (473)+TX, isodrin (1235)+TX, isofenphos (1236)+TX, isolane (1237)+TX, isoprocarb (472)+TX, isopropyl 0-(methoxy-aminothiophosphoryl)salicylate (IUPAC name) (473)+TX, isoprothiolane (474)+TX, isothioate (1244)+TX, isoxathion (480)+TX, ivermectin (alternative name) [CCN]+TX, jasmolin I (696)+TX, jasmolin II (696)+TX, jodfenphos (1248)+TX, juvenile hormone I (alternative name) [CCN]+TX, juvenile hormone II (alternative name) [CCN]+TX, juvenile hormone III (alternative name) [CCN]+TX, kelevan (1249)+TX, kinoprene (484)+TX, lambda-cyhalothrin (198)+TX, lead arsenate [CCN]+TX, lepimectin (CCN)+TX, leptophos (1250)+TX, lindane (430)+TX, lirimfos (1251)+TX, lufenuron (490)+TX, lythidathion (1253)+TX, m-cumenyl methylcarbamate (IUPAC name) (1014)+TX, magnesium phosphide (IUPAC name) (640)+TX, malathion (492)+TX, malonoben (1254)+TX, mazidox (1255)+TX, mecarbam (502)+TX, mecarphon (1258)+TX, menazon (1260)+TX, mephosfolan (1261)+TX, mercurous chloride (513)+TX, mesulfenfos (1263)+TX, metaflumizone (CCN)+TX, metam (519)+TX, metampotassium (alternative name) (519)+TX, metam-sodium (519)+TX, methacrifos (1266)+TX, methamidophos (527)+TX, methanesulfonyl fluoride (IUPAC/Chemical Abstracts name) (1268)+TX, methidathion (529)+TX, methiocarb (530)+TX, methocrotophos (1273)+TX, methomyl (531)+TX, methoprene (532)+TX, methoquin-butyl (1276)+TX, methothrin (alternative name) (533)+TX, methoxychlor (534)+TX, methoxyfenozide (535)+TX, methyl bromide (537)+TX, methyl isothiocyanate (543)+TX, methylchloroform (alternative name) [CCN]+TX, methylene chloride [CCN]+TX, metofluthrin [CCN]+TX, metolcarb (550)+TX, metoxadiazone (1288)+TX, mevinphos (556)+TX, mexacarbate (1290)+TX, milbemectin (557)+TX, milbemycin oxime (alternative name) [CCN]+TX, mipafox (1293)+TX, mirex (1294)+TX, monocrotophos (561)+TX, morphothion (1300)+TX, moxidectin (alternative name) [CCN]+TX, naftalofos (alternative name) [CCN]+TX, naled (567)+TX, naphthalene (IUPAC/Chemical Abstracts name) (1303)+TX, NC-170 (development code) (1306)+TX, NC-184 (compound code)+TX, nicotine (578)+TX, nicotine sulfate (578)+TX, nifluridide (1309)+TX, nitenpyram (579)+TX, nithiazine (1311)+TX, nitrilacarb (1313)+TX, nitrilacarb 1:1 zinc chloride complex (1313)+TX, NNI-0101 (compound code)+TX, NNI-0250 (compound code)+TX, nornicotine (traditional name) (1319)+TX, novaluron (585)+TX, noviflumuron (586)+TX, O-5-dichloro-4-iodophenyl O-ethyl ethylphosphonothioate (IUPAC name) (1057)+TX, O,O-diethyl O-4-methyl-2-oxo-2H-chromen-7-yl phosphorothioate (IUPAC name) (1074)+TX, O,O-diethyl O-6-methyl-2-propylpyrimidin-4-yl phosphorothioate (IUPAC name) (1075)+TX, O,O,O',O'-tetrapropyl dithiopyrophosphate (IUPAC name) (1424)+TX, oleic acid (IUPAC name) (593)+TX, omethoate (594)+TX, oxamyl (602)+TX, oxydemeton-methyl (609)+TX, oxydeprofos (1324)+TX, oxydisulfoton (1325)+TX, pp'-DDT (219)+TX, para-dichlorobenzene [CCN]+TX, parathion (615)+TX, parathion-methyl (616)+TX, penfluron (alternative name) [CCN]+TX, pentachlorophenol (623)+TX, pentachlorophenyl laurate (IUPAC name) (623)+TX, permethrin (626)+TX, petroleum oils (alternative name) (628)+TX, PH 60-38 (development code) (1328)+TX, phenkapton (1330)+TX, phenothrin (630)+TX, phenthoate (631)+TX, phorate (636)+TX, phosalone (637)+TX, phosfolan (1338)+TX, phosmet (638)+TX, phosnichlor (1339)+TX, phosphamidon (639)+TX, phosphine (IUPAC name) (640)+TX, phoxim (642)+TX, phoxim-methyl (1340)+TX, pirimetaphos (1344)+TX, pirimicarb (651)+TX, pirimiphos-ethyl (1345)+TX, pirimiphos-methyl (652)+TX, polychlorodicyclopentadiene isomers (IUPAC name) (1346)+TX, polychloroterpenes (traditional name) (1347)+TX, potassium arsenite [CCN]+TX, potassium thiocyanate [CCN]+TX, prallethrin (655)+TX, precocene I (alternative name) [CCN]+TX, precocene II (alternative name) [CCN]+TX, precocene III (alternative name) [CCN]+TX, primidophos (1349)+TX, profenofos (662)+TX, profluthrin [CCN]+TX, promacyl (1354)+TX, promecarb (1355)+TX, propaphos (1356)+TX, propetamphos (673)+TX, propoxur (678)+TX, prothidathion (1360)+TX, prothiofos (686)+TX, prothoate (1362)+TX, protrifenbute [CCN]+TX, pymetrozine (688)+TX, pyraclofos (689)+TX, pyrazophos (693)+TX, pyresmethrin (1367)+TX, pyrethrin I (696)+TX, pyrethrin II (696)+TX, pyrethrins (696)+TX, pyridaben (699)+TX, pyridalyl (700)+TX, pyridaphenthion (701)+TX, pyrimidifen (706)+TX, pyrimitate (1370)+TX, pyriproxyfen (708)+TX, quassia (alternative name) [CCN]+TX, quinalphos (711)+TX, quinalphos-methyl (1376)+TX, quinothion (1380)+TX, quintiofos (1381)+TX, R-1492 (development code) (1382)+TX, rafoxanide (alternative name) [CCN]+TX, resmethrin (719)+TX, rotenone (722)+TX, RU 15525 (development code) (723)+TX, RU 25475 (development code) (1386)+TX, ryania (alternative name) (1387)+TX, ryanodine (traditional name) (1387)+TX, sabadilla (alternative name) (725)+TX, schradan (1389)+TX, sebufos (alternative name)+TX, selamectin (alternative name) [CCN]+TX, SI-0009 (compound code)+TX, SI-0205 (compound code)+TX, SI-0404 (compound code)+TX, SI-0405 (compound code)+TX, silafluofen (728)+TX, SN 72129 (development code) (1397)+TX, sodium arsenite [CCN]+TX, sodium cyanide (444)+TX, sodium fluoride (IUPAC/Chemical Abstracts name) (1399)+TX, sodium hexafluorosilicate (1400)+TX, sodium pentachlorophenoxide (623)+TX, sodium selenate (IUPAC name) (1401)+TX, sodium thiocyanate [CCN]+TX, sophamide (1402)+TX, spinosad (737)+TX, spiromesifen (739)+TX, spirotetrmat (CCN)+TX, sulcofuron (746)+TX, sulcofuron-sodium (746)+TX, sulfluramid (750)+TX, sulfotep (753)+TX, sulfuryl fluoride (756)+TX, sulprofos (1408)+TX, tar oils (alternative name) (758)+TX, tau-fluvalinate (398)+TX, tazimcarb (1412)+TX, TDE (1414)+TX, tebufenozide (762)+TX, tebufenpyrad (763)+TX, tebupirimfos (764)+TX, teflubenzuron (768)+TX, tefluthrin (769)+TX, temephos (770)+TX, TEPP (1417)+TX, terallethrin (1418)+TX, terbam (alternative name)+TX, terbufos (773)+TX, tetrachloroethane [CCN]+TX, tetrachlorvinphos (777)+TX, tetramethrin (787)+TX, theta-cypermethrin (204)+TX, thiacloprid (791)+TX, thiafenox (alternative name)+TX, thiamethoxam (792)+TX, thicrofos (1428)+TX, thiocarboxime (1431)+TX, thiocyclam (798)+TX, thiocyclam hydrogen oxalate (798)+TX, thiodicarb (799)+TX, thiofanox (800)+TX, thiometon (801)+TX, thionazin (1434)+TX, thiosultap (803)+TX, thiosultap-sodium (803)+TX, thuringiensin (alternative name) [CCN]+TX, tolfenpyrad (809)+TX, tralomethrin (812)+TX, transfluthrin (813)+TX, transpermethrin (1440)+TX, triamiphos (1441)+TX, triazamate (818)+TX, triazophos (820)+TX, triazuron (alternative name)+TX, trichlorfon (824)+TX, trichlormetaphos-3 (alternative name) [CCN]+TX, trichloronat (1452)+TX, trifenofos (1455)+TX, triflumuron (835)+TX, trimethacarb (840)+TX, triprene (1459)+TX, vamidothion (847)+TX, vaniliprole [CCN]+TX, veratridine (alternative name) (725)+TX, veratrine (alternative name) (725)+TX, XMC (853)+TX, xylylcarb (854)+TX, YI-5302 (compound code)+TX, zeta-cypermethrin (205)+TX, zetamethrin (alternative name)+TX, zinc phosphide (640)+TX, zolaprofos (1469) and ZXI 8901 (development code) (858)+TX, cyantraniliprole [736994-63-19+TX, chlorantraniliprole [500008-45-7]+TX, cyenopyrafen [560121-52-0]+TX, cyflumetofen [400882-07-7]+TX, pyrifluquinazon [337458-27-2]+TX, spinetoram [187166-40-1+187166-15-0]+TX, spirotetramat [203313-25-1]+TX, sulfoxaflor [946578-00-3]+TX, flufiprole [704886-18-0]+TX, meperfluthrin [915288-13-0]+TX, tetramethylfluthrin [84937-88-2]+TX, triflumezopyrim (disclosed in WO 2012/092115)+TX, fluxametamide (WO 2007/026965)+TX, epsilon-metofluthrin [240494-71-7]+TX, epsilon-momfluorothrin [1065124-65-3]+TX, fluazaindolizine [1254304-22-7]+TX, chloroprallethrin [399572-87-3]+TX, fluxametamide [928783-29-3]+TX, cyhalodiamide [1262605-53-7]+TX, tioxazafen [330459-31-9]+TX, broflanilide [1207727-04-5]+TX, flufiprole [704886-18-0]+TX, cyclaniliprole [1031756-98-5]+TX, tetraniliprole [1229654-66-3]+TX, guadipyr (described in WO2010/060231)+TX, cycloxaprid (described in WO 2005/077934)+TX, spiropidion+TX, Afidopyropen+TX, flupyrimin+TX, Momfluorothrin+TX, kappa-bifenthrin+TX, kappa-tefluthrin+TX, Dichloromezotiaz+TX, Tetrachloraniliprole+TX, benzpyrimoxan+TX a molluscicide selected from the group of substances consisting of bis(tributyltin) oxide (IUPAC name) (913)+TX, bromoacetamide [CCN]+TX, calcium arsenate [CCN]+TX, cloethocarb (999)+TX, copper acetoarsenite [CCN]+TX, copper sulfate (172)+TX, fentin (347)+TX, ferric phosphate (IUPAC name) (352)+TX, metaldehyde (518)+TX, methiocarb (530)+TX, niclosamide (576)+TX, niclosamide-olamine (576)+TX, pentachlorophenol (623)+TX, sodium pentachlorophenoxide (623)+TX, tazimcarb (1412)+TX, thiodicarb (799)+TX, tributyltin oxide (913)+TX, trifenmorph (1454)+TX, trimethacarb (840)+TX, triphenyltin acetate (IUPAC name) (347) and triphenyltin hydroxide (IUPAC name) (347)+TX, pyriprole [394730-71-3]+TX, a nematicide selected from the group of substances consisting of AKD-3088 (compound code)+TX, 1,2-dibromo-3-chloropropane (IUPAC/Chemical Abstracts name) (1045)+TX, 1,2-dichloropropane (IUPAC/Chemical Abstracts name) (1062)+TX, 1,2-dichloropropane with 1,3-dichloropropene (IUPAC name) (1063)+TX, 1,3-dichloropropene (233)+TX, 3,4-dichlorotetrahydrothiophene 1,1-dioxide (IUPAC/Chemical Abstracts name) (1065)+TX, 3-(4-chlorophenyl)-5-methylrhodanine (IUPAC name) (980)+TX, 5-methyl-6-thioxo-1,3,5-thiadiazinan-3-ylacetic acid (IUPAC name) (1286)+TX, 6-isopentenylaminopurine (alternative name) (210)+TX, abamectin (1)+TX, acetoprole [CCN]+TX, alanycarb (15)+TX, aldicarb (16)+TX, aldoxycarb (863)+TX, AZ 60541 (compound code)+TX, benclothiaz [CCN]+TX, benomyl (62)+TX, butylpyridaben (alternative name)+TX, cadusafos (109)+TX, carbofuran (118)+TX, carbon disulfide (945)+TX, carbosulfan (119)+TX, chloropicrin (141)+TX, chlorpyrifos (145)+TX, cloethocarb (999)+TX, cytokinins (alternative name) (210)+TX, dazomet (216)+TX, DBCP (1045)+TX, DCIP (218)+TX, diamidafos (1044)+TX, dichlofenthion (1051)+TX, dicliphos (alternative name)+TX, dimethoate (262)+TX, doramectin (alternative name) [CCN]+TX, emamectin (291)+TX, emamectin benzoate (291)+TX, eprinomectin (alternative name) [CCN]+TX, ethoprophos (312)+TX, ethylene dibromide (316)+TX, fenamiphos (326)+TX, fenpyrad (alternative name)+TX, fensulfothion (1158)+TX, fosthiazate (408)+TX, fosthietan (1196)+TX, furfural (alternative name) [CCN]+TX, GY-81 (development code) (423)+TX, heterophos [CCN]+TX, iodomethane (IUPAC name) (542)+TX, isamidofos (1230)+TX, isazofos (1231)+TX, ivermectin (alternative name) [CCN]+TX, kinetin (alternative name) (210)+TX, mecarphon (1258)+TX, metam (519)+TX, metam-potassium (alternative name) (519)+TX, metam-sodium (519)+TX, methyl bromide (537)+TX, methyl isothiocyanate (543)+TX, milbemycin oxime (alternative name) [CCN]+TX, moxidectin (alternative name) [CCN]+TX, *Myrothecium verrucaria* composition (alternative name) (565)+TX, NC-184 (compound code)+TX, oxamyl (602)+TX, phorate (636)+TX, phosphamidon (639)+TX, phosphocarb [CCN]+TX, sebufos (alternative name)+TX, selamectin (alternative name) [CCN]+TX, spinosad (737)+TX, terbam (alternative name)+TX, terbufos (773)+TX, tetrachlorothiophene (IUPAC/Chemical Abstracts name) (1422)+TX, thiafenox (alternative name)+TX, thionazin (1434)+TX, triazophos (820)+TX, triazuron (alternative name)+TX, xylenols [CCN]+TX, YI-5302 (compound code) and zeatin (alternative name) (210)+TX, fluensulfone [318290-98-1]+TX, fluopyram+TX, a nitrification inhibitor selected from the group of substances consisting of potassium ethylxanthate [CCN] and nitrapyrin (580)+TX, a plant activator selected from the group of substances consisting of acibenzolar (6)+TX, acibenzolar-S-methyl (6)+TX, probenazole (658) and *Reynoutria sachalinensis* extract (alternative name) (720)+TX, a rodenticide selected from the group of substances consisting of 2-isovalerylindan-1,3-dione (IUPAC name) (1246)+TX, 4-(quinoxalin-2-ylamino)benzenesulfonamide (IUPAC name) (748)+TX, alpha-chlorohydrin [CCN]+TX, aluminium phosphide (640)+TX, antu (880)+TX, arsenous oxide (882)+TX, barium carbonate (891)+TX, bisthiosemi (912)+TX, brodifacoum (89)+TX, bromadiolone (91)+TX, bromethalin (92)+TX, calcium cyanide (444)+TX, chloralose (127)+TX, chlorophacinone (140)+TX, cholecalciferol (alternative name) (850)+TX, coumachlor (1004)+TX, coumafuryl (1005)+TX, coumatetralyl (175)+TX, crimidine (1009)+TX, difenacoum (246)+TX, difethialone (249)+TX, diphacinone (273)+TX, ergocalciferol (301)+TX, flocoumafen (357)+TX, fluoroacetamide (379)+TX, flupropadine (1183)+TX, flupropadine hydrochloride (1183)+TX, gamma-HCH (430)+TX, HCH (430)+TX, hydrogen cyanide (444)+TX, iodomethane (IUPAC name) (542)+TX, lindane (430)+TX, magnesium phosphide (IUPAC name) (640)+TX, methyl bromide (537)+TX, norbormide (1318)+TX, phosacetim (1336)+TX, phosphine (IUPAC name) (640)+TX, phosphorus [CCN]+TX, pindone (1341)+TX, potassium arsenite [CCN]+TX, pyrinuron (1371)+TX, scilliroside (1390)+TX, sodium arsenite [CCN]+TX, sodium cyanide (444)+TX, sodium fluoroacetate (735)+TX, strychnine (745)+TX, thallium sulfate [CCN]+TX, warfarin (851) and zinc phosphide (640)+TX, a synergist selected from the group of substances consisting of 2-(2-butoxyethoxy)ethyl piperonylate (IUPAC name) (934)+TX, 5-(1,3-benzodioxol-5-yl)-3-hexylcyclohex-2-enone (IUPAC name) (903)+TX, farnesol with nerolidol (alternative name) (324)+TX, MB-599 (development code) (498)+TX, MGK 264 (development code) (296)+TX, piperonyl butoxide (649)+TX, piprotal (1343)+TX, propyl isomer (1358)+TX, S421 (development code) (724)+TX, sesamex (1393)+TX, sesasmolin (1394) and sulfoxide (1406)+TX, an animal repellent selected from the group of substances consisting of anthraquinone (32)+TX, chloralose (127)+TX, copper naphthenate [CCN]+TX, copper oxychloride (171)+TX, diazinon (227)+TX, dicyclopentadiene (chemical name) (1069)+TX, guazatine (422)+TX, guazatine acetates (422)+TX, methiocarb (530)+TX, pyridin-4-amine (IUPAC name) (23)+TX, thiram (804)+TX, trimethacarb (840)+TX, zinc naphthenate [CCN] and ziram (856)+TX, a virucide selected from the group of substances consisting of imanin (alternative name) [CCN] and ribavirin (alternative name) [CCN]+TX, a wound protectant selected from the group of substances consisting of mercuric oxide (512)+TX, octhilinone (590) and thiophanate-methyl (802)+TX, and biologically active compounds selected from the group consisting of azaconazole (60207-31-0]+TX, bitertanol [70585-36-3]+TX, bromuconazole [116255-48-2]+TX, cyproconazole [94361-06-5]+TX, difenoconazole [119446-68-3]+TX, diniconazole [83657-24-3]+TX, epoxiconazole [106325-08-0]+TX, fenbuconazole [114369-43-6]+TX, fluquinconazole [136426-54-5]+TX, flusilazole [85509-19-9]+TX, flutriafol [76674-21-0]+TX, hexaconazole [79983-71-4]+TX, imazalil [35554-44-0]+TX, imibenconazole [86598-92-7]+TX, ipconazole [125225-28-7]+TX, metconazole [125116-23-6]+TX, myclobutanil [88671-89-0]+TX, pefurazoate [101903-30-4]+TX, penconazole [66246-88-6]+

TX, prothioconazole [178928-70-6]+TX, pyrifenox [88283-41-4]+TX, prochloraz [67747-09-5]+TX, propiconazole [60207-90-1]+TX, simeconazole [149508-90-7]+TX, tebuconazole [107534-96-3]+TX, tetraconazole [112281-77-3]+TX, triadimefon [43121-43-3]+TX, triadimenol [55219-65-3]+TX, triflumizole [99387-89-0]+TX, triticonazole [131983-72-7]+TX, ancymidol [12771-68-5]+TX, fenarimol [60168-88-9]+TX, nuarimol [63284-71-9]+TX, bupirimate [41483-43-6]+TX, dimethirimol [5221-53-4]+TX, ethirimol [23947-60-6]+TX, dodemorph [1593-77-7]+TX, fenpropidine [67306-00-7]+TX, fenpropimorph [67564-91-4]+TX, spiroxamine [118134-30-8]+TX, tridemorph [81412-43-3]+TX, cyprodinil [121552-61-2]+TX, mepanipyrim [110235-47-7]+TX, pyrimethanil [53112-28-0]+TX, fenpiclonil [74738-17-3]+TX, fludioxonil [131341-86-1]+TX, benalaxyl [71626-11-4]+TX, furalaxyl [57646-30-7]+TX, metalaxyl [57837-19-1]+TX, R-metalaxyl [70630-17-0]+TX, ofurace [58810-48-3]+TX, oxadixyl [77732-09-3]+TX, benomyl [17804-35-2]+TX, carbendazim [10605-21-7]+TX, debacarb [62732-91-6]+TX, fuberidazole [3878-19-1]+TX, thiabendazole [148-79-8]+TX, chlozolinate [84332-86-5]+TX, dichlozoline [24201-58-9]+TX, iprodione [36734-19-7]+TX, myclozoline [54864-61-8]+TX, procymidone [32809-16-8]+TX, vinclozoline [50471-44-8]+TX, boscalid [188425-85-6]+TX, carboxin [5234-68-4]+TX, fenfuram [24691-80-3]+TX, flutolanil [66332-96-5]+TX, mepronil [55814-41-0]+TX, oxycarboxin [5259-88-1]+TX, penthiopyrad [183675-82-3]+TX, thifluzamide [130000-40-7]+TX, guazatine [108173-90-6]+TX, dodine [2439-10-3] [112-65-2] (free base)+TX, iminoctadine [13516-27-3]+TX, azoxystrobin [131860-33-8]+TX, dimoxystrobin [149961-52-4]+TX, enestroburin {Proc. BCPC, Int. Congr., Glasgow, 2003, 1,93}+TX, fluoxastrobin [361377-29-9]+TX, kresoxim-methyl [143390-89-0]+TX, metominostrobin [133408-50-1]+TX, trifloxystrobin [141517-21-7]+TX, orysastrobin [248593-16-0]+TX, picoxystrobin [117428-22-5]+TX, pyraclostrobin [175013-18-0]+TX, ferbam [14484-64-1]+TX, mancozeb [8018-01-7]+TX, maneb [12427-38-2]+TX, metiram [9006-42-2]+TX, propineb [12071-83-9]+TX, thiram [137-26-8]+TX, zineb [12122-67-7]+TX, ziram [137-30-4]+TX, captafol [2425-06-1]+TX, captan [133-06-2]+TX, dichlofluanid [1085-98-9]+TX, fluoroimide [41205-21-4]+TX, folpet [133-07-3]+TX, tolylfluanid [731-27-1]+TX, bordeaux mixture [8011-63-0]+TX, copperhydroxid [20427-59-2]+TX, copperoxychlorid [1332-40-7]+TX, coppersulfat [7758-98-7]+TX, copperoxid [1317-39-1]+TX, mancopper [53988-93-5]+TX, oxine-copper [10380-28-6]+TX, dinocap [131-72-6]+TX, nitrothal-isopropyl [10552-74-6]+TX, edifenphos [17109-49-8]+TX, iprobenphos [26087-47-8]+TX, isoprothiolane [50512-35-1]+TX, phosdiphen [36519-00-3]+TX, pyrazophos [13457-18-6]+TX, tolclofos-methyl [57018-04-9]+TX, acibenzo-lar-S-methyl [135158-54-2]+TX, anilazine [101-05-3]+TX, benthiavalicarb [413615-35-7]+TX, blasticidin-S [2079-00-7]+TX, chinomethionat [2439-01-2]+TX, chloroneb [2675-77-6]+TX, chlorothalonil [1897-45-6]+TX, cyflufenamid [180409-60-3]+TX, cymoxanil [57966-95-7]+TX, dichlone [117-80-6]+TX, diclocymet [139920-32-4]+TX, diclomezine [62865-36-5]+TX, dicloran [99-30-9]+TX, diethofencarb [87130-20-9]+TX, dimethomorph [110488-70-5]+TX, SYP-L190 (Flumorph) [211867-47-9]+TX, dithianon [3347-22-6]+TX, ethaboxam [162650-77-3]+TX, etridiazole [2593-15-9]+TX, famoxadone [131807-57-3]+TX, fenamidone [161326-34-7]+TX, fenoxanil [115852-48-7]+TX, fentin [668-34-8]+TX, ferimzone [89269-64-7]+TX, fluazinam 179622-59-6]+TX, fluopicolide [239110-15-7]+TX, flusulfamide [106917-52-6]+TX, fenhexamid [126833-17-8]+TX, fosetyl-aluminium [39148-24-8]+TX, hymexazol [10004-44-1]+TX, iprovalicarb [140923-17-7]+TX, IKF-916 (Cyazofamid) [120116-88-3]+TX, kasugamycin [6980-18-3]+TX, methasulfocarb [66952-49-6]+TX, metrafenone [220899-03-6]+TX, pencycuron [66063-05-6]+TX, phthalide [27355-22-2]+TX, polyoxins [11113-80-7]+TX, probenazole [27605-76-1]+TX, propamocarb [25606-41-1]+TX, proquinazid [189278-12-4]+TX, pyroquilon [57369-32-1]+TX, quinoxyfen [124495-18-7]+TX, quintozene [82-68-8]+TX, sulfur [7704-34-9]+TX, tiadinil [223580-51-6]+TX, triazoxide [72459-58-6]+TX, tricyclazole [41814-78-2]+TX, triforine [26644-46-2]+TX, validamycin [37248-47-8]+TX, zoxamide (RH7281) [156052-68-5]+TX, mandipropamid [374726-62-2]+TX, isopyrazam [881685-58-1]+TX, sedaxane [874967-67-6]+TX, 3-difluoromethyl-1-methyl-1H-pyrazole-4-carboxylic acid (9-dichloromethylene-1,2,3,4-tetrahydro-1,4-methano-naphthalen-5-yl)-amide (disclosed in WO 2007/048556)+TX, 3-difluoromethyl-1-methyl-1H-pyrazole-4-carboxylic acid (3',4',5'-trifluoro-biphenyl-2-yl)-amide (disclosed in WO 2006/087343)+TX, [(3S,4R,4aR,6S,6aS,12R,12aS,12bS)-3-[(cyclopropylcarbonyl)oxy]-1,3,4,4a,5,6,6a,12,12a,12b-decahydro-6,12-dihydroxy-4,6a,12b-trimethyl-11-oxo-9-(3-pyridinyl)-2H,11Hnaphtho[2,1-b]pyrano[3,4-e]pyran-4-yl]methyl-cyclopropanecarboxylate [915972-17-7]+TX and 1,3,5-trimethyl-N-(2-methyl-1-oxopropyl)-N-[3-(2-methylpropyl)-4-[2,2,2-trifluoro-1-methoxy-1-(trifluoromethyl)ethyl]phenyl]-1H-pyrazole-4-carboxamide [926914-55-8]+TX; lancotrione [1486617-21-3]+TX, florpyrauxifen [943832-81-3]]+TX, ipfentrifluconazole[1417782-08-1]+TX, mefentrifluconazole [1417782-03-6]+TX, quinofumelin [861647-84-9]+TX, chloroprallethrin [399572-87-3]+TX, cyhalodiamide [1262605-53-7]]+TX, fluazaindolizine [1254304-22-7]+TX, fluxametamide [928783-29-3]+TX, epsilon-metofluthrin [240494-71-7]+TX, epsilon-momfluorothrin [1065124-65-3]+TX, pydiflumetofen [1228284-64-7]+TX, kappa-bifenthrin [439680-76-9]+TX, broflanilide [1207727-04-5]+TX, dicloromezotiaz [1263629-39-5]+TX, dipymetitrone [16114-35-5]+TX, pyraziflumid [942515-63-1]+TX, kappa-tefluthrin [391634-71-2]+TX, fenpicoxamid [517875-34-2]+TX; fluindapyr [1383809-87-7]+TX; alpha-bromadiolone [28772-56-7]+TX; flupyrimin [1689566-03-7]+TX; benzpyrimoxan [1449021-97-9]+TX; acynonapyr [1332838-17-1]+TX; inpyrfluxam [1352994-67-2]+TX, isoflucypram [1255734-28-1]+TX; rescalure [64309-03-1]+TX; aminopyrifen [1531626-08-0]+TX; tyclopyrazoflor [1477919-27-9]+TX; and spiropidion [1229023-00-0]+TX; and microbials including: *Acinetobacter* lwoffii+TX, *Acremonium alternatum*+TX+TX, *Acremonium cephalosporium*+TX+TX, *Acremonium diospyri*+TX, *Acremonium obclavatum*+TX, *Adoxophyes orana* granulovirus (AdoxGV) (Capex®)+TX, *Agrobacterium radiobacter* strain K84 (Galltrol-A®)+TX, *Alternaria alternate*+TX, *Alternaria cassia*+TX, *Alternaria destruens* (Smolder®)+TX,

*Ampelomyces quisqualis* (AQ10e)+TX, *Aspergillus flavus* AF36 (AF36®)+TX, *Aspergillus flavus* NRRL 21882 (Aflaguard®)+TX, *Aspergillus* spp.+TX, *Aureobasidium pullulans*+TX, *Azospirillum*+TX, (MicroAZ®+TX, TAZO B®)+TX, *Azotobacter*+TX, *Azotobacter chroocuccum* (Azotomeal®)+TX, *Azotobacter* cysts (Bionatural Blooming Blossoms®)+TX, *Bacillus amyloliquefaciens*+TX, *Bacillus cereus*+TX, *Bacillus* chitinosporus strain CM-1+TX, *Bacillus* chitinosporus strain AQ746+TX, *Bacillus licheniformis* strain HB-2 (Biostart™ Rhizoboost®)+TX, *Bacillus licheniformis* strain 3086 (EcoGuard®+TX, Green Releaf®)+TX, *Bacillus circulans*+TX, *Bacillus firmus* (BioSafe®+TX, BioNem-WP®+TX, VOTiVO®)+TX, *Bacillus firmus* strain 1-1582+TX, *Bacillus macerans*+TX, *Bacillus marismortui*+TX, *Bacillus megaterium*+TX, *Bacillus mycoides* strain AQ726+TX, *Bacillus papillae* (Milky Spore Powdere)+TX, *Bacillus pumilus* spp.+TX, *Bacillus pumilus* strain GB34 (Yield Shield®)+TX, *Bacillus pumilus* strain AQ717+TX, *Bacillus pumilus* strain QST 2808 (Sonata®+TX, Ballad Plus®)+TX, *Bacillus* spahericus (VectoLex®)+TX, *Bacillus* spp.+TX, *Bacillus* spp. strain AQ175+TX, *Bacillus* spp. strain AQ177+TX, *Bacillus* spp. strain AQ178+TX, *Bacillus subtilis* strain QST 713 (CEASE®+TX, Serenade®+TX, Rhapsody®)+TX, *Bacillus subtilis* strain QST 714 (JAZZ®)+TX, *Bacillus subtilis* strain AQ153+TX, *Bacillus subtilis* strain AQ743+TX, *Bacillus subtilis* strain QST3002+TX, *Bacillus subtilis* strain QST3004+TX, *Bacillus subtilis* var. *amyloliquefaciens* strain FZB24 (Taegro®+TX, Rhizopro®)+TX, *Bacillus thuringiensis* Cry 2Ae+TX, *Bacillus thuringiensis* Cry1Ab+TX, *Bacillus thuringiensis aizawai* GC 91 (Agree®)+TX, *Bacillus thuringiensis israelensis* (BMP123e+TX, Aquabac®+TX, VectoBac®)+TX, *Bacillus thuringiensis kurstaki* (Javelin®+TX, Deliver®+TX, CryMax®+TX, Bonide®+TX, Scutella WP®+TX, Turilav WP®+TX, Astuto®+TX, Dipel WP®+TX, Biobit®+TX, Foray®)+TX, *Bacillus thuringiensis kurstaki* BMP 123 (Baritone®)+TX, *Bacillus thuringiensis kurstaki* HD-1 (Bioprotec-CAF/3P®)+TX, *Bacillus thuringiensis* strain BD #32+TX, *Bacillus thuringiensis* strain AQ52+TX, *Bacillus thuringiensis* var. *aizawai* (XenTari®+TX, DiPel®)+TX, bacteria spp. (GROW-MEND®+TX, GROWSWEET®+TX, Shootup®)+TX, bacteriophage of *Clavipacter michiganensis* (AgriPhage®)+TX, Bakflor®+TX, *Beauveria bassiana* (Beaugenic®+TX, Brocaril WP®)+TX, *Beauveria bassiana* GHA (Mycotrol ES®+TX, Mycotrol O®+TX, BotaniGuard®)+TX, *Beauveria brongniartii* (Engerlingspilz®+TX, Schweizer *Beauveria*®+TX, Melocont®)+TX, *Beauveria* spp.+TX, *Botrytis* cineria+TX, *Bradyrhizobium japonicum* (TerraMax®)+TX, *Brevibacillus brevis*+TX, *Bacillus thuringiensis tenebrionis* (Novodor®)+TX, BtBooster+TX, *Burkholderia cepacia* (Deny®+TX, Intercept®+TX, Blue Circle®)+TX, *Burkholderia gladii*+TX, *Burkholderia gladioli*+TX, *Burkholderia* spp.+TX, Canadian thistle fungus (CBH Canadian Bioherbicide®)+TX, *Candida butyri*+TX, *Candida famata*+TX, *Candida* (ructus+TX, *Candida glabrata*+TX, *Candida guiffiermondii*+TX, *Candida melibiosica*+TX, *Candida oleophila* strain O+TX, *Candida parapsilosis*+TX, *Candida pelliculosa*+TX, *Candida pulcherrima*+TX, *Candida reukaufii*+TX, *Candida saitoana* (Bio-Coat®+TX, Biocure®)+TX, *Candida sake*+TX, *Candida* spp.+TX, *Candida tenius*+TX, *Cedecea* dravisae+TX, *Cellulomonas flavigena*+TX, *Chaetomium cochliodes* (Nova-Cide®)+TX, *Chaetomium globosum* (Nova-Cide®)+TX, *Chromobacterium subtsugae* strain PRAA4-1T (Grandevo®)+TX, *Cladosporium cladosporioides*+TX, *Cladosporium oxysporum*+TX, *Cladosporium chlorocephalum*+TX, *Cladosporium* spp.+TX, *Cladosporium tenuissimum*+TX, *Clonostachys rosea* (EndoFine®)+TX, *Colletotrichum acutatum*+TX, *Coniothyrium minitans* (Cotans WG®)+TX, *Coniothyrium* spp.+TX, *Cryptococcus albidus* (YIELDPLUS®)+TX, *Cryptococcus humicola*+TX, *Cryptococcus* infirmo-miniatus+TX, *Cryptococcus laurentii*+TX, *Cryptophlebia leucotreta* granulovirus (Cryptex®)+TX, *Cupriavidus campinensis*+TX, *Cydia pomonella* granulovirus (CYD-X®)+TX, *Cydia pomonella* granulovirus (Madex®+TX, Madex Plus®+TX, Madex Max/Carpovirusine®)+TX, *Cylindrobasidium laeve* (Stumpout®)+TX, Cylindrocladium+TX, *Debaryomyces hansenfi*+TX, *Drechslera hawaiinensis*+TX, *Enterobacter cloacae*+TX, Enterobacteriaceae+TX, *Entomophtora virulenta* (Vektor®)+TX, *Epicoccum nigrum*+TX, *Epicoccum purpurascens*+TX, *Epicoccum* spp.+TX, *Filobasidium floriforme*+TX, *Fusarium acuminatum*+TX, *Fusarium chlamydosporum*+TX, *Fusarium oxysporum* (Fusaclean®/Biofox C®)+TX, *Fusarium proliferatum*+TX, *Fusarium* spp.+TX, *Galactomyces geotrichum*+TX, *Gliocladium catenulatum* (Primastop®+TX, Prestop®)+TX, *Gliocladium roseum*+TX, *Gliocladium* spp. (SoilGard®)+TX, *Gliocladium virens* (Soilgard®)+TX, Granulovirus (Granuporn®)+TX, *Halobacillus halophilus*+TX, *Halobacillus litoralis*+TX, *Halobacillus trueperi*+TX, *Halomonas* spp.+TX, *Halomonas subglaciescola*+TX, Halovibrio *variabilis*+TX, *Hanseniaspora uvarum*+TX, *Helicoverpa armigera* nucleopolyhedrovirus (Helicovex®)+TX, *Helicoverpa zea* nuclear polyhedrosis virus (Gemstar®)+TX, Isoflavone formononetin (Myconate®)+TX, *Kloeckera apiculata*+TX, *Kloeckera* spp.+TX, *Lagenidium giganteum* (Laginex®)+TX, *Lecanicillium longisporum* (Vertiblast®)+TX, *Lecanicillium muscarium* (Vertikil®)+TX, *Lymantria Dispar* nucleopolyhedrosis virus (Disparvirus®)+TX, *Marinococcus halophilus*+TX, *Meira geulakonigii*+TX, *Metarhizium anisopliae* (Met52®)+TX, *Metarhizium anisopliae* (Destruxin WP®)+TX, *Metschnikowia fruticola* (Shemer®)+TX, *Metschnikowia pulcherrima*+TX, *Microdochium dimerum* (Antibot®)+TX, *Micromonospora coerulea*+TX, *Microsphaeropsis ochracea*+TX, *Muscodor albus* 620 (Muscudor®)+TX, *Muscodor roseus* strain A3-5+TX, *Mycorrhizae* spp. (AMykor®+TX, Root Maximizer®)+TX, *Myrothecium verrucaria* strain AARC-0255 (DiTera®)+TX, BROS PLUS®+TX, *Ophiostoma piliferum* strain D97 (Sylvanex®)+TX, *Paecilomyces farinosus*+TX, *Paecilomyces fumosoroseus* (PFR-97®+TX, PreFeRal®)+TX, *Paecilomyces linacinus* (Biostat WP®)+TX, *Paecilomyces lilacinus* strain 251 (MeloCon WG®)+TX, *Paenibacillus polymyxa*+TX, *Pantoea agglomerans* (BlightBan C₉-1®)+TX, *Pantoea* spp.+TX, *Pasteuria* spp. (Econem®)+TX, *Pasteuria nishizawae*+TX, *Penicillium aurantiogriseum*+TX, *Penicillium billai* (Jumpstart®+TX, TagTeam®)+TX, *Penicillium brevicompactum*+TX, *Penicillium frequentans*+TX, *Penicillium griseofulvum*+TX, *Penicillium purpurogenum*+TX, *Penicillium* spp.+TX, *Penicillium viridicatum*+TX, *Phlebiopsis gigantean*

(Rotstop®)+TX, phosphate solubilizing bacteria (Phosphomeal®)+TX, *Phytophthora cryptogea*+TX, *Phytophthora palmivora* (Devine®)+TX, *Pichia anomala*+TX, *Pichia guilermondii*+TX, *Pichia membranaefaciens*+TX, *Pichia onychis*+TX, *Pichia stipites*+TX, *Pseudomonas aeruginosa*+TX, *Pseudomonas aureofasciens* (Spot-Less Biofungicide®)+TX, *Pseudomonas cepacia*+TX, *Pseudomonas chlororaphis* (AtEze®)+TX, *Pseudomonas corrugate*+TX, *Pseudomonas fluorescens* strain A506 (BlightBan A506®)+TX, *Pseudomonas putida*+TX, *Pseudomonas reactans*+TX, *Pseudomonas* spp.+TX, *Pseudomonas syringae* (Bio-Save®)+TX, *Pseudomonas viridiflava*+TX, *Pseudomons fluorescens* (Zequanox®)+TX, *Pseudozyma flocculosa* strain PF-A22 UL (Sporodex Le)+TX, *Puccinia canaliculata*+TX, *Puccinia thlaspeos* (Wood Warrior®)+TX, *Pythium paroecandrum*+TX, *Pythium oligandrum* (Polygandron®+TX, Polyversum®)+TX, *Pythium periplocum*+TX, *Rhanella aquatilis*+TX, *Rhanella* spp.+TX, *Rhizobia* (Dormal®+TX, Vault®)+TX, *Rhizoctonia*+TX, *Rhodococcus globerulus* strain AQ719+TX, *Rhodosporidium diobovatum*+TX, *Rhodosporidium toruloides*+TX, *Rhodotorula* spp.+TX, *Rhodotorula glutinis*+TX, *Rhodotorula graminis*+TX, *Rhodotorula mucilagnosa*+TX, *Rhodotorula rubra*+TX, *Saccharomyces cerevisiae*+TX, *Salinococcus roseus*+TX, *Sclerotinia minor*+TX, *Sclerotinia minor* (SARRITOR®)+TX, *Scytalidium* spp.+TX, *Scytalidium uredinicola*+TX, *Spodoptera exigua* nuclear polyhedrosis virus (Spod-X®+TX, Spexit®)+TX, *Serratia marcescens*+TX, *Serratia plymuthica*+TX, *Serratia* spp.+TX, *Sordaria fimicola*+TX, *Spodoptera littoralis* nucleopolyhedrovirus (Littovir®)+TX, *Sporobolomyces roseus*+TX, *Stenotrophomonas maltophilia*+TX, *Streptomyces ahygroscopicus*+TX, *Streptomyces albaduncus*+TX, *Streptomyces exfoliates*+TX, *Streptomyces galbus*+TX, *Streptomyces griseoplanus*+TX, *Streptomyces griseoviridis* (Mycostop®)+TX, *Streptomyces lydicus* (Actinovate®)+TX, *Streptomyces lydicus* WYEC-108 (ActinoGrow®)+TX, *Streptomyces violaceus*+TX, *Tilletiopsis minor*+TX, *Tilletiopsis* spp.+TX, *Trichoderma asperellum* (T34 Biocontrol®)+TX, *Trichoderma gamsii* (Tenet®)+TX, *Trichoderma atroviride* (Plantmate®)+TX, *Trichoderma hamatum* TH 382+TX, *Trichoderma harzianum* rifai (Mycostar®)+TX, *Trichoderma harzianum* T-22 (Trianum-P®+TX, PlantShield HC®+TX, RootShield®+TX, Trianum-G®)+TX, *Trichoderma harzianum* T-39 (Trichodex®)+TX, *Trichoderma inhamatum*+TX, *Trichoderma koningii*+TX, *Trichoderma* spp. LC 52 (Sentinel®)+TX, *Trichoderma lignorum*+TX, *Trichoderma longibrachiatum*+TX, *Trichoderma polysporum* (Binab T®)+TX, *Trichoderma taxi*+TX, *Trichoderma virens*+TX, *Trichoderma virens* (formerly *Gliocladium virens* GL-21) (SoilGuard®)+TX, *Trichoderma viride*+TX, *Trichoderma viride* strain ICC 080 (Remedier®)+TX, *Trichosporon pullulans*+TX, *Trichosporon* spp.+TX, *Trichothecium* spp.+TX, *Trichothecium roseum*+TX, *Typhula phacorrhiza* strain 94670+TX, *Typhula phacorrhiza* strain 94671+TX, *Ulocladium atrum*+TX, *Ulocladium oudemansii* (Botry-Zen®)+TX, *Ustilago maydis*+TX, various bacteria and supplementary micronutrients (Natural II®)+TX, various fungi (Millennium Microbes®)+TX, *Verticillium chlamydosporium*+TX, *Verticillium lecanii* (Mycotal®+TX, Vertalec®)+TX, Vip3Aa20 (VIPtera®)+TX, *Virgibacllius marismortui*+TX, *Xanthomonas campestris* pv. *Poae* (Camperico®)+TX, *Xenorhabdus bovienii*+TX, *Xenorhabdus nematophilus*; and Plant extracts including: pine oil (Retenol®)+TX, azadirachtin (Plasma Neem Oil®+TX, AzaGuard®+TX, MeemAzal®+TX, Molt-X®+TX, Botanical IGR (Neemazad®+TX, Neemix®)+TX, canola oil (Lilly Miller Vegol®)+TX, *Chenopodium ambrosioides* near *ambrosioides* (Requiem®)+TX, *Chrysanthemum* extract (Crisant®)+TX, extract of neem oil (Trilogy®)+TX, essentials oils of *Labiatae* (Botania®)+TX, extracts of clove rosemary peppermint and thyme oil (Garden insect Killer®)+TX, Glycinebetaine (Greenstim®)+TX, garlic+TX, lemongrass oil (GreenMatch®)+TX, neem oil+TX, *Nepeta cataria* (Catnip oil)+TX, *Nepeta catarina*+TX, nicotine+TX, oregano oil (MossBuster®)+TX, Pedaliaceae oil (Nematon®)+TX, pyrethrum+TX, *Quillaja saponaria* (NemaQ®)+TX, *Reynoutria sachalinensis* (Regalia®+TX, Sakalia®)+TX, rotenone (Eco Roten®)+TX, Rutaceae plant extract (Soleo®)+TX, soybean oil (Ortho Ecosense®)+TX, tea tree oil (Timorex Gold®)+TX, thymus oil+TX, AGNIQUE® MMF+TX, BugOil®+TX, mixture of rosemary sesame peppermint thyme and cinnamon extracts (EF 300®)+TX, mixture of clove rosemary and peppermint extract (EF 400®)+TX, mixture of clove pepermint garlic oil and mint (Soil Shot®)+TX, kaolin (Screen®)+TX, storage glucam of brown algae (Laminarin®); and pheromones including: blackheaded fireworm pheromone (3M Sprayable Blackheaded Fireworm Pheromone®)+TX, Codling Moth Pheromone (Paramount dispenser-(CM)/Isomate C-Plus®)+TX, Grape Berry Moth Pheromone (3M MEC-GBM Sprayable Pheromone®)+TX, Leafroller pheromone (3M MEC LR Sprayable Pheromone®)+TX, Muscamone (Snip7 Fly Bait®+TX, Starbar Premium Fly Bait®)+TX, Oriental Fruit Moth Pheromone (3M oriental fruit moth sprayable Pheromone®)+TX, Peachtree Borer Pheromone (Isomate-P®)+TX, Tomato Pinworm Pheromone (3M Sprayable Pheromone®)+TX, Entostat powder (extract from palm tree) (Exosex CM®)+TX, (E+TX,Z+TX,Z)-3+TX,8+TX,11 Tetradecatrienyl acetate+TX, (Z+TX,Z+TX,E)-7+TX,11+TX,13-Hexadecatrienal+TX, (E+TX,Z)-7+TX,9-Dodecadien-1-yl acetate+TX, 2-Methyl-1-butanol+TX, Calcium acetate+TX, Scenturion®+TX, Biolure®+TX, Check-Mate®+TX, Lavandulyl senecioate; and Macrobials including: *Aphelinus abdominalis*+TX, *Aphidius ervi* (*Aphelinus*-System®)+TX, *Acerophagus papaya*+TX, *Adalia bipunctata* (*Adalia*-System®)+TX, *Adalia bipunctata* (Adaline®)+TX, *Adalia bipunctata* (Aphidalia®)+TX, *Ageniaspis citricola*+TX, *Ageniaspis fusciooffis*+TX, *Amblyseius andersoni* (Anderline®+TX, Andersoni-System®)+TX, *Amblyseius californicus* (Amblyline®+TX, Spicale)+TX, *Amblyseius cucumeris* (Thripex®+TX, Bugline *cucumeris*®)+TX, *Amblyseius fallacis* (Fallacis®)+TX, *Amblyseius swirskii* (Bugline *swirskii*®+TX, Swirskii-Mite®)+TX, *Amblyseius womersleyi* (WomerMite®)+TX, *Amitus hesperidum*+TX, *Anagrus atomus*+TX, *Anagyrus fusciventris*+TX, *Anagyrus kamali*+TX, *Anagyrus loecki*+TX, *Anagyrus pseudococci* (Citripar®)+TX, *Anicetus benefices*+TX, *Anisopteromalus calandrae*+TX, *Anthocoris nemoralis* (Anthocoris-System®)+TX, *Aphelinus abdominalis* (Apheline®+TX, Aphiline®)+TX, *Aphelinus asychis*+TX, *Aphidius* colemani (Aphipar®)+TX, *Aphidius ervi* (Ervipar®)+TX, *Aphidius gifuensis*+TX, *Aphidius matricariae* (Aphipar-M®)+TX, *Aphidoletes aphidimyza* (Aphidend®)+TX, *Aphidoletes aphidimyza* (Aphidoline®)+TX, *Aphytis lingnanensis*+TX, *Aphytis melinus*+TX, *Aprostocetus hagenowii*+TX, *Atheta coriaria* (Staphyline®)+TX, *Bombus* spp.+TX, *Bombus terrestris* (Natupol Beehive®)+TX, *Bombus terrestris* (Beeline®+TX, Trip®)+TX, *Cephalonomia stephanoderis*+TX, *Chilocorus nigritus*+TX, *Chrysoperla carnea* (Chrysoline®)+TX, *Chrysoperla carnea* (Chrysopa®)+TX, *Chrysoperla rufilabris*+TX, *Cirrospilus ingenuus*+TX, *Cirrospilus quadristriatus*+TX, *Citrostichus phyllocnistoides*+TX, *Closterocerus chamaeleon*+TX, *Closterocerus* spp.+TX, *Coccidoxenoides perminutus* (Planopar®)+TX, *Coccophagus cowperi*+TX, *Coccophagus lycimnia*+TX, *Cotesia flavipes*+TX, *Cotesia plutellae*+TX, *Cryptolaemus montrouzieri* (Cryptobug®+TX, Cryptoline®)+TX, *Cybocephalus nipponicus*+TX, *Dacnusa sibirica*+TX, *Dacnusa sibirica* (Minusa®)+TX, *Diglyphus isaea* (Diminex®)+TX, *Delphastus catalinae* (Delphastus®)+TX, *Delphastus pusillus*+TX, *Diachasmimorpha krausfi*+TX, *Diachasmimorpha longicaudata*+TX, *Diaparsis jucunda*+TX, *Diaphorencyrtus aligarhensis*+TX, *Diglyphus isaea*+TX, *Diglyphus isaea* (Miglyphus®+TX, Digline®)+TX, *Dacnusa sibirica* (Dac-Digline®+TX, Minex®)+TX, *Diversinervus* spp.+TX, *Encarsia citrina*+TX, *Encarsia formosa* (Encarsia maze+TX, Encarline®+TX, En-Stripe)+TX, *Eretmocerus eremicus* (Enermix®)+TX, *Encarsia guadeloupae*+TX, *Encarsia haitiensis*+TX, *Episyrphus balteatus* (Syrphidend®)+TX, *Eretmoceris siphonini*+TX, *Eretmocerus califomicus*+TX, *Eretmocerus eremicus* (Ercal®+TX, Eretline e®)+TX, *Eretmocerus eremicus* (Bemimix®)+TX, *Eretmocerus hayati*+TX, *Eretmocerus mundus* (Bemipar®+TX, Eretline m®)+TX, *Eretmocerus siphonini*+TX, *Exochomus quadripustulatus*+TX, *Feltiella acarisuga* (Spidend®)+TX, *Feltiella acarisuga* (Feltiline®)+TX, *Fopius arisanus*+TX, *Fopius ceratitivorus*+TX, Formononetin (Wirless Beehome®)+TX, *Franklinothrips vespiformis* (Vespop®)+TX, *Galendromus occidentalis*+TX, *Goniozus legneri*+TX, *Habrobracon hebetor*+TX, *Harmonia axyridis* (HarmoBeetle®)+TX, *Heterorhabditis* spp. (Lawn Patrol®)+TX, *Heterorhabditis bacteriophora* (NemaShield HB®+TX, Nemaseek®+TX, Terranem-Nam®+TX, Terranem®+TX, Larvanem®+TX, B-Green®+TX, NemAttack+TX, Nematop®)+TX, *Heterorhabditis megidis* (Nemasys H®+TX, BioNem H®+TX, Exhibitline hm®+TX, Larvanem-M®)+TX, *Hippodamia convergens*+TX, *Hypoaspis aculeifer* (Aculeifer-System®+TX, Entomite-A®)+TX, *Hypoaspis miles* (Hypoline m®+TX, Entomite-M®)+TX, Lbalia leucospoides+TX, *Lecanoideus floccissimus*+TX, *Lemophagus errabundus*+TX, *Leptomastidea abnormis*+TX, *Leptomastix dactylopfi* (Leptopar®)+TX, *Leptomastix epona*+TX, Lindorus lophanthae+TX, *Lipolexis oregmae*+TX, *Lucilia caesar* (Natufly®)+TX, *Lysiphlebus testaceipes*+TX, *Macrolophus caliginosus* (Mirical-N®+TX, Macroline c®+TX, Mirical®)+TX, *Mesoseiulus longipes*+TX, *Metaphycus flavus*+TX, *Metaphycus lounsburyi*+TX, *Micromus angulatus* (Milacewing®)+TX, *Microterys flavus*+TX, *Muscidifurax raptorellus* and *Spalangia cameroni* (Biopar®)+TX, *Neodryinus typhlocybae*+TX, *Neoseiulus califomicus*+TX, *Neoseiulus cucumeris* (THRYPEX®)+TX, *Neoseiulus fallacis*+TX, *Nesideocoris tenuis* (NesidioBug®+TX, Nesibug®)+TX, *Ophyra aenescens* (Biofly®)+TX, *Orius insidiosus* (Thripor-I®+TX, Oriline i®)+TX, *Orius laevigatus* (Thripor-L®+TX, Oriline I®)+TX, *Orius majusculus* (Oriline me)+TX, *Orius strigicollis* (Thripor-Se)+TX, *Pauesia juniperorum*+TX, *Pediobius foveolatus*+TX, *Phasmarhabditis hermaphrodita* (Nemaslug®)+TX, *Phymastichus coffea*+TX, *Phytoseiulus macropilus*+TX, *Phytoseiulus persimilis* (Spidex®+TX, Phytoline p®)+TX, *Podisus maculiventris* (Podisus®)+TX, *Pseudacteon curvatus*+TX, *Pseudacteon obtusus*+TX, *Pseudacteon tricuspis*+TX, *Pseudaphycus maculipennis*+TX, *Pseudleptomastix mexicana*+TX, *Psyllaephagus pilosus*+TX, *Psyttalia concolor* (complex)+TX, *Quadrastichus* spp.+TX, *Rhyzobius lophanthae*+TX, *Rodolia cardinalis*+TX, *Rumina decollate*+TX, *Semielacher petiolatus*+TX, *Sitobion avenae* (Ervibank®)+TX, *Steinernema carpocapsae* (Nematac C®+TX, Millenium®+TX, BioNem C®+TX, NemAttack®+TX, Nemastar®+TX, Capsanem®)+TX, *Steinernema feltiae* (NemaShield®+TX, Nemasys Fe+TX, BioNem Fe+TX, *Steinernema*-System®+TX, NemAttack®+TX, Nemaplus®+TX, Exhibitline sf®+TX, Scia-Rid®+TX, Entonem®)+TX, *Steinernema kraussei* (Nemasys L®+TX, BioNem Le+TX, Exhibitline srb®)+TX, *Steinernema* riobrave (BioVector®+TX, BioVektor®)+TX, *Steinernema* scapterisci (Nematac S®)+TX, *Steinernema* spp.+TX, *Steinernematid* spp. (Guardian Nematodes®)+TX, Stethorus *punctillum* (Stethorus®)+TX, *Tamarixia radiate*+TX, *Tetrastichus setifer*+TX, *Thripobius semiluteus*+TX, *Torymus sinensis*+TX, *Trichogramma brassicae* (Tricholine b®)+TX, *Trichogramma brassicae* (Tricho-Strip®)+TX, *Trichogramma evanescens*+TX, *Trichogramma minutum*+TX, *Trichogramma ostriniae*+TX, *Trichogramma platneri*+TX, *Trichogramma pretiosum*+TX, *Xanthopimpla stemmator*; and other biologicals including: abscisic acid+TX, bioSea®+TX, *Chondrostereum purpureum* (Chontrol Paste®)+TX, *Colletotrichum gloeosporioides* (Collego®)+TX, Copper Octanoate (Cueva®)+TX, Delta traps (Trapline d®)+TX, *Erwinia amylovora* (Harpin) (ProAct®+TX, Ni-HIBIT Gold CST®)+TX, Ferri-phosphate (Ferramol®)+TX, Funnel traps (Trapline ye)+TX, Gallex®+TX, Growers Secret®+TX, Homo-brassonolide+TX, Iron Phosphate (Lilly Miller Worry Free Ferramol Slug & Snail Bait®)+TX, MCP hail trap (Trapline f®)+TX, Microctonus *hyperodae*+TX, *Mycoleptodiscus terrestris* (Des-X®)+TX, BioGain®+TX, Aminomite®+TX, Zenox®+TX, Pheromone trap (Thripline ams®)+TX, potassium bicarbonate (MilStop®)+TX, potassium salts of fatty acids (Sanova®)+TX, potassium silicate solution (Sil-Matrix®)+TX, potassium iodide+potassiumthiocyanate (Enzicur®)+TX, SuffOil-X®+TX, Spider venom+TX, *Nosema locustae* (Semaspore Organic Grasshopper Control®)+TX, Sticky traps (Trapline YF®+TX, Rebell Amarillo®)+TX and Traps (Takitrapline y+b®)+TX, or a biologically active compound or agent selected from: Brofluthrinate+TX, Diflovidazine+TX, Flometoquin+TX, Fluhexafon+TX, *Plutella xylostella* Granulosis virus+TX, *Cydia pomonella Granulosis virus*+TX, *Imicyafos*+TX, *Heliothis virescens* Nucleopolyhedrovirus+TX, *Heliothis punctigera* Nucleopolyhedrovirus+TX, *Helicoverpa zea* Nucleopolyhedrovirus+TX, *Spodoptera frugiperda* Nucleopolyhedrovirus+TX, *Plutella*

*xylostella* Nucleopolyhedrovirus+TX, p-cymene+TX, Pyflubumide+TX, Pyrafluprole+TX, QRD 420+TX, QRD 452+TX, QRD 460+TX, Terpenoid blends+TX, Terpenoids+TX, Tetraniliprole+TX, and α-terpinene+TX;

or an active substance referenced by a code+TX, such as code AE 1887196 (BSC—BX60309)+TX, code NNI-0745 GR+TX, code IKI-3106+TX, code JT-L001+TX, code ZNQ-08056+TX, code IPPA152201+TX, code HNPC-A9908 (CAS: [660411-21-2])+TX, code HNPC-A2005 (CAS: [860028-12-2])+TX, code JS118+TX, code ZJ0967+TX, code ZJ2242+TX, code JS7119 (CAS: [929545-74-4])+TX, code SN-1172+TX, code HNPC-A9835+TX, code HNPC-A9955+TX, code HNPC-A3061+TX, code Chuanhua 89-1+TX, code IPP-10+TX, code ZJ3265+TX, code JS9117+TX, code ZJ3757+TX, code ZJ4042+TX, code ZJ4014+TX, code ITM-121+TX, code DPX-RAB55 (DKI-2301)+TX, code NA-89+TX, code MIE-1209+TX, code MCI-8007+TX, code BCS-CL73507+TX, code S-1871+TX, code DPX-RDS63+TX, Quinofumelin+TX, mefentrifluconazol+TX, fenpicoxamid+TX, fluindapyr+TX, flufenpyrrolidone+TX, inpyrfluxam+TX or indiflumetpyr+TX, isoflucypram+TX, isocycloseram+TX, pyrapropoyne+TX, florylpicoxamid+TX, metyltetraprole+TX, ipflufenoquin+TX, pyridachlometyl+TX or chlopyridiflu+TX, tetrachlorantraniliprole+TX, tetrachloraniliprole+TX, Tetflupyrolimet+TX, Triflufenpyrrolidone+TX, Tyclopyrazoflor+TX, flupyrimin+TX or pyrifluramide+TX, benzpyrimoxan+TX, beflubutamid-M+TX, Benzosufyl+TX or oxazosulfyl+TX, cyetpyrafen+TX or etpyrafen+TX, acynonapyr+TX or pyrinonafen+TX, oxotrione+TX, bixlozone+TX or clofendizone+TX or dicloroxizone+TX, cyclopyranil+TX or pyrazocyclonil+TX or cyclopyrazonil+TX, alpha-bromadiolone+TX, code AKD-1193+TX, Oxathiapiprolin+TX, Fluopyram+TX, Penflufen+TX, Fluoxopyrosad+TX, fluoxapiprolin+TX, Flupyradifurone+TX, cyclobutrifluram+TX, dimesulfazet+TX, flubeneteram+TX and flupentiofenox+TX.

The references in brackets behind the active ingredients, e.g. [3878-19-1] refer to the Chemical Abstracts Registry number. The above described mixing partners are known. Where the active ingredients are included in "The Pesticide Manual" [The Pesticide Manual—A World Compendium; Thirteenth Edition; Editor: C. D. S. TomLin; The British Crop Protection Council], they are described therein under the entry number given in round brackets hereinabove for the particular compound; for example, the compound "abamectin" is described under entry number (1). Where "[CCN]" is added hereinabove to the particular compound, the compound in question is included in the "Compendium of Pesticide Common Names", which is accessible on the internet [A. Wood; *Compendium of Pesticide Common Names*, Copyright © 1995-2004]; for example, the compound "acetoprole" is described under the internet address http://www alanwood.net/pesticides/acetoprole.html.

Most of the active ingredients described above are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "development code" is used or, if neither one of those designations nor a "common name" is used, an "alternative name" is employed. "CAS Reg. No" means the Chemical Abstracts Registry Number.

The active ingredient mixture of the compounds of formula I selected from Tables A-1 to A-48, Tables C1-C18, Tables D1-D12, Tables E1-E12, Tables G1-G24, Tables I1-I48, Tables J1 to J18, Tables K1-K12 and Tables L-1 to L-12 and Table P with active ingredients described above comprises a compound selected from Tables A-1 to A-48, Tables C1-C18, Tables D1-D12, Tables E1-E12, Tables G1-G24, Tables I1-I48, Tables J1 to J18, Tables K1-K12 and Tables L-1 to L-12 and Table P and an active ingredient as described above preferably in a mixing ratio of from 100:1 to 1:6000, especially from 50:1 to 1:50, more especially in a ratio of from 20:1 to 1:20, even more especially from 10:1 to 1:10, very especially from 5:1 and 1:5, special preference being given to a ratio of from 2:1 to 1:2, and a ratio of from 4:1 to 2:1 being likewise preferred, above all in a ratio of 1:1, or 5:1, or 5:2, or 5:3, or 5:4, or 4:1, or 4:2, or 4:3, or 3:1, or 3:2, or 2:1, or 1:5, or 2:5, or 3:5, or 4:5, or 1:4, or 2:4, or 3:4, or 1:3, or 2:3, or 1:2, or 1:600, or 1:300, or 1:150, or 1:35, or 2:35, or 4:35, or 1:75, or 2:75, or 4:75, or 1:6000, or 1:3000, or 1:1500, or 1:350, or 2:350, or 4:350, or 1:750, or 2:750, or 4:750. Those mixing ratios are by weight.

The mixtures as described above can be used in a method for controlling pests, which comprises applying a composition comprising a mixture as described above to the pests or their environment, with the exception of a method for treatment of the human or animal body by surgery or therapy and diagnostic methods practised on the human or animal body.

The mixtures comprising a compound of formula I selected from Tables A-1 to A-48, Tables C1-C18, Tables D1-D12, Tables E1-E12, Tables G1-G24, Tables I1-I48, Tables J1 to J18, Tables K1-K12 and Tables L-1 to L-12 and Table P and one or more active ingredients as described above can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compounds of formula I selected from Tables A-1 to A-48, Tables C1-C18, Tables D1-D12, Tables E1-E12, Tables G1-G24, Tables I1-I48, Tables J1 to J18, Tables K1-K12 and Tables L-1 to L-12 and Table P and the active ingredients as described above is not essential for working the present invention.

The compositions according to the invention can also comprise further solid or liquid auxiliaries, such as stabilizers, for example unepoxidized or epoxidized vegetable oils (for example epoxidized coconut oil, rapeseed oil or soya oil), antifoams, for example silicone oil, preservatives, viscosity regulators, binders and/or tackifiers, fertilizers or other active ingredients for achieving specific effects, for example bactericides, fungicides, nematocides, plant activators, molluscicides or herbicides.

The compositions according to the invention are prepared in a manner known per se, in the absence of auxiliaries for example by grinding, screening and/or compressing a solid active ingredient and in the presence of at least one auxiliary for example by intimately mixing and/or grinding the active ingredient with the auxiliary (auxiliaries). These processes for the preparation of the compositions and the use of the compounds I for the preparation of these compositions are also a subject of the invention.

The application methods for the compositions, that is the methods of controlling pests of the abovementioned type, such as spraying, atomizing, dusting, brushing on, dressing, scattering or pouring—which are to be selected to suit the intended aims of the prevailing circumstances—and the use of the compositions for controlling pests of the abovementioned type are other subjects of the invention. Typical rates of concentration are between 0.1 and 1000 ppm, preferably between 0.1 and 500 ppm, of active ingredient. The rate of application per hectare is generally 1 to 2000 g of active ingredient per hectare, in particular 10 to 1000 g/ha, preferably 10 to 600 g/ha.

A preferred method of application in the field of crop protection is application to the foliage of the plants (foliar application), it being possible to select frequency and rate of application to match the danger of infestation with the pest in question. Alternatively, the active ingredient can reach the plants via the root system (systemic action), by drenching the locus of the plants with a liquid composition or by incorporating the active ingredient in solid form into the locus of the plants, for example into the soil, for example in the form of granules (soil application). In the case of paddy rice crops, such granules can be metered into the flooded paddy-field.

The compounds of the invention and compositions thereof are also be suitable for the protection of plant propagation material, for example seeds, such as fruit, tubers or kernels, or nursery plants, against pests of the abovementioned type. The propagation material can be treated with the compound prior to planting, for example seed can be treated prior to sowing. Alternatively, the compound can be applied to seed kernels (coating), either by soaking the kernels in a liquid composition or by applying a layer of a solid composition. It is also possible to apply the compositions when the propagation material is planted to the site of application, for example into the seed furrow during drilling. These treatment methods for plant propagation material and the plant propagation material thus treated are further subjects of the invention. Typical treatment rates would depend on the plant and pest/fungi to be controlled and are generally between 1 to 200 grams per 100 kg of seeds, preferably between 5 to 150 grams per 100 kg of seeds, such as between 10 to 100 grams per 100 kg of seeds.

The term seed embraces seeds and plant propagules of all kinds including but not limited to true seeds, seed pieces, suckers, corns, bulbs, fruit, tubers, grains, rhizomes, cuttings, cut shoots and the like and means in a preferred embodiment true seeds.

The present invention also comprises seeds coated or treated with or containing a compound of formula I. The term "coated or treated with and/or containing" generally signifies that the active ingredient is for the most part on the surface of the seed at the time of application, although a greater or lesser part of the ingredient may penetrate into the seed material, depending on the method of application. When the said seed product is (re)planted, it may absorb the active ingredient. In an embodiment, the present invention makes available a plant propagation material adhered thereto with a compound of formula (I). Further, it is hereby made available, a composition comprising a plant propagation material treated with a compound of formula (I).

Seed treatment comprises all suitable seed treatment techniques known in the art, such as seed dressing, seed coating, seed dusting, seed soaking and seed pelleting. The seed treatment application of the compound formula (I) can be carried out by any known methods, such as spraying or by dusting the seeds before sowing or during the sowing/planting of the seeds.

BIOLOGICAL EXAMPLES

The Examples which follow serve to illustrate the invention. Certain compounds of the invention can be distinguished from known compounds by virtue of greater efficacy at low application rates, which can be verified by the person skilled in the art using the experimental procedures outlined in the Examples, using lower application rates if necessary, for example 50 ppm, 24 ppm, 12.5 ppm, δ ppm, 3 ppm, 1.5 ppm, 0.8 ppm or 0.2 ppm.

Example B1: *Bemisia tabaci* (Cotton White Fly): Feeding/Contact Activity

Cotton leaf discs were placed on agar in 24-well microtiter plates and sprayed with aqueous test solutions prepared from 10'000 ppm DMSO stock solutions. After drying the leaf discs were infested with adult white flies. The samples were checked for mortality 6 days after incubation.

The following compounds resulted in at least 80% mortality at an application rate of 200 ppm: P2, P5, P6, P7, P8, P9, P10, P11, P13, P18, P21, P23, P25, P26, P27, P28.

Example B2: *Diabrotica Balteata* (Corn Root Worm)

Maize sprouts placed onto an agar layer in 24-well microtiter plates were treated with aqueous test solutions prepared from 10'000 ppm DMSO stock solutions by spraying. After drying, the plates were infested with L2 larvae (6 to 10 per well). The samples were assessed for mortality and growth inhibition in comparison to untreated samples 4 days after infestation.

The following compounds gave an effect of at least 80% in at least one of the two categories (mortality or growth inhibition) at an application rate of 200 ppm: P1, P2, P3, P4, P5, P6, P7, P8, P9, P10, P11, P12, P13, P14, P15, P16, P17, P18, P19, P20, P21, P22, P23, P24, P25, P26, P27, P28.

Example B3: *Euschistus heros* (Neotropical Brown Stink Bug)

Soybean leaves on agar in 24-well microtiter plates were sprayed with aqueous test solutions prepared from 10'000 ppm DMSO stock solutions. After drying the leaves were infested with N2 nymphs. The samples were assessed for mortality and growth inhibition in comparison to untreated samples 5 days after infestation.

The following compounds gave an effect of at least 80% in at least one of the two categories (mortality or growth inhibition) at an application rate of 200 ppm: P1, P2, P3, P4, P5, P6, P8, P9, P10, P11, P12, P13, P14, P15, P16, P18, P19, P20, P21, P23, P25, P26, P28.

Example B4: *Frankliniella occidentalis* (Western Flower *Thrips*): Feeding/Contact Activity Sunflower leaf discs were placed on agar in 24-well microtiter plates and sprayed with aqueous test solutions prepared from 10'000 DMSO stock solutions. After drying the leaf discs were infested with a *Frankliniella* population of mixed ages. The samples were assessed for mortality 7 days after infestation.

The following compounds resulted in at least 80% mortality at an application rate of 200 ppm: P3, P8.

Example B5: *Plutella xylostella* (Diamond Back Moth)

24-well microtiter plates with artificial diet were treated with aqueous test solutions prepared from 10'000 ppm DMSO stock solutions by pipetting. After drying, *Plutella* eggs were pipetted through a plastic stencil onto a gel blotting paper and the plate was closed with it. The samples were assessed for mortality and growth inhibition in comparison to untreated samples 8 days after infestation.

The following compounds gave an effect of at least 80% in at least one of the two categories (mortality or growth inhibition) at an application rate of 200 ppm: P1, P2, P3, P4, P5, P6, P7, P8, P9, P10, P11, P12, P13, P14, P15, P16, P17, P18, P19, P20, P21, P22, P23, P24, P25, P26, P27, P28.

Example B6: *Myzus persicae* (Green Peach Aphid): Feeding/Contact Activity

Sunflower leaf discs were placed onto agar in a 24-well microtiter plate and sprayed with aqueous test solutions prepared from 10'000 ppm DMSO stock solutions. After drying, the leaf discs were infested with an aphid population of mixed ages. The samples were assessed for mortality 6 days after infestation.

The following compounds resulted in at least 80% mortality at an application rate of 200 ppm: P1, P2, P3, P4, P5, P6, P7, P8, P9, P10, P11, P12, P13, P14, P15, P16, P17, P18, P19, P20, P21, P22, P23, P24, P25, P26, P28.

Example B7: *Myzus persicae* (Green Peach Aphid): Systemic Activity

Roots of pea seedlings infested with an aphid population of mixed ages were placed directly into aqueous test solutions prepared from 10'000 DMSO stock solutions. The samples were assessed for mortality 6 days after placing seedlings into test solutions.

The following compounds resulted in at least 80% mortality at a test rate of 24 ppm: P1, P2, P3, P4, P5, P6, P8, P10, P11, P12, P14, P15, P16, P17, P18, P19, P20, P21, P22, P23, P27.

Example B8: *Spodoptera littoralis* (Egyptian Cotton Leaf Worm)

Cotton leaf discs were placed onto agar in 24-well microtiter plates and sprayed with aqueous test solutions prepared from 10'000 ppm DMSO stock solutions. After drying the leaf discs were infested with five L1 larvae. The samples were assessed for mortality, anti-feeding effect, and growth inhibition in comparison to untreated samples 3 days after infestation. Control of *Spodoptera littoralis* by a test sample is given when at least one of the categories mortality, anti-feedant effect, and growth inhibition is higher than the untreated sample.

The following compounds resulted in at least 80% control at an application rate of 200 ppm: P1, P2, P3, P4, P5, P7, P8, P9, P10, P11, P12, P13, P14, P15, P16, P17, P18, P19, P20, P21, P22, P23, P24, P25, P26, P27, P28.

Example B9: *Tetranychus urticae* (Two-Spotted Spider Mite): Feeding/Contact Activity Bean leaf discs on agar in 24-well microtiter plates were sprayed with aqueous test solutions prepared from 10'000 ppm DMSO stock solutions. After drying the leaf discs were infested with a mite population of mixed ages. The samples were assessed for mortality on mixed population (mobile stages) 8 days after infestation.

The following compounds resulted in at least 80% mortality at an application rate of 200 ppm: P28.

Example B10: *Nilaparvata lugens* (Brown Plant Hopper): Larvicide, Feeding/Contact Rice plants were treated with the diluted test solutions in a spray chamber. After drying plants were infested with ~20 N3 nymphs. 7 days after the treatment samples were assessed for mortality and growth regulation.

The following compounds resulted in at least 80% mortality at an application rate of 50 ppm: P2, P3, P4, P5, P6, P8, P10, P11, P18.

Example B11: *Nilaparvata lugens* (Brown Plant Hopper): Igr, Feeding/Contact Rice plants were treated with the diluted test solutions in a spray chamber. After drying plants were infested with ~20 N3 nymphs. 7 days after treatment adults were removed and 15 days after the treatment samples were assessed for effect on F1 generation.

The following compounds resulted in at least 80% mortality at an application rate of 50 ppm: P2, P3, P4, P5, P8, P9, P10, P11, P18.

Example B12: *Nilaparvata lugens* (Brown Plant Hopper): Larvicide, Systemic into Water Rice plants cultivated in a nutritive solution were treated with the diluted test solutions into nourishing cultivation system. 1 day after application plants were infested with ~20 N3 nymphs. 7 days after infestation samples were assessed for mortality and growth regulation.

The following compounds resulted in at least 80% mortality at a test rate of 12.5 ppm: P1, P2, P3, P4, P5, P6, P8, P9, P10, P11, P12, P13, P18.

The invention claimed is:

1. A compound of formula (I)

wherein $G_1$ and $G_2$ are, independently from each other, CH or N;

$R_2$ is $C_1$-$C_4$haloalkyl, $C_1$-$C_4$haloalkylsulfanyl, $C_1$-$C_4$haloalkylsulfinyl, $C_1$-$C_4$haloalkylsulfonyl or $C_1$-$C_6$haloalkoxy, $C_1$-$C_4$haloalkylsulfonyloxy;

Q is a radical selected from the group consisting of formula Qa and Qb

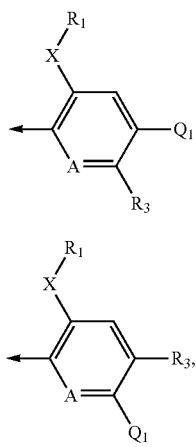

Qa

Qb wherein the arrow denotes the point of attachment to the nitrogen atom of the bicyclic ring;

and wherein A represents CH or N;

X is S, SO, or $SO_2$;

$R_1$ is $C_1$-$C_4$alkyl, or $C_3$-$C_6$cycloalkyl-$C_1$-$C_4$alkyl;

$Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$cyanoalkoxy, $C_1$-$C_6$haloalkoxy, —N($R_4$)$_2$, —N($R_4$)C(=O)$R_5$, —N($R_4$)CON($R_4$)$_2$, (oxazolidin-2-one)-3-yl, or 2-pyridyloxy; or $Q_1$ is a five- to six-membered aromatic ring system, linked via a ring carbon atom to the ring which contains the substituent A, said ring system is unsubstitued or is mono- or polysubstituted by substituents selected from the group consisting of halogen, cyano, $C_1$-$C_4$alkyl, $C_1$-$C_4$haloalkyl, $C_1$-$C_4$alkoxy, $C_1$-$C_4$haloalkoxy, $C_1$-$C_4$alkylsulfanyl, $C_1$-$C_4$alkylsulfinyl and $C_1$-$C_4$alkylsulfonyl; and said ring system can contain 1, 2 or 3 ring heteroatoms selected from the group consisting of nitrogen, oxygen and sulfur, where said ring system may not contain more than one ring oxygen atom and not more than one ring sulfur atom; or $Q_1$ is a five-membered aromatic ring system linked via a ring nitrogen atom to the ring which contains the substituent A, said ring system is unsubstituted or is mono- or polysubstituted by substituents selected from the group consisting of halogen, cyano, $C_1$-$C_4$alkyl, $C_1$-$C_4$haloalkyl, $C_1$-$C_4$alkoxy, $C_1$-$C_4$haloalkoxy, $C_1$-$C_4$alkylsulfanyl, $C_1$-$C_4$alkylsulfinyl and $C_1$-$C_4$alkylsulfonyl;

and said ring system contains 1, 2 or 3 ring heteroatoms selected from the group consisting of nitrogen, oxygen and sulfur, where said ring system contains at least one ring nitrogen atom and may not contain more than one ring oxygen atom and not more than one ring sulfur atom;

$R_3$ is hydrogen, halogen or C-$C_4$alkyl;

each $R_4$ independently is hydrogen, $C_1$-$C_4$alkyl or $C_3$-$C_6$cycloalkyl; and $R_5$ is $C_1$-$C_6$alkyl, $C_1$-$C_6$haloalkyl or $C_3$-$C_6$cycloalkyl; or an agrochemically acceptable salt, stereoisomer, enantiomer, tautomer or N-oxide of a compound of formula I.

2. The compound of formula I according to claim 1, represented by the compounds of formula I-A1

I-A1

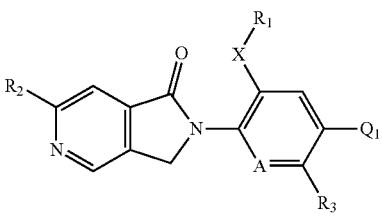

wherein A, $R_1$, $R_2$, $R_3$, X, $Q_1$, $R_4$, and $R_5$ are as defined under formula I in claim 1.

3. The compound of formula I according to claim 1, represented by the compounds of formula I-A2

I-A2

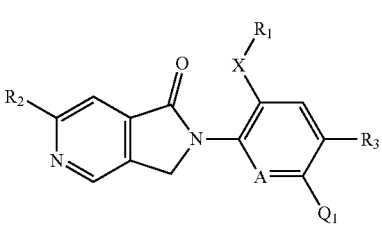

wherein A, $R_1$, $R_2$, $R_3$, X, $Q_1$, $R_4$, and $R_5$ are as defined under formula I in claim 1.

4. The compound of formula I according to claim 1, represented by the compounds of formula I-B1

I-B1

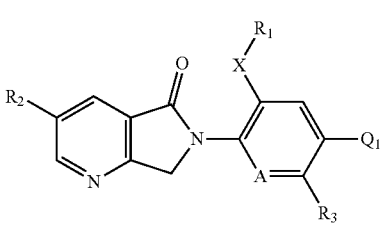

wherein A, $R_1$, $R_2$, $R_3$, X, $Q_1$, $R_4$, and $R_5$ are as defined under formula I in claim 1.

5. The compound of formula I according to claim 1, represented by the compounds of formula I-B2

I-B2

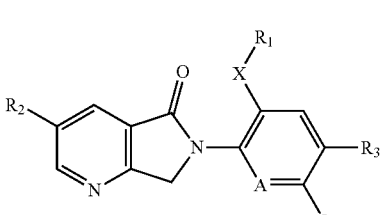

wherein A, $R_1$, $R_2$, $R_3$, X, $Q_1$, $R_4$, and $R_5$ are as defined under formula I in claim 1.

6. The compound of formula I according to claim 1, represented by the compounds of formula I-C₁

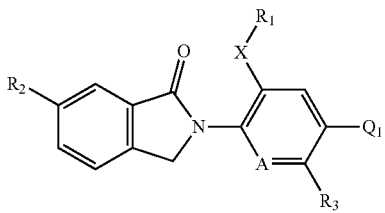

wherein A, $R_1$, $R_2$, $R_3$, X, $Q_1$, $R_4$, and $R_5$ are as defined under formula I in claim 1.

7. The compound of formula I according to claim 1, represented by the compounds of formula I-C₂

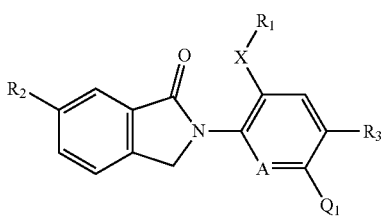

wherein A, $R_1$, $R_2$, $R_3$, X, $Q_1$, $R_4$, and $R_5$ are as defined under formula I in claim 1.

8. The compound of formula I according to claim 1, represented by the compounds of formula I-D1

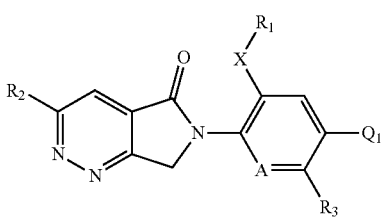

wherein A, $R_1$, $R_2$, $R_3$, X, $Q_1$, $R_4$, and $R_5$ are as defined under formula I in claim 1.

9. The compound of formula I according to claim 1, represented by the compounds of formula I-D2

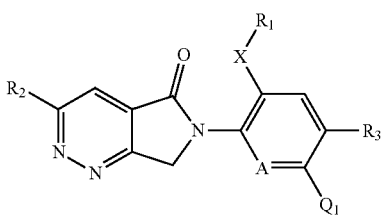

wherein A, $R_1$, $R_2$, $R_3$, X, $Q_1$, $R_4$, and $R_5$ are as defined under formula I in claim 1.

10. The compound of formula I according to claim 1, wherein
A is CH or N;
$R_1$ is $C_1$-$C_4$alkyl or $C_3$-$C_6$cycloalkyl-$C_1$-$C_4$alkyl;
$R_2$ is $C_1$-$C_6$haloalkyl, $C_1$-$C_2$haloalkoxy, $C_1$-$C_2$haloalkylsulfanyl, $C_1$-$C_2$haloalkylsulfinyl or $C_1$-$C_2$haloalkylsulfonyl;
$R_3$ is hydrogen or $C_1$-$C_4$alkyl;
X is S or $SO_2$; and
$Q_1$ is hydrogen, halogen, $C_1$-$C_6$haloalkyl, $C_3$-$C_6$cycloalkyl, $C_3$-$C_6$cycloalkyl monosubstituted by cyano, $C_1$-$C_6$cyanoalkyl, $C_1$-$C_6$cyanoalkoxy, $C_1$-$C_6$haloalkoxy, $C_1$-$C_6$haloalkoxy, —N($R_4$)$_2$, —N($R_4$)COR$_5$, —N($R_4$)CON($R_4$)$_2$, (oxazolidin-2-one)-3-yl or 2-pyridyloxy; in which each $R_4$ independently is hydrogen or $C_1$-$C_4$alkyl; and $R_5$ is $C_1$-$C_6$alkyl or $C_3$-$C_6$cycloalkyl.

11. The compound of formula I according to claim 1, wherein
A is CH or N;
$R_1$ is ethyl or cyclopropylmethyl;
$R_2$ is —OSO$_2$CF$_3$, SO$_2$CF$_3$, —OCF$_3$, CF$_2$CF$_3$ or CF$_3$;
$R_3$ is hydrogen or methyl;
X is S or $SO_2$; and
$Q_1$ is hydrogen, bromine, trifluoromethyl, cyclopropyl, 1-cyanocyclopropyl, 1-cyano-1-methyl-ethyl, 2,2,2-trifluoroethoxy, —NH(CH$_3$), —N(CH$_3$)COCH$_3$, —N(CH$_3$)COCH$_2$CH$_3$, —N(CH$_3$)CO(cyclopropyl), —N(H)CONH(CH$_3$), —N(CH$_3$)CONH(CH$_3$), (oxazolidin-2-one)-3-yl, or 2-pyridyloxy.

12. The compound of formula I according to claim 1, wherein
A is CH or N;
$R_1$ is ethyl or cyclopropylmethyl;
$R_2$ is —OSO$_2$CF$_3$, SO$_2$CF$_3$, —OCF$_3$, CF$_2$CF$_3$ or CF$_3$;
$R_3$ is hydrogen or methyl;
X is S or $SO_2$; and
$Q_1$ is a five- to six-membered aromatic ring system linked via a ring carbon atom to the ring which contains the substituent A, said ring system is unsubstitued or is mono-substituted by substituents selected from the group consisting of halogen and $C_1$-$C_4$haloalkyl; and said ring system can contain 1 or 2 ring nitrogen atoms.

13. The compound of formula I according to claim 1, wherein
A is CH or N;
$R_1$ is ethyl or cyclopropylmethyl;
$R_2$ is —OSO$_2$CF$_3$, SO$_2$CF$_3$, —OCF$_3$, CF$_2$CF$_3$ or CF$_3$;
$R_3$ is hydrogen or methyl;
X is S or $SO_2$; and
$Q_1$ is a five-membered aromatic ring system linked via a ring nitrogen atom to the ring which contains the substituent A, said ring system is unsubstitued or is mono-substituted by substituents selected from the group consisting of halogen and $C_1$-$C_4$haloalkyl; and said ring system contains 2 or 3 ring nitrogen atoms.

14. The compound of formula I according to claim 1, wherein
A is CH or N;
$R_1$ is ethyl or cyclopropylmethyl;
$R_2$ is —OSO$_2$CF$_3$, SO$_2$CF$_3$, —OCF$_3$, CF$_2$CF$_3$ or CF$_3$;
X is S or $SO_2$; and
$Q_1$ is hydrogen, halogen, trifluoromethyl, cyclopropyl, cyanocyclopropyl, cyanoisopropyl, trifluoroethoxy, (oxazolidin-2-one)-3-yl, 2-pyridyloxy, N-linked pyrazolyl which can be mono-substituted by chloro or trifluoromethyl, N-linked triazolyl, C-linked pyrimidinyl, —N(R₄)₂, —N(R₄)COR5, or —N(R₄)CON(R₄)₂, in each of which R₄ is independently either hydrogen or methyl and R₅ is either methyl, ethyl or cyclopropyl.

15. The compound of formula I according to claim 1, wherein Q₁ is hydrogen, bromine, trifluoromethyl, cyclopropyl, 1-cyanocyclopropyl, 1-cyano-1-methyl-ethyl, 2,2,2-trifluoroethoxy, —NH(CH₃), —N(CH₃)COCH₃, —N(CH₃)COCH₂CH₃, —N(CH₃)CO(cyclopropyl), —N(H)CONH(CH₃), —N(CH₃)CONH(CH₃), (oxazolidin-2-one)-3-yl, 2-pyridyloxy, pyrazol-1-yl, 3-chloro-pyrazol-1-yl, 3-trifluoromethyl-pyrazol-1-yl, 1,2,4-triazol-1-yl or pyrimidin-2-yl.

16. The compound of formula I according to claim 1, selected from the group consisting of:
2-(3-ethylsulfonyl-2-pyridyl)-6-(trifluoromethyl)-3H-pyrrolo [3,4-c]pyridin-1-one (compound P1);
2-[5-ethylsulfonyl-6-[1-oxo-6-(trifluoromethyl)-3H-pyrrolo [3,4-c]pyridin-2-yl]-3-pyridyl]-2-methyl-propanenitrile (compound P2);
N-[5-ethylsulfonyl-6-[1-oxo-6-(trifluoromethyl)-3H-pyrrolo [3,4-c]pyridin-2-yl]-3-pyridyl]-N-methyl-acetamide (compound P3);
2-[3-ethylsulfonyl-6-(methylamino)-2-pyridyl]-6-(trifluoromethyl)-3H-pyrrolo [3,4-c]pyridin-1-one (compound P4);
2-[3-ethylsulfonyl-6-(1,2,4-triazol-1-yl)-2-pyridyl]-6-(trifluoromethyl)-3H-pyrrolo [3,4-c] pyridin-1-one (compound P5);
1-[5-ethylsulfonyl-6-[1-oxo-6-(trifluoromethyl)-3H-pyrrolo [3,4-c]pyridin-2-yl]-2-pyridyl]-1,3-dimethyl-urea (compound P6);
2-(5-bromo-3-ethylsulfonyl-2-pyridyl)-6-(trifluoromethyl)-3H-pyrrolo [3,4-c]pyridin-1-one (compound P7);
1-[5-ethylsulfonyl-6-[1-oxo-6-(trifluoromethyl)-3H-pyrrolo [3,4-c]pyridin-2-yl]-3-pyridyl] cyclopropanecarbonitrile (compound P8);
2-[3-ethylsulfonyl-5-[3-(trifluoromethyl) pyrazol-1-yl]-2-pyridyl]-6-(trifluoromethyl)-3H-pyrrolo [3,4-c]pyridin-1-one (compound P9);
2-[3-ethylsulfonyl-5-(trifluoromethyl)-2-pyridyl]-6-(trifluoromethyl)-3H-pyrrolo [3,4-c]pyridin-1-one (compound P10);
1-[5-ethylsulfonyl-6-[5-oxo-3-(trifluoromethyl)-7H-pyrrolo [3,4-b]pyridin-6-yl]-3-pyridyl] cyclopropanecarbonitrile (compound P11);
2-[3-ethylsulfonyl-5-(2-pyridyloxy)-2-pyridyl]-6-(trifluoromethyl)-3H-pyrrolo [3,4-c]pyridin-1-one (compound P12);
2-[5-(3-chloropyrazol-1-yl)-3-ethylsulfonyl-2-pyridyl]-6-(trifluoromethyl)-3H-pyrrolo [3,4-c] pyridin-1-one (compound P13);
2-(5-cyclopropyl-3-ethylsulfonyl-2-pyridyl)-6-(trifluoromethyl)-3H-pyrrolo [3,4-c]pyridin-1-one (compound P14);
2-(6-cyclopropyl-3-ethylsulfonyl-2-pyridyl)-6-(trifluoromethyl)-3H-pyrrolo [3,4-c]pyridin-1-one (compound P15);
2-(3-ethylsulfonyl-6-pyrimidin-2-yl-2-pyridyl)-6-(trifluoromethyl)-3H-pyrrolo [3,4-c]pyridin-1-one (compound P16);
3-[5-ethylsulfonyl-6-[1-oxo-6-(trifluoromethyl)-3H-pyrrolo [3,4-c]pyridin-2-yl]-2-pyridyl] oxazolidin-2-one (compound P17);
N-[5-ethylsulfonyl-6-[1-oxo-6-(trifluoromethyl)-3H-pyrrolo [3,4-c]pyridin-2-yl]-2-pyridyl]-N-methyl-cyclopropanecarboxamide (compound P18);

N-[5-ethylsulfonyl-6-[1-oxo-6-(trifluoromethyl)-3H-pyrrolo [3,4-c]pyridin-2-yl]-2-pyridyl]-N-methyl-propanamide (compound P19);
N-[5-ethylsulfonyl-6-[1-oxo-6-(trifluoromethyl)-3H-pyrrolo [3,4-c]pyridin-2-yl]-2-pyridyl]-N-methyl-acetamide (compound P20);
2-(3-ethylsulfonyl-2-pyridyl)-6-(trifluoromethyl) isoindolin-1-one (compound P21);
6-(3-ethylsulfonyl-2-pyridyl)-3-(trifluoromethyl)-7H-pyrrolo [3,4-b]pyridin-5-one (compound P22);
2-(3-ethylsulfonyl-2-pyridyl)-6-(trifluoromethylsulfonyl) isoindolin-1-one (compound P23);
2-(3-ethylsulfonyl-2-pyridyl)-6-(trifluoromethoxy) isoindolin-1-one (compound P24);
1-[5-ethylsulfonyl-6-[1-oxo-6-(trifluoromethoxy) isoindolin-2-yl]-3-pyridyl] cyclopropanecarbonitrile (compound P25);
1-[5-ethylsulfonyl-6-[1-oxo-6-(trifluoromethyl) isoindolin-2-yl]-3-pyridyl] cyclopropanecarbonitrile (compound P26);
2-[5-ethylsulfonyl-6-[5-oxo-3-(trifluoromethyl)-7H-pyrrolo [3,4-b]pyridin-6-yl]-3-pyridyl]-2-methyl-propanenitrile (compound P27); and
1-[5-(cyclopropylmethylsulfonyl)-6-[1-oxo-6-(trifluoromethyl)-3H-pyrrolo [3,4-c]pyridin-2-yl]-3-pyridyl] cyclopropanecarbonitrile (compound P28).

17. A composition comprising an insecticidally, acaricidally, nematicidally or molluscicidally effective amount of a compound of formula (I), or an agrochemically acceptable salt, stereoisomer, enantiomer, tautomer or N-oxide thereof, as defined in claim 1 and, optionally, an auxiliary or diluent.

18. A method of combating and controlling insects, acarines, nematodes or molluscs which comprises applying to a pest, to a locus of a pest, or to a plant susceptible to attack by a pest an insecticidally, acaricidally, nematicidally or molluscicidally effective amount of a compound of formula (I), or an agrochemically acceptable salt, stereoisomer, enantiomer, tautomer or N-oxide thereof, as defined in claim 1.

19. A method for the protection of plant propagation material from the attack by insects, acarines, nematodes or molluscs, which comprises treating the propagation material or the site, where the propagation material is planted, with a composition according to claim 17.

20. A method of combating and controlling insects, acarines, nematodes or molluscs which comprises applying to a pest, to a locus of a pest, or to a plant susceptible to attack by a pest an insecticidally, acaricidally, nematicidally or molluscicidally effective amount of the composition of claim 17.

21. A compound of formula XVII-a

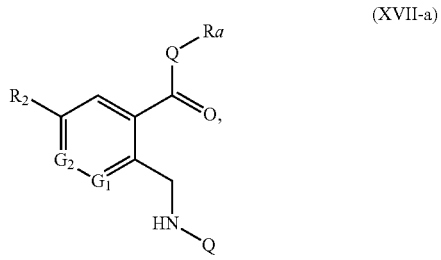

(XVII-a)

wherein

G$_1$ and G$_2$ are, independently from each other, CH or N;

R$_2$ is C$_1$-C$_6$haloalkyl, C$_1$-C$_4$haloalkylsulfanyl, C$_1$-C$_4$haloalkylsulfinyl, C$_1$-C$_4$haloalkylsulfonyl or C$_1$-C$_6$haloalkoxy, C$_1$-C$_4$haloalkylsulfonyloxy;

Q is a radical selected from the group consisting of formula Qa and Qb

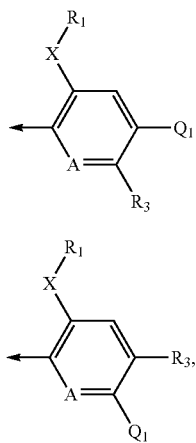

wherein the arrow denotes the point of attachment to the nitrogen atom of the bicyclic ring;

and wherein A represents CH or N;

X is S, SO, or SO$_2$;

R$_1$ is C$_1$-C$_4$alkyl, or C$_3$-C$_6$cycloalkyl-C$_1$-C$_4$alkyl;

Q$_1$ is hydrogen, halogen, C$_1$-C$_6$haloalkyl, C$_3$-C$_6$cycloalkyl, C$_3$-C$_6$cycloalkyl monosubstituted by cyano, C$_1$-C$_6$cyanoalkyl, C$_1$-C$_6$cyanoalkoxy, C$_1$-C$_6$haloalkoxy, —N(R$_4$)$_2$, —N(R$_4$)C(=O)R$_5$, —N(R$_4$)CON(R$_4$)$_2$, (oxazolidin-2-one)-3-yl, or 2-pyridyloxy; or Q$_1$ is a five- to six-membered aromatic ring system, linked via a ring carbon atom to the ring which contains the substituent A, said ring system is unsubstitued or is mono- or polysubstituted by substituents selected from the group consisting of halogen, cyano, C$_1$-C$_4$alkyl, C$_1$-C$_4$haloalkyl, C$_1$-C$_4$alkoxy, C$_1$-C$_4$haloalkoxy, C$_1$-C$_4$alkylsulfanyl, C$_1$-C$_4$alkylsulfinyl and C$_1$-C$_4$alkylsulfonyl; and said ring system can contain 1, 2 or 3 ring heteroatoms selected from the group consisting of nitrogen, oxygen and sulfur, where said ring system may not contain more than one ring oxygen atom and not more than one ring sulfur atom; or Q$_1$ is a five-membered aromatic ring system linked via a ring nitrogen atom to the ring which contains the substituent A, said ring system is unsubstituted or is mono- or polysubstituted by substituents selected from the group consisting of halogen, cyano, C$_1$-C$_4$alkyl, C$_1$-C$_4$haloalkyl, C$_1$-C$_4$alkoxy, C$_1$-C$_4$haloalkoxy, C$_1$-C$_4$alkylsulfanyl, C$_1$-C$_4$alkylsulfinyl and C$_1$-C$_4$alkylsulfonyl;

and said ring system contains 1, 2 or 3 ring heteroatoms selected from the group consisting of nitrogen, oxygen and sulfur, where said ring system contains at least one ring nitrogen atom and may not contain more than one ring oxygen atom and not more than one ring sulfur atom;

R$_3$ is hydrogen, halogen or C$_1$-C$_4$alkyl;

each R$_4$ independently is hydrogen, C$_1$-C$_4$alkyl or C$_3$-C$_6$cycloalkyl; and R$_5$ is C$_1$-C$_6$alkyl, C$_1$-C$_6$haloalkyl or C$_3$-C$_6$cycloalkyl; and R$_a$ is hydrogen, C$_1$-C$_6$alkyl, benzyl or phenyl.

22. A compound of formula IX-a

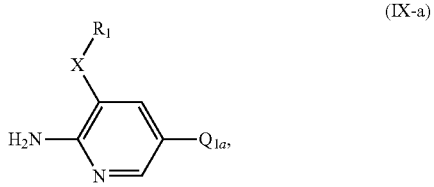

wherein

R$_1$ is C$_1$-C$_4$alkyl, or C$_3$-C$_6$cycloalkyl-C$_1$-C$_4$alkyl;

X is S, SO, or SO$_2$; and

Q$_{1a}$ is 1-cyanocyclopropyl, 1-cyano-1-methyl-ethyl or 2-pyridyloxy.

* * * * *